United States Patent
Ruffner et al.

(10) Patent No.: US 10,832,266 B2
(45) Date of Patent: *Nov. 10, 2020

(54) STREAMLINED UTILITY PORTALS FOR MANAGING DEMAND-RESPONSE EVENTS

(71) Applicant: Google LLC, Mountain View, CA (US)

(72) Inventors: Scott Ruffner, Palo Alto, CA (US); Jonathan Crimins, Menlo Park, CA (US); Scott McGaraghan, Palo Alto, CA (US); William Greene, Palo Alto, CA (US); Jared Luxenberg, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,576

(22) Filed: Jul. 24, 2019

(65) Prior Publication Data
US 2019/0349384 A1 Nov. 14, 2019

Related U.S. Application Data

(63) Continuation of application No. 16/006,115, filed on Jun. 12, 2018, now Pat. No. 10,367,819, which is a (Continued)

(51) Int. Cl.
*G06Q 30/02* (2012.01)
*G06Q 50/06* (2012.01)
(Continued)

(52) U.S. Cl.
CPC ....... *G06Q 30/0202* (2013.01); *G06F 16/955* (2019.01); *G06Q 50/06* (2013.01);
(Continued)

(58) Field of Classification Search
CPC ..... G06F 3/00; G06F 17/30876; H04L 63/08; H04L 63/102; G06Q 30/0202; G06Q 50/06
See application file for complete search history.

(56) References Cited

U.S. PATENT DOCUMENTS 4,223,831 A 9/1980 Szarka
4,335,847 A 6/1982 Levine
(Continued)

FOREIGN PATENT DOCUMENTS

CA 2202008 C 2/2000
CN 102375443 A 3/2012
(Continued)

OTHER PUBLICATIONS

Aprilaire Electronic Thermostats Model 8355 User's Manual, Research Products Corporation, 2000, 16 pages.
(Continued)

*Primary Examiner* — Hee K Song
(74) *Attorney, Agent, or Firm* — Kilpatrick Townsend & Stockton LLP

(57) ABSTRACT

A method for automatically enrolling a smart-home device in a demand-response program includes receiving an identification of a user account that is sent from a utility provider computer system based on an agreement that the smart-home device will be enrolled in the demand-response program. The identification of the user account is also sent to indicate to the device management server that the smart-home device should be sent to a location associated with the user account. The method also includes causing the smart-home device to be sent to the location associated with the user account. The method additionally includes receiving an indication from the smart-home device that the smart-home device has been installed at the location associated with the user account, and enrolling the smart-home device in the demand-response program.

20 Claims, 65 Drawing Sheets

Related U.S. Application Data continuation of application No. 14/742,172, filed on Jun. 17, 2015, now Pat. No. 9,998,475.

(51) Int. Cl.
*G06F 16/955* (2019.01)
*H04L 29/06* (2006.01)
*H04W 12/06* (2009.01)
*F24F 11/58* (2018.01)
*F24F 11/46* (2018.01)

(52) U.S. Cl.
CPC ............ *H04L 63/08* (2013.01); *H04L 63/102* (2013.01); *H04W 12/06* (2013.01); *F24F 11/46* (2018.01); *F24F 11/58* (2018.01)

(56) References Cited

U.S. PATENT DOCUMENTS

| | | | |
|---|---|---|---|
| 4,408,711 A | 10/1983 | Levine | |
| 4,615,380 A | 10/1986 | Beckey | |
| 4,674,027 A | 6/1987 | Beckey | |
| 4,685,614 A | 8/1987 | Levine | |
| 4,751,961 A | 6/1988 | Levine et al. | |
| 4,847,781 A | 7/1989 | Brown, III et al. | |
| 5,088,645 A | 2/1992 | Bell | |
| 5,211,332 A | 5/1993 | Adams | |
| 5,224,648 A | 7/1993 | Simon et al. | |
| 5,240,178 A | 8/1993 | Dewolf et al. | |
| 5,395,042 A | 3/1995 | Riley et al. | |
| 5,462,225 A | 10/1995 | Massara et al. | |
| 5,476,221 A | 12/1995 | Seymour | |
| 5,499,196 A | 3/1996 | Pacheco | |
| 5,544,036 A | 8/1996 | Brown, Jr. et al. | |
| 5,555,927 A | 9/1996 | Shah | |
| 5,611,484 A | 3/1997 | Uhrich | |
| 5,761,083 A | 6/1998 | Brown, Jr. et al. | |
| 5,816,491 A | 10/1998 | Berkeley et al. | |
| 5,902,183 A | 5/1999 | D'Souza | |
| 5,909,378 A | 6/1999 | De Milleville | |
| 5,977,964 A | 11/1999 | Williams et al. | |
| 6,062,482 A | 5/2000 | Gauthier et al. | |
| 6,098,893 A | 8/2000 | Berglund et al. | |
| 6,122,603 A | 9/2000 | Budike, Jr. | |
| 6,216,956 B1 | 4/2001 | Ehlers et al. | |
| 6,311,105 B1 | 10/2001 | Budike, Jr. | |
| 6,349,883 B1 | 2/2002 | Simmons et al. | |
| 6,356,204 B1 | 3/2002 | Guindi et al. | |
| 6,453,687 B2 | 9/2002 | Sharood et al. | |
| 6,490,174 B1 | 12/2002 | Kompelien | |
| 6,513,723 B1 | 2/2003 | Mueller et al. | |
| 6,574,581 B1 | 6/2003 | Bohrer et al. | |
| 6,619,055 B1 | 9/2003 | Addy | |
| 6,643,567 B2 | 11/2003 | Kolk et al. | |
| 6,645,066 B2 | 11/2003 | Gutta et al. | |
| 6,769,482 B2 | 8/2004 | Wagner et al. | |
| 6,785,630 B2 | 8/2004 | Kolk et al. | |
| 6,891,838 B1 | 5/2005 | Petite et al. | |
| 6,975,958 B2 | 12/2005 | Bohrer et al. | |
| 7,024,336 B2 | 4/2006 | Salsbury et al. | |
| 7,135,965 B2 | 11/2006 | Chapman, Jr. et al. | |
| 7,289,887 B2 | 10/2007 | Rodgers | |
| 7,333,880 B2 | 2/2008 | Brewster et al. | |
| 7,346,467 B2 | 3/2008 | Bohrer et al. | |
| RE40,437 E | 7/2008 | Rosen | |
| 7,469,550 B2 | 12/2008 | Chapman, Jr. et al. | |
| 7,537,171 B2 | 5/2009 | Mueller et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,837,958 B2 | 11/2010 | Crapser et al. | |
| 7,848,900 B2 | 12/2010 | Steinberg et al. | |
| 7,854,389 B2 | 12/2010 | Ahmed | |
| 7,908,116 B2 | 3/2011 | Steinberg et al. | |
| 7,908,117 B2 | 3/2011 | Steinberg et al. | |
| 8,010,237 B2 | 8/2011 | Cheung et al. | |
| 8,019,567 B2 | 9/2011 | Steinberg et al. | |
| 8,090,477 B1 | 1/2012 | Steinberg | |
| 8,131,207 B2 | 3/2012 | Hwang et al. | |
| 8,131,497 B2 | 3/2012 | Steinberg et al. | |
| 8,131,506 B2 | 3/2012 | Steinberg et al. | |
| 8,160,752 B2 | 4/2012 | Weaver et al. | |
| 8,180,492 B2 | 5/2012 | Steinberg | |
| 8,452,457 B2 | 5/2013 | Matsuoka et al. | |
| 8,544,285 B2 | 10/2013 | Stefanski et al. | |
| 8,554,376 B1 | 10/2013 | Matsuoka | |
| 8,572,230 B2 | 10/2013 | Koch | |
| 8,600,561 B1 | 12/2013 | Modi et al. | |
| 8,606,374 B2 | 12/2013 | Fadell et al. | |
| 8,630,740 B2 | 1/2014 | Matsuoka et al. | |
| 8,630,741 B1 | 1/2014 | Matsuoka et al. | |
| 8,635,373 B1 | 1/2014 | Supramaniam | |
| 8,752,771 B2 | 6/2014 | Warren et al. | |
| 8,757,507 B2 | 6/2014 | Fadell et al. | |
| 8,843,239 B2 | 9/2014 | Mighdoll et al. | |
| 8,850,348 B2 | 9/2014 | Fadell et al. | |
| 8,854,489 B2 | 10/2014 | Jang et al. | |
| 8,893,032 B2 | 11/2014 | Bruck et al. | |
| 9,121,623 B2 | 9/2015 | Filson et al. | |
| 9,261,287 B2 | 2/2016 | Warren et al. | |
| 9,494,332 B2 | 11/2016 | Filson et al. | |
| 9,595,070 B2 | 3/2017 | Matsuoka et al. | |
| 9,605,858 B2 | 3/2017 | Warren et al. | |
| 9,807,099 B2 | 10/2017 | Matsuoka et al. | |
| 9,810,442 B2 | 11/2017 | Matsuoka et al. | |
| 9,998,475 B2 | 6/2018 | Ruffner et al. | |
| 10,241,527 B2 | 3/2019 | Fadell et al. | |
| 10,367,819 B2 | 7/2019 | Ruffner et al. | |
| 2003/0055776 A1 | 3/2003 | Samuelson | |
| 2003/0216838 A1 | 11/2003 | Dudley | |
| 2004/0034484 A1 | 2/2004 | Solomita et al. | |
| 2004/0095237 A1 | 5/2004 | Chen et al. | |
| 2004/0249479 A1 | 12/2004 | Shorrock | |
| 2005/0119793 A1 | 6/2005 | Amundson et al. | |
| 2005/0125083 A1 | 6/2005 | Kiko | |
| 2005/0128067 A1 | 6/2005 | Zakrewski | |
| 2005/0189429 A1 | 9/2005 | Breeden | |
| 2005/0246408 A1 | 11/2005 | Chung | |
| 2005/0270151 A1 | 12/2005 | Winick | |
| 2005/0280421 A1 | 12/2005 | Yomoda et al. | |
| 2006/0186214 A1 | 8/2006 | Simon et al. | |
| 2006/0196953 A1 | 9/2006 | Simon et al. | |
| 2006/0208099 A1 | 9/2006 | Chapman et al. | |
| 2007/0038787 A1 | 2/2007 | Harris et al. | |
| 2007/0045431 A1 | 3/2007 | Chapman, Jr. et al. | |
| 2007/0167179 A1 | 7/2007 | Shamoon et al. | |
| 2007/0241203 A1 | 10/2007 | Wagner et al. | |
| 2008/0015740 A1 | 1/2008 | Osann | |
| 2008/0015742 A1 | 1/2008 | Kulyk et al. | |
| 2008/0191045 A1 | 8/2008 | Harter | |
| 2008/0317292 A1 | 12/2008 | Baker et al. | |
| 2009/0001181 A1 | 1/2009 | Siddaramanna | |
| 2009/0050703 A1 | 2/2009 | Lifson et al. | |
| 2009/0099699 A1 | 4/2009 | Steinberg et al. | |
| 2009/0125151 A1 | 5/2009 | Steinberg et al. | |
| 2009/0171862 A1 | 7/2009 | Harrod et al. | |
| 2009/0195349 A1 | 8/2009 | Frader-Thompson et al. | |
| 2009/0240381 A1 | 9/2009 | Lane | |
| 2009/0254225 A1 | 10/2009 | Boucher et al. | |
| 2009/0259713 A1 | 10/2009 | Blumrich et al. | |
| 2009/0281885 A1 | 11/2009 | Castelli et al. | |
| 2009/0326726 A1 | 12/2009 | Ippolito et al. | |
| 2010/0019051 A1 | 1/2010 | Rosen | |
| 2010/0025483 A1 | 2/2010 | Hoeynck et al. | |
| 2010/0050004 A1 | 2/2010 | Hamilton et al. | |
| 2010/0060479 A1 | 3/2010 | Salter | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0076835 A1 | 3/2010 | Silverman | |
| 2010/0084482 A1 | 4/2010 | Kennedy et al. | |
| 2010/0088261 A1 | 4/2010 | Montalvo | |
| 2010/0101854 A1 | 4/2010 | Wallaert et al. | |

(56) References Cited

U.S. PATENT DOCUMENTS

| | | |
|---|---|---|
| 2010/0107109 A1 | 4/2010 | Filbeck |
| 2010/0156608 A1 | 6/2010 | Bae et al. |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0282857 A1 | 11/2010 | Steinberg |
| 2010/0289643 A1 | 11/2010 | Trundle et al. |
| 2010/0292856 A1 | 11/2010 | Fujita |
| 2010/0305891 A1 | 12/2010 | Rodgers |
| 2010/0308119 A1 | 12/2010 | Steinberg et al. |
| 2010/0318227 A1 | 12/2010 | Steinberg et al. |
| 2010/0324962 A1 | 12/2010 | Nesler et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0066300 A1 | 3/2011 | Tyagi |
| 2011/0077896 A1 | 3/2011 | Steinberg et al. |
| 2011/0106328 A1 | 5/2011 | Zhou et al. |
| 2011/0153106 A1 | 6/2011 | Drake et al. |
| 2011/0166828 A1 | 7/2011 | Steinberg et al. |
| 2011/0184565 A1 | 7/2011 | Peterson |
| 2011/0185895 A1 | 8/2011 | Freen |
| 2011/0231028 A1 | 9/2011 | Ozog |
| 2011/0246291 A1 | 10/2011 | Paul |
| 2011/0258018 A1 | 10/2011 | Tyagi et al. |
| 2011/0264291 A1 | 10/2011 | Le Roux et al. |
| 2011/0290893 A1 | 12/2011 | Steinberg |
| 2011/0307103 A1 | 12/2011 | Cheung et al. |
| 2012/0029713 A1 | 2/2012 | Spicer |
| 2012/0046859 A1 | 2/2012 | Imes et al. |
| 2012/0053745 A1 | 3/2012 | Ng |
| 2012/0064923 A1 | 3/2012 | Imes et al. |
| 2012/0065805 A1 | 3/2012 | Montalvo |
| 2012/0065935 A1 | 3/2012 | Steinberg et al. |
| 2012/0085831 A1 | 4/2012 | Kopp |
| 2012/0086562 A1 | 4/2012 | Steinberg |
| 2012/0089523 A1 | 4/2012 | Hurri et al. |
| 2012/0091804 A1 | 4/2012 | Altonen et al. |
| 2012/0095601 A1 | 4/2012 | Abraham et al. |
| 2012/0101648 A1 | 4/2012 | Federspiel et al. |
| 2012/0118989 A1 | 5/2012 | Buescher et al. |
| 2012/0123995 A1 | 5/2012 | Boot |
| 2012/0126019 A1 | 5/2012 | Warren et al. |
| 2012/0126021 A1 | 5/2012 | Warren et al. |
| 2012/0131504 A1 | 5/2012 | Fadell et al. |
| 2012/0150359 A1* | 6/2012 | Westergaard .......... G06Q 50/06 700/291 |
| 2012/0158350 A1 | 6/2012 | Steinberg et al. |
| 2012/0191257 A1 | 7/2012 | Corcoran et al. |
| 2012/0221151 A1 | 8/2012 | Steinberg |
| 2012/0259469 A1 | 10/2012 | Ward et al. |
| 2012/0296480 A1 | 11/2012 | Raman |
| 2012/0310431 A1 | 12/2012 | Cheetham |
| 2013/0024799 A1 | 1/2013 | Fadell et al. |
| 2013/0030590 A1 | 1/2013 | Prosser |
| 2013/0047010 A1 | 2/2013 | Massey et al. |
| 2013/0085614 A1 | 4/2013 | Wenzel et al. |
| 2013/0274936 A1 | 10/2013 | Donahue |
| 2014/0277761 A1 | 9/2014 | Matsuoka et al. |
| 2014/0277769 A1 | 9/2014 | Matsuoka et al. |
| 2014/0277795 A1 | 9/2014 | Matsuoka et al. |
| 2014/0277808 A1 | 9/2014 | Irisarri et al. |
| 2014/0278794 A1 | 9/2014 | Slutsker et al. |
| 2017/0083072 A1 | 3/2017 | Dauneria et al. |
| 2017/0185120 A9* | 6/2017 | Imes .................. F24F 11/79 |

FOREIGN PATENT DOCUMENTS

| | | |
|---|---|---|
| CN | 102812303 A | 12/2012 |
| EP | 196069 B1 | 12/1991 |
| EP | 2378483 A1 | 10/2011 |
| EP | 2407837 A2 | 1/2012 |
| JP | 59106311 A | 6/1984 |
| JP | 01252850 A | 10/1989 |
| JP | 09-298780 A | 11/1997 |
| WO | 2010-033563 A1 | 3/2010 |
| WO | 2010-083334 A1 | 7/2010 |
| WO | 2011-149600 A2 | 12/2011 |
| WO | 2012-024534 A2 | 2/2012 |
| WO | 2012-068591 A2 | 5/2012 |
| WO | 2012-092625 A2 | 7/2012 |
| WO | 2014-149993 A1 | 9/2014 |
| WO | 2014-152301 A2 | 9/2014 |
| WO | 2014-172374 A1 | 10/2014 |

OTHER PUBLICATIONS

Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., 2011, 120 pages.
Hunter Internet Thermostat Installation Guide, Hunter Fan Co., 2012, 8 pages.
Introducing the New Smart Si Thermostat, Datasheet [online]. Ecobee, Mar. 2012 [retrieved on Feb. 25, 2013]. Retrieved from the Internet: <URL: https:--www.ecobee.com-solutions-home-smart-si->, Mar. 12, 2012, 4 pages.
Lennox ComfortSense 5000 Owners Guide, Lennox Industries, Inc., 2007, 32 pages.
Lennox ComfortSense 7000 Owners Guide, Lennox Industries, Inc., 2009, 15 pages.
Lennox iComfort Manual, Lennox Industries, Inc., 2010, 20 pages.
Lux PSPU732T Manual, LUX Products Corporation, Jan. 6, 2009, 48 pages.
NetX RP32-Wifi Network Thermostat Consumer Brochure, Network Thermostat, May 2011, 2 pages.
NetX RP32-Wifi Network Thermostat Specification Sheet, Network Thermostat, 2012, 2 pages.
RobertShaw Product Manual 9620, Maple Chase Company, 2001, 14 pages.
RobertShaw Product Manual 9825i2, Maple Chase Company, 2006, 36 pages.
SCE Energy$mart Thermostat Study for Southern California Edison—Presentation of Study Results, Population Research Systems, Project #1010, Nov. 10, 2004, 51 pages.
SYSTXCCUIZ01-V Infinity Control Installation Instructions, Carrier Corp, 2012, 20 pages.
T8611G Chronotherm IV Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Perfect Climate Comfort Center PC8900A W8900A-C Product Data Sheet, Honeywell International Inc, 2001, 44 pages.

(56) References Cited

OTHER PUBLICATIONS

Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T2900Manual, Venstar, Inc., 2008, 113 pages.
Venstar T5800 Manual, Venstar, Inc., Sep. 7, 2011, 63 pages.
VisionPRO TH8000 Series Installation Guide, Honeywell International, Inc., 2012, 12 pages.
VisionPRO TH8000 Series Operating Manual, Honeywell International, Inc., 2012, 96 pages.
VisionPRO Wi-Fi Programmable Thermostat, Honeywell International, Inc. Operating Manual, 2012, 48 pages.
White Rodgers (Emerson) Model 1F81-261 Installation and Operating Instructions, White-Rodgers, Emerson Electric Co., 2010, 8 pages.
White Rodgers Emerson Blue Wireless Comfort Interface Model IF98EZ-1621 Homeowner User Guide, White-Rodgers, Emerson Electric Co., 2012, 28 pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Electrical Appliance Manager—User Interface Design, Development and Testing", Poster, Demand Response Enabling Technology Development, University of California Berkeley, Retrieved from dr.berkeley.edu-dream-posters-2005_6GUIposter.pdf, 2005, 1 page.
Arens et al., "Demand Response Enabled Thermostat—Control Strategies and Interface", Demand Response Enabling Technology Development Poster, University of California Berkeley, Retrieved from dr.berkeley.edu-dream-posters-2004_11CEC_TstatPoster.pdf, 2004, 1 page.
Arens et al., "Demand Response Enabling Technology Development", Phase I Report: Jun. 2003-Nov. 2005, Jul. 27, P:-DemandRes-UC Papers-DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004, 1 page.
Auslander et al., "UC Berkeley DR Research Energy Management Group", PowerPoint Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley., 2008, pp. 1-24 through 1-36.
De Almeida et al., "Advanced Monitoring Technologies for the Evaluation of Demand-Side Management Programs", Energy, vol. 19, No. 6, 1994, pp. 661-678.
Deleeuw, "Ecobee WiFi Enabled Smart Thermostat Part 2: The Features Review", Retrieved from <URL: http:--www.homenetworkenabled.com-content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Gevorkian, "Alternative Energy Systems in Building Design", 2009, pp. 195-200.
Hoffman et al., "Integration of Remote Meter Reading, Load Control and Monitoring of Customers' Installations for Customer Automation with Telephone Line Signaling", Electricity Distribution, 1989. CIRED 1989. 10th International Conference on, May 8-12, 1989, pp. 421-424.
Levy, "A Vision of Demand Response—2016", The Electricity Journal, vol. 19, Issue 8, Oct. 2006, pp. 12-23.
Loisos et al., "Buildings End-Use Energy Efficiency: Alternatives to Compressor Cooling", California Energy Commission, Public Interest Energy Research, Jan. 2000, 80 pages.
Lopes, "Case Studies in Advanced Thermostat Control for Demand Response", AEIC Load Research Conference, St. Louis, MO, Jul. 2004, 36 pages.
Lu et al., "The Smart Thermostat: Using Occupancy Sensors to Save Energy in Homes", in Proceedings of the 8th ACM Conference on Embedded Networked Sensor Systems, Nov. 3-5, 2010, pp. 211-224.
Martinez, "SCE Energy$mart Thermostat Program", Advanced Load Control Alliance, Oct. 5, 2004, 20 pages.
Matty, "Advanced Energy Management for Home Use", IEEE Transaction on Consumer Electronics, vol. 35, No. 3, Aug. 1989, pp. 584-588.
Motegi et al., "Introduction to Commercial Building Control Strategies and Techniques for Demand Response", Demand Response Research Center, May 22, 2007, 35 pages.
Mozer, "The Neural Network House: An Environmental that Adapts to it's Inhabitants", AAAI Technical Report SS-98-02, 1998, pp. 110-114.
Mozer, M. et al., "The Neurothermostat: Predictive Optimal Control of Residential Heating Systems" appearing in M. Mozer et al. *Adv. in Neural Info. Proc. Systems 9*, Cambridge, MA: MIT Press. 1997, pp. 953-959.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley, 2008, pp. 7-242 through 7-253.
Peffer et al., "Smart Comfort at Home: Design of a Residential Thermostat to Achieve Thermal Comfort, and Save Money and Peak Energy", University of California Berkeley, Mar. 2007, 1 page.
Wright et al., "DR ETD—Summary of New Thermostat, TempNode, & New Meter (UC Berkeley Project)", Power Point Presentation, Public Interest Energy Research, University of California Berkeley. Retrieved from: http:--dr.berkeley.edu-dream-presentations-2005_6CEC.pdf, 2005, pp. 1-49.
Extended European Search Report dated Oct. 12, 2016 in European Patent Application No. 14770648.5, all pages.
Extended European Search Report dated Nov. 25, 2016 in European Patent Application No. 14784686.9, all pages.
Extended European Search Report dated Jan. 5, 2017 in European Patent Application No. 14767804.9, all pages.
"Study on Optimization Control Technique of Heating, Ventilation and Air-conditioning," Xiaoping Yang, Chinese Doctoral Dissertations & Master's Theses Full-text Database (Master), Engineering Science and Technology II, No. 5, C038-269.
International Search Report and Written Opinion dated Oct. 9, 2014 in International Patent Application No. PCT/US2014/027185, all pages.
International Preliminary Report on Patentability dated Sep. 15, 2015 in International Patent Application No. PCT/US2014/027185, all pages.
International Search Report and Written Opinion dated Sep. 15, 2014 for International Patent Application No. PCT/US2014/034213, all pages.
International Preliminary Report on Patentability dated Oct. 20, 2015 for International Patent Application No. PCT/US2014/034213, all pages.
Non-Final Office Action dated Feb. 4, 2016 in U.S. Appl. No. 13/842,213, all pages.
Final Office Action dated Jun. 16, 2016 in U.S. Appl. No. 13/842,213, all pages.
Non-Final Office Action dated Dec. 12, 2016 in U.S. Appl. No. 13/866,635, all pages.
Non-Final Office Action dated Jul. 17, 2015 in U.S. Appl. No. 13/866,635, all pages.
Final Office Action dated Jan. 14, 2016 in U.S. Appl. No. 13/866,635, all pages.
Notice of Publication dated Sep. 18, 2014 in U.S. Appl. No. 13/866,199, 1 page.

(56) References Cited

OTHER PUBLICATIONS

Non-Final Office Action dated Dec. 12, 2016 in U.S. Appl. No. 13/866,199, all pages.
Non-Final Office Action dated Jun. 19, 2015 in U.S. Appl. No. 13/866,199, all pages.
First Examination Report dated May 12, 2017 in Australian Patent Application No. 2014254089, all pages.
Office Action dated May 15, 2017 in Chinese Patent Application No. 201480029063.8, all pages.
First Chinese Office Action dated Aug. 24, 2016 in Chinese Patent Application No. 201480029063.8, all pages. English translation.
International Search Report and Written Opinion dated Jul. 30, 2014 in International Patent Application No. PCT/US2014/021758 all pages.
International Preliminary Report on Patentability dated Sep. 24, 2015 in International Patent Application No. PCT/US2014/021758 all pages.
Chinese Notification of Publication of Patent Application for Invention and Entering the Substantive Examination Proceeding dated Mar. 9, 2016 in Chinese Patent Application No. 201480027939.5, all pages.

\* cited by examiner

Enrollment - @ User Device

Participation - @ User Device

Participant GUI: Scheduler

Utility Portal

| User ID 2952 | Device 2954 | Connection Status 2956 | Qualify? 2958 | Receive DR notification 2960 | Executing DR? 2962 | Estimated Total Energy Reduction 2964 | Estimated Current Energy Reduction 2966 | Actual Current Energy Reduction 2968 |
|---|---|---|---|---|---|---|---|---|
| Angel | A | connected | y | y | y | 25 kWh | 5 kWh | 4 |
| Brian | B | connected | y | y | y | 82 kWh | 16 kWh | 16 |
| | C | connected | y | n | n | 56 kWh | 21 kWh | 0 |
| | D | no conn. | n | n | n | 79 kWh | 11 kWh | 0 |
| Eric | E | connected | y | y | y | 915 kWh | 248 kWh | 273 kWh |
| George | F | connected | y | — | — | — | — | — |
| | G | connected | y | — | — | — | — | — |
| ... | ... | ... | ... | ... | ... | ... | ... | ... |
| Nancy | N | connected | y | y | y | 12 kWh | 3 kWh | 4 kWh |

Estimated Aggregate Current Energy Reduction: 28,468 kWh  ~2970
Actual Aggregate Current Energy Reduction: 29,395 kWh  ~2972
Percentage of Participating Devices Current Executing DR Event: 92%  ~2974

Event Time Remaining: 2 Hrs 6 mins  ~2976

FIG. 29B

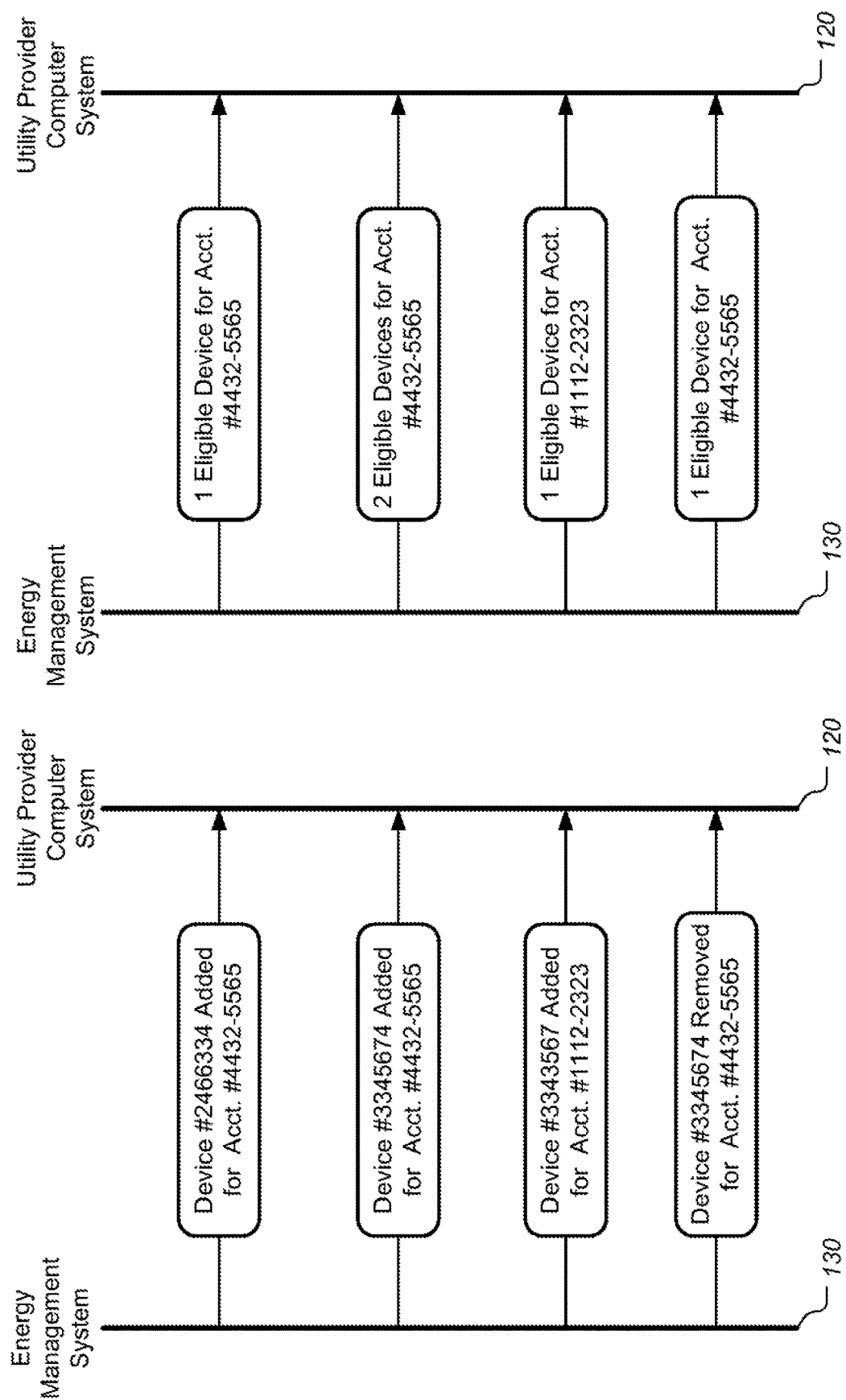

nest Utility Partner  Utility Company  Dave Smith
Sign out

SCHEDULE CUSTOMERS ②

| Pending Requests | Existing Customers |

② PENDING
Feb. 24, 9:36AM

[ Download File... ]  [ Make Changes ]  [ Upload File... ]

Last download Feb. 23, 10:45AM  Change only the accept/reject column  Last upload Feb. 24, 8:13AM
by Steve Smith  and assign a group  by Steve Smith File uploaded 8:13AM Feb 24 2013
pending customer 02-24-2013.csv

9 Accepted  1 Rejected

2 Errors  Ref.  Name  Account No.

Applicant was rejected and then assigned a group  6  James Smith  1234567
Applicant was rejected and then assigned a group  13  Julie Smith  1234567

3401 (top)

3450 (bracket on right)

FIG. 34B nest Utility Partner — Utility Company — Dave Smith Sign out

SCHEDULE CUSTOMERS ②

Schedule a Demand Respnse | Tomorrow, Feb 22 ▲ | 2:00-4:00 PM CST ▲ | Demand Response Deadline

| Groups ▼ | Total Units | Ready | %Ready | Availability | Last Demand Response (CST) | Demand Response Left |
|---|---|---|---|---|---|---|
| ☐ Group A | 438 | 352 | 76% | availble | Wed. Feb. 19 2:00-4:00PM | 10 |
| ☐ Group B | 350 | 458 | 76% | availble | Wed. Feb. 19 2:00-4:00PM | 10 |
| ☐ Group C | 349 | 255 | 76% | availble | Wed. Feb. 17 2:00-4:00PM | 12 |

[ Request Demand Response ]

Active Demand Response

No Active Demand Response Events

| Previous Demand Response | Total | Units Ran | % | Units Confirmed | % | Date & Time (CST) | Status | Date & Time (CST) | w/Demand Response | Runtime w/o Demand Response | % Reduction |
|---|---|---|---|---|---|---|---|---|---|---|---|
| • Group A, Group B | 1002 | 771 | 77% | | | Wed. Feb 19, 2:00PM-4:00PM | | | 1429 hrs | 2210 hrs | 35% |
| • Group A, and 2 more | 1047 | 754 | 72% | | | Mon. Feb 17, 2:00PM-4:00PM | | | 1256 hrs | 1305 hrs | 40% |

FIG. 34C

3404 nest Utility Partner     Utility Company     Dave Smith   Sign out

SCHEDULE CUSTOMERS (2)

| Schedule a Demand Response | | | | Tomorrow • Feb 22 | 2:00-4:00 PM CST | | Demand Response Deadline | |
|---|---|---|---|---|---|---|---|---|
| Groups ▼ | Total Units | Ready | %Ready | | Availability | Last Demand Response (CST) | Demand Response Left |
| ☒ Group A | 438 | 332 | 76% | | availble | Wed Feb. 19 2:00-4:00PM | 10 |
| ☒ Group B | 350 | 454 | 81% | | availble | Wed Feb. 19 2:00-4:00PM | 10 |
| ☐ Group C | 349 | 255 | 73% | | availble | Wed Feb. 19 2:00-4:00PM | 12 |

Group A, Group B   1005   791   79%   ___%   [ Request Demand Response ] — 3466

Active Demand Response    Status

No Active Demand Response Events

| Previous Demand Response | Total | Units Ran | Units Confirmed % | % | Date & Time (CST) | w/Demand Response | Runtime w/o Demand Response | % Reduction |
|---|---|---|---|---|---|---|---|---|
| ▸ Group A, Group B | 1002 | 771 | 754 | 77% | Wed. Feb 19, 2:00PM-4:00PM | 1429 hrs | 2210 hrs | 35% |
| ▸ Group A, and 2 more | 1047 | 754 | | 72% | Mon. Feb 17, 2:00PM-4:00PM | 1256 hrs | 1305 hrs | 40% |

3465 —

FIG. 34D nest Utility Partner     Utility Company     Dave Smith / Sign out

3405

SCHEDULE CUSTOMERS ②  3458

| Schedule a Demand Response | | | | Tomorrow • Feb 22 ⬥ | 2:00PM-4:00PM CST ⬥ | Demand Response Deadline | |
|---|---|---|---|---|---|---|---|
| Groups ▾ | Total Units | | Ready | %Ready | Availability | Demand Response Hour (CST) | Demand Response Left |
| ☐ Group A | 438 | | 332 | 76% | scheduled | Wed Feb. 19 2:00-4:00PM | 10 |
| ☐ Group B | 350 | | 332 | 76% | scheduled | Wed Feb. 19 2:00-4:00PM | 10 |
| ☐ Group C | 349 | | 332 | 76% | scheduled | Wed Feb. 19 2:00-4:00PM | 12 |

3471

[ Request Demand Response ]    3473

| Active Demand Response | Total Units | Units Confirmed | % | Date & Time (CST) — 3472 | Status |
|---|---|---|---|---|---|
| ▸ Group A, Group B | 1005 | 856 | 85% | Sat. Feb 22, 2:00PM-4:00PM | Scheduled |

| Previous Demand Response | Total | Units Ran | % | Date & Time (CST) | w/Demand Response | Runtime w/o Demand Response | % Reduction |
|---|---|---|---|---|---|---|---|
| ▸ Group A, Group B | 1002 | 771 | 77% | Wed. Feb 19, 2:00PM-4:00PM | 1429 hrs | 2210 hrs | 35% |
| ▸ Group A, and 2 more | 1047 | 754 | 72% | Mon. Feb 17, 2:00PM-4:00PM | 1256 hrs | 1305 hrs | 40% |

3406 nest Utility Partner    Utility Company    Dave Smith Sign out

SCHEDULE CUSTOMERS ②    3458

| Schedule a Demand Response | | Tomorrow • Feb 22 ▼ | | 2:00PM-4:00PM CST ▼ | Demand Response Deadline | |
|---|---|---|---|---|---|---|
| Groups ▼ | Total Units | Ready | %Ready | Availability | Last Demand Response (CST) | Demand Response Left |
| ☐ Group A | 438 | 332 | 76% | running | Wed Feb. 19 2:00-4:00PM | 10 |
| ☐ Group B | 350 | 332 | 76% | running | Wed Feb. 19 2:00-4:00PM | 10 |
| ☐ Group C | 349 | 332 | 76% | available | Wed Feb. 19 2:00-4:00PM | 12 |

[ Request Demand Response ]

| Active Demand Response | Units | | | Date & Time (CST) | Status |
|---|---|---|---|---|---|
| | Total Confirmed | % | | | |
| ▸ Group A, Group B | 1005 | 856 | 85% | Sat. Feb 22, 2:00PM-4:00PM | running —3483 |

3470 ⎫

| Previous Demand Response | Units Ran | | | Date & Time (CST) | Runtime w/ Demand Response | Runtime w/o Demand Response | % Reduction |
|---|---|---|---|---|---|---|---|
| | Total | Units Ran | % | | | | |
| Group A, Group B (3485) | 1002 | 771 | 77% | Wed. Feb 19, 2:00PM-4:00PM | 1429 hrs | 2210 hrs | 35% |
| Group A, and 2 more (3486) | 1047 | 754 | 72% | Mon. Feb 17, 2:00PM-4:00PM | 1256 hrs —3482 | 1305 hrs | 40% |

3407 nest Utility Partner                Utility Company                                          Dave Smith
                                                                                             Sign out

SCHEDULE CUSTOMERS ②

| Schedule a Demand Response | Tomorrow • Feb 22 ◆ | | | 2:00PM-4:00PM CST ◆ | Demand Response Deadline | |
|---|---|---|---|---|---|---|
| Groups ▾ | Total Units | Ready | %Ready | Availability | Last Demand Response (CST) | Demand Response Left |
| ☐ Group A | 438 | 332 | 76% | running | Sat Feb. 22 2:00-4:00PM | 10 |
| ☐ Group B | 562 | 453 | 81% | running | Sat Feb. 22 2:00-4:00PM | 10 |
| ☐ Group C | 349 | 255 | 73% | available | Mon Feb. 17 2:00-4:00PM | 12 |

[ Request Demand Response ]

Active Demand Response

| | Units Total | Units Confirmed | % | Date & Time (CST) | Status |
|---|---|---|---|---|---|
| ▸ Group A, Group B | 1005 | 856 | 85% | Sat. Feb 22, 2:00PM-4:00PM | running |

Previous Demand Response

| | Total | Units Ran | % | Date & Time (CST) | w/Demand Response | Runtime w/o Demand Response | % Reduction |
|---|---|---|---|---|---|---|---|
| ▸ Group A, Group B | 1005 | 771 | 77% | Wed. Feb 19, 2:00PM-4:00PM | 1437 hrs | 2210 hrs | 35% |
| | 438 | 332 | 76% | | 821 hrs | 955 hrs | 35% |
| Group A | 567 | 439 | 77% | | 816 hrs | 1255 hrs | 35% |
| Group B | | | | | | | |
| ▸ Group A, and 2 more | 1047 | 754 | 72% | Mon. Feb 17, 2:00PM-4:00PM | 1256 hrs | 1306 hrs | 40% |

| | 3501 | 3502 | 3503 |
|---|---|---|---|
| 3510—MONTH | | 3 | 3 |
| 3511—DAY | | 20 | 20 |
| 3512—EVENT_TYPE | | NEW_USER | NEW_USER |
| 3520—NAME | | John Doe | Jane Somebody |
| 3513—EMAIL | | jdoe@example.com | jsomebody@example.com |
| 3521—SERVICE ADDRESS | | 1234 Main St. | 2345 Minor St. |
| 3522—SERVICE CITY | | Austin | Austin |
| 3523—SERVICE STATE | | TX | TX |
| 3524—SERVICE POSTAL_CODE | | 78701 | 78701 |
| 3525—MAILING ADDRESS | | 1234 Main St. | 2345 Minor St. |
| 3526—MAILING CITY | | Austin | Austin |
| 3527—MAILING STATE | | TX | TX |
| 3528—MAILING POSTAL_CODE | | 78701 | 78701 |
| PHONE | | | |
| 3529—ACCOUNT_NUMBER | | 01234 56789 | 12345 67890 |
| 3514—RATE_PLAN | | Power Partner | Power Partner |
| 3530—CONTRACT_APPROVED | | 2013-03-20 12:21:30CST | 2013-03-20 19:45:6CST |
| 3515—NEST_SERIALS | | TESTL 1234567890 | TESTL 2345678901 |
| 3531—APPROVED | | | |
| 3532—ASSIGN GROUP | | | |
| 3533—GROUP | | | |
| 3534—REJECTION REASON | | | |
| 3535—REJECTION NOTES | | | |

FIG. 35

3500 nest Utility Partner     Utility Company     Dave Smith / Sign out

SCHEDULE   CUSTOMERS ②

| Schedule a Demand Response | Tomorrow - Feb 22 | | | 2:00PM-4:00PM CST | Demand Response Deadline | |
|---|---|---|---|---|---|---|
| Groups ▾ | Total Units | Ready | %Ready | Availability | Last Demand Response (CST) | Demand Response Left |
| ☐ Group A | 438 | 332 | 76% | availble | Sat Feb. 22 2:00-4:00PM | 10 |
| ☐ Group B | 567 | 459 | 81% | availble | Sat Feb. 22 2:00-4:00PM | 10 |
| ☐ Group C | 349 | 255 | 73% | availble | Mon. Feb. 17 2:00-4:00PM | 12 |

[ Request Demand Response ]

UTILITY OPERATING PARAMETERS

ENERGY PRODUCTION CAPACITY

ENTER ENERGY DEMAND PROFILE

— MAX ENERGY PRODUCTION 3642
— ENERGY DEMAND PROFILE 3644

FIG. 36A nest Utility Partner     Utility Company     Dave Smith Sign out

REQUEST CUSTOMERS ②

REQUEST ENERGY REDUCTION FROM YOUR UTILITY PARTNER

SPECIFY DESIRED ENERGY REDUCTION AMOUNT [2 MwH] —3730

SPECIFY DATE [3/25] —3732

SPECIFY TIME PERIOD [12PM-6PM] —3734

```
         AMOUNT    DATE    TIME PERIOD
         2 mWh     3/25    12PM-6PM
```

[REQUEST] —3736

UTILITY PARTNER CAN REDUCE [2.5 mWh] ON —3762
[3/25] DURING [12PM-6PM] USING ONE OR MORE OF GROUPS:

```
                              UNITS
              ENERGY SAVINGS    TOTAL  READY   %
☒ GROUP A     1.5 mWh           3567   2782   78%
☒ GROUP B     0.5 mWh           1200    957   80%
☒ GROUP C     0.5 mWh           1359   1014   75%
```

[CONFIRM DEMAND REQUEST] —3768

FIG. 37

3800 nest Utility Partner     Utility Company     Dave Smith / Sign out

SCHEDULE CUSTOMERS ② SUGGESTIONS ③     — 3828

SUGGESTED DEMAND RESPONSE EVENT

WE NOTICED YOU HAVE NOT SCHEDULED DEMAND RESPONSE EVENTS FOR ONE OR MORE OF THE FOLLOWING DAYS:

| | EVENT# | DATE | EVENT PERIOD | ENERGY SAVINGS |
|---|---|---|---|---|
| ☐ | 1 | 3/22 | 4PM-6PM | 1.5 mWh |
| ☒ | 2 | 3/22 | 12PM-4PM | 0.75 mWh |
| ☐ | 3 | 3/23 | 12PM-6PM | 2.0 mWh |

| NAME | TOTAL UNITS |
|---|---|
| GROUP A | 4500 |
| GROUP D | 6000 |

[ COMMENCE DEMAND RESPONSE EVENT FOR SELECTED SUGGESTIONS ] — 3840

STREAMLINED UTILITY PORTALS FOR MANAGING DEMAND-RESPONSE EVENTS

CROSS-REFERENCES TO RELATED APPLICATIONS

This patent application is a continuation of U.S. Ser. No. 16/006,115 filed Jun. 12, 2018. U.S. Ser. No. 16/006,115 is a continuation of U.S. Ser. No. 14/742,172 filed Jun. 17, 2015. This patent application is related to U.S. Ser. No. 13/866,199 filed Apr. 19, 2013 and U.S. Ser. No. 13/842,213 filed Mar. 15, 2013. The disclosures of each of these applications are incorporated herein by reference in their entirety.

This patent specification relates to utility portals for managing demand response events. More particularly, this patent specification relates to user interfaces that enable utility companies to communicate information to an energy management system that can implement energy shifting techniques for a population of structures having environmental cooling systems controlled by a respective population of network-connected thermostats.

BACKGROUND

Utility companies face ongoing challenges with consistently satisfying the demand for electricity. Facilities for generating electricity are typically well-suited for supplying constant amounts of electricity. However, consumers' demand for electricity is often quite the opposite in that the aggregate electricity demand varies significantly over the course of the delay. The daily variance results in one or more 'peak' demand times or periods in which demand on the utility company is greatest, and 'non-peak' demand times or periods in which demand on the utility company is reduced.

The variance in demand over the course of a day may be impacted by a number of factors such as weather and living patterns. For example, during the summertime, demand generally tends to increase as the outside temperature increases to levels considered uncomfortable as consumers increase their usage of high consumption appliances such as air conditioning systems. Demand also generally tends to vary based on work habits, where demand peaks when people leave for work and again when people return from work. During some points in the year, such as during extremely hot days, demand may reach extreme peaks.

Utility companies have a variety of options for dealing with the variable demand for energy. They may, for example, increase their ability to satisfy higher peak demands by building additional power plants. However, the costs of doing so are often prohibitive and building such plants is often inefficient as the added capacity is used for only short durations throughout the year. They may buy additional capacity from other utility company's or energy providers, but doing so is also costly as such company's may charge a premium and the energy transfer from those other companies is often less efficient. Instead of increasing supply, utility companies may also address peak demands by reducing the demand via load shedding.

Load shedding is a technique in which the utility company reduces the amount of energy demanded by its consumers during a period of peak demand. A variety of load shedding techniques are in use today, most of which are based on the utility company directly controlling the cooling systems of its consumers. During such peak demand periods the utility company controls the cooling systems to reduce their energy demand. Such events, which most often take place on very hot days in the mid-to-late afternoon and have a duration in the general range of two to six hours, are referenced in the literature by a variety of different names such as load shedding events, load shifting events, and demand response events. The goal of the utility company in carrying out such events is not necessarily to reduce the total amount of energy consumed over the whole day, but rather to reduce the peak demand during that particular two-to-six hour interval, i.e., during the load shedding interval or demand-response interval. Typically, the end result is that the energy that would have been consumed during the load shedding interval is instead consumed in the hours subsequent to the load shedding interval, as the cooling systems of the participating homes work to regain their cooler normal setpoint temperature. Such control, of course, often creates an inconvenience to the consumers who sign up to participate in such a 'demand response program' as their cooling system may not cool their residence as expected. However, in return for this inconvenience the consumer is often granted certain benefits, such as more favorable rates for energy consumed outside of the peak demand period.

One common load shedding technique, often referred to as direct load control, involves the periodic on-and-off cycling of power to the cooling system of each participating customer under the direct control of the utility during the load shedding period. In such a method, a remotely controllable switch is installed on the cooling system of each customer and is operable to disconnect power to the cooling system under the direct control of the utility company. The power to the cooling system may then be directly controlled by the utility company such that it is turned off for regular, fixed time intervals during a peak demand period. Consumers may express some degree of animosity towards such a technique, however, as direct load control results in a lack of control by the consumer of their cooling system, and often results in inside temperatures that are found to be uncomfortable by the consumer. Deficiencies in the communication link between the utility company and the switch can worsen the problem, with lost commands from the utility company to the switch to reconnect power to the cooling system resulting in the cooling system undesirably remaining in a disconnected state. Such problems have resulted in some consumers attempting to obviate the control on their cooling system while still attaining the benefits of participating in the demand response program by bypassing the remotely controlled switch. As a result, while such "cheaters" may acquire their desired individual cooling system control, the effectiveness of the overall demand response program can be undermined.

Another known load shedding technique involves remote control of the setpoint temperature of the thermostat of each participating customer by the utility, wherein the utility sends a common setback value to the thermostats of the participating customers. During the load shedding period, the participating thermostats will control the indoor temperature to a temperature setpoint value that is higher than the normally scheduled temperature setpoint value by the setback amount. This control by the utility company will typically result in an ambient temperature that is less comfortable than what the consumers would have otherwise experienced, but provides the benefit of both energy and cost savings. While providing the potential for increased comfort and acceptance over direct on/off cycling of the power to the cooling system by the utility, this technique can have disadvantages including lack of control by the consumer and the utility company's ability to set the setback value to any value the utility company deems suitable. Moreover, the use of a single setback value for all consumers fails to recognize differences in perceptions in comfort, differences in thermal characteristics of residences, differences in cooling capacities of the cooling systems, and other differences among the base of participating customers.

U.S. Patent Publication No. 2012/0053745 to Howard Ng discusses a system and method for establishing load control during a load shedding event. Specifically, Ng discusses a technique that allows a customer or utility to control a maximum temperature rise under a direct load control program. The customer may set a comfort range on their thermostat that indicates a range of temperatures from a desired temperature that the customer is comfortable with. During a load shedding event, in a hot weather example, a switch on a space conditioning load is activated so that the space conditioning load undergoes direct load control (i.e., fixed-width duty cycling). The space conditioning load undergoes direct load control until the indoor temperature exceeds the upper value of the comfort range, at which point control will be transferred from direct load control to temperature setback control.

Although the above-mentioned load shedding methods offer utility companies options to address peak energy demands, the tools to do so are limited. What are needed are user interfaces that are intuitive, offer flexibility in managing demand response events, and relatively informative as to how much energy will be shifted in a demand response event so that utility companies can better manage demand response events.

BRIEF SUMMARY

Various utility portals that enable utility companies to manage demand-response events are disclosed herein. The disclosed utility portals include several different options for enabling utility companies to communicate information to and receive information from an energy management system. The energy management system can host the portal and can carry out a demand response event via intelligent, network-connected devices based on information provided by the utility company.

In some embodiments, a method for authorizing a smart-home device for enrollment with a demand-response program may include receiving, at a control server of an energy management system and for the smart-home device, identifying information for a user account. The method may also include sending the identifying information from the control server to an Application Program Interface (API) with an enrollment request. The method may additionally include receiving, at the control server, a determination from the API as to whether the identifying information for the user account was matched to an existing utility account. The method may further include based on the determination from the API, determining whether the smart-home device can be enrolled with the demand-response program.

In some embodiments, a control server of an energy management system may include one or more processors and one or more memory devices comprising instructions that, when executed by the one or more processors, cause the one or more processors to perform operations including receiving, at the control server and for a smart-home device, identifying information for a user account. The operations may also include sending the identifying information from the control server to an Application Program Interface (API) with an enrollment request. The operations may additionally include receiving, at the control server, a determination from the API as to whether the identifying information for the user account was matched to an existing utility account. The operations may further include based on the determination from the API, determining whether the smart-home device can be enrolled with a demand-response program.

In some embodiments, a non-transitory, computer-readable medium comprising instructions that, when executed by the one or more processors, cause the one or more processors to perform operations including receiving, at the control server and for a smart-home device, identifying information for a user account. The operations may also include sending the identifying information from the control server to an Application Program Interface (API) with an enrollment request. The operations may additionally include receiving, at the control server, a determination from the API as to whether the identifying information for the user account was matched to an existing utility account. The operations may further include based on the determination from the API, determining whether the smart-home device can be enrolled with a demand-response program.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

Specifically.

FIG. 29B illustrates an I/O element including a utility portal providing detailed energy consumer information according to an embodiment.

FIG. 33K illustrates a transaction diagram for updating device registrations between the energy management system and utility provider computer system, according to some embodiments.

FIG. 33L illustrates a transaction diagram for updating a number of eligible devices, according to some embodiments.

FIGS. 34A and 34B show illustrative input/output (I/O) elements of a utility module that has a customer module according to various embodiments.

FIGS. 34C-34G show illustrative I/O elements of a utility portal according that has a schedule module according to various embodiments.

FIG. 35 shows illustrative contents of a file downloaded from energy management system in accordance with an embodiment.

FIG. 36A shows an illustrative example of a utility portal providing estimated energy savings based selected groups.

FIG. 37 shows an illustrative I/O element of a utility portal that has a request module according to an embodiment.

FIG. 38 shows an illustrative I/O element of a utility portal that has suggestion module according to an embodiment.

DETAILED DESCRIPTION

Figure 1:
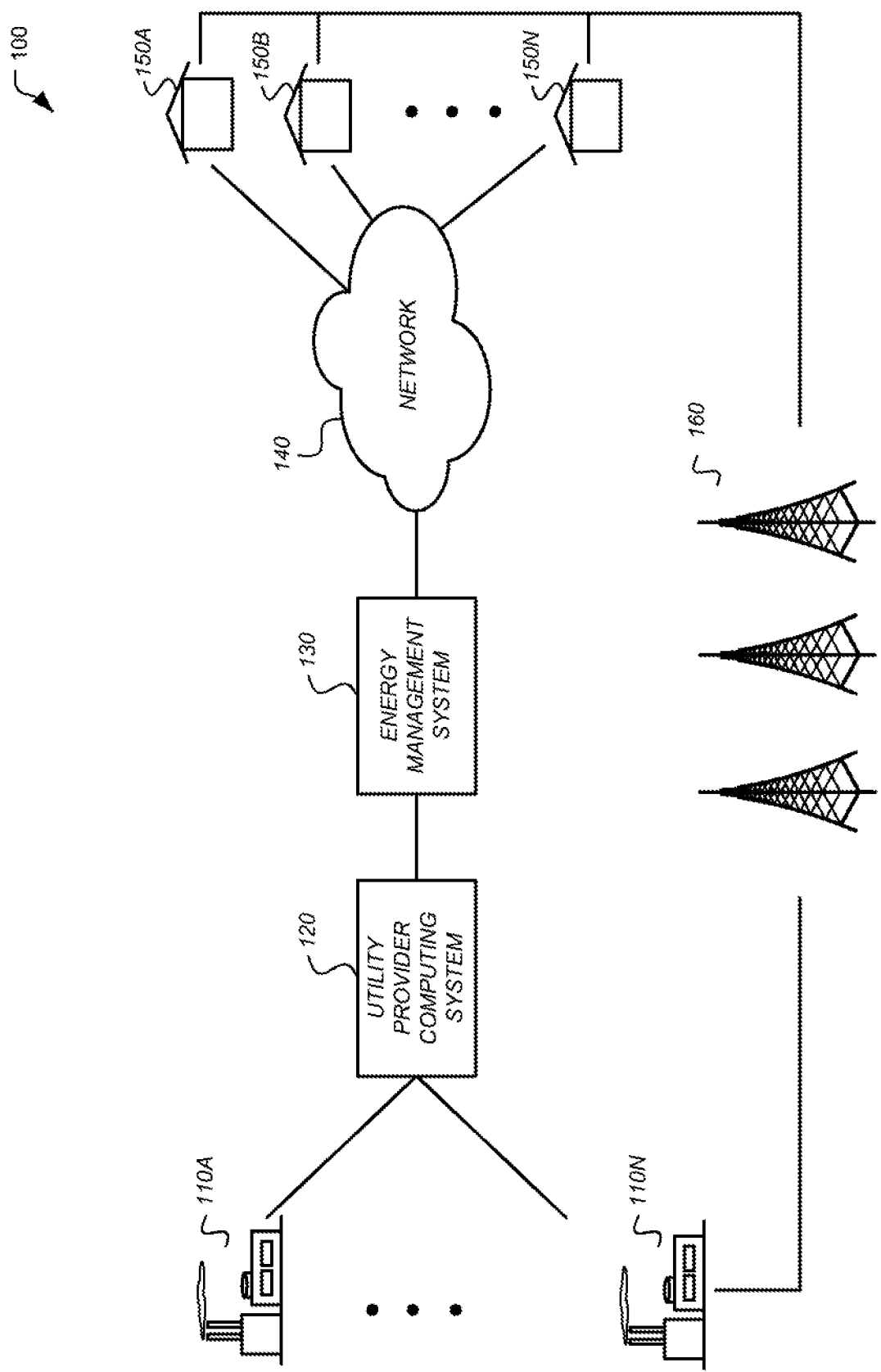
FIG. 1 depicts a system for implementing demand-response programs and event management according to an embodiment.

Embodiments discussed herein generally relate to techniques for managing demand-response programs and events, and in particular to utility portals that enable utility companies to manage demand response events. The entities in a system for managing demand-response programs and events typically include a utility provider that provides electrical or other forms of energy from a power source (e.g., an electrical generator) to individual's homes or businesses. The individuals typically pay for the amount of energy they consume on a periodic, e.g., monthly, basis. In many embodiments an energy management system is disposed between the utility provider and the individuals. The energy management system operates to intelligently and effectively shift energy consumption of the individuals from one particular time period to other time periods. Such energy shifting is usually performed so as to shift energy consumption from a high energy cost period to a low energy cost period. In the case of DR events, energy is shifted from the DR event period to time periods outside of the DR event period.

The energy management system according to many embodiments includes an intelligent, network-connected thermostat located at the individual's homes or businesses. Such a thermostat can acquire various information about the residence, such as a thermal retention characteristic of the residence, a capacity of an HVAC associated with the residence to cool or heat the residence, a likelihood of the residence being occupied (via occupancy sensors that, over time, can build an occupancy probability profile), a forecasted weather, a real-time weather, a real-time occupancy, etc. Moreover, the thermostat can be programmed by its users or may learn, over time, the preferences and habits of its users to set scheduled setpoints. In exemplary embodiments, a population of such network-connected thermostats associated with a respective population of individual homes and businesses are configured to communicate with one or more central servers managed by one or more cloud service providers. Each network-connected thermostat is associated with one or more accounts managed by the cloud service provider(s), and data is sent back and forth as needed between each network-connected thermostat and the central server(s) for providing a variety of advantageous functionalities such as facilitating remote control, reporting weather data, reporting HVAC control data and status information, and providing the centralized and/or partially centralized controlling and data communications required to carry out the DR-related, time-of-use (TOU)-related, and/or real-time pricing functionalities described herein.

It is to be appreciated that although some embodiments herein may be particularly suitable and advantageous for commercial scenarios in which (i) the cloud service provider(s) associated with the population of network-connected thermostats is/are also the provider(s) of the described energy management system, (ii) the provider(s) of the energy management system are separate and distinct business entities from the utilities themselves, and (iii) the energy management system is provided as a value-added service to the utilities, the scope of the present description is in no way limited to such scenarios. In other applicable scenarios, for example, all of the elements can be provided by the utility. In other applicable scenarios, some of the elements can be provided by the utility while other elements can be provided by a governmental entity or by miscellaneous combinations of disparate cooperating businesses or consortia. Prior to a DR event, based on a wealth of information the energy management system possesses regarding the residences it is managing, the energy management system can effectively predict how much energy a residence is likely to consume over an given period, such as over a DR event. Moreover, given the wealth of information regarding the residences, the energy management system may also generate variations to the residence's baseline thermostat setpoints that can be implemented during the DR event period. The variations can be made so that that the residence consumes less energy over the DR event period. Further yet, because of this wealth of information the energy management system has regarding the residences, the energy management system may also accurately predict the amount of energy likely to be reduced over the DR event period or, in other words, shifted from the DR event period to one or more time periods outside (e.g., shouldering) the DR event period.

The described provisions for such energy consumption prediction and management brings about many advantages as described further hereinbelow. For example, not only does it allow the energy management system to effectively manage the energy consumption of a number of connected residences, but it also allows the energy management system to intelligently select a subset of residences from a large pool for participation in DR programs or events. The physical characteristics of residences and habitual tendencies of occupants of those residents vary widely across regions, and thus the potential energy savings/shifting also varies widely. The energy management system disclosed herein may intelligently choose the participants in an energy savings program to maximize efficiency and minimize costs.

As the energy management system disclosed herein provides advantageous insight into energy-related characteristics of various residences on both individual and aggregate levels, the energy management system may also provide portals so that other interested parties, such as utility companies, may similarly have access to such information. As it is generally in the interests of the utility company to reduce energy consumption over a particular time period, the utility company similarly has interests in accessing such energy-related characteristics of the various residences individually and in the aggregate so as to more efficiently and effectively generate and manage DR events. Accordingly, in some embodiments, a utility portal is disclosed that enables the utility provider access to consumer-level energy-related information at a variety of levels of detail and complexity, for facilitating both economically smart and environmentally responsible decision making on resource planning and utilization.

The specifics of these and other embodiments are further disclosed herein, and a further understanding of which can be appreciated with reference to the figures. Turning now then to the Figures, FIG. 1 depicts a system 100 for managing demand-response programs and events according to an embodiment. System 100 includes a plurality of electrical power generators 110A-110N, a utility provider computing system 120, an energy management system 130, a communication network 140, a plurality of energy consumer residences 150A-150N, and a power distribution network 160.

Electrical power generators 110A-110N are operable to generate electricity or other type of energy (e.g., gas) using one or more of a variety of techniques known in the art. For example, electrical power generators 110A-110N may include hydroelectric systems, nuclear power plants, fossil-fuel based power plants, solar plants, wind plants, gas processing plants, etc. The amount of electricity that may be generated at any given time may limited to some maximum energy supplied that is determined by the generators 110A-110N. Further, the electrical power generators 110A-110N may be owned and managed by a utility provider implementing the utility provider computing system 120, or may be owned and/or managed by one or more third party entities that contract with the utility provider to provide source energy to customers of the utility provider.

Utility provider computing system 120 is a computing system operable to communicate with one or more of the electrical power generators 110A-110N, the energy management system 130, and in some embodiments electronic systems in one or more of the residences 150A-150N. The utility provider associated with the utility provider company system 120 typically manages the distribution of electricity from the electrical power generators 110A-110N to energy consumers at the residences 150A-150N. This management includes ensuring the electricity is successfully communicated from the power generators 110A-110N to the residences 150A-150N, monitoring the amount of energy consumption at each of the residences 150A-150N, and collecting fees from occupants of the residences 150A-150N in accordance with the their respective monitored amount of energy consumption. The utility provider computing system 120 may perform one or more of the operations described herein, and may include a variety of computer processors, storage elements, communications mechanisms, etc. as further described herein and as necessary to facilitate the described operations.

Energy management system 130 is a computing system operable to intelligently and efficiently manage the energy consumption at one or more of the residences 150A-150N while optionally providing reporting and control mechanisms to the utility provider computing system 120. The energy management system 130 may be operable to engage in real-time two-way communications with electronic devices associated with the residences 150A-150N via the network 140, as well as in engage in real-time two-way communications with the utility provider computing system 120. In one particular embodiment, the energy management system 130 may be operable to reduce the aggregate amount of energy consumed at the residences 150A-150N so that the aggregate energy demand does not exceed the maximum energy supply limits of the power generators 110A-110N. Such reductions may be achieved during any suitable time period through the day. For example, such reductions may be achieved during a demand-response (DR) event communicated by the utility provider computing system 120. The energy management system 130 may perform one or more of the operations described herein, and may include a variety of computer processors, storage elements, communications mechanisms, etc. as further described herein and as necessary to facilitate the described operations.

Network 140 is any suitable network for enabling communications between various entities, such as between one or more components of the energy management system 130 and one or more electronic devices associated with one or more of the residences 150A-150N. Such a network may include, for example, a local area network, a wide-area network, a virtual private network, the Internet, an intranet, an extranet, a public switched telephone network, an infrared network, a wireless network, a wireless data network, a cellular network, or any other such wired or wireless network(s) or combination(s) thereof. The network 140 may, furthermore, incorporate any suitable network topology. Network 140 may utilize any suitable protocol, and communication over the network 140 may be enabled by wired or wireless connections, and combinations thereof.

Residences 150A-150N are a variety of structures or enclosures that are associated with energy consumption. The structures may be span a variety of structure types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in residential living context, it is to be appreciated that this is for purposes of clarity of description and not by way of limitation.

The residences 150A-150N typically include one or more energy consumption devices, which could be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, the residences 150A-150N may include a natural gas (air/water/etc.) heater, stove, fireplace, etc. The residences 150A-150N in many embodiments include an intelligent, network connected thermostat that is operable to control the thermal environment of the residence. The thermostats may be considered to part of the energy management system 130, in that much of the processing subsequently described herein may be performed by computing systems at the energy management system 130 or by the thermostats themselves. Alternatively, the thermostats may be considered separate from the energy management system 130 due to their remote geographical location with respect to other components of the energy management system 130. In either case, electronic devices associated with the residences 150A-150N may perform one or more of the operations described herein, and may include a variety of computer processors, storage elements, communications mechanisms, etc. as further described herein and as necessary to facilitate the described operations. While most embodiments are described in the context of situations where it is desired to reduce the temperature inside of the structure (e.g., during a hot summer), similar principles apply (just applied in the opposite) in situations where it is desired to increase the temperature inside of the structure (e.g., during a cold winter). For some embodiments, some or all of the intelligent, network-connected thermostats may be the same as or similar in functionality to the NEST LEARNING THERMOSTAT® available from Nest Labs, Inc. of Palo Alto, Calif.

Power distribution network 160 is any suitable network for transferring energy from one or more of the electrical power generators 110A-110N to one or more of the residences 150A-150N. In an electrical distribution network, power distribution network 160 may include a variety of power lines, substations, pole-mounted transformers, and the like as known in the for carrying electricity from the electrical power generators 110A-110N to the residences 150A-150N. In a gas distribution network, power distribution network 160 may include a variety of compressor stations, storage elements, pipes, and the like for transporting natural or other types of energy producing gas from the power generators 110A-110N (in this embodiment, gas wells and/or processing plants) to the residences 150A-150N.

System 100 in certain embodiments is a distributed system for managing demand-response programs and events utilizing several computer systems and components that are interconnected via communication links using one or more computer networks or direct connections. However, it will be appreciated by those skilled in the art that such a system could operate equally well in a system having fewer or a greater number of components than are illustrated in FIG. 1. Thus, the depiction of system 100 in FIG. 1 should be taken as being illustrative in nature, and not as limiting the scope of the present teachings.

Figure 2:
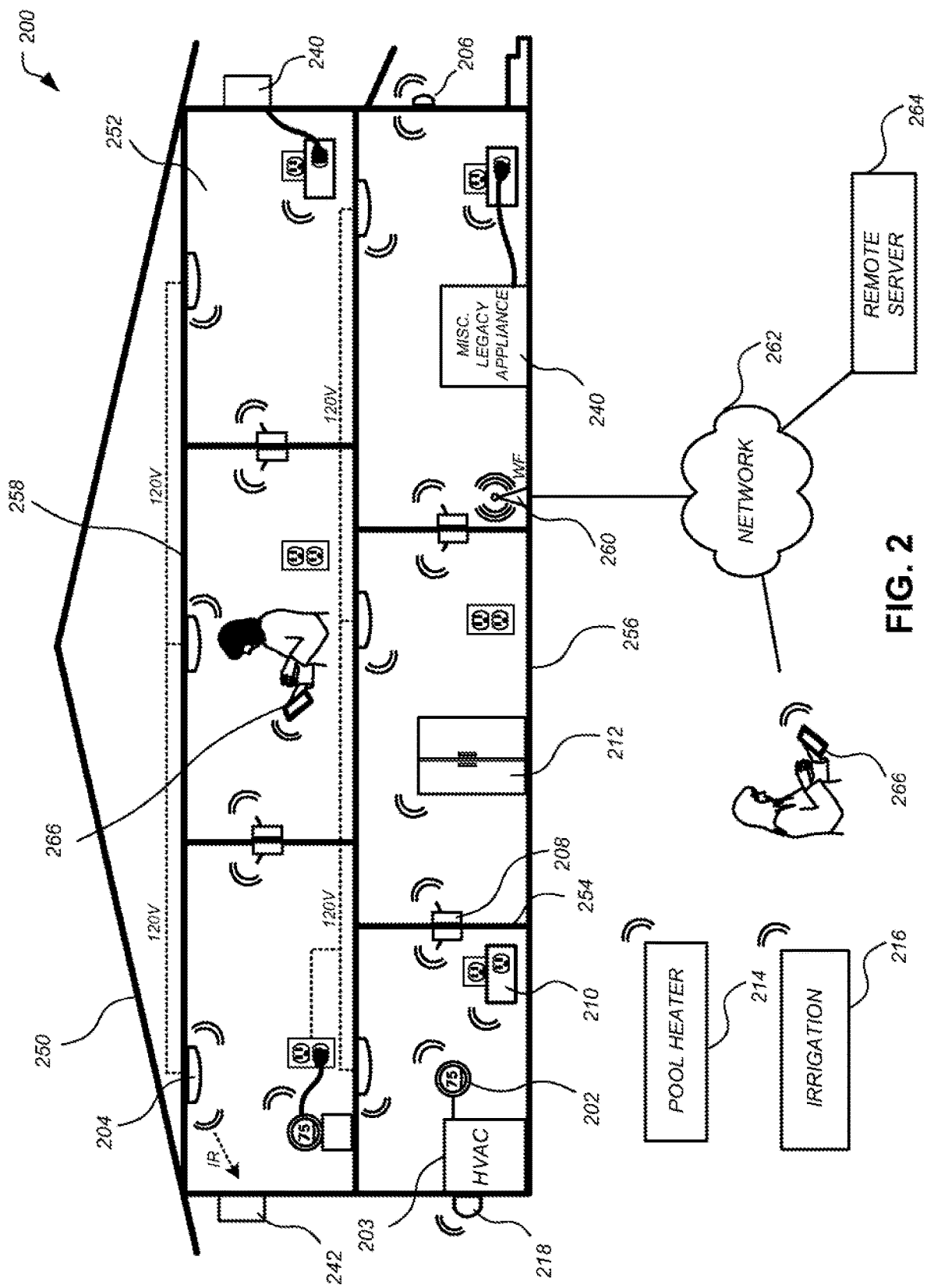
FIG. 2 illustrates an example of a smart home environment within which a portion of the system for implementing demand-response programs and event management may be implemented according to an embodiment.

FIG. 2 illustrates an example of a smart home environment 200 within which one or more of the devices, methods, systems, services, and/or computer program products described further herein can be applicable. The depicted smart home environment includes a structure 250, which can include, e.g., a house, office building, garage, or mobile home. In some embodiments, the structure 250 may correspond to one of structures 150A-150N described with reference to FIG. 1. In addition to the structure 250, the smart home environment 200 also includes a network 262 and remote server 264 which, in one embodiment, respectively correspond to network 140 and energy management system 130 (FIG. 1). While the structure 250 as depicted includes a variety of components and devices as further described herein, a number of components and devices, such as pool heater 214, irrigation system 216, and access device 266 may also be associated with (e.g., powered at) the structure 250 without being physically attached or disposed within or on the structure 250.

The smart home environment 200 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor 256 or ceiling 258. The various devices that may be incorporated within the smart home environment 200 include intelligent, multi-sensing, network-connected devices that can integrate seamlessly with each other and/or with cloud-based server systems to provide any of a variety of useful smart home objectives. An intelligent, multi-sensing, network-connected thermostat 202 can detect ambient climate characteristics (e.g., temperature and/or humidity) and control a heating, ventilation and air-conditioning (HVAC) system 203. One or more intelligent, network-connected, multi-sensing hazard detection units 204 can detect the presence of a hazardous substance and/or a hazardous condition in the home environment (e.g., smoke, fire, or carbon monoxide). One or more intelligent, multi-sensing, network-connected entryway interface devices 206, which can be termed a "smart doorbell", can detect a person's approach to or departure from a location, control audible functionality, announce a person's approach or departure via audio or visual means, or control settings on a security system (e.g., to activate or deactivate the security system).

In some embodiments, the smart home may include at least one energy consumption meter 218 such as a smart meter. The energy consumption meter 218 monitors some or all energy (electricity, gas, etc.) consumed by the devices in and around the structure 250. The energy consumption meter 218 may display the amount of energy consumed over a given period of time on a surface of the meter 218. The given period may be, e.g., a second, a minute, an hour, a day, a month, a time span less than one second, a time span greater than a month, or a time span between one second and one month. In some embodiments, the energy consumption meter 218 may include communication capabilities (wired or wireless) that enable the meter 218 to communicate various information, e.g., the amount of energy consumed over one or more given periods, the price of energy at any particular time or during any particular period of time, etc. The communication capabilities may also enable the meter to receive various information. For example, the meter may receive instructions for controlling one or more devices in the smart home such as the HVAC system 203, the price of energy at any particular time or during any particular period of time, etc. To facilitate control of devices in and around the structure 250, the meter 218 may be wired or wirelessly connected to such devices.

Each of a plurality of intelligent, multi-sensing, network-connected wall light switches 208 can detect ambient lighting conditions, detect room-occupancy states and control a power and/or dim state of one or more lights. In some instances, light switches 208 can further or alternatively control a power state or speed of a fan, such as a ceiling fan. Each of a plurality of intelligent, multi-sensing, network-connected wall plug interfaces 210 can detect occupancy of a room or enclosure and control supply of power to one or more wall plugs (e.g., such that power is not supplied to the plug if nobody is at home). The smart home may further include a plurality of intelligent, multi-sensing, network-connected appliances 212, such as refrigerators, stoves and/or ovens, televisions, washers, dryers, lights (inside and/or outside the structure 250), stereos, intercom systems, garage-door openers, floor fans, ceiling fans, whole-house fans, wall air conditioners, pool heaters 214, irrigation systems 216, security systems, and so forth. While descriptions of FIG. 2 can identify specific sensors and functionalities associated with specific devices, it will be appreciated that any of a variety of sensors and functionalities (such as those described throughout the specification) can be integrated into the device.

In addition to containing processing and sensing capabilities, each of the devices within the smart home environment 200 can be capable of data communications and information sharing with any other devices within the smart home environment 200, as well as to any devices outside the smart home environment 240 such as the access device 266 and/or remote server 264. The devices can send and receive communications via any of a variety of custom or standard wireless protocols (Wi-Fi, ZigBee, 6LoWPAN, IR, IEE 802.11, IEEE 802.15.4, etc.) and/or any of a variety of custom or standard wired protocols (CAT6 Ethernet, HomePlug, etc.). The wall plug interfaces 210 can serve as wireless or wired repeaters, and/or can function as bridges between (i) devices plugged into AC outlets and communicating using Homeplug or other power line protocol, and (ii) devices that are not plugged into AC outlets.

For example, a first device can communicate with a second device via a wireless router 260. A device can further communicate with remote devices via a connection to a network, such as the network 262. Through the network 262, the device can communicate with a central (i.e., remote) server or a cloud-computing system 264. The remote server or cloud-computing system 264 can be associated with a manufacturer, support entity or service provider associated with the device. In one embodiment, a user may be able to contact customer support using a device itself rather than needing to use other communication means such as a telephone or Internet-connected computer.

Devices' network connections can further allow a user to interact with the device even if the user is not proximate to the device. For example, a user can communicate with a device (e.g., thermostat 202) using a computer (e.g., a desktop computer, laptop computer, or tablet) or other portable electronic device (e.g., a smartphone) 266. A webpage or app can be configured to receive communications from the user and control the device based on the communications and/or to present information about the device's operation to the user. For example, when the portable electronic device 266 is being used to interact with the thermostat 202, the user can view a current setpoint temperature for a thermostat and adjust it using the portable electronic device 266. The user can be in the structure during this remote communication or outside the structure. The communications between the portable electronic device 266 and the thermostat 202 may be routed via the remote server 264 (e.g., when the portable electronic device 266 is remote from structure 250) or, in some embodiments, may be routed exclusive of the remote server 264.

The smart home environment 200 also can include a variety of non-communicating legacy appliances 240, such as old conventional washer/dryers, refrigerators, and the like which can be controlled, albeit coarsely (ON/OFF), by virtue of the wall plug interfaces 210. The smart home can further include a variety of partially communicating legacy appliances 242, such as IR-controlled wall air conditioners or other IR-controlled devices, which can be controlled by IR signals provided by the hazard detection units 204 or the light switches 208 or, in some embodiments, by using socket-based communication protocol such as powerline to communicate via a wall plug interface 210.

It should be recognized that some or all of the components located inside and outside of structure 250 may be considered part of energy management system 130 depending on the embodiment. In general, devices or components which facilitate control of other energy consumption devices may be considered to be part of energy management system 130. For example, thermostat 202 and access device 266 may be part of energy management system 130 while HVAC 203, while high energy consuming components such as HVAC 203, pool heater 214, and legacy appliances 240 may be considered external to energy management system 130 as they comprise energy consuming elements that are controllable by the thermostat 202 and access device 266. In other examples, however, additional or alternative components of smart home environment 200 may be considered part of energy management system 130, such as hazard detection units 204, entryway interface devices 206, light switches 208, plug interface 210, etc., as they may provide monitoring (and/or control) functionality for the energy management system 130 to assist the system 130 in making intelligent energy management decisions. In yet other examples, none of the devices of the smart home environment (except for remote server 264) may be part of energy management system 130, but rather one or more of the devices of the smart home environment 200 may be submissive devices that are remotely controlled by energy management system 130 to perform monitoring and/or energy consumption tasks.

Smart home 200 in certain embodiments is an environment including a number of client devices and access devices all operable to communicate with one another as well as with devices or systems external to the smart home 200 such as remote server 264. However, it will be appreciated by those skilled in the art that such an environment could operate equally well having fewer or a greater number of components than are illustrated in FIG. 2. One particular example of a smart-home environment including various elements having differing functionality is described in detail in U.S. Provisional Patent Application No. 61/704,437, filed Sep. 21, 2012, the entire contents of which are incorporated by reference herein in their entirety for all purposes. Thus, the depiction of the smart home environment 200 in FIG. 2 should be taken as being illustrative in nature, and not limiting to the scope of the present teachings.

Figure 3A:
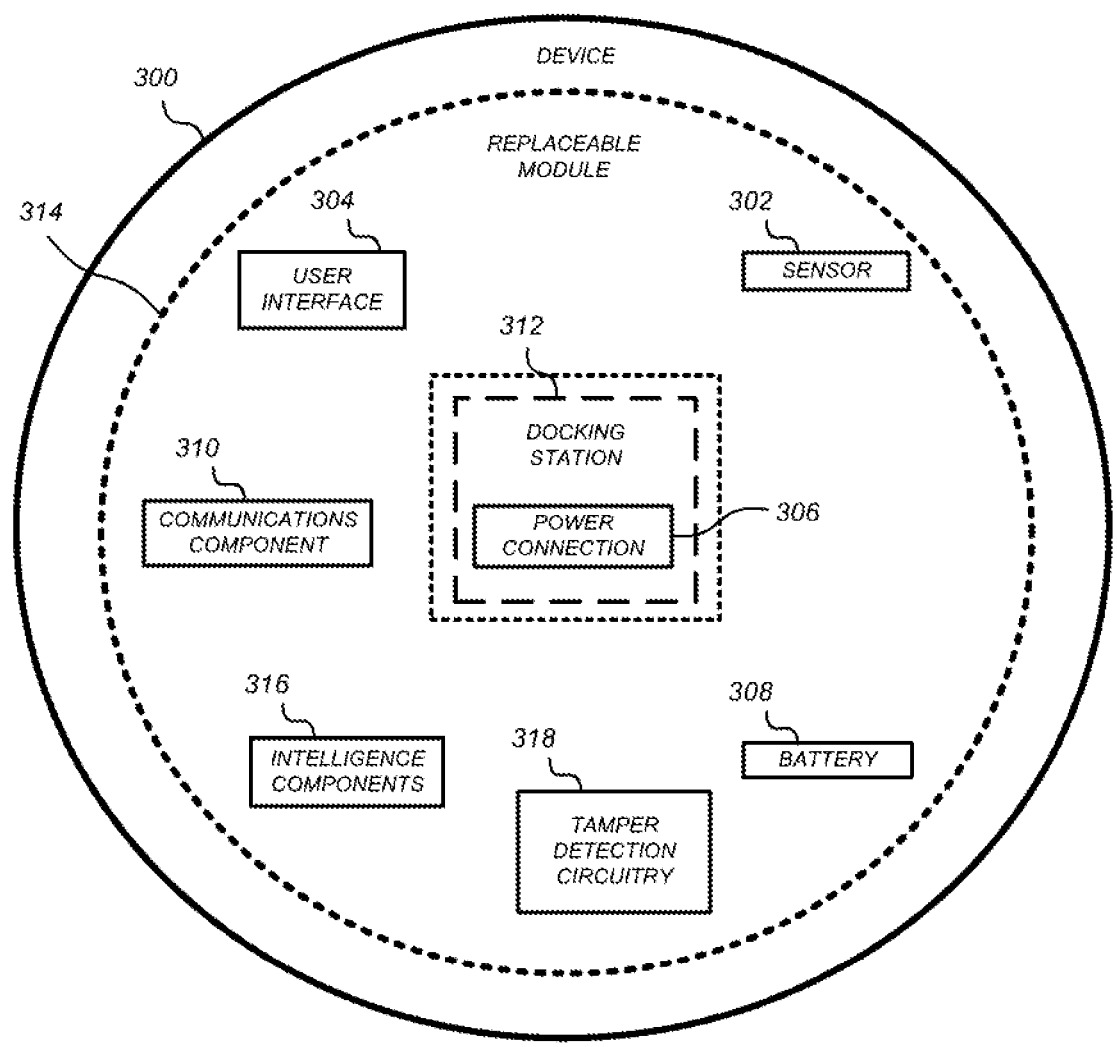
FIG. 3A illustrates an example of general device components which can be included in an intelligent, network-connected device according to an embodiment.

FIG. 3A illustrates an example of general device components which can be included in an intelligent, network-connected device 300 (i.e., "device"). Device 300 may be implemented as one or more of the various devices discussed with reference to FIG. 2, such as thermostat 202, hazard detection unit 204, entryway interface device 206, wall light switch 208, wall plug interface 210, etc. Much of the following discussion presents the device 300 as being a thermostat 202, but it should be recognized that embodiments are not so limited. Each of one, more or all devices 300 within a system of devices can include one or more sensors 302, a user-interface component 304, a power supply (e.g., including a power connection 306 and/or battery 308), a communications component 310, a modularity unit (e.g., including a docking station 312 and replaceable module 314), intelligence components 316, and tamper detection circuitry 318. Particular sensors 302, user-interface components 304, power-supply configurations, communications components 310, modularity units, intelligence components 316, and/or wire tamper detection circuitry 318 can be the same or similar across devices 300 or can vary depending on device type or model.

By way of example and not by way of limitation, one or more sensors 302 in a device 300 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 302 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 3A illustrates an embodiment with a single sensor, many embodiments will include multiple sensors. In some instances, device 300 includes one or more primary sensors and one or more secondary sensors.

The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 304 in device 300 may be configured to present information to a user via a visual display (e.g., a thin-film-transistor display or organic light-emitting-diode display) and/or an audio speaker. User-interface component 304 can also include one or more user-input components to receive information from a user, such as a touchscreen, buttons, scroll component (e.g., a movable or virtual ring component), microphone or camera (e.g., to detect gestures). In one embodiment, user-interface component 304 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 304 includes a camera, such that gestures can be detected (e.g., to indicate that a power or alarm state of a device is to be changed).

A power-supply component in device 300 may include a power connection 306 and/or local battery 308. For example, power connection 306 can connect device 300 to a power source such as a line voltage source. In some instances, connection 306 to an AC power source can be used to repeatedly charge a (e.g., rechargeable) local battery 308, such that battery 308 can later be used to supply power if needed in the event of an AC power disconnection or other power deficiency scenario.

A communications component 310 in device 300 can include a component that enables device 300 to communicate with a central server, such as remote server 264, or a remote device, such as another device 300 described herein or a portable user device. Communications component 310 can allow device 300 to communicate using one or more wired or wireless communication techniques, either simultaneously or sequentially, such as Wi-Fi, ZigBee, 3G/4G wireless, IEEE 802.11, IEEE 802.15.4, 6-LO-PAN, Bluetooth, CAT6 wired Ethernet, HomePlug or other powerline communications method, telephone, or optical fiber, by way of non-limiting examples. Communications component 310 can include one or more wireless cards, Ethernet plugs, or other transceiver connections. In some embodiments, the communications component 310 facilitates communication with a central server to synchronize information between device 300, the central server, and in some cases additional devices. Techniques for synchronization data between such devices are further described in the commonly assigned U.S. patent application Ser. No. 13/624,892 (client reference number NES0231), filed Sep. 22, 2012, the contents of which are incorporated by reference in their entirety for all purposes.

A modularity unit in device 300 can include a static physical connection, and a replaceable module 314. Thus, the modularity unit can provide the capability to upgrade replaceable module 314 without completely reinstalling device 300 (e.g., to preserve wiring). The static physical connection can include a docking station 312 (which may also be termed an interface box) that can attach to a building structure. For example, docking station 312 could be mounted to a wall via screws or stuck onto a ceiling via adhesive. Docking station 312 can, in some instances, extend through part of the building structure. For example, docking station 312 can connect to wiring (e.g., to 120V line voltage wires) behind the wall via a hole made through a wall's sheetrock. Docking station 312 can include circuitry such as power-connection circuitry 306 and/or AC-to-DC powering circuitry and can prevent the user from being exposed to high-voltage wires. Docking station 312 may also or alternatively include control circuitry for actuating (i.e., turning on and off) elements of an HVAC system, such as a heating unit (for heating the building structure), an air-condition unit (for cooling the building structure), and/or a ventilation unit (for circulating air throughout the building structure). In some instances, docking stations 312 are specific to a type or model of device, such that, e.g., a thermostat device includes a different docking station than a smoke detector device. In some instances, docking stations 312 can be shared across multiple types and/or models of devices 300.

Replaceable module 314 of the modularity unit can include some or all sensors 302, processors, user-interface components 304, batteries 308, communications components 310, intelligence components 316 and so forth of the device. Replaceable module 314 can be configured to attach to (e.g., plug into or connect to) docking station 312. In some instances, a set of replaceable modules 314 are produced with the capabilities, hardware and/or software, varying across the replaceable modules 314. Users can therefore easily upgrade or replace their replaceable module 314 without having to replace all device components or to completely reinstall device 300. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 316 of the device can support one or more of a variety of different device functionalities. Intelligence components 316 generally include one or more processors configured and programmed to carry out and/or cause to be carried out one or more of the advantageous functionalities described herein. The intelligence components 316 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 316 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 316 can be intelligence components 316 configured to detect when a location (e.g., a house or room) is occupied, up to and including whether it is occupied by a specific person or is occupied by a specific number and/or set of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 316 may include image-recognition technology to identify particular occupants or objects.

In some instances, intelligence components 316 can be configured to predict desirable settings and/or to implement those settings. For example, based on the presence detection, intelligence components 316 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 316 can initiate an audio or visual indicator of where the person, animal or object is or can initiate an alarm or security feature if an unrecognized person is detected under certain conditions (e.g., at night or when lights are out). As yet another example, intelligence components 316 can detect hourly, weekly or even seasonal trends in user settings and adjust settings accordingly. For example, intelligence components 316 can detect that a particular device is turned on every week day at 6:30 am, or that a device setting is gradually adjusted from a high setting to lower settings over the last three hours. Intelligence components 316 can then predict that the device is to be turned on every week day at 6:30 am or that the setting should continue to gradually lower its setting over a longer time period.

In some instances, devices can interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Tamper detection circuitry 318 may be part or separate from intelligence components 316. Tamper detection circuitry 318 may include software and/or hardware operable to detect tampering of the device 300. Tampering may include, e.g., a disconnect between the device 300 and the HVAC indicative of a user attempt to obviate HVAC control by the remote server during a DR event, a change in impedance or power consumption by the HVAC indicative of a user attempt to obviate HVAC control by the remote server during a DR event, etc.

Figure 3B:
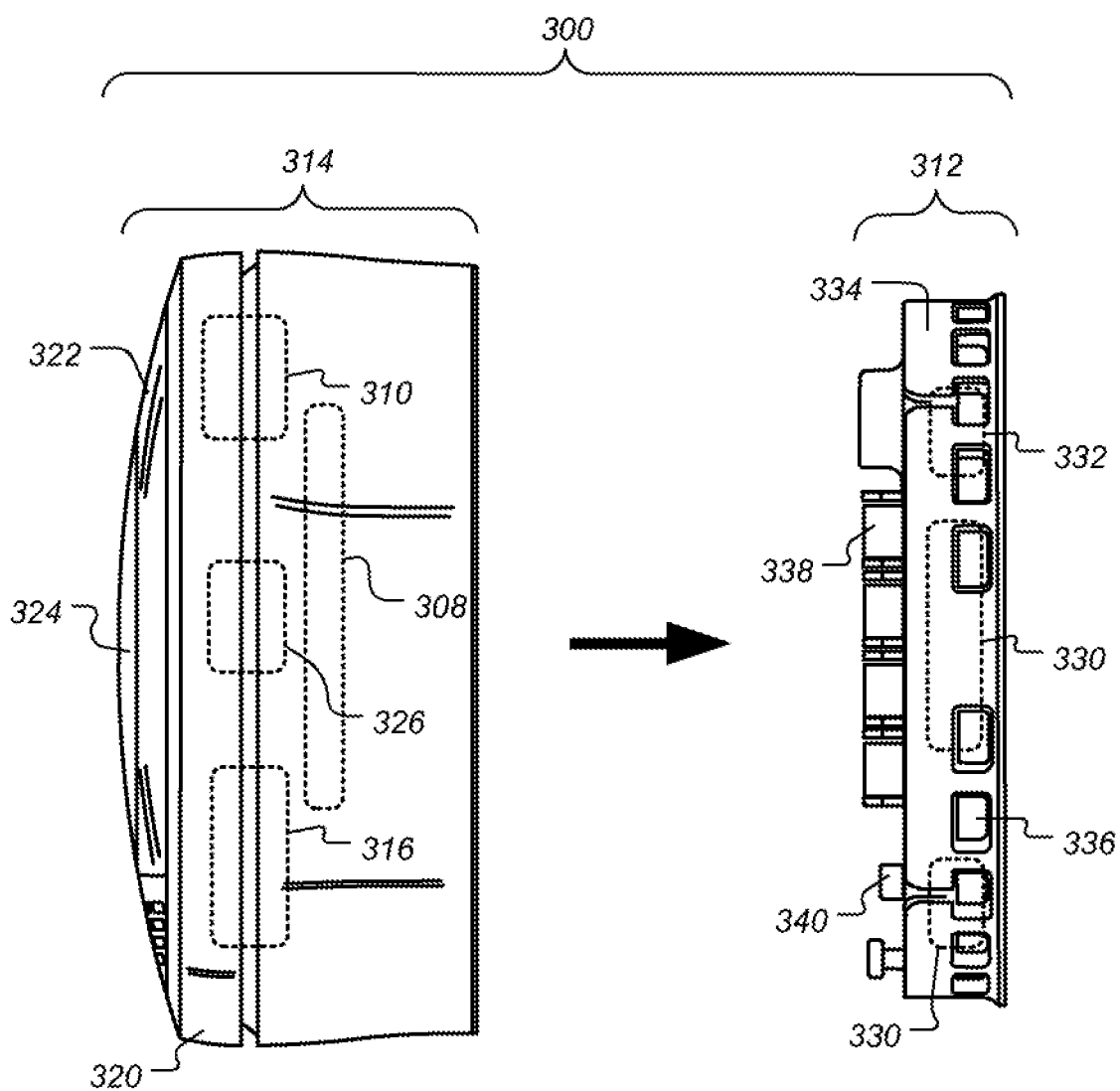
FIG. 3B illustrates an intelligent, network-connected device having a replaceable module and a docking station according to an embodiment.

FIG. 3B illustrates an intelligent, network-connected device 300 having a replaceable module 314 (e.g., a head unit) and a docking station 312 (e.g., a back plate) for ease of installation, configuration, and upgrading according to some embodiments. As described hereinabove, device 300 may be wall mounted, have a circular shape, and have an outer rotatable ring 320 (that may be, e.g., part of user interface 304) for receiving user input. Outer rotatable ring 320 allows the user to make adjustments, such as selecting a new target temperature. For example, by rotating outer ring 320 clockwise, a target setpoint temperature can be increased, and by rotating the outer ring 320 counter-clockwise, the target setpoint temperature can be decreased. Changes to an existing setpoint temperature that reflect a desire for the temperature in the structure to be immediately changed to that setpoint temperature may herein be referred to as "immediate setpoint temperature". This is in contrast to setpoint temperatures that may be provided in a hourly, daily, weekly, monthly, or other schedule in which setpoint temperatures may reflect desire for future temperatures in the structure. Such setpoint temperatures may herein be referred as "scheduled setpoint temperature".

Device 300 has a cover 322 that includes a display 324 (that may be, e.g., part of user interface 304). Head unit 314 slides onto back plate 312. Display 324 may display a variety of information depending on, e.g., a current operational state of the device 300, direct user interaction with the device via ring 320, sensed presence of the user via, e.g., a proximity sensor 302 (such as a passive infrared motion sensor), remote user interaction with the device via a remote access device, etc. For example, display 324 may display central numerals that are representative of a current setpoint temperature.

According to some embodiments the connection of the head unit 314 to back plate 312 can be accomplished using magnets, bayonet, latches and catches, tabs or ribs with matching indentations, or simply friction on mating portions of the head unit 314 and back plate 312. According to some embodiments, the head unit 314 includes battery 308, communications component 310, intelligence components 316, and a display driver 326 (that may be, e.g., part of user interface 304). Battery 308 may be recharged using recharging circuitry (that may be, e.g., part of intelligence components 316 and/or may be included in the back plate 312) that uses power from the back plate 312 that is either obtained via power harvesting (also referred to as power stealing and/or power sharing) from the HVAC system control circuit(s) or from a common wire, if available, as described in further detail in commonly assigned co-pending U.S. patent application Ser. No. 13/034,674 (client reference number NES0006) and Ser. No. 13/034,678 (client reference number NES0007), both filed Feb. 24, 2011, and U.S. patent application Ser. No. 13/267,871 (client reference number NES0158), filed Oct. 6, 2011, all of which are incorporated by reference herein in their entirety for all purposes. According to some embodiments, battery 308 is a rechargeable single cell lithium-ion, or a lithium-polymer battery.

Back plate 312 includes electronics 330 and a temperature sensor 332 (that may be, e.g., one of sensors 302) in housing 334, which are ventilated via vents 336. Temperature sensor 332 allows the back plate 312 to operate as a fully functional thermostat even when not connected to the head unit 314. Wire connectors 338 are provided to allow for connection to HVAC system wires, such as connection to wires for actuating components of the HVAC system, wires for receiving power from the HVAC system, etc. Connection terminal 340 is a male or female plug connector that provides electrical connections between the head unit 314 and back plate 312. Various arrangements for connecting to and controlling an HVAC system are further described in U.S. patent application Ser. Nos. 13/034,674 and 13/034,678, supra.

In some embodiments, the back plate electronics 330 includes an MCU processor, and driver circuitry for opening and closing the HVAC control circuits, thereby turning on and turning off the one or more HVAC functions such as heating and cooling. The electronics 330 also includes flash memory which is used to store a series of programmed settings that take effect at different times of the day, such that programmed setpoint (i.e., desired temperature) changes can be carried out even when the head unit 314 is not attached to the back plate 312. According to some embodiments, the electronics 330 also includes power harvesting circuitry (that may be in addition or alternatively to that provided in head unit 314) to obtain power from the HVAC control circuit(s) even when an HVAC common power wire is not available. In various embodiments, tamper detection circuitry 318 (FIG. 3A) may also be incorporated in one or more of the head unit 314 and back plate 312 such that tampering may be detected regardless of whether the head unit 314 is coupled to the back plate 312.

Figure 3C:
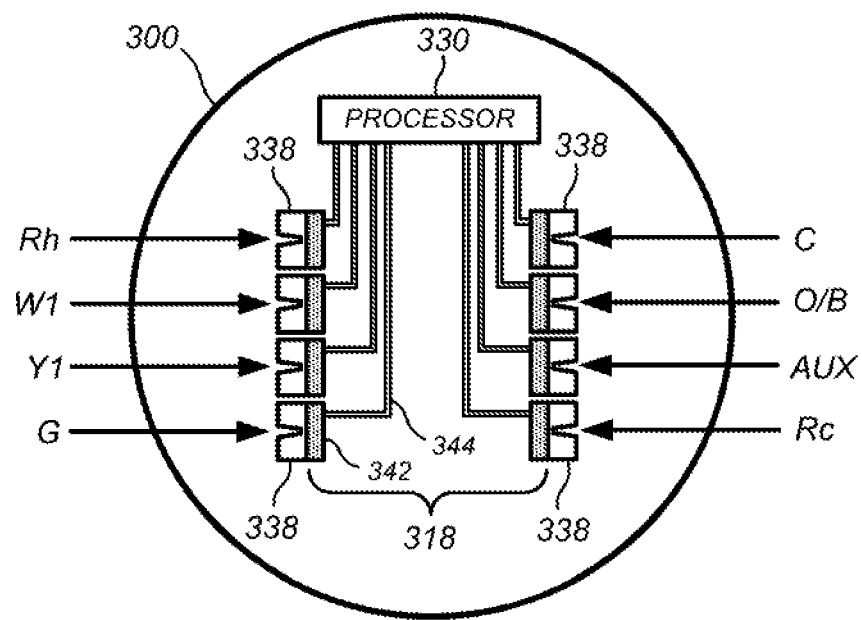
FIG. 3C illustrates connection ports and wire insertion sensing circuitry of an intelligent, network-connected device according to an embodiment.

FIG. 3C illustrates a conceptual diagram of the device 300 with particular reference to the wire connectors 338 and tamper detection circuitry 318. It is to be appreciated that the wire connectors 338 and tamper detection circuitry 318 can, in whole or in part, be separably or inseparably integral with the main body of the device 300 without departing from the scope of the present teachings. Thus, for example, for one embodiment the wire connectors 338 and tamper detection circuitry 318 can be inseparably integral with the main body of the device 300, with the HVAC wires being inserted directly into the back before placement on the wall as a single monolithic unit. In another embodiment, the wire connectors 338 and tamper detection circuitry 318 can be located in a wall plate unit to which the main body of the thermostat attaches, it being understood that references herein to the insertion of wires into the thermostat encompass embodiments in which the wires are inserted into the wall plate and the main body is attached to the wall plate to form the completed device 300.

As illustrated in FIG. 3C, each wire connector 338 is associated with a predetermined HVAC signal type. For one embodiment that has been found to provide an optimal balance between simplicity of installation for do-it-yourselfers and a reasonably broad retrofit applicability for a large number of homes, there are eight (8) wire connectors 338 provided, which are dedicated respectively to a selected group of HVAC signal types consisting of heating call power (Rh), heating call (W1), cooling call (Y1), fan call (G), common (C), heat pump (O/B), auxiliary (AUX), and heating call power (Rh). Preferably, the device 300 is of a "jumperless" type according to the commonly assigned U.S. Ser. No. 13/034,674, supra, such that (i) the Rh and Rc connection ports automatically remain shunted together for cases in which there is a single call power wire provided by the HVAC system, one or the other connection port receiving a single call power wire (which might be labeled R, V, Rh, or Rc depending on the particular HVAC installation), and (ii) the Rh and Rc connection ports are automatically electrically segregated for cases in which there are dual call power wires provided by the HVAC system that are inserted.

According to one embodiment, tamper detection circuitry 318 includes, for each wire connector 338, a port sensing circuit 342 that communicates with the back plate electronics 330 over a pair of electrical leads 344. Although the port sensing circuit 342 can operate in a variety of different ways without departing from the scope of the present teachings, in one embodiment the control port sensing circuit 342 comprises a two-position switch (not shown) coupled to the electrical leads 344, the two-position switch being closed to short the electrical leads 344 together when no wire has been inserted into the associated wire connector 338, the two-position switch being mechanically urged into an open position to electrically segregate the electrical leads 344 when a wire is inserted into the associated wire connector 338. The back plate electronics 330 thereby is able to readily sense when a wire is inserted into the connection port by virtue of the shorted or open state of the electrical leads 344. One particularly advantageous configuration that implements the combined functionality of the wire connector 338 and the port sensing circuit 342 is described in the commonly assigned U.S. patent application Ser. No. 13/034,666 (client reference number NES0035), filed Feb. 24, 2011, the contents of which are incorporated by reference in their entirety for all purposes.

Device 300 in certain embodiments is an intelligent, network-connected learning thermostat that includes various components such as a head unit, a back plate, a user interface, communications components, intelligent components, etc. However, it will be appreciated by those skilled in the art that devices that perform the various operations described herein could operate equally well with fewer or a greater number of components than are illustrated in FIGS. 3A through 3C. For example, the device 300 may be formed as a single unit rather than multiple modules, may include more or fewer components than described with reference to FIG. 3A, and may include more or fewer components than described with reference to FIG. 3C. For example, the device 300 may be formed as described in U.S. patent application Ser. No. 13/624,878, filed Sep. 21, 2012, and/or as described in U.S. patent application Ser. No. 13/632,148, filed Sep. 30, 2012, both of which are incorporated herein by reference in their entirety for all purposes.

Thus, the depiction of device 300 in FIGS. 3A through 3C should be taken as being illustrative in nature, and not limiting to the scope of the present teachings.

Figure 4:
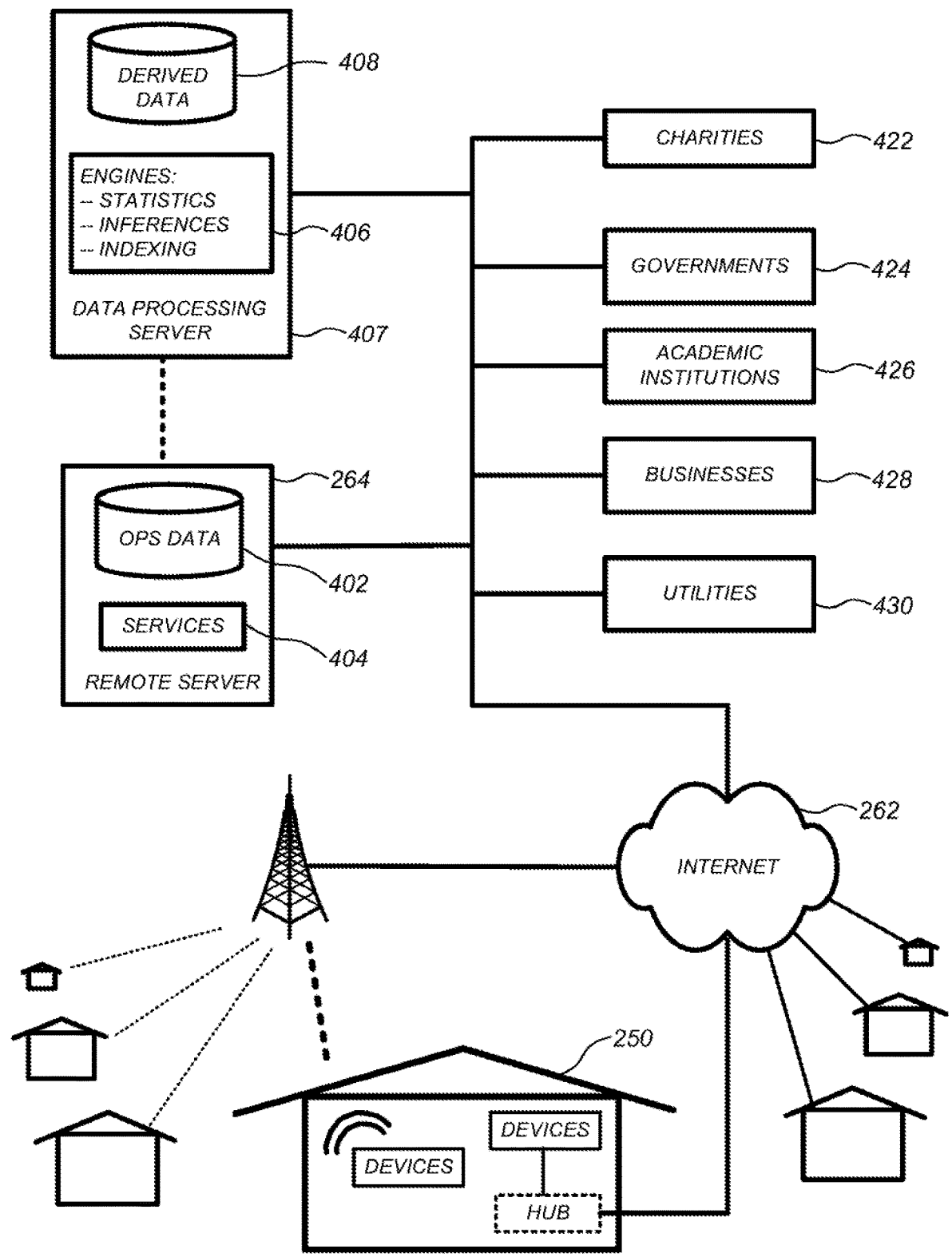
FIG. 4 illustrates a network-level view of an extensible devices and services platform with which a smart home environment and systems for implementing demand-response programs and event management can be integrated according to an embodiment.

FIG. 4 illustrates a network-level view of an extensible devices and services platform with which the smart home of FIGS. 1 and/or 2 and/or the device of FIGS. 3A through 3C can be integrated. Each of the intelligent, network-connected devices discussed previously with reference to structure 250 can communicate with one or more remote servers or cloud computing systems 264. The communication can be enabled by establishing connection to the network 262 either directly (for example, using 3G/4G connectivity to a wireless carrier), though a hubbed network (which can be a scheme ranging from a simple wireless router, for example, up to and including an intelligent, dedicated whole-home control node), or through any combination thereof.

The remote server or cloud-computing system 264 can collect operation data 302 from the smart home devices. For example, the devices can routinely transmit operation data or can transmit operation data in specific instances (e.g., when requesting customer support). The remote server or cloud-computing architecture 264 can further provide one or more services 404. The services 404 can include, e.g., software updates, customer support, sensor data collection/logging, remote access, remote or distributed control, or use suggestions (e.g., based on collected operation data 404 to improve performance, reduce utility cost, etc.). Data associated with the services 304 can be stored at the remote server or cloud-computing system 264 and the remote server or cloud-computing system 264 can retrieve and transmit the data at an appropriate time (e.g., at regular intervals, upon receiving request from a user, etc.).

One salient feature of the described extensible devices and services platform, as illustrated in FIG. 4, is a processing engine 406, which can be concentrated at a single data processing server 407 (which may be included in or separate from remote server 264) or distributed among several different computing entities without limitation. Processing engine 406 can include engines configured to receive data from a set of devices (e.g., via the Internet or a hubbed network), to index the data, to analyze the data and/or to generate statistics based on the analysis or as part of the analysis. The analyzed data can be stored as derived data 408. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the network 262. In this manner, processing engine 406 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, the processing engine 406 can generate statistics about device usage across a population of devices and send the statistics to device users, service providers or other entities (e.g., that have requested or may have provided monetary compensation for the statistics). As specific illustrations, statistics can be transmitted to charities 422, governmental entities 424 (e.g., the Food and Drug Administration or the Environmental Protection Agency), academic institutions 426 (e.g., university researchers), businesses 428 (e.g., providing device warranties or service to related equipment), or utility companies 430. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 5:
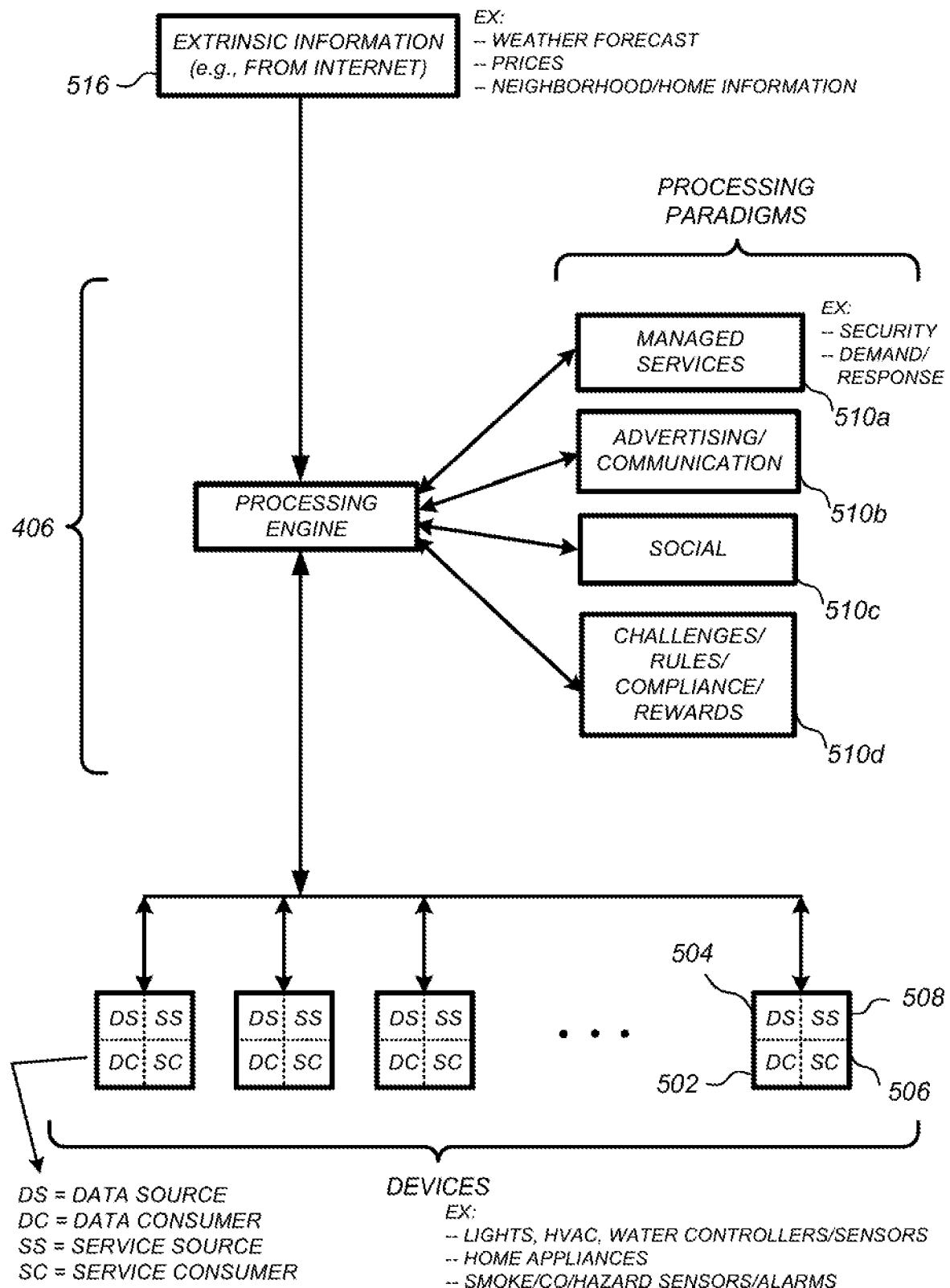
FIG. 5 illustrates an abstracted functional view of the extensible devices and services platform of FIG. 4.

FIG. 5 illustrates an abstracted functional view of the extensible devices and services platform of FIG. 4, with particular reference to the processing engine 406 as well as the devices of the smart home. Even though the devices situated in the smart home will have an endless variety of different individual capabilities and limitations, they can all be thought of as sharing common characteristics in that each of them is a data consumer 502 (DC), a data source 504 (DS), a services consumer 506 (SC), and a services source 508 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 5 shows processing engine 406 as including a number of paradigms 510. Processing engine 406 can include a managed services paradigm 510a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 406 can further include an advertising/communication paradigm 510b that estimates characteristics (e.g., demographic information), desires and/or products of interest of a user based on device usage. Services, promotions, products or upgrades can then be offered or automatically provided to the user. Processing engine 406 can further include a social paradigm 510c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 406 can include a challenges/rules/compliance/rewards paradigm 510d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 406 can integrate or otherwise utilize extrinsic information 516 from extrinsic sources to improve the functioning of one or more processing paradigms. Extrinsic information 516 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 406 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 6:
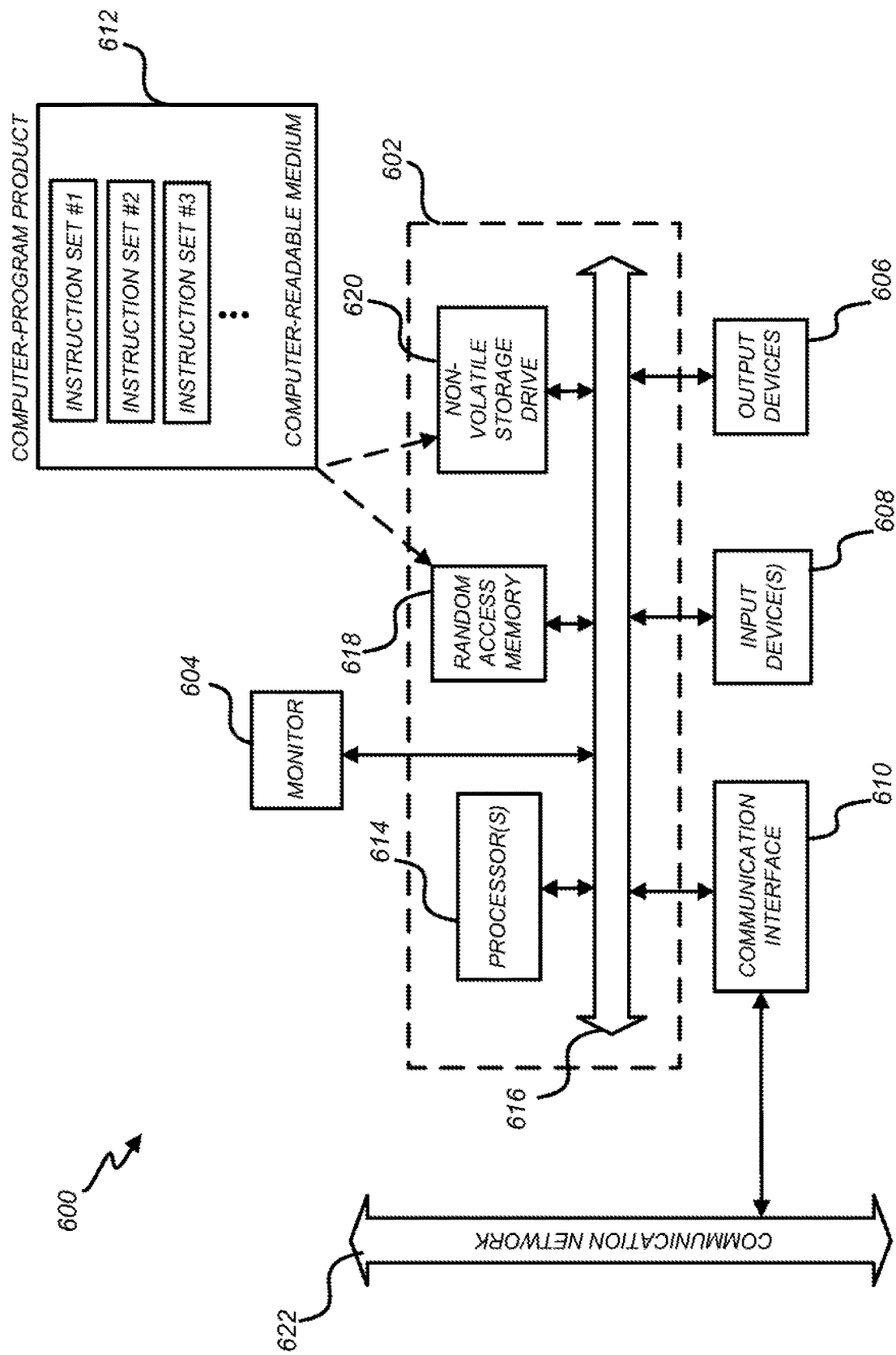
FIG. 6 is a block diagram of a special-purpose computer system according to an embodiment.

FIG. 6 is a block diagram of a special-purpose computer system 600 according to an embodiment. For example, one or more of a utility provider computing system 120, energy management system 130, elements of smart home environment 200, remote server 264, client device 300, processing engine 406, data processing server 407, or other electronic components described herein may be implemented as a special-purpose computer system 600. The methods and processes described herein may similarly be implemented by computer-program products that direct a computer system to perform the actions of the methods and processes described herein. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

Special-purpose computer system 600 comprises a computer 602, a monitor 604 coupled to computer 602, one or more additional user output devices 606 (optional) coupled to computer 602, one or more user input devices 608 (e.g., keyboard, mouse, track ball, touch screen) coupled to computer 602, an optional communications interface 610 coupled to computer 602, and a computer-program product 612 stored in a tangible computer-readable memory in computer 602. Computer-program product 612 directs system 600 to perform the methods and processes described herein. Computer 602 may include one or more processors 614 that communicate with a number of peripheral devices via a bus subsystem 616. These peripheral devices may include user output device(s) 606, user input device(s) 608, communications interface 610, and a storage subsystem, such as random access memory (RAM) 618 and non-volatile storage drive 620 (e.g., disk drive, optical drive, solid state drive), which are forms of tangible computer-readable memory.

Computer-program product 612 may be stored in non-volatile storage drive 620 or another computer-readable medium accessible to computer 602 and loaded into memory 618. Each processor 614 may comprise a microprocessor, such as a microprocessor from Intel® or Advanced Micro Devices, Inc.®, or the like. To support computer-program product 612, the computer 602 runs an operating system that handles the communications of product 612 with the above-noted components, as well as the communications between the above-noted components in support of the computer-program product 612. Exemplary operating systems include Windows® or the like from Microsoft Corporation, Solaris® from Sun Microsystems, LINUX, UNIX, and the like.

User input devices 608 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 608 are typically embodied as a computer mouse, a trackball, a track pad, a joystick, wireless remote, a drawing tablet, a voice command system. User input devices 608 typically allow a user to select objects, icons, text and the like that appear on the monitor 604 via a command such as a click of a button or the like. User output devices 606 include all possible types of devices and mechanisms to output information from computer 602. These may include a display (e.g., monitor 604), printers, non-visual displays such as audio output devices, etc.

Communications interface 610 provides an interface to other communication networks and devices and may serve as an interface to receive data from and transmit data to other systems, WANs and/or the Internet, via a wired or wireless communication network 622. Embodiments of communications interface 610 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 610 may be coupled to a computer network, to a FireWire® bus, or the like. In other embodiments, communications interface 610 may be physically integrated on the motherboard of computer 602, and/or may be a software program, or the like.

RAM 618 and non-volatile storage drive 620 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 618 and non-volatile storage drive 620 may be configured to store the basic programming and data constructs that provide the functionality of various embodiments of the present invention, as described above.

Software instruction sets that provide the functionality of the present invention may be stored in RAM 618 and non-volatile storage drive 620. These instruction sets or code may be executed by the processor(s) 614. RAM 618 and non-volatile storage drive 620 may also provide a repository to store data and data structures used in accordance with the present invention. RAM 618 and non-volatile storage drive 620 may include a number of memories including a main random access memory (RAM) to store of instructions and data during program execution and a read-only memory (ROM) in which fixed instructions are stored. RAM 618 and non-volatile storage drive 620 may include a file storage subsystem providing persistent (non-volatile) storage of program and/or data files. RAM 618 and non-volatile storage drive 620 may also include removable storage systems, such as removable flash memory.

Bus subsystem 616 provides a mechanism to allow the various components and subsystems of computer 602 communicate with each other as intended. Although bus subsystem 616 is shown schematically as a single bus, alternative embodiments of the bus subsystem may utilize multiple busses or communication paths within the computer 602.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Figure 7:
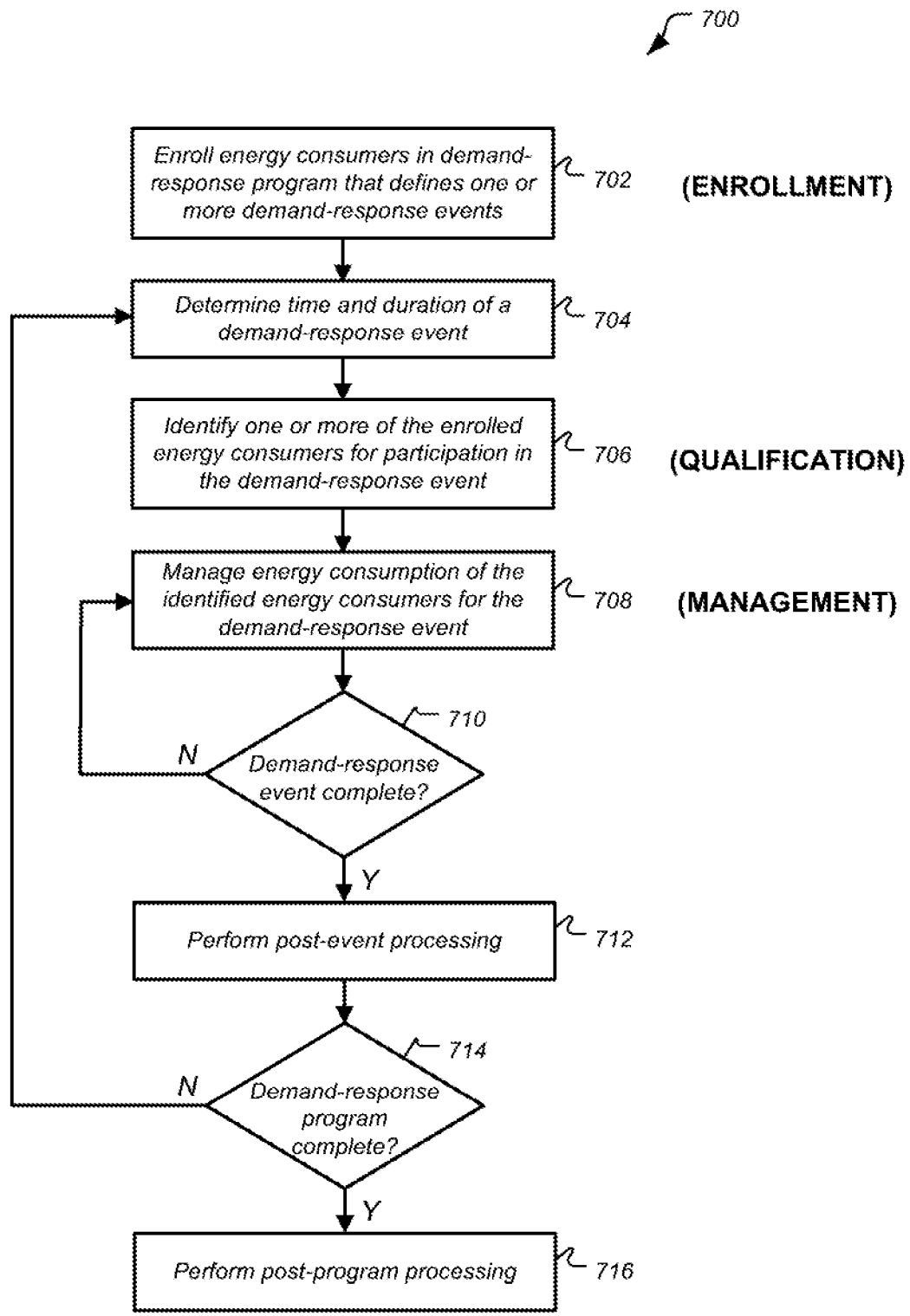
FIG. 7 illustrates a process for implementing and managing a demand-response program according to an embodiment.

FIG. 7 illustrates a process 700 for implementing and managing a demand-response program according to an embodiment. To facilitate understanding, the process 300 is described with reference to FIG. 1 and FIG. 2, although it should be understood that embodiments of the process 700 are not limited to the exemplary systems and apparatus described with reference to FIG. 1 and FIG. 2.

In operation 702, energy consumers are enrolled in a demand-response program that defines one or more demand-response events. The energy consumers may be residents of or otherwise associated with the energy consumption at one or more of energy consumer residences 150A-150N. The demand-response program is a program that attempts to reduce load on the electrical grid supplying the energy consumer residences 150A-150N during certain critical times which are generally times when demand gets close to or is expected to exceed supply. The DR program often allows for participation in the program by the energy consumers to be voluntary, although in some embodiments participation may be mandatory. In exchange for participation, the energy consumers are often rewarded monetary incentives, reward-based incentives, or other types of incentives to garner increased participation, but in some embodiments the energy consumers may not be provided such incentives.

A DR program may run for set periods, such as for a certain number of months, days, years, may be seasonal (e.g., implemented in seasons such as summer when energy demand is expected to increase substantially), may be perpetual, and/or may be executed over any suitable period of time. In its efforts to reduce energy consumption over specifically defined periods, the DR program defines one or more DR events. A DR event is a time period over which energy reduction mechanisms are to be actively engaged. The DR event is defined by a DR event profile which includes information identifying a DR event period which defines the time period over which energy reduction mechanisms are to be actively engaged. The time period may be on the order of minutes, tens of minutes, hours, tens of hours, or other suitable time period for which energy shifting is desired. In at least one embodiment, a DR event period may be on the order of a few minutes and referred to as an 'instantaneous DR event', which is an event narrowly tailored to an expected peak in aggregate energy demand. In such instances the peak in energy demand may be identified a few minutes (or a few hours) prior to the expected peak time, and in some embodiments the duration of the peak energy demand (i.e., the duration during which expected demand exceeds supply) may last a few minutes.

The DR event may also include other information suitable for effectively managing energy consumption over the DR event period. For example, the DR event may also include information identifying a DR event magnitude which defines a magnitude of the desired energy reduction (either on a per-consumer basis, a group basis, an aggregate basis, or other basis). For another example, the DR event may include information identifying a geographical scope of the DR event, where the geographical scope may describe a region that relates to one or more electrical grids from which load shedding is desired. The region may be defined using any suitable parameters such as state, county, zip code, address, or the like, or may identify one or more particular electrical grids from which such addresses of residences may subsequently be inferred. In some embodiments, the DR program may also identify costs per unit of energy over the course of the DR program, DR events, etc. In other embodiments, consumers may be grouped according to characteristics other than geographical characteristics. For example, consumers may be grouped based on similar (or different) characteristics regarding their structures (e.g., thermal retention), their affluency (e.g., absolute wealth, annual income, etc.), their tendency to participate in DR events and/or programs, the amount of energy shifting likely achieved by their participation in a DR event and/or program, etc.

As further described herein, various aspects of the DR program may be managed and executed by the utility provider computing system 120 and/or the energy management system 130 either separately or in combination with one another. Accordingly, the energy consumers may enroll in one or more DR programs offered by one or more of the utility provider associated with the utility provider computing system 120 and an energy manager associated with the energy management system 130. In one particular embodiment, the energy consumer enrolls with the energy manager of the energy management system 130 as further described with reference to FIG. 8 through FIG. 11C. In any event, as a result of executing operation 702, one or more energy consumers will be enrolled a DR program.

In operation 704, the time and duration of a demand-response event are determined. As should be recognized, some or all aspects of the DR program may be defined by a utility provider associated with the utility provider computing system, an energy manager associated with energy management system 130, or other suitable entity. For example, in one aspect of the DR program the utility provider computing system 120 may notify the energy management system 130 of a particular period during which the utility provider would like to reduce aggregate energy consumption. The utility provider computing system 120 may also notify the energy management system 130 of the energy reduction it desires during the period. The energy management system 130 may then determine the time and duration of a demand-response event based on these notifications from the energy management system 130, and use such information to subsequently generate a DR event. In other embodiments, however, the utility provider computing system 120 may determine the time and duration of a demand-response event and communicate that information to the energy management system 130. As mentioned, the duration of the DR event may be on the order of minutes (e.g., 5, 10, 15, 30, 45, 60 minutes, less than 5 or greater than 60 minutes, or in any range therebetween), or on the order of hours (e.g., 1, 2, 3, 4, 5, more than 5, or in any range therebetween, etc.).

The energy management system 130 does not necessarily have to rely on the utility provider to determine the time and duration of a demand-response event. In some embodiments, the energy management system 130 may determine the time and duration of a demand-response event using information acquired from sources other than the utility provider. For example, energy management system 130 may monitor one or more of the conditions of the electrical grid (e.g., power distribution network 160), weather conditions (e.g., temperature, humidity, etc.) at the residences 150A-150N, the cost of energy (e.g., the real-time cost of a unit of electricity at a residence 150A-150N), etc. to identify trends indicative of a situation in which active energy management and consumption reduction may be beneficial. The energy management system 130 may then use one or more of these factors to define a time and duration of an upcoming demand-response event, where the time and duration may be fixed or variable depending on a continued monitoring of the aforementioned conditions.

In operation 706 one or more of the enrolled energy consumers is identified for participation in the demand-response event. For example, one or more of the energy consumers associated with the residences 150A-150N that enrolled in the DR program may be identified for participation in the demand-response event determined in operation 704. It should be recognized that not all energy consumers who enrolled in the demand response program are equally situated to reduce energy demand for a given DR event, and accordingly it may be desirable to invite some enrolled energy consumers to participate in a particular DR event over other enrolled energy consumers. For example, some energy consumers within the geographical scope of the DR event may be better situated or more likely to provide increased energy reductions over the DR event period as compared to other energy consumers. The differences in energy consumption may result from any number of a variety of factors, such as variations among thermal retention characteristics of the residences, HVAC capacities, outside temperatures, etc. Particular techniques for using these and other factors to identify suitable candidates for participation in a particular DR event are further described herein, for example with reference to FIGS. 12 and 13.

In operation 708 energy consumption of the energy consumers identified in operation 706 is managed during the demand-response event. For example, the energy consumed at each of the residences 150A-150N that enrolled in the DR program and were identified for participation in a DR event may be managed by the energy management system 130. In managing the energy consumption of the identified energy consumers, the energy management system 130 may attempt to reduce the aggregate amount of energy consumed by the identified energy consumers over a certain period. For example, the energy management system 130 may attempt to reduce the aggregate amount of energy consumed by the DR event magnitude defined by the DR event over the course of the DR event period. To achieve a reduction in energy consumption, the energy management system 130 may determine a 'baseline' energy consumption for each energy consumer which defines an amount of energy the energy consumer would have consumed during the course of the DR event but-for their active participation in the DR program and the DR event. The energy management system 130 then utilizes a number of factors to determine techniques for reducing the energy consumption of the consumer to an amount less than the baseline. Some particular techniques for managing the energy consumption of identified energy consumers are further described with reference to FIG. 14 through FIG. 28.

In operation 710 a determination is made as to whether the demand-response event is complete. For example, the energy management system 130 may determine whether the end of the DR event period has been reached. If so, then processing may continue to operation 712, otherwise processing returns to operation 708.

It should be recognized that not all DR events complete at the end of the originally defined DR event period. Rather, DR events may end before or after the end of the originally defined DR event period. This may be due to any one or more of a variety of reasons. For example, the desired aggregate energy reduction may be achieved prior to the end of the originally defined DR event period, in which case the DR event may end early. Conversely, the desired aggregate energy reduction may not be achieved until after the end of the originally defined DR event period, in which case the DR event may end late.

In one embodiment, the energy management system 130 and/or utility provider computing system 120 may monitor the load on the power distribution network to determine whether the aggregate load has achieved a desired magnitude during the course of the DR event period and at the end of the originally defined DR event period. If the monitoring indicates that the load is at an acceptable level, then the DR event may be completed early, whereas if the monitoring indicates that the load continues to persist at an unacceptable level, then the DR event period may be extended.

Instead of or in addition to monitoring load, the actual amount of energy reduction achieved by way of the energy management in operation 708 may be monitored, and the DR event may be deemed complete only once the amount of energy reduction actually achieved is substantially equal to or exceeds the desired amount of energy reduction. The monitored energy reduction may be the aggregate energy reduction achieved by managing the energy consumption of all of the identified energy consumers, where such an aggregate energy reduction may, for example, be compared to the desired aggregate energy reduction (e.g., the DR event magnitude defined on an aggregate basis by the DR event). In such an embodiment, the DR event may be completed for all of the identified energy consumers even if some of the energy consumers provide less energy reduction than expected as long as the energy consumers as a whole provide the desired amount of energy reduction. Additionally or alternatively, the DR event for a particular energy consumer may be deemed complete once the amount of energy reduction actually achieved by that energy consumer is substantially equal to or exceeds the amount of energy reduction expected of that energy consumer. The actual energy reduction achieved by the energy consumer may, for example, be compared to the desired or otherwise expected energy reduction from the energy consumer (e.g., the DR event magnitude defined on a per-customer basis by the DR event).

Once the DR event is complete, then processing performs to operation 712 where one or more post-event processing operations may be performed. For example, energy management system 130 may determine actual amounts of energy reduction achieved on a per-customer and/or aggregate basis, determine the value of the energy reductions, determine types and/or magnitudes of rewards to provide to each of the DR event participants, etc. Such information may be compiled, aggregated, and selectively communicated to other entities such as the utility provider computing system 120 for further analysis and/or processing. In some embodiments, such information may be used for increasing the effectiveness of managing energy during subsequent DR events or for DR events in other DR programs.

In operation 714 it is determined whether the demand-response program is complete. As described, a demand-response program may prolong for any suitable duration and include one or more demand response events. If the end of the DR program has not yet been reached, then processing returns to operation 704 where the time and duration of a subsequent DR event are determined. Otherwise, processing continues to operation 716 where post-program processing may be performed. Post-program processing 716 may encompass a variety of information compilation, aggregation, or other processing suitable for determining the value, effectiveness, or other characteristics of the completed DR program. Such information may be used for a variety of purposes, such as for increasing the effectiveness of managing energy during subsequent DR or other DR programs.

It should be appreciated that the specific operations illustrated in FIG. 7 provide a particular process for implementing and managing a demand-response program according to an embodiment. The various operations described with reference to FIG. 7 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 8:
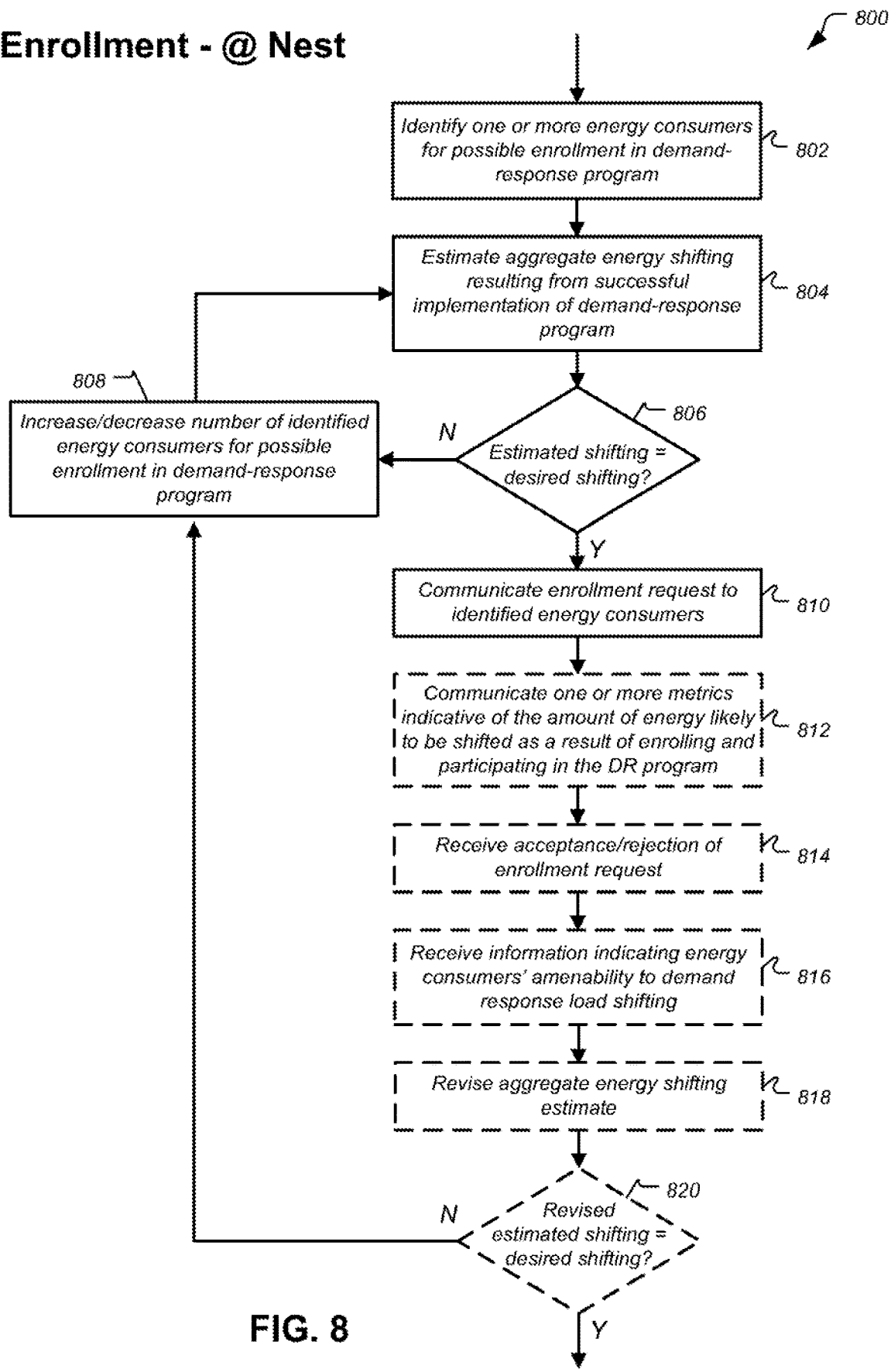
FIG. 8 illustrates a process for enrolling energy consumers in a demand-response program according to an embodiment.

FIG. 8 illustrates a process 800 for enrolling energy consumers in a demand-response program according to an embodiment. To facilitate understanding, the process 800 is described with reference to FIG. 1 and FIG. 2, although it should be understood that embodiments of the process 800 are not limited to the exemplary systems and apparatus described with reference to FIG. 1 and FIG. 2. In one particular embodiment, process 800 represents a particular example of operation 702 described with reference to FIG. 7. However, in other embodiments the scope of process 800 is not so limited.

As discussed with reference to operation 706 of FIG. 7, not all energy consumers that are enrolled in a DR program may be best suited for a particular DR event. Similarly, not all energy consumers may be suitable for participation in a DR program at all. For example, some energy consumers may be associated with residences that have thermal retention characteristics so poor that attempts to manage their energy consumption is largely ineffective. Some energy consumers on a grid may be known to never participate in DR events although they enroll a DR program. Some energy consumers may have illustrated undesirable past behavior, such as tampering with or attempting to tamper with their electronic devices so as to obviate the energy shifting impact of a successful implementation of a DR event. In summary, there are numerous reasons to exclude energy consumers from enrollment in a DR program. One particular method for identifying energy consumers for enrollment, thus effectively excluding others, is hereby described.

Figure 12:
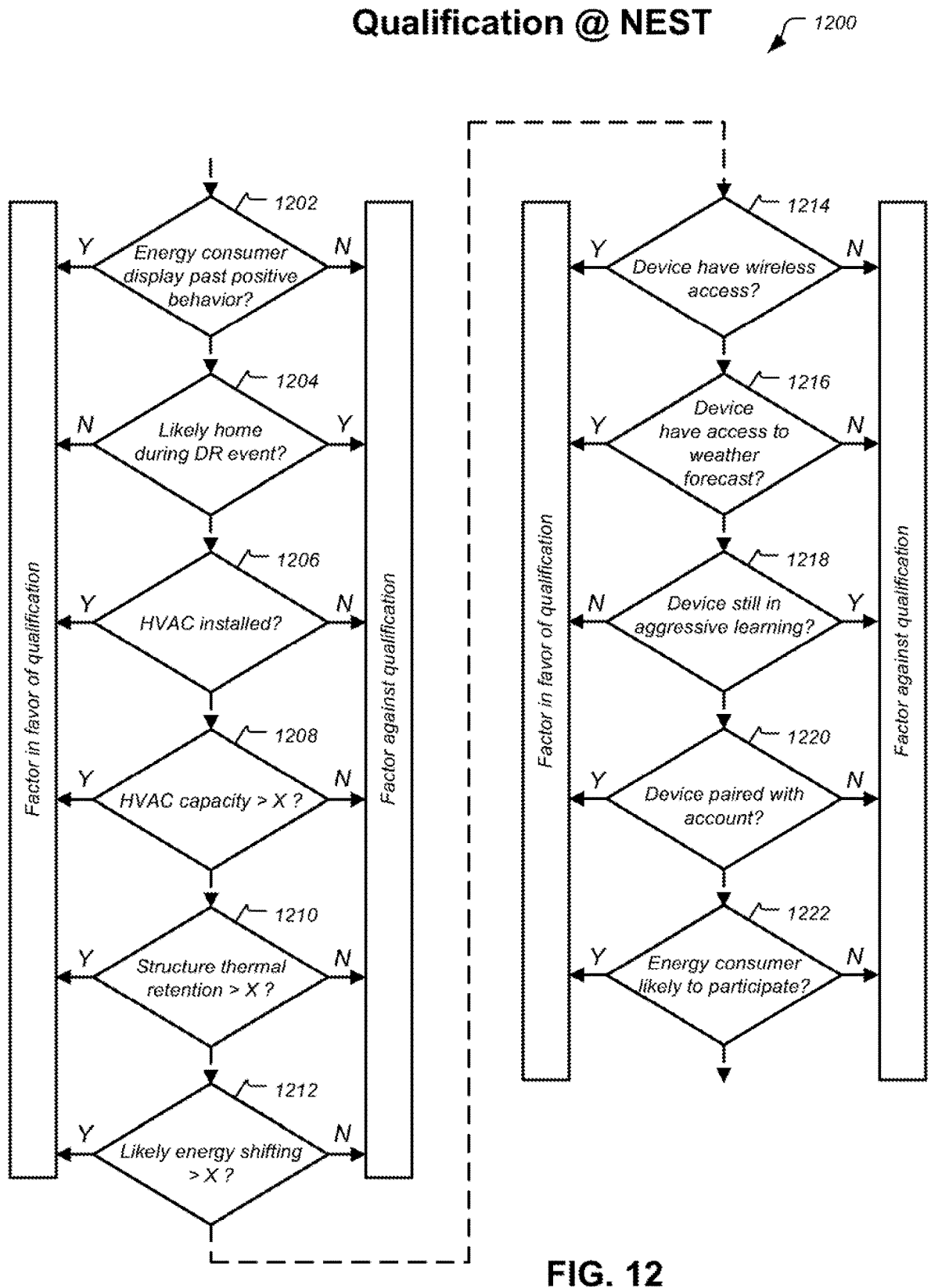
FIG. 12 illustrates process for analyzing a number of factors to determine whether an enrolled energy consumer is qualified for participation in a particular DR event according to an embodiment.

In operation 802 one or more energy consumers are identified for possible enrollment in a demand-response program. For example, energy management system 130 may identify one or more energy consumers associated with residences 150A-150N for enrollment in a DR program. The initially identified energy consumers may include all or only a subset of the energy consumers associated with residences 150A-150N. The initial identification may be based on any one or more of a number of different factors, such as past behavior, whether the residence includes an HVAC, whether the residence has a structural thermal retention exceeding some value, etc. Turning briefly to FIG. 12, FIG. 12 describes a number of factors that may be used to determine whether an energy consumer qualifies to participate in a particular DR event. While the subsequent discussion regarding these factors is specifically directed to qualification for participation in a particular DR event, it should be recognized that some or all of these factors can similarly be used at the initial stages of determining whether or not a particular energy consumer is even suitable to be offered enrollment in the DR program as a whole. If these factors, either individually or in the aggregate, indicate that the energy user is likely to contribute to the DR program by reducing their energy consumption during DR events, then the energy consumer may be identified for possible in enrollment in the DR program. Otherwise, the energy consumer may be excluded from enrollment and, as a result, subsequent participation in DR events.

Once one or more energy consumers have been identified for possible enrollment in the DR program, processing continues to operation 804 where the aggregate energy shifting resulting from successful implementation of the DR program is estimated. For example, the energy management system 130 may estimate the aggregate energy shifting. The aggregate energy shifting may be estimated on the presumption that there is 100% acceptance of offers to enroll in the DR program and subsequent participation in all DR events. Alternatively, the aggregate energy shifting may be estimated based on expectations of enrollment and DR event participation. For example, various data such as prior participation levels in the same or similar DR programs, participation levels for prior DR events, the geographical location of the identified energy consumers, the affluence of the energy consumers, one or more of the various factors described with reference to FIG. 12, etc. may be used to determine the likelihood of a particular energy consumer to accept an offer to enroll in a particular DR program. Such information may similarly be used to determine a likely rate of participation in the DR events and likely level of participation in each DR event.

Once the likelihood of participation in the DR program and DR events is determined for each identified energy consumer, these may be used to assist in determining the energy shifting likely to result from the identified energy consumer's participation in a DR program. Once the energy shifting likely to result from each energy consumer's participation in the DR program is determined, these individual amounts of energy shifting may then be aggregated to determine the total amount of energy shifting expected from the successful implementation of the DR program.

As mentioned, the likelihood of participation in the DR program and DR events determined for each identified energy consumer may be used to assist in determining the energy shifting likely to result from the identified energy consumer's participation in a DR program. For example, the probability of participating in a DR event may be multiplied by a metric indicative of the amount of energy likely to be shifted as a result of participating in the DR event, and that result may be multiplied by the probability of the identified energy consumer participating in the DR program to determine an estimated amount of energy shifting attributed to the identified energy consumer likely to occur if an offer of enrollment is extended to the identified energy consumer. In generating the metric indicative of the amount of energy likely to be shifted as a result of participating in the DR event, a number of different factors may be taken into consideration, such as the likely characteristics of the DR program, the likely characteristics of each DR event, the likely HVAC schedule of the energy consumer over the each DR event period, the likely DR implementation profile for each DR event, the structural ability of the energy consumer's residence to shift energy loads, etc. The use of such factors for estimating the savings that an energy consumer may realize upon participation in and successful completion of a DR program are further described with reference to FIG. 10. It should be recognized that these factors can similarly be used to determine the amount of energy likely to be shifted as a result of a particular energy consumer participating in a DR program, as described with reference to operation 1012 in FIG. 10.

In operation 806, the estimated aggregate energy shifting determined in operation 804 is compared to a desired amount of aggregate energy shifting for implementation of the DR program. For example, the energy management system 130 may compare the estimated shifting determined in operation 804 with a desired amount of aggregate energy shifting. Like DR events, each DR program may define magnitude of desired energy reduction that should result from successful implementation of the DR program. The desired energy reduction may, similar those defined for DR events, may be on a per-consumer basis, a group basis, an aggregate basis, or some other basis. By comparing the estimated aggregate shifting likely to result from implementation of the DR program with a select subset of the energy consumers 150A-150N, it can be determined whether the DR program is being offered to too few energy consumers, too many energy consumers, or just the right number of energy consumers.

If the comparison indicates that the estimated shifting is less than or greater than the desired amount of energy shifting, then scope of enrollment may be altered as described with reference to operation 808 so that enrollment is offered to the optimal number of energy consumers. In operation 808 the number of identified energy consumers for possible enrollment in the DR program is either increased or decreased. For example, if the comparison indicates that the estimated shifting is less than the desired amount of energy shifting, then the number of identified energy consumers may be increased. In contrast, if the comparison indicates that the estimated shifting is greater than the desired amount of energy shifting, then the number of identified energy consumers may be decreased. In increasing or decreasing the number of identified energy consumers, the factors used for the identification as described with reference to operation 802 may respectively be relaxed or tightened. Once the scope of identified energy consumers is altered, processing then returns to operation 804 whereby a new aggregate energy shifting is estimated resulting from successful implementation of the DR program by the revised group of identified energy consumers.

If, in contrast, the comparison of operation 806 indicates that the estimated shifting is approximately equal to that desired, then processing may continue to operation 810. In operation 810 enrollment requests are communicated to the identified energy consumers. For example, energy management system 130 may communicate enrollment requests to one or more electronic devices of residences 150A-150N associated with the identified energy consumers, including one or more of an intelligent, multi-sensing, network-connected thermostat 202 and an access device 266 associated with the identified energy consumers. One particular example of communicating such an enrollment request is described with reference to FIG. 11A through 11C, which depict a graphical user interface of an intelligent, network-connected thermostat associated with an identified energy consumer receiving and responding to an enrollment request.

In operation 812, one or more metrics indicative of the amount of energy likely to be shifted as a result of the identified energy consumer participating in the DR program may also be communicated to the identified energy consumer. For example, the number of kWh of energy likely to be shifted, the monetary value of the energy likely to be shifted, etc. can be communicated to the identified energy consumer to inform the identified energy consumer as to the value of their participation. Such information may be communicated together with, before, or after communicating the enrollment request. In one particular embodiment, such information is communicated simultaneously with the enrollment request so as to enable the identified energy consumer to make an informed decision when responding to the request. One particular process for generating such metrics is further described with reference to FIG. 10.

In some embodiments, the quality of the estimated aggregate energy shifting may be increased by determining the actual number of identified energy consumers who accept or reject enrollment offers and an increased likelihood as to their expected level of participation in each DR event. The following operations describe one particular embodiment for increasing the quality of the estimated aggregate energy shifting.

In operation 814 information indicative of an acceptance or rejection of the enrollment request may be received from each identified energy consumer. For example, such information may be received by the energy management system 130 from one or more electronic devices associated with the identified energy consumers for which enrollment requests were communicated to in operation 810, such as one or more of an intelligent, multi-sensing, network-connected thermostat 202 and an access device 266. The information may be received from the same electronic device which the enrollment requests was communicated to, or from a different electronic devices.

In operation 816 information indicative of the identified energy consumers' amenability to demand response load shifting is received for each identified energy consumer. In being amenable to demand response load shifting, a consumer's preference may range from a 'minimum' amenability (or participation) to a 'maximum' amenability (or participation). An indication of a 'minimum' participation indicates that the energy consumer prefers a minimum amount of load shifting to participate in the DR program or event. Conversely, a 'maximum' participation indicates that the energy consumer prefers a maximum amount of load shifting that is capable under the DR program or event. The energy consumer may select the minimum, maximum, or anywhere in a range between a minimum and maximum participation, where a minimum participation will result in the least change to the energy consumer's energy consumption habits but-for participation in the DR program whereas the maximum participation will result in the maximum change to the energy consumer's energy consumption habits but-for participation in the DR program. In many situations, a minimum participation will result in the least amount of discomfort resulting from participation in a DR event whereas a maximum participation will result in the maximum amount of discomfort resulting from participation in a DR event. Like the information indicative of an acceptance or rejection of the enrollment request, the information indicative of the identified energy consumers' amenability to demand response load shifting may be received by the energy management system 130 from one or more electronic devices associated with the identified energy consumers for which enrollment requests were communicated to in operation 810, such as one or more of an intelligent, multi-sensing, network-connected thermostat 202 and an access device 266.

In operation 818 the aggregate energy shifting estimate is revised based on the information received in one or more of operations 814 and 816. For example, the energy management system 130 may review the estimate generated in operation 804. The aggregate energy shifting estimate may then be revised in one or more of a variety of ways. For example, where the received information indicates acceptance of the enrollment request, when using the probability of DR program participation to determine to determine an estimated amount of energy shifting attributed to an identified energy consumer, the probability can be set to 100%. Then, the information indicating the energy consumer's amenability to DR load shifting can then be used to more accurately generate the DR implementation profile discussed with reference to operation 1008 in FIG. 10. In cases where the received information indicates rejection of the enrollment request, the identified energy consumer can be removed entirely from the calculation in estimating the aggregate energy shifting.

In operation 820 the revised estimate of aggregate energy shifting is again compared to the desired amount of shifting. If they are not approximately equal, processing may return to operation 808 where the subset of identified energy consumers is increased or decreased as previously described. Otherwise, enrollment may conclude where the energy consumers who accepted the enrollment requests are determined to be enrolled in the program. In some embodiments, the enrollment 'request' may not be a request at all, but rather a notification that the recipient will be subject to participation a demand response program. In such cases, reception of an acceptance/rejection is unnecessary, and a more accurate estimate can initially be generated in operation 804 in contrast to the embodiments where the enrollment is a request for participation.

It should be appreciated that the specific operations illustrated in FIG. 8 provide a particular process for enrolling energy consumers in a demand-response program according to an embodiment. The various operations described with reference to FIG. 8 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. Moreover, the individual operations illustrated in FIG. 8 may include multiple sub-operations that may be performed in various sequences as appropriate to the individual operations. Furthermore, additional operations may be added or existing operations removed depending on the particular applications. For example, as described, operations 812 through 820 may be optional. One of ordinary skill in the art would recognize and appreciate many variations, modifications, and alternatives.

Figure 9:
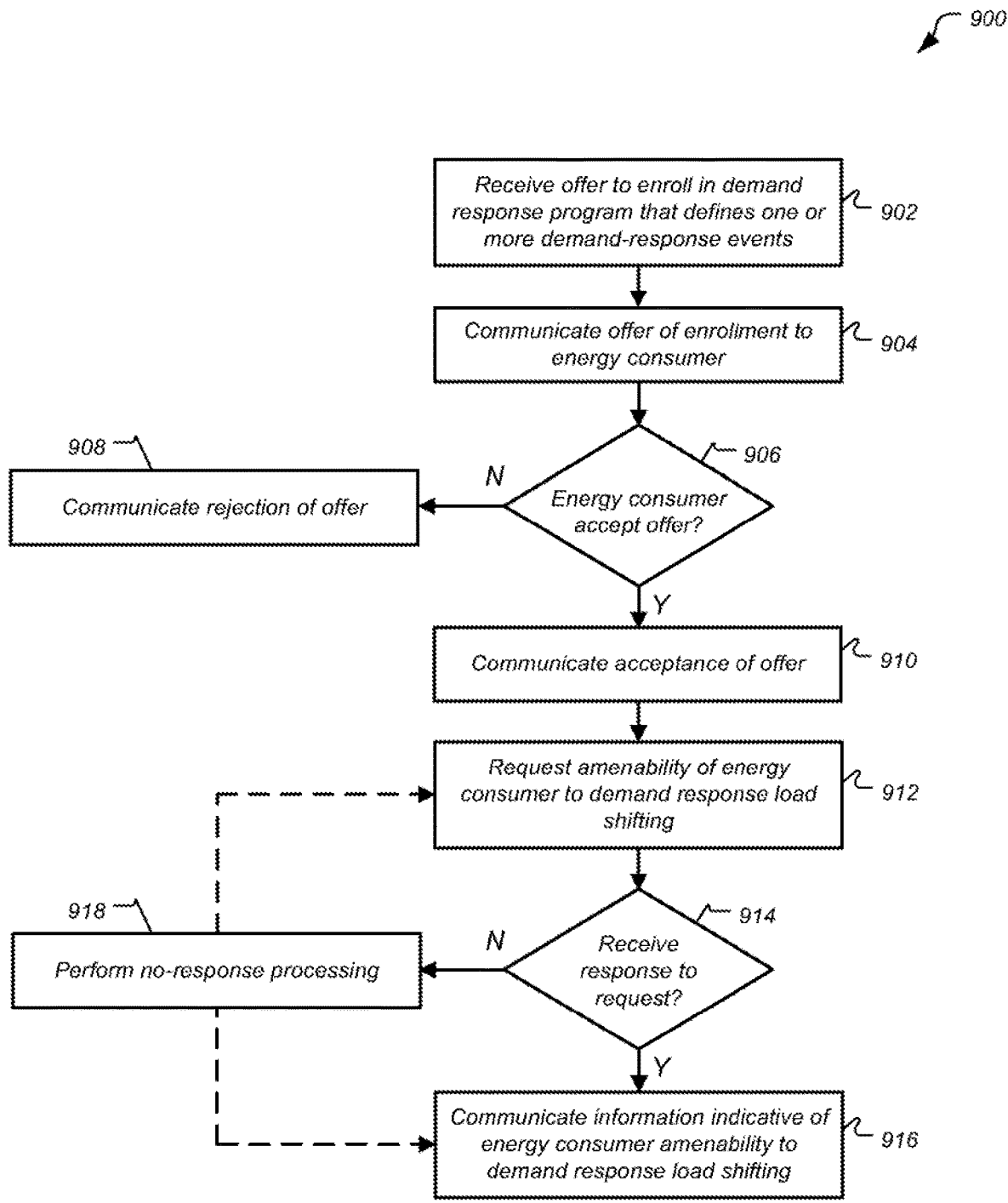
FIG. 9 illustrates a process for facilitating enrollment of an energy consumer in a demand-response program via an electronic device associated with the energy consumer according to an embodiment.

FIG. 9 illustrates a process 900 for facilitating enrollment of an energy consumer in a demand-response program via an electronic device associated with the energy consumer according to an embodiment. To facilitate understanding, the process 900 is described with reference to FIG. 1 and FIG. 2, although it should be understood that embodiments of the process 900 are not limited to the exemplary systems and apparatus described with reference to FIG. 1 and FIG. 2.

As discussed with reference to FIG. 8, enrollment requests and information indicating an energy consumer's amenability to demand response load shifting may be communicated to identifier energy consumers. Each identified energy consumer may be associated with one or more electronic devices, such as intelligent, multi-sensing, network-connected thermostat 202, access device 266, etc. The requests for information may be communicated to one or more of these devices and thus one or more of these devices may be used to process and respond to the requests as described herein.

In operation 902, an offer to enroll in a DR program is received. For example, the offer may be received at an electronic device associated with the identified energy consumer, such as intelligent, multi-sensing, network-connected thermostat 202, access device 266, or other device, from remote server 264 via network 262. The offer to enroll may include a variety of information regarding the DR program, such as the duration, magnitude, expectations, terms, etc. of the DR program, expected number of DR events, and/or expected duration, magnitude, expectations, terms, etc. of the DR events. The details of the information may be communicated together with the offer, or may be provided to the identified energy consumer via a separate communication mechanism.

In operation 904, the received offer is communicated to the energy consumer. The offer may be communicated using one or more of a variety of techniques. For example, the offer may be displayed to the user, communicated to the user via audio, etc. Further, the offer may be received using one or more of a variety of techniques, e.g., via email, a message on or communicated by the thermostat, a telephone call, etc. In one embodiment, the offer may be displayed on one or more of thermostat 202 and access device 266.

In operation 906 it is determined whether the energy consumer accepts the offer. The energy consumer may indicate acceptance or rejection of the offer using one or more of a variety of techniques. For example, the energy consumer may engage an input interface of one of the thermostat 202 and access device 266 to provide their response, where the input interface may be, as previously described, a touchscreen, a rotatable ring, a voice input, or other input mechanism.

If the energy consumer rejects the offer, processing may continue to operation 908 where information indicative of the rejection is communicated. The rejection is typically communicated to the entity that communicated the enrollment request to the energy consumer; however, in some embodiments the rejection may be communicated to one or more other recipients. In one particular embodiment, information indicative of the rejection is communicated from the thermostat 202 or access device 266 to the energy management system 130 via network 262.

Alternatively, if the energy consumer accepts the offer, processing may continue to operation 910 where information indicative of the acceptance is communicated. The acceptance is typically communicated to the entity that communicated the enrollment request to the energy consumer; however, in some embodiments the acceptance may be communicated to one or more other recipients. In one particular embodiment, information indicative of the acceptance is communicated from the thermostat 202 or access device 266 to the energy management system 130 via network 262.

Processing may then continue to operation 912 where the energy consumer's amenability to DR load shifting is requested. The request may be communicated to the energy consumer using one or more of a variety of techniques. For example, the request may be displayed to the user, communicated to the user via audio, etc. In one embodiment, the request may be displayed on one or more of thermostat 202 and access device 266.

In operation 914 it is determined whether a response to the request is received. The energy consumer provide a response indicating their amenability to DR load shifting using one or more of a variety of techniques. For example, the energy consumer may engage an input interface of one of the thermostat 202 and access device 266 to provide their response, where the input interface may be, as previously described, a touchscreen, a rotatable ring, a voice input, or other input mechanism.

If a response is received, processing may continue to operation 916 where the received information indicating the energy consumer's amenability to DR load shifting is communicated. The information indicating the energy consumer's amenability to DR load shifting is typically communicated to the entity that communicated the enrollment request to the energy consumer; however, in some embodiments the information indicating the energy consumer's amenability to DR load shifting may be communicated to one or more other recipients. In one particular embodiment, information indicating the energy consumer's amenability to DR load shifting is communicated from the thermostat 202 or access device 266 to the energy management system 130 via network 262.

In contrast, if a response is not received, processing may continue to operation 918 where 'no-response' processing is performed. No-response processing may encompass one or more of a variety of processes that may be performed in the absence of receiving a response to an initial request for the energy consumer's amenability to DR load shifting. In one embodiment, if no response is received, processing may return to operation 912 where the energy consumer is again requested for such information. This may be performed any number of times until a response is received. In another embodiment, if no response is received, processing may continue to operation 916, where 'default' amenability to DR load shifting may be communicated. The default value may range anywhere from minimum to maximum amenability to load shifting, and in some embodiments may be displayed to the energy consumer prior to communicating such information to the energy management system 130. In other embodiments, no-response processing may include communicating information indicating a lack of a response to the request for load shifting amenability, in which case the energy management system 130 may use a default value or wait until a specific DR event to again request the energy consumer's amenability to load shifting.

It should be appreciated that the specific operations illustrated in FIG. 9 provide a particular process for facilitating enrollment of an energy consumer in a demand-response program via an electronic device associated with the energy consumer. The various operations described with reference to FIG. 9 may be implemented at and performed by one or more of a variety of electronic devices or components described herein. For example, they may be implemented at and performed by a thermostat 202, an access device 266, or other electronic device described in accordance with the smart home environment 200. Other sequences of operations may also be performed according to alternative embodiments. For example, alternative embodiments of the present invention may perform the operations outlined above in a different order. Moreover, the individual operations illustrated in FIG. 14 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 10:
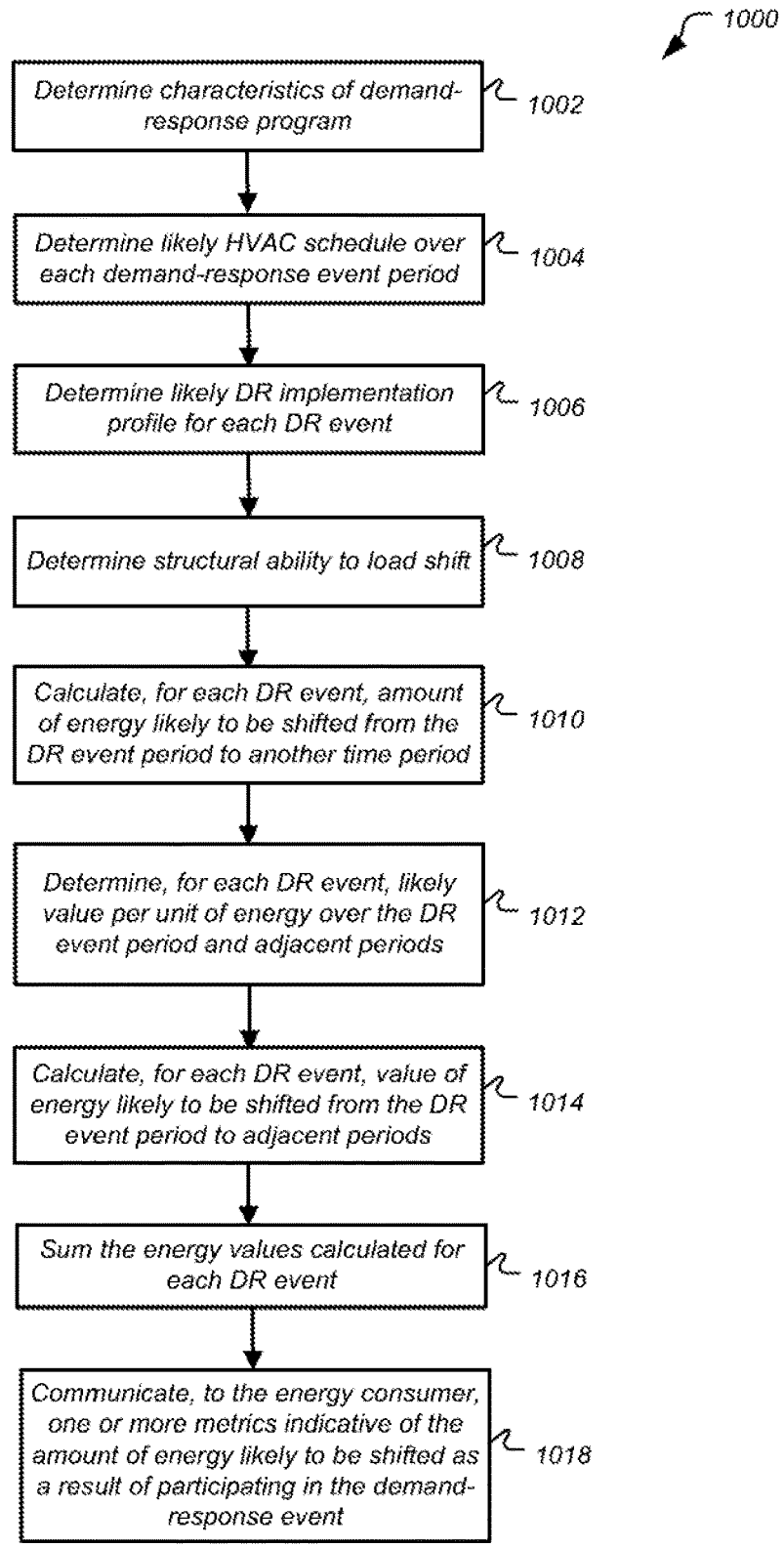
FIG. 10 illustrates a process for generating one or more metrics indicative of an amount of energy likely be shifted by an energy consumer if the energy consumer enrolls and participates in a demand-response program according to an embodiment.

FIG. 10 illustrates a process 1000 for generating one or more metrics indicative of an amount of energy likely be shifted by an energy consumer if the energy consumer enrolls and participates in a demand-response program according to an embodiment. To facilitate understanding, the process 1000 is described with reference to FIG. 1 and FIG. 2, although it should be understood that embodiments of the process 1000 are not limited to the exemplary systems and apparatus described with reference to FIG. 1 and FIG. 2.

As discussed with reference to operation 812 of FIG. 8, one or more metrics indicative of an amount of energy likely be shifted by an energy consumer if the energy consumer enrolls and participates in a DR program may be generated for and communicated to each identified energy consumer. In one particular embodiment as described herein, such metrics may be generated using various information such as the characteristics of the DR program, the likely HVAC schedule of the identified energy consumer, the likely DR implementation profile for the identified energy consumer, and the structural ability of the energy consumer's residence to load shift.

Turning now to FIG. 10, in operation 1002 the characteristics of the DR program are determined. As previously described, the DR program may be defined prior to requesting energy consumers to enroll in the program, where the DR program may define the expected number of DR events, the expected magnitude of each DR event, etc. Accordingly, such characteristic information may be received by the utility provider computing system 120, generated by the energy management system 130, or received or generated in part or in whole by other suitable entity. In some cases, a DR program communicated from the utility provider computing system 120 may neglect to include various details such as the number of DR events, period of each DR event, magnitude of each DR event, etc. The energy management system 130 can estimate the value of such details. For example, the energy management system 130 may identify various factors, such as the history of weather patterns for a particular region, the expected weather (i.e., weather forecast), the history of DR events for a DR program having particular attributes, etc. to generate such an estimate.

In operation 1004, the expected HVAC schedule of the energy consumer over each DR event period is determined.

In determining the expected HVAC schedule of a particular energy consumer over a particular DR event period, a number of different factors may be taken into consideration. These may include, for example, any current scheduled setpoints for the DR event period, the occupancy probability profile as applicable to the DR event period, a history of the energy consumer's scheduled and/or immediate setpoints, etc. In some embodiments, the energy consumer's historical setpoints may be correlated with historical weather patterns to determine setpoints for different weather tendencies, which may then be extrapolated to likely setpoints for future weather patterns expected for the future DR events. Information from other energy consumers may also be used. For example, historical setpoints of similarly situated energy consumers (e.g., as correlated to various weather patterns) may be used. Similarly situated energy consumers may be other energy consumers in the same geographical region as the identified energy consumer, energy consumers being associated with structures having the same thermal retention characteristics and/or HVAC capacity as the identified energy consumer, etc.

Once the expected HVAC schedule is determined, processing may continue to operation 1006 where the likely DR implementation profile for each DR event is determined. The likely DR implementation profile indicates the setpoints likely to be implemented for the energy consumer during a DR event instead of their scheduled setpoints. In determining the likely DR implementation profile for each event, a number of factors may be taken into consideration. These factors may include, for example, the likely HVAC schedule determined in operation 1004, the expected occupancy probability profile, the thermal retention characteristic of the structure associated with the energy consumer, the HVAC capacity of the structure associated with the energy consumer, the expected DR event profile, any indication as to the energy consumer's amenability to load shifting, past DR event behavior, weather forecast, etc. Some particular methods for generating a DR implementation profile is described with reference to FIG. 16 through FIG. 22. While the methods described with reference to FIG. 16 through FIG. 22 are described in the context of generating a DR implementation profile during a DR program and immediately prior to a DR event, such a process may similarly be used to generate an expected DR implementation profile for one or more future DR events. In the case of generating the expected DR implementation profile, however, as mentioned, some factors may be expected value rather than actual values.

In operation 1008 the ability of the structure associated with the energy consumer to load shift, for example one of residences 150A-150N, is determined. The ability of a structure to load shift indicates the ability of the structure to reduce energy consumption during one period (most commonly in favor of increasing energy consumption during other periods) while maintaining substantially constant internal temperature. The ability of a structure to load shift may be calculated based on a number of factors, such as the capacity of an environmental management system of the structure relative to a volume of the structure to be environmentally managed. The environmental management system may be, e.g., an HVAC system, a cooling system, a heating system, a humidifier, etc. The ability to load shift may also or alternatively be based on the environmental retention characteristics of the structure. Environmental retention characteristics refer to a structure's ability to retain heat, retain cold, retain humidity, retain dryness, etc. Different structures have different abilities to retain heat, humidity, and the like, depending on a variety of characteristics of the structure, such as the materials used to the construct the structure, the number, size, and types of windows used in the structure, cavities in the structure for devices such as fireplaces, ventilation units, etc. Various techniques for determining the environmental retention characteristics of a structure may be used. Some particular techniques are described in commonly assigned U.S. patent application Ser. No. 12/881,463, filed Sep. 14, 2010 (client reference number NES0003) and U.S. patent application Ser. No. 13/632,152 (client reference number NES0259), filed Sep. 30, 2012, both of which are incorporated herein in their entirety for all purposes. For one preferred embodiment, the step 1008 is carried out automatically based exclusively on historical sensor readings of, and control commands carried out by, the intelligent, network-connected thermostat for that residence. This automatic processing can be carried out exclusively at the thermostat itself, or as facilitated by the central server(s) of the cloud-based service provider(s) for the thermostat using data uploaded thereto by the thermostat. For such an embodiment, there is a distinct advantage in that the homeowner is not required to perform any background data entry, hire any outside consultants to perform a thermal analysis of the home, place any special sensing equipment in any special location, etc. Rather, simply by virtue of buying and installing the intelligent, network-connected thermostat, there has been an intelligent pre-qualification of that customer's premises for predicted demand-response suitability and efficacy. However, the scope of the present teachings is not so limited, and in other preferred embodiments there can be data used that is input by the homeowner, by an external sensing/logging system, or data obtained from other sources to carry out the step 1008. For some embodiments, if it is determined that the premises is highly unsuitable for demand response efficacy, there is provided the possible scenario, as may be actualized according to the desires of that particular demand-response program, that the homeowner not be bothered at all with the demand-response participation offer. It should be recognized that while thermal retention is described in numerous places herein, embodiments are not so limited. Rather, other types of environmental retention may be considered and/or used depending on the particular environmental conditions at the structure and type of energy management being performed during a DR event.

In operation 1010, for each likely DR event identified by the DR program, the amount of energy likely to be shifted from the DR event period to another time period is calculated. Such a calculation may use some or all of the aforementioned factors, such as the likely HVAC schedule, the likely DR implementation profile, and the ability of the structure to load shift. In one particular embodiment, a 'baseline' energy consumption for the DR event may first be determined using the expected HVAC schedule for the DR event, the structure's ability to load shift, the forecasted weather, and the occupancy probability profile. In some embodiments, the baseline energy consumption for the DR event may be predicted using a home thermal model that is created based on a number of factors such as the structure's ability to load shift, the forecasted weather, the occupancy probability profile, the indoor temperature history, the outdoor temperature history, and the history of HVAC usage. The likely energy consumption as a result of participating in the DR event may then be determined using the DR implementation profile and the structures ability to load shift. The difference of these values may then be taken as the amount of energy likely to be shifted from the DR event period to another time period.

In operation 1012, for each DR event, the likely value per unit of energy over the DR event period may be determined. The likely value per unit may be, for example, an expected cost per unit of energy. In the context of electrical energy, this may be a cost per kWh or other suitable unit. The expected cost per unit of energy may be determined using one or more of a variety of sources, such as contracted energy costs (i.e., a cost of energy as defined by the DR program), historical energy costs (i.e., energy costs from prior similar DR events, energy costs during prior similar weather patterns as expected for the DR event, etc.

In operation 1014, for each DR event, the value of energy likely to be shifted from the DR event period to another time period is determined. This value of energy may be determined by multiplying the likely value per unit of energy determined in operation 1012 with the amount of energy likely to be shifted calculated in operation 1010.

In one particular embodiment, the value of energy likely to be shifted represents only the energy reduction that is likely to occur during the DR event period as a result of energy management and control by one or more elements of the system (e.g., implementation of a DR implementation profile by a thermostat). In other embodiments, however, the value of energy likely to be shifted may also incorporate increased energy consumption outside of the DR event period. That is, in energy shifting energy is shifted from a high cost period (i.e., the DR event period) to a low cost period (i.e., periods shouldering the DR event period). While the reduction in energy during the high cost period (and associated value thereof) provides a good estimate of the value of energy savings, a more accurate estimate may be obtained if the increased energy consumption during the low cost periods is also taken into consideration. This may be done by, e.g., in operation 1012 determining the likely value per unit of energy not only over the DR event period, but also during the time periods (e.g., shoulder periods) over which the energy is likely to be shifted. Then, in operation 1014, the value of the energy shifted to time periods outside the DR event period may be deducted from the value of the energy shifted from the actual DR event period.

In operation 1016, the values of energy calculated for each DR event are summed. This summed value is the likely value for the energy consumer to particulate in the DR program.

In operation 1018, one or more metrics indicative of the amount of energy likely to be shifted as a result of enrolling and participating in the DR program are communicated to the energy consumer. The metrics may include the amount of energy likely to be shifted as described with reference to operation 1010 (i.e., amount of likely energy shift on a per-event basis) or a sum of these amounts for all expected DR events (i.e., a total amount of likely energy shift resulting from enrolling and participating in the DR program). The metrics may also or alternatively include the value of energy likely to be shifted on a per-event basis (e.g., as described with respect to operation 1014) or on an all-event basis (e.g., as described with reference to operation 1016). In one particular embodiment, energy management system 130 may communicate the one or more metrics to one or more electronic devices of residences 150A-150N associated with the identified energy consumer, including one or more of an intelligent, multi-sensing, network-connected thermostat 202 and an access device 266 associated with the identified energy consumer.

It should be appreciated that the specific operations illustrated in FIG. 10 provide a particular process for generating one or more metrics indicative of an amount of energy likely be shifted by an energy consumer if the energy consumer enrolls and participates in a demand-response program according to an embodiment. The various operations described with reference to FIG. 10 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. Moreover, the individual operations illustrated in FIG. 10 may include multiple sub-operations that may be performed in various sequences as appropriate to the individual operations. Furthermore, additional operations may be added or existing operations removed depending on the particular applications. For example, where only energy estimates (i.e., no value estimates) are needed, operations 1012 to 1016 may be omitted. One of ordinary skill in the art would recognize and appreciate many variations, modifications, and alternatives.

Figure 11A:
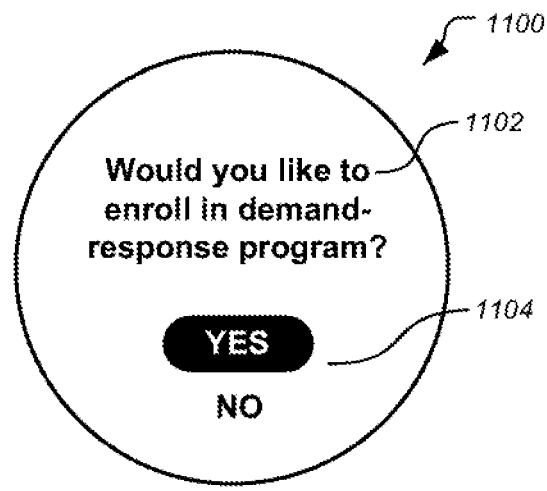
FIGS. 11A through 11C depict a graphical user interface of an intelligent, network-connected thermostat associated with an identified energy consumer receiving and responding to an enrollment request according to an embodiment.
Figure 11B:
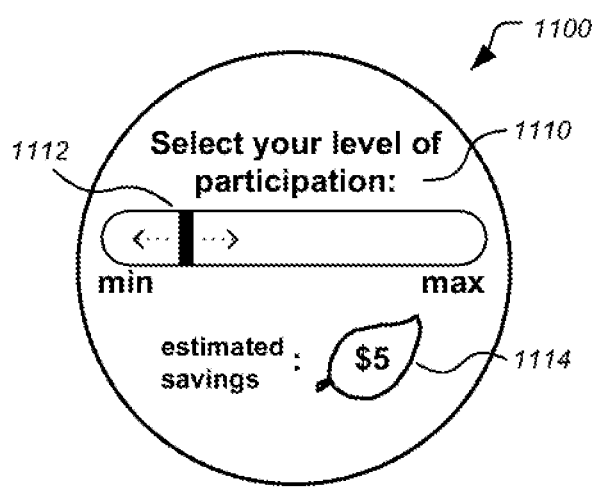
Figure 11C:
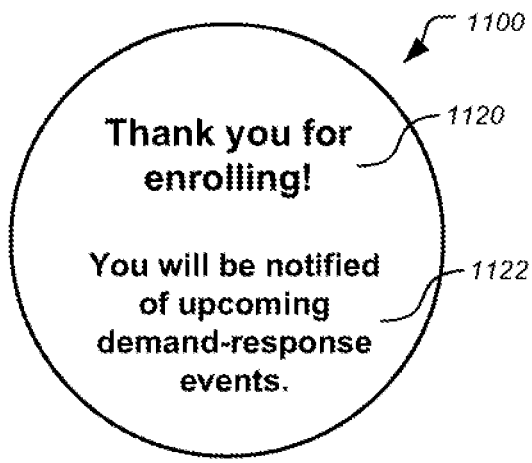

FIGS. 11A through 11C illustrate a simplified graphical user interface for presenting an offer to enroll in a demand response program to an energy consumer. While the graphical user interface (GUI) is presented in the form of an interface that may be displayed on a circular-shaped device such as the device 300 discussed with reference to FIGS. 3A through 3C, embodiments are not so limited as similar GUI's could be presented on other devices of other shapes.

Turning to the figures, FIG. 11A illustrates an input/output (I/O) element 1100 which may be, e.g., user interface 304 (FIG. 3A), output device 606 and/or input device 608 (FIG. 6), or other suitable I/O element 1100 of an electronic device associated with an identified energy consumer which is offered enrollment in a DR program. The I/O element 1100 includes a request message 1102 displaying the offer of enrollment to the identified energy consumer. The I/O element 1100 also includes a selectable input mechanism 1104 whereby the user can either accept or reject the offer. In one specific example, ring 320 could be rotated and/or depressed to either accept or reject the offer.

FIG. 11B illustrates the I/O element 1100 in the event the user accepts the offer of enrollment. The I/O element 1100 includes a participation level request message 1110 displaying a request for the identified energy consumer to select their desired level of participation in the DR program. This may range from a minimum level of participation to a maximum level of participation in the program. The I/O element 1100 may include a controllable slider 1112 that enables the identified energy consumer to select any level of participation on a gradient ranging from minimum to maximum participation. In one specific example, ring 320 could be rotated and/or depressed to select the level of participation. The I/O element 1100 may also include an estimated savings 1114 the identified energy consumer may realize if they enroll in the program and participate at the level of participation indicated by the slider 1112. The estimated savings in this particular example is illustrated as a dollar savings, but in other examples may also or alternatively be illustrated as a magnitude of energy savings (e.g., kWh). The estimated savings may also be recalculated and re-displayed in real-time in response to the energy consumer changing their level of participation. Further, in some embodiments, the estimated savings may also or alternatively be displayed together with the request message 1102 displaying the offer of enrollment. In such a case, the estimated savings may be calculated based on a default or expected level of participation.

FIG. 11C illustrates the I/O element 1100 in the event the identified energy consumer accepts the offer of enrollment and, in some embodiments, in the event the identified energy consumer selects their desired level of participation. The I/O element 1100 includes a thank you message 1120 thanking the identified energy consumer for enrolling in the program and an instruction message 1122 indicating that the identified energy consumer will subsequently be notified of upcoming DR events.

It should be appreciated that the specific I/O elements illustrated in FIGS. 11A through 11C describe particular I/O elements according to certain embodiments. The I/O elements described with reference to FIGS. 11A through 11C may be implemented at and performed by one or more of a variety of electronic devices associated with the identified energy consumer. For example, they may be implemented at and performed by one or more of the a thermostat 202, hazard detection unit 204, entryway interface device 206, wall light switch 208, wall plug interface 210, appliance 212, access device 266, or other electronic device associated with the identified energy consumer. The various messages and input elements may not necessarily be displayed at different times, but rather some messages could be presented simultaneously on the same display. Some messages could be communicated using other communication mechanisms, and responses could similarly be received using other communication mechanisms. For example, audible, touch, or other input/output mechanisms could be used. Further, it should be recognized that additional or alternative information could be presented to request enrollment and a participation level, and all of the information illustrated in FIGS. 11A through 11C need not be presented. One of ordinary skill in the art would recognize and appreciate many variations, modifications, and alternatives.

Returning briefly to FIG. 7, as described with reference to operation 706, after enrollment, one or more of the enrolled energy consumers is identified for participation in a particular DR event. As mentioned, not all energy consumers who enrolled in the demand response program are equally situated to reduce energy demand for a given DR event, and accordingly it may be desirable to invite some enrolled energy consumers to participate in a particular DR event over other enrolled energy consumers. A number of different factors may be taken into consideration for determining whether or not a particular enrolled energy consumer is suitable (i.e., qualified) for participation in a particular DR event. One particular set of factors is described with reference to FIG. 12.

Specifically, FIG. 12 illustrates process 1200 for analyzing a number of factors to determine whether an enrolled energy consumer is qualified for participation in a particular DR event according to an embodiment. Some of the factors may be determinative on their own, while other factors may be weighed to present an overall qualification level. The qualification level may range anywhere from not qualified (e.g., 0) to very qualified (e.g., 100). Whether a particular energy consumer is identified for participation in a DR event may thus depend on whether their qualification level meets a required qualification level. To facilitate further understanding, the process 1200 is described with reference to FIG. 1 and FIG. 2, although it should be understood that embodiments of the process 1200 are not limited to the exemplary systems and apparatus described with reference to FIG. 1 and FIG. 2.

Turning to FIG. 12, in operation 1202 it is determined whether the energy consumer has displayed a history of positive behavior. Positive behavior may be, e.g., productive (i.e., energy saving) contributions to past DR programs or DR events; positive encouragement for others to participate in past DR programs or DR events; timely payment of utility or other bills; etc. In contrast, negative behavior may be, e.g., non-productive contributions to past DR programs, negative encouragement for others to participate in past DR programs, untimely payment of utility or other bills, tampering of one or more electronic devices indicative of an attempt to obviate past DR programming, etc. When there is a history of positive behavior, such a history weighs in favor of qualification. In contrast, when there is a history of negative behavior, such a history weighs against qualification.

In operation 1204, it is determined whether the structure associated with the energy consumer is likely to be occupied during the DR event. In determining whether the structure is likely to be occupied during the DR event, an occupancy probability profile may be generated or otherwise acquired. The occupancy probability profile indicates a probability that the structure will be occupied at various times. The occupancy probability profile may be generated using one or more occupancy sensors incorporated in one or more electronic devices associated with the structure, such as in a thermostat 202, hazard detection unit 204, entryway interface device 206, wall light switch 208, wall plug interface 210, appliance 212, access device 266, or other electronic device associated with the identified energy consumer. A historical record of the occupancy detected by one or more of these devices may be maintained and used to develop the probability profile. In one particular embodiment, a technique for developing an occupancy probability profile as described in commonly assigned U.S. patent application Ser. No. 13/632,070 (client reference number NES0234), which is incorporated by reference in its entirety for all purposes, may be used. When the occupancy probability profile indicates that the structure is likely to be unoccupied, such a likelihood weighs in favor of qualification. In contrast, when the occupancy probability profile indicates that the structure is unlikely to be occupied, such a likelihood weighs against qualification.

In operation 1206 it is determined whether an environmental management system (e.g., an HVAC system, cooling system, heating system, etc.) is installed, operable, and controllable at the structure. For example, device 300 may detect installation of a particular type of environmental management system via connections to wire connectors 338. One particular technique for detecting installation of a particular type of environmental management system is disclosed in commonly assigned U.S. patent application Ser. No. 13/038,191 (client reference number NES0009), filed Mar. 1, 2011, which is incorporated by reference in its entirety for all purposes. Further, device 300 may similarly be used to determine whether the attached environmental management system is operable and controllable by, e.g., the device 300. For example, device 300 may attempt to control an attached cooling system to cool the structure. If temperature sensors of the device 300 subsequently measure a reduction in inside temperature that is not likely a result of factors such as declining outside temperature, the device 300 may deduce that the attached cooling system is operable and controllable. Other techniques for determining whether an attached environmental management system is operable and controllable are disclosed in U.S. patent application Ser. No. 13/038,191, supra, which is incorporated by reference for all purposes. If it is determined that an environmental management system is installed, operable, and controllable, then this may weigh in favor of qualification. In contrast, if it is determined that an environmental management system is not installed, operable, or controllable, then this way weigh against qualification.

In operation 1208 it is determined whether the capacity of the environmental management system relative to the volume of the structure to be environmentally managed exceeds a threshold. For example, it may be determined whether the cooling capacity of a cooling system relative to the volume of the structure to be cooled by the cooling system exceeds a threshold. When the capacity of the environmental management system is too small, in some instances the environmental management system may not assist in any DR event energy reduction. Accordingly, when the capacity of the environmental management system does not meet or exceed the threshold, this may weigh against qualification. In contrast, when the capacity exceeds the threshold, this may weigh in favor of qualification.

In operation 1210 it is determined whether an environmental retention characteristic of the structure exceeds a threshold. As mentioned, environmental retention characteristics refer to a structures ability to retain heat, retain cold, retain humidity, retain dryness, etc., and different structures have different abilities to retain heat, humidity, and the like. When the environmental retention characteristic is so low for the type of DR event being managed, there may be little or no energy shifting. For example, where there is a very hot outside temperature and the thermal retention of a structure is very low, the energy consumer associated with the structure may be a poor choice for participation in a DR even as pre-cooling (described in detail further herein) may become largely ineffective. Accordingly, when the environmental retention characteristic is equal to or below a threshold value, this weighs against qualification. In contrast, when the environmental retention characteristic exceeds the threshold value, this weighs in favor of qualification.

In operation 1212 it is determined whether the amount of energy shifting likely to occur as a result of the identified energy consumer participating in the particular DR event exceeds a threshold value. Even though a particular energy consumer has enrolled in a DR program and, in some embodiments, determined to likely provide at least some amount of energy shifting as a result of their participation in the DR program, that same energy consumer may not be well-suited to provide energy shifting for a particular DR event. This may be due to any one of a number of reasons, such as the person likely being home for the entire duration of the DR event (and unlikely to be home for most other DR events), the weather at the energy consumer's structure likely to be significantly different (less energy demanding) than the weather at other identified energy consumer's structures (but more similar during other DR events), etc. Moreover, although a number of energy consumers are enrolled to participate in a DR program, there may be instances where it is desirable to use only a select subset of those consumers for a particular DR event as further described with reference to FIG. 13.

Regardless of the case, at operation 1212 it is determined whether the amount of energy shifting likely to occur as a result of the identified energy consumer participating in the particular DR event exceeds a threshold value. The amount of energy shifting likely to occur may be determined using a number of factors such as the energy consumer's HVAC schedule, the DR implementation profile, and the ability of the structure to load shift. In one particular embodiment, a 'baseline' energy shifting for the DR event may first be determined using the HVAC schedule for the DR event, the structures ability to load shift, the weather forecast, and occupancy probability profile. The likely energy shifting to occur as a result of participating in the DR event may then be determined using the DR implementation profile and the structures ability to load shift. The difference of these values may then be taken as the amount of energy likely to be shifted from the DR event period to another time period. One particular process for determining the amount of energy likely to be shifted is discussed with reference to operation 2310 of FIG. 23 in the context of estimating savings and is equally applicable here. Accordingly, when the amount of energy shifting likely to occur as a result of the identified energy consumer participating in the particular DR event exceeds a threshold value, this weighs in favor of qualification. In contrast, when the amount of energy shifting likely to occur as a result of the identified energy consumer participating in the particular DR event is equal to or less than the threshold value, this weighs against qualification.

In operation 1214 it is determined whether the device controlling the environmental management system (e.g., an HVAC) at the structure has wireless communication capabilities. For example, it may be determined whether device 300 is capable of communicating wirelessly with remote server 264 and/or energy management system 130. If so, this may weigh in favor of qualification; otherwise, this may weigh against qualification.

In operation 1216 it is determined whether one or more devices associated with the structure of the identified energy consumer has access to weather forecast information. For example, it may be determined whether device 300 is operable to receive a weather forecast for the weather in the vicinity of the structure. In other embodiments, the devices associated with the structure need not have access to weather forecast information, but rather such information may be acquired by other entities such as energy management system 130. If, however, it is determined that one or more devices associated with the structure of the identified energy consumer has access to weather forecast information, then his may weigh in favor of qualification; otherwise, this may weigh against qualification.

In operation 1218 it is determined whether the device (e.g., device 300) controlling the environmental management system (e.g., an HVAC) at the structure is in a particular learning mode, e.g., an 'aggressive' learning mode. For example, an intelligent, multi-sensing, network-connected thermostat 202 may implement one or more learning algorithms whereby the thermostat 202 learns the tendencies and preferences of the occupants of the structure associated with the thermostat 202. The thermostat 202 may learn preferred temperatures, humidity's, etc. for different times of the day, for different occupants, etc. The thermostat 202 may implement multiple modes of learning, wherein an initial learning mode aggressively responds to user selections. That is, the learning mode provides significant weight to temperature settings and changes instigated by the occupants. The initial learning mode may last for a certain duration, for example a week, two weeks, three weeks, etc., or until a certain amount of temperature settings and adjustments have been recorded.

At the end of the initial learning mode, the substantive preferences and tendencies of the occupants should be recognized. The thermostat 202 may then enter a second learning mode such as a refining mode of learning. The refining mode may be much less aggressive compared to the initial learning mode, in that changes made by occupants are given much less weight in comparison to changes made during the initial learning mode. Various specific learning algorithms are further described in commonly assigned U.S. Provisional Application No. 61/550,346 (client reference number NES0162-PROV), filed Oct. 21, 2011, the contents of which are incorporated by reference herein in their entirety for all purposes.

It should be recognized that embodiments are not necessarily limited to the thermostat 202 learning tendencies and preferences of the occupants of the structure, but rather the learning algorithms may be incorporated in any one or more of the electronic devices described with reference to the smart home environment 200 and/or the energy management system 130. In any event, when such devices are still in an aggressive learning mode they may not be suitable for participation in a DR event, and thus this may weigh against qualification. In contrast, when such devices are out of the aggressive learning mode, this may weigh in favor of qualification.

In operation 1220 it is determined whether the device controlling the environmental management system (e.g., an HVAC) at the structure is paired with a user account. By being paired with a user account, the device is uniquely associated with a user account managed by the energy management system 130. In many cases, the device is paired with an account created by the energy consumer associated with the structure. The account may be managed by the energy management system 130 and provide the energy consumer access to control and monitoring of the device (e.g., thermostat 202) using one or more remote electronic device (e.g., access device 266). Various techniques for pairing a device to a user account are further described in commonly assigned U.S. patent application Ser. No. 13/275,311 (client reference number NES0129), filed Oct. 17, 2011, the contents of which are incorporated by reference herein in their entirety for all purposes. If the device controlling the environmental management system at the structure is paired with a user account, this may weigh in favor of qualification. In contrast, if the device controlling the environmental management system at the structure is not paired with a user account, this may weigh against qualification.

In operation 1222 it is determined whether the identified energy consumer is likely to participate in the DR event. The likelihood of the energy consumer participating in the DR event may be determined based on a number of factors, such as the prior participation levels by the energy consumer in past DR events, the HVAC schedule of the energy consumer, the likelihood of the structure being occupied during the DR event, the geographical location of the energy consumer, the affluence of the energy consumer, etc. If the energy consumer is likely to participate in the DR event, then this may favor qualification. Otherwise, this may weigh against qualification.

It should be appreciated that the specific operations illustrated in FIG. 12 provide a particular process for analyzing a number of factors to determine whether an enrolled energy consumer is qualified for participation in a particular DR event. The various operations described with reference to FIG. 12 may be implemented at and performed by one or more of a variety of electronic devices or components described herein. For example, they may be implemented at and performed by one or more electronic devices in the smart home environment 200, the energy management system 130, etc. Other sequences of operations may also be performed according to alternative embodiments. For example, alternative embodiments of the present invention may perform the operations outlined above in a different order. Moreover, the individual operations illustrated in FIG. 12 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 13:
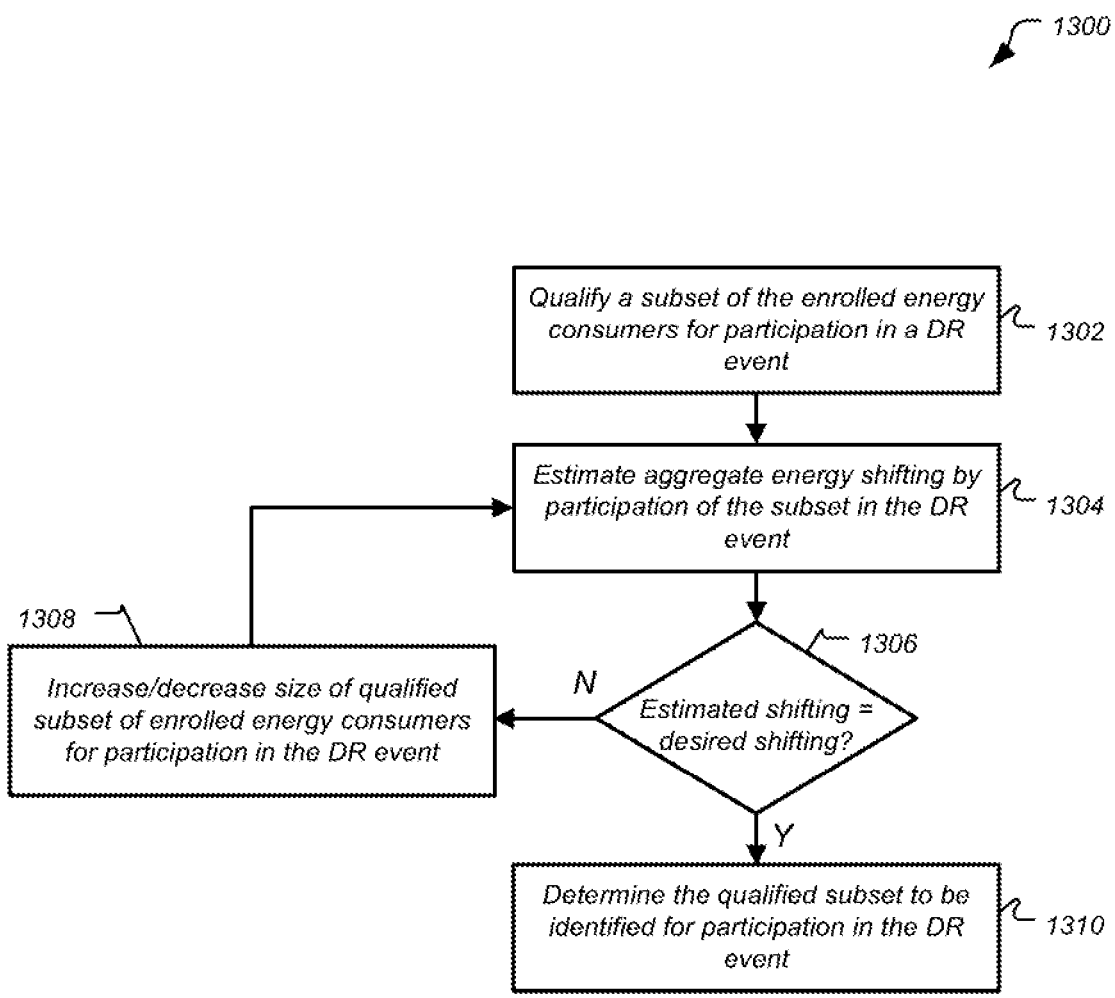
FIG. 13 illustrates a process for identifying enrolled energy consumers to participate in a DR event according to an embodiment.

FIG. 13 illustrates a process 1300 for identifying energy enrolled energy consumers to participate in a DR event according to an embodiment. Any particular DR event may have the goal of reducing energy consumption by a certain amount during the DR event period (i.e., shifting a certain amount of energy consumption from the DR event period to one or more other time periods). The magnitude of this reduction or shifting may be defined, e.g., by the DR event magnitude. In some embodiments it may not be necessary to have all enrolled energy consumers participate in a particular DR event to achieve the desired shifting in energy consumption. Accordingly, a particular process for determining the minimum number of enrolled energy consumers necessary to achieve a particular amount of energy shifting is described herein. To facilitate further understanding, the process 1300 is described with reference to FIG. 1 and FIG. 2, although it should be understood that embodiments of the process 1300 are not limited to the exemplary systems and apparatus described with reference to FIG. 1 and FIG. 2.

In operation 1302, a subset of the enrolled energy consumers is qualified for participation in a DR event. A number of factors such as those described with reference to FIG. 12 may be used to determine which energy consumers are qualified to participate in a particular DR event. Initially, the qualification factors may be applied stringently such that a fairly limited number of energy consumers are considered to be qualified.

Once the initial subset of enrolled energy consumers is qualified, processing continues to operation 1304. In operation 1304 an estimate of the aggregate energy shifting likely to result from participation of the qualified subset of energy consumers is determined. The estimated energy shifting likely to result from participation of each energy consumer may initially be determined as described with reference to operation 1212. These estimates may then be aggregated for all of the initially qualified energy consumers.

In operation 1306, the estimated aggregate energy shifting is then compared with the desired energy shifting. For example, the estimated aggregate energy shifting may be compared to a desired energy shifting defined by the DR event. If the estimated aggregate energy shifting is not approximately equal to the desired energy shifting, then processing may continue to operation 1308.

In operation 1308, the size of the qualified subset of enrolled energy consumers for participation in the DR event is either increased or decreased. If the estimated energy shifting is less than the desired energy shifting, then the size of the qualified subset is increased. In contrast, if the estimated energy shifting is greater than the desired energy shifting, then the size of the qualified subset is decreased. In one particular embodiment, the size of the qualified subset may be decreased by making one or more of the factors used to the qualify the subset more stringent. For example, with reference to FIG. 12, the HVAC capacity threshold may be increased, the structural thermal retention threshold may be increased, the amount of likely energy shifting may be increased, etc. In contrast, the size of the qualified subset may be increased by making one or more of the factors used to qualify the subset less stringent. For example, with reference to FIG. 12, the HVAC capacity threshold may be decreased, the structural thermal retention threshold may be decreased, the amount of likely energy shifting may be decreased, etc. Once the size of the qualified subset is changed, processing may return to operation 1304 where an aggregate energy shifting is again estimated but this time for the modified subset.

Returning to operation 1310, if the estimated aggregate energy shifting is approximately equal to the desired energy shifting, then processing may continue to operation 1310. In operation 1310 the energy consumers that are included in the qualified subset are determined to be the identified energy consumers for participation in the DR event. For example, with reference to operation 706, the energy consumers that are included in the qualified subset may be considered to be those identified in operation 706.

It should be appreciated that the specific operations illustrated in FIG. 13 provide a particular process for identifying energy enrolled energy consumers to participate in a DR event. The various operations described with reference to FIG. 13 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. For example, in some embodiments, if the estimated shifting is greater than the desired shifting, processing may continue to operation 1310 rather than 1308. In such a case it may be recognized that greater shifting than defined by a DR event profile may be desired. Moreover, the individual operations illustrated in FIG. 13 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Returning briefly to FIG. 7, once the specific enrolled energy consumers are identified for participation in a DR event as described with reference to operation 706, the energy consumption of those energy consumers is then managed during a DR event. Managing energy consumption for an energy consumer may include a variety of aspects, such as notifying the energy consumer of the DR event, intelligently reducing energy consumption for the energy consumer, responding to changes in the DR event instigated by the utility provider or energy management system, responding to feedback of the energy consumer, and the like. One particular process for managing energy consumption of the identified energy consumers is herein described with reference to FIG. 14.

Figure 14:
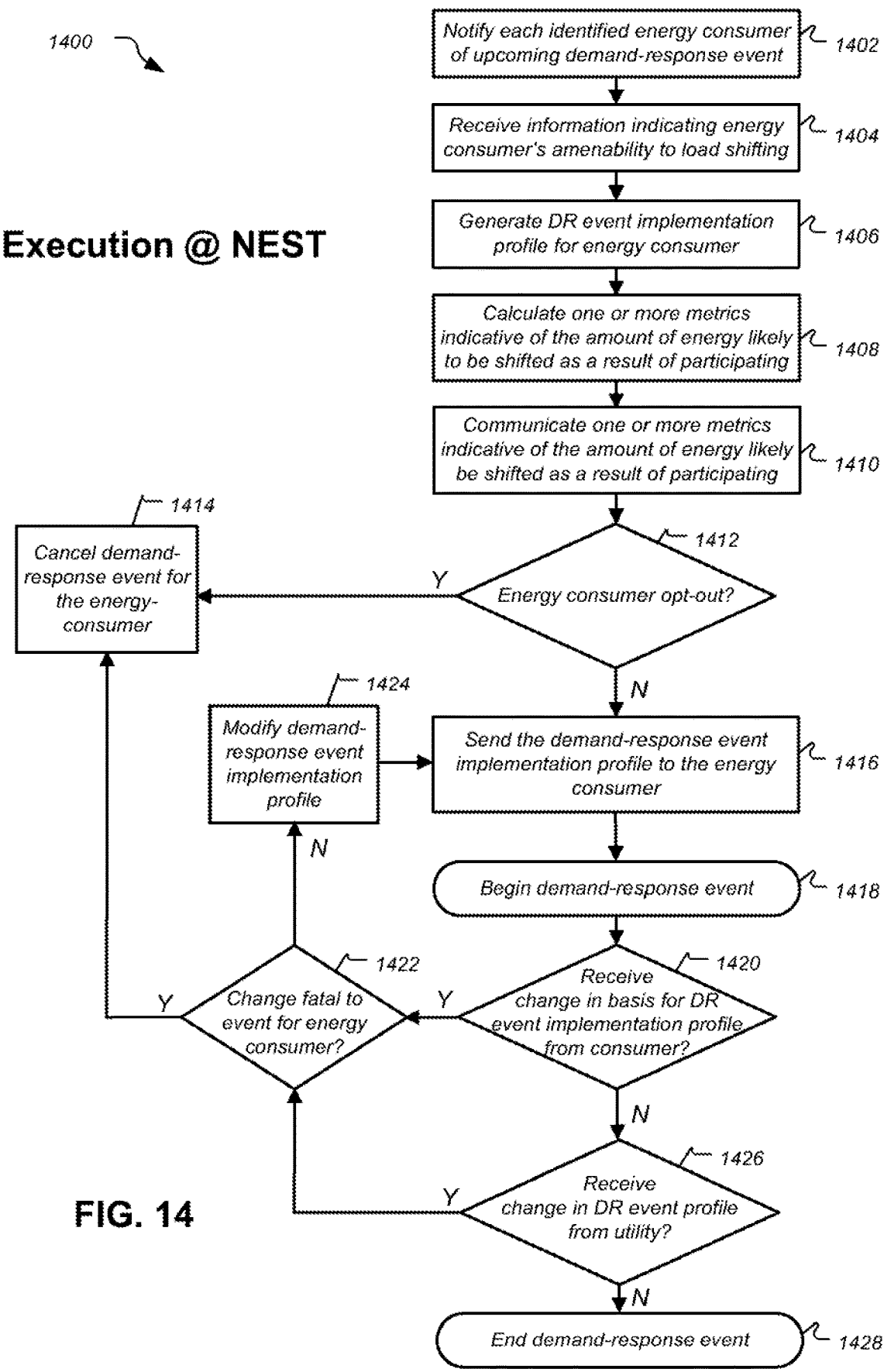
FIG. 14 illustrates a process for managing the energy consumption of energy consumers identified for participation in a DR event according to an embodiment.

Specifically, FIG. 14 illustrates a process 1400 for managing the energy consumption of energy consumers identified for participation in a DR event according to an embodiment. To facilitate further understanding, the process 1400 is described with reference to FIG. 1 and FIG. 2, although it should be understood that embodiments of the process 1400 are not limited to the exemplary systems and apparatus described with reference to FIG. 1 and FIG. 2.

In operation 1402 each identified energy consumer may be notified of an upcoming demand-response event. For example, energy management system 130 may communicate such a notification to one or more electronic devices of residences 150A-150N associated with the identified energy consumers, including one or more of an intelligent, multi-sensing, network-connected thermostat 202 and an access device 266 associated with the identified energy consumers. The notification may be communicated to each device associated with an energy consumer or, in some embodiments, may be communicated to only one or a subset of devices associated with the energy consumer. The notification may be communicated at any suitable time period to the DR event period, such as 1 hour before, 6 hours before, 12 hours before, 24 hours before, etc. In some embodiment, the notification may be communicated on the order of minutes prior to the DR event period, such as 5 minutes, 15 minutes, 30 minutes, etc. Such may be the case for instantaneous DR where the utility company (or other entity) determines that a peak in aggregate energy demand is likely within an hour (or other nearby time) and would like to cause a reduction in aggregate energy demand in the near term. Multiple notifications may be communicated at the DR event period approaches. In many embodiments, the notification is communicated prior to any expected pre-event management period. In some cases, however, such as when the number of participants needs to be increased partway through the DR event, a notification could be sent during the DR event period. One particular example of communicating such a notification is described with reference to FIG. 24A through 24C, which depict a graphical user interface of an intelligent, network-connected thermostat associated with an identified energy consumer receiving and responding to such a notification. The notification may include a variety of information to the DR event, such as the DR event period, DR event magnitude, etc.

It should be recognized that the intelligent, network-connected thermostat need not receive notification of a DR event at any certain time prior to the DR event period beginning. In some embodiments, the thermostat may receive notification of the DR event prior to the DR event period beginning. In other embodiments, however, the thermostat may receive notification of the DR event period during the DR event. In such cases, the thermostat may still implement a DR implementation profile. In at least one embodiment, additional processing may be performed to determine whether a thermostat should implement a DR implementation profile based on the time the notification is received. For example, the thermostat may implement a DR implementation profile only if some shift in energy consumption is likely. That is, at the time of receiving the notification, the thermostat (or remote server) may determine whether a shift in energy consumption is likely (e.g., using the processing described with reference to operation 1408), based on the time remaining for the DR event, the DR implementation profile applicable to the remaining DR event period, etc. If a shift in energy consumption is not likely because, e.g., the thermostat received the notification too late (e.g., partway through a pre-cooling period, or partway through a set-back period), then the thermostat may not generate or implement a DR implementation profile. In contrast, if an energy shift is likely, the thermostat may implement the DR implementation profile such that it participates in at least a portion of the DR event. It should further be recognized that, to participate in the DR event, the thermostat need not maintain a network connection after receiving the DR event notification. That is, once the thermostat receives the DR event notification, the network connection to the remote server may be lost, but the thermostat may nevertheless implement a DR implementation profile.

In operation 1404 information indicating the energy consumer's amenability to load shifting is received. This operation is similar to that described with reference to operation 804. However, in this case, this information indicates the energy consumer's amenability to load shifting with respect to a specific DR event, rather than the DR program as a whole. In many embodiments, this operation may be excluded in favor of operation 804 (where the amenability to load shifting indicated for the DR program is subsequently used as the amenability to load shifting for some or all DR events in the program), or vice versa, operation 804 may be excluded in favor of operation 1404 (where amenability to load shifting is asked for each DR event, or for only the first DR event or a subset of DR events where the amenability may effectively be learned over the course of the DR program). In some embodiments, the energy consumer may be requested for their amenability to load shifting both at the time of enrolling in the DR program and at the time of participating in a DR event, where the information received for the specific DR event may take precedence over that received for the DR program as a whole. In at least one embodiment, where the energy consumer initially indicated a preferred amenability for the DR program, that preference may be indicated as a default level of amenability for each particular DR event, where the energy consumer has the option to tweak their desired amenability at the time of each specific DR event.

In operation 1406, a DR event implementation profile is generated for the energy consumer. The DR event implementation profile defines a plurality of setpoint temperatures distributed over the DR event period of the DR event. These setpoint temperatures temporarily replace the scheduled setpoint temperatures that the energy consumer had in place prior to the DR event. The setpoint temperatures are temporary in that they are applied and implemented only for the DR event period (and, in some cases, pre-event and/or post-event periods such as pre-cooling and snapback periods). In cases where the energy consumer did not have any scheduled setpoint temperatures during the DR event period, the setpoint temperatures defined by the DR event implementation profile may be created as new (yet temporary) setpoint temperatures for the energy consumer. One particular technique for generating a DR event implementation profile is described herein with reference to FIG. 16 through FIG. 22, although other techniques for generating a DR event implementation profile may be implemented. In at least one embodiment, the information indicating the energy consumer's amenability to load shifting as described in operation 1404 may be used to generate the DR event implementation profile. An increased amenability will result in a more aggressive DR event implementation profile (i.e., one that more aggressively shifts energy) whereas a decreased amenability will result in a less aggressive DR event implementation profile.

In operation 1408, one or more metrics indicative of the amount of energy likely to be shifted as a result of the energy consumer participating in the DR event is calculated. This operation is similar to the process 1000 described with reference to FIG. 10, however in this case the accuracy of the metrics in indicating the amount of energy like to be shifted may be increased as compared to those calculated in operation 1018 due to the more concrete nature of the factors used to generate the metrics. For example, in determining the metrics in accordance with operation 1408, the HVAC schedule for the DR event period is likely known and can be identified and the DR event implementation profile has been generated. These may be used in combination with the ability of the structure to load shift to calculate the amount of energy likely to be shifted from the DR event period to another event period. In some embodiments, the per unit value of energy over the DR event period may also be determined in order to calculate the value of energy likely to be shifted. Accordingly, such metrics may include one or more of a magnitude (e.g., kWh) of energy likely to be shifted, a value (e.g., dollars) of the energy likely to be shifted, etc. One particular technique for determining such metrics is described with reference to FIG. 23 and may be used herein.

In operation 1410 one or more of the metrics calculated in operation 1408 are communicated to the energy consumer. In one particular embodiment, energy management system 130 may communicate the one or more metrics to one or more electronic devices of residences 150A-150N associated with the identified energy consumer, including one or more of an intelligent, multi-sensing, network-connected thermostat 202 and an access device 266 associated with the identified energy consumer.

In operation 1412 it is determined whether the energy consumer opts-out of participation in the DR event. The energy consumer may opt-out in one or more of a variety of ways. For example, the energy consumer may respond to the notification described in operation 1402 with a response indicating a desire to opt-out of participation in the DR event. For another example, the energy consumer may change their scheduled setpoints for the DR event period that were set by the DR implementation profile, and/or may change an immediate setpoint on their thermostat. In some embodiments, any setpoint change may result in an opt-out, whereas in other embodiments, only scheduled setpoint changes that result in a reduction of the amount of energy shifting expected by the energy consumer result in an opt-out. In some cases, the reduction must be great enough such that the energy consumer no longer shifts energy from the DR event period. It should be recognized that a variety of techniques to opt-out may be incorporated, such as the energy consumer emailing, telephoning, messaging, or other communicating an opt-out request to the energy management system 130 either before or during the DR event. It should also be recognized, however, than in other embodiments the energy consumer may not be given an opportunity opt-out of participating in a particular DR event. In such cases, for example, the processing may continue to operation 1416.

If the energy consumer opts-out, then processing may continue to operation 1414 where the DR event is canceled for that energy consumer. In canceling the DR event, no DR implementation profile will be communicated to the energy consumer, thus the energy consumer's scheduled setpoints will remain as originally configured by the energy consumer. If a DR implementation profile had already been communicated to the energy consumer, then any changes made to the energy consumers setpoints by incorporation of the DR implementation profile may be reversed. If on the other hand the energy consumer does not opt-out, then processing may continue to operation 1416.

In operation 1416 the DR event implementation profile is sent to the energy consumer. For example, energy management system 130 may send the DR event implementation profile to one or more electronic devices of residences 150A-150N associated with the identified energy consumers, including one or more of an intelligent, multi-sensing, network-connected thermostat 202 and an access device 266 associated with the identified energy consumers. As a result, the receiving device, such as thermostat 202, may temporarily replace any existing scheduled setpoints with those indicated in the DR event implementation profile.

In operation 1418 the DR event begins. For example, the DR event period defined by the DR event may start.

In operation 1420 it is determined whether a change is basis for the DR event implementation profile is received from the consumer. As described with reference to operation 1406 and FIG. 16 through FIG. 22, a number of factors may be used to generate the DR event implementation profile, such as the HVAC schedule, an occupancy probability profile, an amenability to load shifting, a weather forecast, etc. One or more of these basis may change during the DR event. For example, the energy consumer may adjust their immediate setpoint or scheduled setpoints on the HVAC schedule for the DR event period. A real-time occupancy sensor may indicate an occupancy where the occupancy probability profile indicated a non-occupancy. A real-time outside weather (e.g., temperature, humidity, etc.) measurement may be different than that indicated in the weather forecast. If such a change in the basis is received or otherwise detected, then processing may continue to operation 1422.

In operation 1422 it is determined whether the change in basis is fatal to the DR event for the energy consumer. The change in basis may be fatal, e.g., if it results in less energy shifting than initially predicted. Alternatively, there may be more leniency, whereby the change in basis is fatal only if it results in no energy shifting at all for the DR event. In one particular embodiment, to determine whether the change is fatal, the amount of energy shifting likely to result from continued participation in the DR event subject to the altered basis may be recalculated. This recalculated energy shift may then be compared to the energy shifting initially calculated in, e.g., operation 1408, or may be compared to a threshold amount such as zero shifting. If the change is not fatal, then processing may continue to operation 1424.

In operation 1424 the DR event implementation profile is modified in accordance with the changed basis. The DR event implementation profile at this point may be generated similar to that described above with reference to operation 1406, but in this case the modified basis are used to generate the profile. Once the modified DR event implementation profile is generated, processing may continue to operation 1416 where the modified profile is sent to the energy consumer. If, on the other hand, it is determined in operation 1422 that the change is fatal, then processing may return to operation 1414 where the DR event is canceled for the energy consumer.

Returning to operation 1420, if it is determined no change in basis is received from the energy consumer, then processing may continue to operation 1426. In operation 1426 it is determined whether a change in basis for the DR event profile is received from the utility provider computing system 120 or other entity of system 100, or is generated by energy management system 130. As described with reference to operation 702, a DR event is a time period over which energy reduction mechanisms are actively engaged in an effort to reduce energy consumption over a specifically defined period. The efforts to reduce energy consumption may be in response to a determination that demand on the grid is likely to exceed supply during the defined period. This may be due to a variety of factors, such as expected temperature, humidity, temporary drops in supply (e.g., scheduled maintenance of electrical power generators), etc. During the course of the DR event one or more of these basis for generating the DR event may change. As a result, the necessity of the DR event may also decrease. In another example, the actual amount of aggregate energy reduction may exceed that expected, or an additional supply of energy may be incorporated, in which case the necessity of the DR event may also decrease. In some embodiments, the basis may change prior to the DR event period beginning. Accordingly, a notification may be sent to the energy consumer, energy management system, or the like prior to the beginning of the DR event period effectively canceling the DR event. Regardless of the reason, if such a change in the DR event profile is received, processing may continue to operation 1422.

In operation 1422 during this instance, it is determined whether the change in the DR event profile is fatal to the energy consumer. This may be determined as previously discussed for operation 1422, except in this case likely energy shifting is recalculated based on the change in the DR event profile. In contrast, if there is no change in the DR event profile, then processing may continue to operation 1428 where the DR event is finished.

It should be appreciated that the specific operations illustrated in FIG. 14 provide a particular process for managing the energy consumption of energy consumers identified for participation in a DR event. The various operations described with reference to FIG. 14 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. For example, while operations 1420 through 1426 are described as being performed during a DR event, they may similarly be performed prior to a DR event beginning. That is, changes to the DR event implementation profile and/or DR event profile may be received and processed prior to the DR event beginning. Moreover, the individual operations illustrated in FIG. 14 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

In the process described with reference to FIG. 14, once the energy consumers are identified for participation in the DR event, the size of this set of energy consumers may decrease (e.g., as a result of opting out) but may not increase. In some embodiments it may be desirable to increase the number of energy consumers that are eligible to participate in a DR event during the course of the DR event. For example, in some cases the pre-event estimate for the aggregate amount of energy to be shifted by the identified energy consumers may be inaccurate, resulting in less energy shifting than is desired. Conversely, if the actual energy shifting being achieved during the course of a DR event is greater than that expected or needed, then the number of participants in the event may be diminished. Accordingly, in some embodiments the number of energy consumers participating in a particular DR event may increase, decrease, or the specific energy consumers may change, during the course of the DR event. One particular technique for actively managing the DR event based on the monitored aggregate energy shifting is described with reference to FIG. 15. Such techniques may, e.g., be implemented simultaneously with operations 1420 through 1426 described with reference to FIG. 14.

Figure 15:
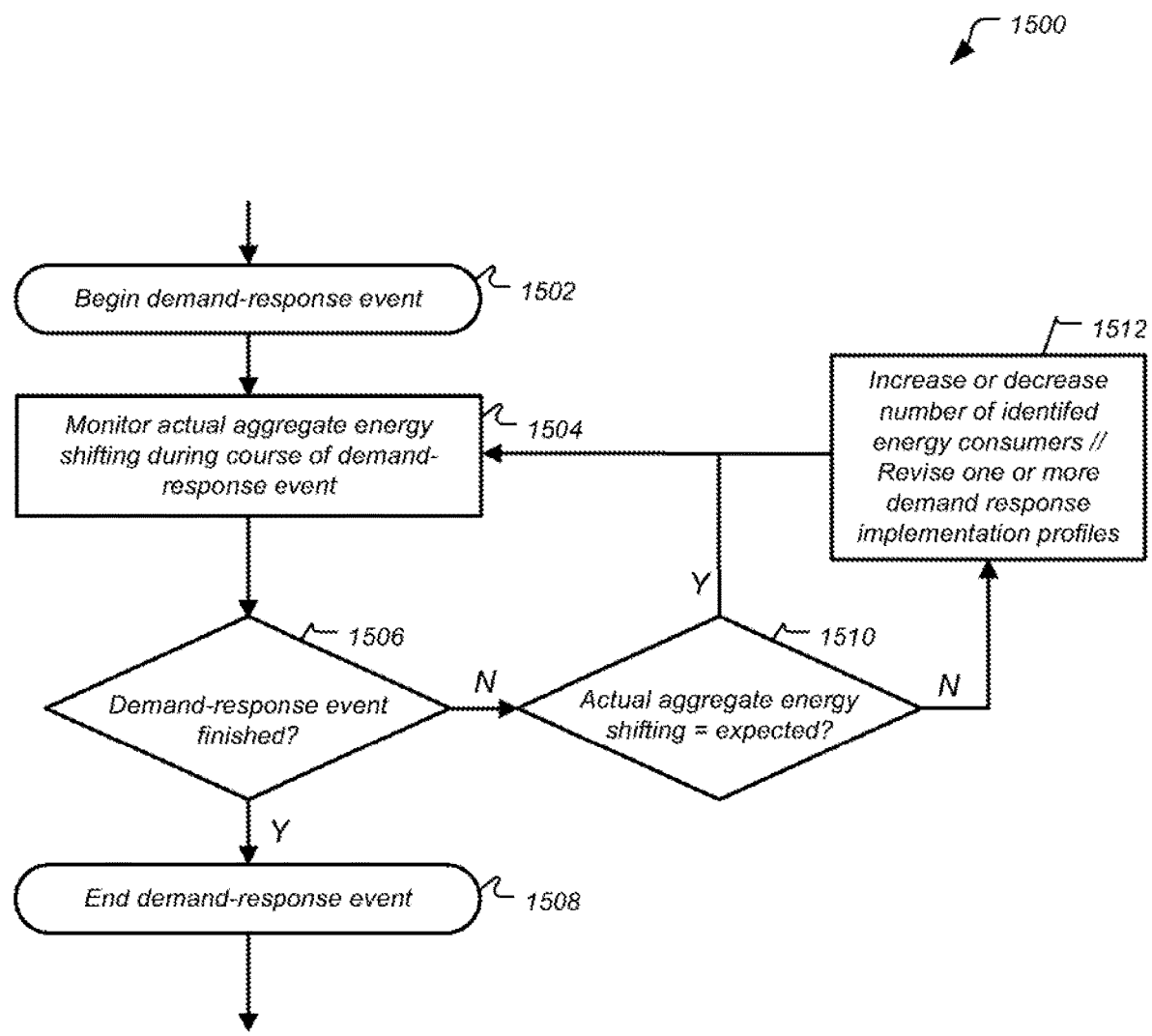
FIG. 15 illustrates a process for managing a DR event based on a monitored aggregate energy shifting in accordance with an embodiment.

Specifically, FIG. 15 illustrates a process 1500 for managing a DR event based on a monitored aggregate energy shifting in accordance with an embodiment. To facilitate further understanding, the process 1500 is described with reference to FIG. 1 and FIG. 2, although it should be understood that embodiments of the process 1500 are not limited to the exemplary systems and apparatus described with reference to FIG. 1 and FIG. 2.

In operation 1502, a DR event begins. This operation is similar to operation 1418, thus further description is omitted.

In operation 1510, the actual aggregate energy shifting during the course of the DR event is monitored. For example, energy management system 130 may determine the actual amount of energy shifting caused by each of the energy consumers participating in the DR event, and aggregate this data to determine the aggregate energy shifting. The actual amount of energy shifting may be determined using a variety of techniques. For example, a current (real-time) amount of energy consumption may be determined. This may be calculated using a number of factors such an HVAC status (on, off, % of capacity being used, etc.), a status of other electronic devices associated with the structure, etc. Additionally or alternatively, this may be determined from a meter that monitors energy consumption such as energy consumption meter 218. A history of the actual amount of energy being consumed may be kept at least for the duration of the DR event so that an aggregate amount of actual energy consumed over the course of the DR event may be determined. Further, the 'baseline' energy consumption for the consumer may be determined as described with reference to operation 708, except in this case the baseline energy consumption is determined only for the portion of the event period that has passed, instead of for the entire event period. The difference between the aggregate actual amount of energy consumed up to a given time and the aggregate amount of energy defined in the baseline results in an indication as to the actual aggregate energy that has been shifted at any particular time during the DR event.

As the aggregate energy shift is being monitored, processing may continue to operation 1506 where it is determined whether the DR event has finished. If so, then processing may continue to operation 1508 where the DR event is ended. Otherwise, processing may continue to operation 1510.

In operation 1510 it is determined whether the actual real-time aggregate amount of energy shifting is approximately equal to that expected. For example, the amount determined in operation 1504 may be compared with the energy shifting expected by this particular time in the DR event. The expected energy shifting may be calculated using techniques similar to those that will be described with reference to operation 2310. However, in contrast to the expected energy shifting calculated in operation 2310, which is for the entire DR event period, the expected energy shifting in this case is only for the portion of the event period that has passed. If it is determined that the actual aggregate energy shifting at a given point in time during the DR event is approximately equal to that expected, then processing may return to operation 1504. If, however, it is determined that the actual aggregate energy shifting at the given point in time is not approximately equal to that expected, then this is indicative of the energy consumer either shifting too much or not enough energy, and thus processing may continue to operation 1512.

In operation 1512 one or more techniques may be implemented to respond to the difference in actual and estimated aggregate shifting for a particular energy consumer. In one embodiment, the number of consumers identified to participate in the DR event may be altered. For example, if the actual aggregate shifting is less than that expected, then the number of energy consumers identified to participate in the DR event may be increased. In such a case, an identification process as described with reference to operation 706 may be carried out, one or more new energy consumers identified, and event notifications immediately sent to those energy consumers. If, on the other hand, the actual aggregate shifting is greater than that expected, then in one embodiment the number of energy consumers identified to participate in the DR event may be decreased. For example, the DR event may be canceled for the energy consumer being monitored. Additionally or alternatively, the DR event may be canceled for other energy consumers participating in the DR event.

In another embodiment, instead of (or in addition to) increasing or decreasing the number of energy consumers participating in the DR event, the DR implementation profiles associated with one or more energy consumers may be modified. For example, if the actual aggregate shifting is less than that expected, then the DR implementation profiles for one or more energy consumers participating in the DR event (including or excluding the energy consumer being monitored) may be modified to more aggressively shift energy. If, on the other hand, the actual aggregate shifting is greater than that expected, then the DR implementation profiles for one or more energy consumers participating in the DR event (including or excluding the energy consumer being monitored) may be modified to shift energy less aggressively.

It should be appreciated that the specific operations illustrated in FIG. 15 provide a particular process for managing a DR event based on a monitored aggregate energy shifting in accordance with an embodiment. The various operations described with reference to FIG. 15 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. Moreover, the individual operations illustrated in FIG. 15 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

As described with reference to operation 1406, a DR event implementation profile may be generated for each energy consumer identified to participate in a DR event. The DR event implementation profile defines a plurality of setpoint temperatures distributed over the DR event period of the DR event. A process for generating such a DR event implementation profile according to some embodiments is further described with reference to FIG. 16.

Figure 16:
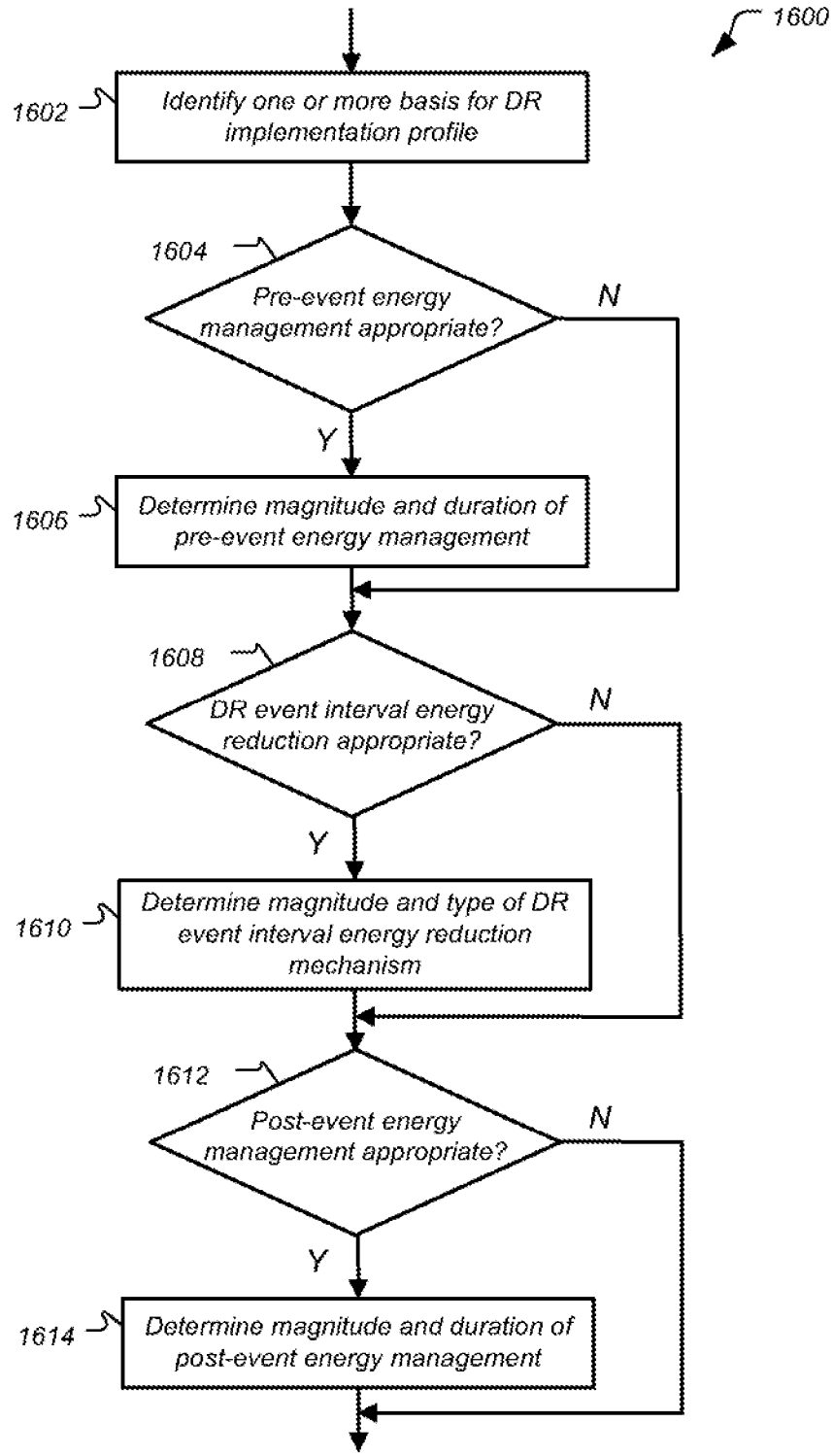
FIG. 16 illustrates a process for generating a demand-response event implementation profile in accordance with an embodiment.

Specifically, FIG. 16 illustrates a process 1600 for generating a demand-response event implementation profile in accordance with an embodiment. To facilitate further understanding, the process 1600 is described with reference to FIG. 1 and FIG. 2, although it should be understood that embodiments of the process 1600 are not limited to the exemplary systems and apparatus described with reference to FIG. 1 and FIG. 2.

In operation 1602 one or more basis for creating the DR event implementation profile are identified. The basis used may be equally weighted, unequally weighted, or used for generating different aspects of the DR event implementation profile as further described herein. The basis may include one or more of the following: the HVAC schedule of the energy consumer (e.g., one or more scheduled setpoints set by the energy consumer, including those set over the course of the DR event period); an occupancy probability profile for the structure associated with the energy consumer; an environmental (e.g., thermal) retention characteristic of the structure; a capacity of the environmental management system (e.g., HVAC) relative to the volume of the structure being environmentally managed; a real-time occupancy of the structure; a DR event profile; an amenability of the energy consumer to load shifting; past behavior of the energy consumer during DR events (e.g., changing the setpoints defined by previous DR implementation profiles for previous DR events); and a weather forecast (e.g., the forecast weather at the structure associated with the energy consumer).

Once one or more of these basis have been identified, processing may continue to operation 1604. In operation 1604 it is determined whether pre-event energy management is appropriate. To gain a further appreciation for pre-event energy management and the DR event implementation profile in general, we turn briefly to FIGS. 17A and 17B.

Figure 17A:
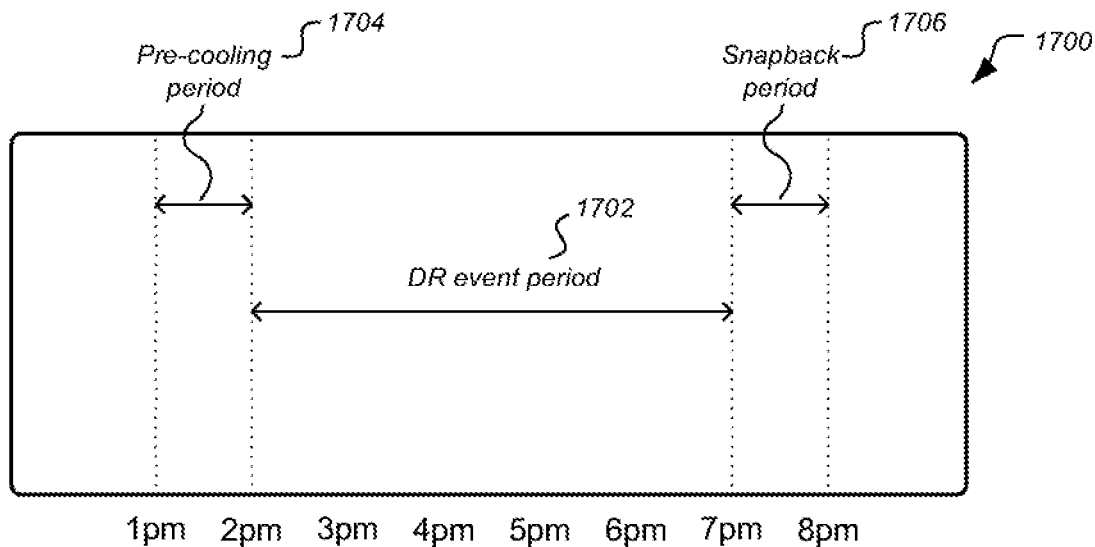
FIG. 17A is an illustration of a DR event and related periods according to an embodiment.

FIG. 17A is an illustration 1700 of a DR event and related periods according to an embodiment. As depicted in the illustration 1700, a DR event period 1702 extends from 2 pm to 7 pm. This DR event period may, e.g., be defined by a utility provider in a DR event profile, and as previously described is a period of desired energy reduction. Shouldering the DR event period 1702 is a pre-event period 1704 (e.g., a pre-cooling period) and a post-event period 1706 (e.g., a snapback period). The pre-cooling period 1704 is illustrated as extending from 1 pm to 2 pm and the post-event period is illustrated as extending from 7 pm to 8 pm. However it should be recognized that pre-cooling periods, DR event periods, and snapback periods may have time frames different than those depicted in FIG. 17A, and may be dynamically calculated per user so that each user has a unique DR implementation profile that is customized to their particular structure, occupancy probability profile, weather forecast, amenability to load shifting, etc.

The pre-event period 1704 in this example is referred to as a pre-cooling period. In situations where a DR event is implemented to respond to hot weather conditions, the pre-event period 1704 is referred to as a pre-cooling period as this is a period during which a structure may be aggressively cooled in preparing for the DR event period. In other situations, however, this may be referred to as a pre-heating period, or pre-humidifying period, pre-dehumidifying period, depending on the goals of the DR event. Most of the examples described herein are in the context of a DR event being disseminated to respond to hot weather conditions, however it should be recognized that embodiments are not so limited.

The snapback period 1706 is a period during which energy consumption may substantially increase (i.e., spike) as a result of one or more energy consumers offsetting energy reductions instigated during the DR event period. For example, by the end of the DR event period, many energy consumers may experience inside temperatures higher than desirable as a result of their energy consumption being managed. Once the DR event period completes, however, they may increase their energy consumption (to reduce their inside temperature to something more comfortable) without penalty, and thus they may increase their energy consumption significantly. In the aggregate, this may result in a new peak in energy demand and, in some cases, pressures on the grid similar to those expected during the DR event period.

Figure 17B:
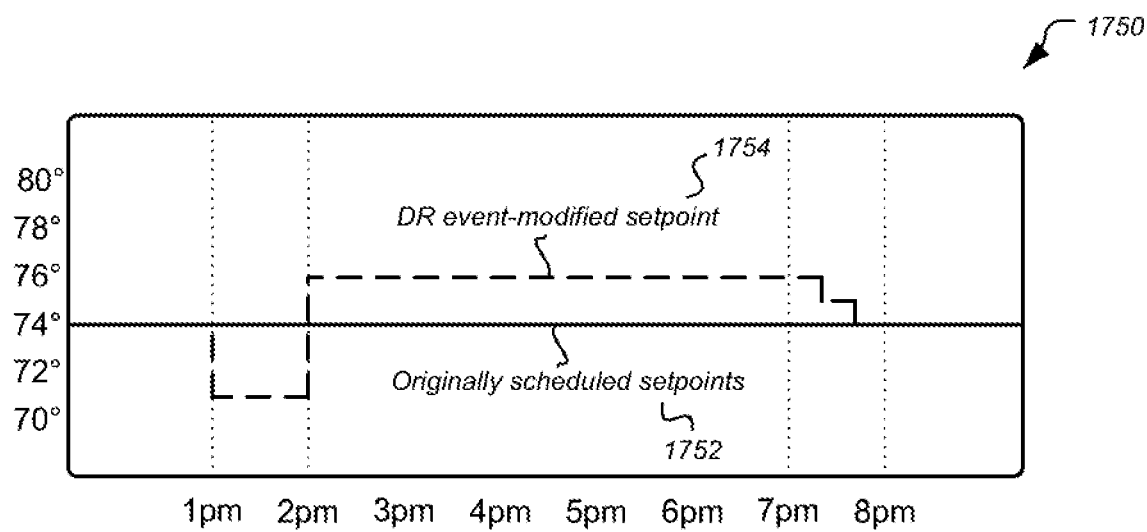
FIG. 17B is an illustration of an energy consumers originally scheduled setpoints as well as DR event-modified overlaying the time periods described with reference to FIG. 17A according to an embodiment.

FIG. 17B is an illustration 1750 of an energy consumers originally scheduled setpoints as well as DR event-modified setpoints (resulting from application of the DR event implementation profile) overlaying the time periods described with reference to FIG. 17A according to an embodiment. Specifically, illustration 1750 shows a set of originally scheduled setpoints 1752 and DR event-modified setpoints 1754. The originally scheduled setpoints 1752 indicate a desired temperature consistently at or around 74° F. The DR event-modified setpoints 1754 illustrate a change to those originally scheduled setpoints 1752 that, in some examples, reduces energy consumption by the energy consumer during the DR event period.

The DR event-modified setpoints 1754 show setpoints identical to the original setpoints up until 1 pm and after 7:30 pm. Between 1 pm and 2 pm, however, i.e., during the pre-cooling period, the DR event-modified setpoints 1754 are set to 71° F. rather than 74° F. In this case, the structure is cooled to an amount less than that originally desired by the energy consumer. From 2 pm to 7:20 pm, however, the DR event-modified setpoints 1754 are set to 76° F. rather than 74° F. In this case, the structure is allowed to heat to an amount greater than that originally desired by the energy consumer. At about 7:20 pm, the DR event-modified setpoints 154 are reduced to 75° F. for about 20 minutes and then returned to 74° F.

As a result of increasing the allowing the internal temperature to rise to 76° F. rather than maintain it at 74° F. for the duration of the DR event, the amount of energy consumed at the structure is likely reduced over the duration of the DR event. Further, by staggering the return to 76° F., a spike in energy consumption at or around 7 pm (the end of the DR event period) may also be reduced. However, it should be recognized that energy consumption on a whole is not necessarily reduced. That is, in contrast to the originally scheduled setpoints, the DR event-modified setpoints result in additional energy consumption during the pre-cooling period. As a result, even though energy consumption during the DR event period 1702 is reduced, this energy consumption is actually shifted to one or more time periods outside of the DR event period (e.g., to the pre-cooling period and/or the snapback period 1706).

Returning now to FIG. 16, in operation 1604 it is determined whether pre-event energy management is appropriate. For example, it may be determined whether it is appropriate to perform any energy management (such a pre-cooling or pre-heating) during the pre-event period 1704. It may be appropriate to perform such energy management if it is determined that such energy management will result in a reduction of energy during the DR event period. One particular example of a process that may be used to determine whether it is appropriate to apply pre-cooling is described with reference to FIG. 19. If it is determined that it is not appropriate to perform such energy management, then processing may continue to operation 1608. If, however, it is determined that such energy management is appropriate, then processing may continue to operation 1606.

In operation 1606 the magnitude and duration of the pre-event energy management is determined. As mentioned, pre-event energy management may include pre-cooling, pre-heating, pre-humidifying, pre-dehumidifying, or other type of energy management. The magnitude of the pre-event energy management (e.g., +2° F., +4° F., etc.) may be determined as well as the duration (e.g., 30 minutes, 60 minutes, 90 minutes, etc.). The magnitude and duration may be determined using one or more of the basis previously described for generating the DR implementation profile.

In operation 1608 it is determined whether DR event interval energy management is appropriate. For example, it may be determined whether it is appropriate to perform any energy management (such as setpoint changes, duty cycling, etc.) during the DR event period 1702. It may be appropriate to perform such energy management if it is determined that such energy management will result in a reduction of energy during the DR event period. In determining whether it is appropriate to perform any DR event interval energy management, a number of different DR event energy reduction mechanisms may be considered. These include a setpoint change mechanism, a duty cycling mechanism, or a combination of the setpoint change and duty cycling mechanisms, as described herein. To gain a further appreciation for the various types of DR event interval energy management, we turn briefly to FIGS. 18A through 18C.

Figure 18A:
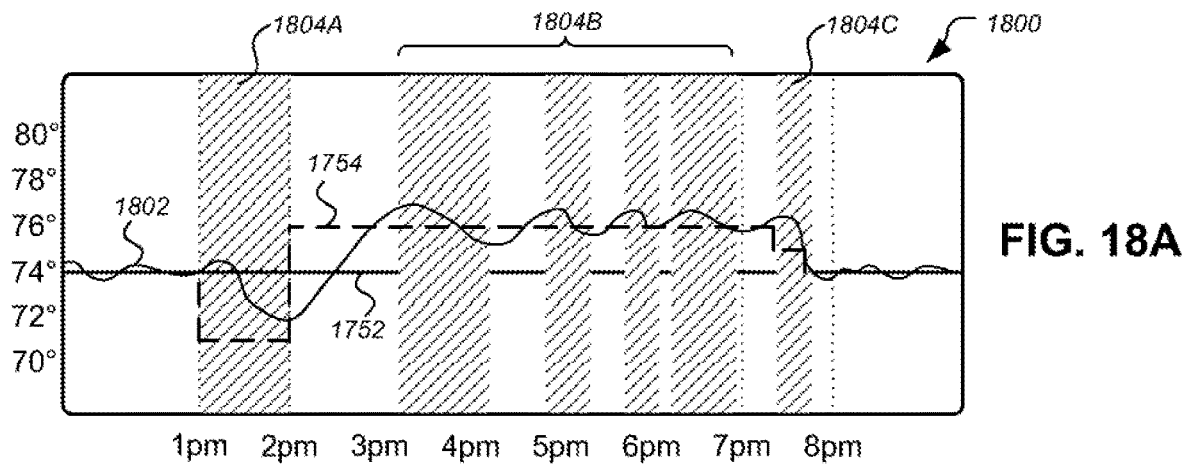
FIG. 18A is an illustration depicting a setpoint change type of DR event interval energy reduction mechanism according to an embodiment.

FIG. 18A is an illustration 1800 depicting a setpoint change type of DR event interval energy reduction mechanism according to an embodiment. Illustration 1800 depicts the originally scheduled setpoints 1752 and DR event-modified setpoints 1754 over the pre-event period, DR event period, and post-event period as previously described with reference to FIGS. 17A and 17B. Further, an internal temperature 1802 of the structure associated with the energy consumer, and HVAC ON periods 1804 that are periods during which a cooling system is actively attempting to cool the structure, are also depicted. In this particular example, the DR event interval energy reduction mechanism is a 'setpoint change' mechanism, in which the cooling system is activated and deactivated during the DR event period as necessary to maintain the internal temperature 1802 as close to the setpoints (e.g., DR event-modified setpoints 1754) as possible (e.g., within a range of ±1° F., ±2° F., etc.).

Specifically, the HVAC is in an ON state 1804A during the pre-cooling period to reduce the internal temperature 1802 prior to the DR event period. During the DR event period, the HVAC enters into and stays in an ON state 1804B for various durations and at various times in an attempt to maintain the internal temperature 1802 at the DR event-modified setpoints 1754. During the post-event period the HVAC is in an ON state 1804C as necessary to maintain the internal temperature 1802 at the DR event-modified setpoints 1754, where the temperature of the DR event-modified setpoints 1754 is reduced in stages to eventually reach the originally scheduled setpoints 1752 and the reductions are offset from the end of the DR event period.

Figure 18B:
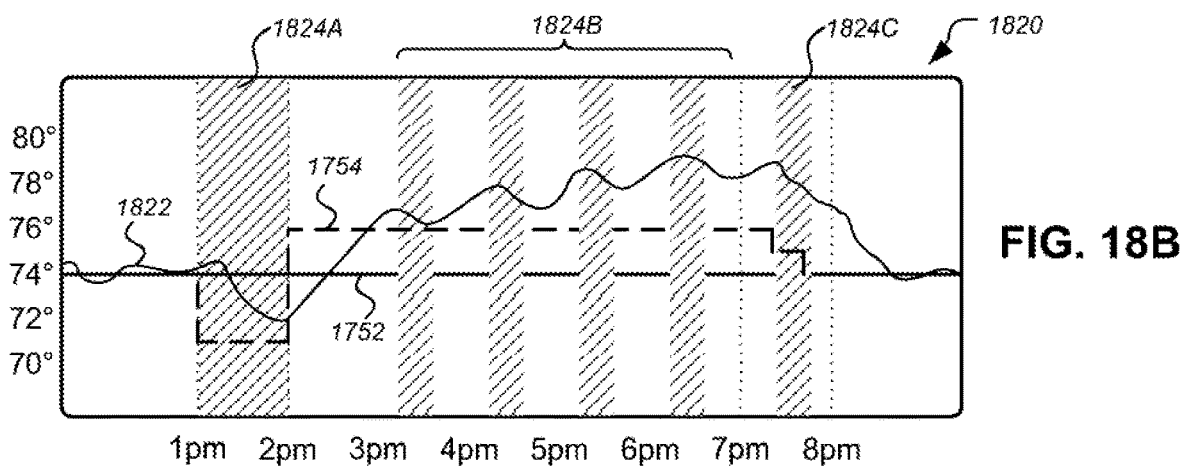
FIG. 18B is an illustration depicting a duty cycling change type of DR event interval energy reduction mechanism according to an embodiment.

FIG. 18B is an illustration 1820 depicting a duty cycling change type of DR event interval energy reduction mechanism according to an embodiment. Illustration 1820 is similar to that described with reference to FIG. 18A, but in this case illustrates HVAC ON states 1824A, 1824B, and 1824C. HVAC ON states 1824A and 1824C are the same as 1804A and 1804C, thus further description is omitted. HVAC ON state 1824B, however, illustrates a 'duty cycling' DR event interval energy reduction mechanism, in which the cooling system is activated for fixed durations over regular intervals. In this particular case, the cooling system is activated for 15 minute durations every 1 hour for the duration of the DR event interval regardless of the magnitude of the internal temperature 1822. It should be recognized that in some embodiments direct load control (i.e., actively controlling the duty cycle of an HVAC) may be controlled by setting setpoint temperatures very high (i.e., higher than typical inside temperatures), to turn the HVAC ON, or very low (i.e., lower than typical inside temperatures), to turn the HVAC OFF. Such setpoint temperatures may or may not be displayed to the user.

Figure 18C:
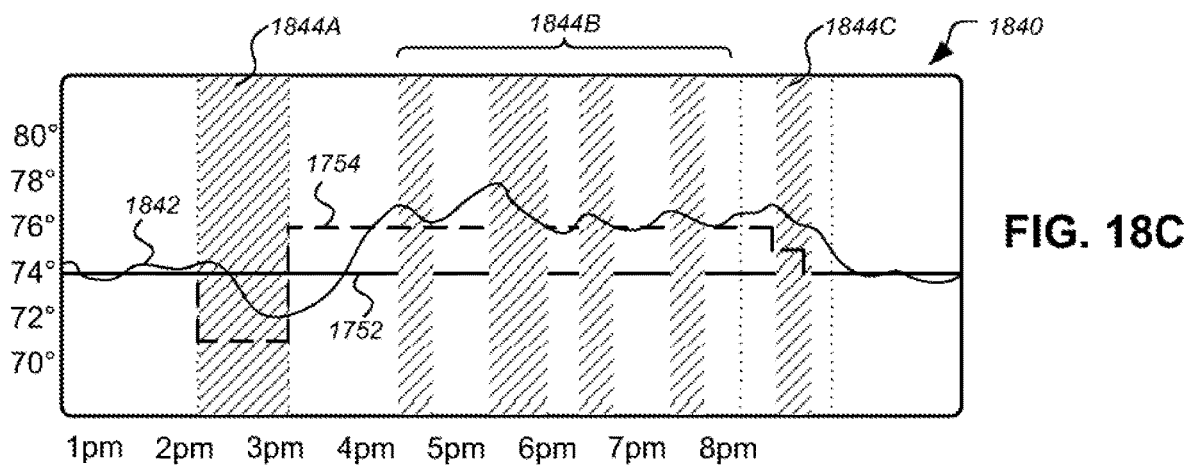
FIG. 18C is an illustration depicting a combination setpoint/duty cycling change type of DR event interval energy reduction mechanism according to an embodiment.

FIG. 18C is an illustration 1840 depicting a combination setpoint/duty cycling change type of DR event interval energy reduction mechanism according to an embodiment. Illustration 1840 is similar to that described with reference to FIG. 18A, but in this case illustrates HVAC ON states 1844A, 1844B, and 1844C. HVAC ON states 1844A and 1844C are the same as 1804A and 1804C, thus further description is omitted. HVAC ON state 1844B, however, illustrates a combination of the aforementioned setpoint and duty cycling type DR event interval energy reduction mechanisms. In this particular combination the cooling system is activated at regular time intervals for minimum durations. For example, the cooling system is activated every hour for at least 10 minutes. If the minimum activation interval (e.g., 10 minutes) is sufficient to reduce the internal temperature 1842 to the temperature defined by the DR event-modified setpoints 1754, then the cooling system will deactivate after the minimum activation interval. If, however, the minimum activation interval (e.g., 10 minutes) is insufficient to reduce the internal temperature 1842 to the temperature defined by the DR event-modified setpoints 1754, then the cooling system may extend its activation interval past the minimum activation interval (e.g., it may extend to 15 or 20 minutes). In some embodiments the cooling system may extend its activation interval until the internal temperature 1842 is reduced to the temperature defined by the DR event-modified setpoints 1754. In other embodiments, the length of the extension may be limited in duration to prevent the cooling system from being constantly activated. In this particular example, the first, third, and fourth cooling system activations are for the minimum activation interval, whereas the second activation is extended.

It should be recognized that embodiments are not limited to the various examples illustrated in and described with reference to FIGS. 18A through 18C. Rather, one skilled in the art would recognize numerous variations in setpoint temperatures, setpoint intervals, setpoint times, DR event period times and intervals, energy management system (e.g., cooling system) activation times and periods, etc. These examples are presented to articulate different types of DR event interval energy reduction mechanisms as further described herein and, while presented in the context of reducing internal temperatures, are similarly applicable to varying other types of environmental conditions within the structure.

Returning to operation 1608 of FIG. 16, it is determined whether DR event interval energy reduction is appropriate. As described, various types of DR event interval energy reduction mechanisms include a setpoint change, duty cycling, or a combination of a setpoint change and duty cycling. Some specific processes that may be used to determine whether any or all of these energy reduction mechanisms are appropriate are described with reference to FIGS. 20 and 21. If it is determined that it is not appropriate to perform such energy management, then processing may continue to operation 1612. If, however, it is determined that such energy management is appropriate, then processing may continue to operation 1610.

In operation 1610 the magnitude and duration of the DR event interval energy management is determined. As mentioned, DR event interval energy management may include setpoint control, duty cycling control, or a combination of setpoint and duty cycling control. The magnitude for each type of energy control mechanism (e.g., difference in DR event-modified setpoints and originally scheduled setpoints, duty cycling periods, maximum extensions to duty cycling periods, etc.) may be determined using one or more of the basis previously described for generating the DR implementation profile, while the duration of the energy reduction mechanism may be defined as the DR event period.

In operation 1612 it is determined whether post-event energy management is appropriate. For example, it may be determined whether it is appropriate to perform any energy management (such a delaying a return to the originally scheduled setpoints, gradually returning to originally scheduled setpoints, etc.) during the post-event period 1706. It may be appropriate to perform such energy management if it is determined that such energy management will result in a reduction of energy during the DR event period and, in some cases, reduce the impact of numerous energy consumers placing high demands on the electric grid as soon as the DR event period 1702 comes to an end. One particular example of a process that may be used to determine whether it is appropriate to apply post-event energy management is described with reference to FIG. 22. If it is determined that it is appropriate to perform such energy management, then processing may continue to operation 1614.

In operation 1614 the magnitude and duration of the post-event energy management is determined. As mentioned, post-event energy management may include one or more of delaying setpoint return, staggering setpoint return, or other type of energy management. The magnitude of the post-event energy management (e.g., size of the stagger and/or delay) may be determined as well as the duration (e.g., 30 minutes, 60 minutes, 90 minutes, etc.). The magnitude and duration may be determined using one or more of the basis previously described for generating the DR implementation profile. It should be recognized that a variety of types of techniques may be used to return the DR event-modified setpoints 1754 to the originally scheduled setpoints 1752 during the post-event period. For example, the magnitude may be reduced incrementally in increments having the same or different sizes, where one or more than one increment may be used. Similarly, the durations at which the setpoint is held at each midpoint may be the same or different from one another. The setpoint return may be linear, exponential, or other curve shape. In at least one embodiment, the time at which the DR event-modified setpoints 1754 return to the originally scheduled setpoints 1752 may be random for some or all of the participating energy consumers such that, as a whole, the post-event aggregate energy consumption is equally distributed over the post-event period.

It should be appreciated that the specific operations illustrated in FIG. 16 provide a particular process for generating a demand-response event implementation profile in accordance with an embodiment. The various operations described with reference to FIG. 16 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. Moreover, the individual operations illustrated in FIG. 16 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

As described with reference to FIG. 16, a specific process for determining whether pre-event energy management (e.g., pre-cooling) is appropriate is described with reference to FIG. 19, a specific process for determining whether a setback-type DR event interval energy reduction is appropriate is described with reference to FIG. 20, a specific process for determining whether a duty-cycling type DR event interval energy reduction is appropriate is described with reference to FIG. 21, and a specific process for determining whether post-event energy management is appropriate is described with reference to FIG. 22. Each of these particular processes is described in turn.

Figure 19:
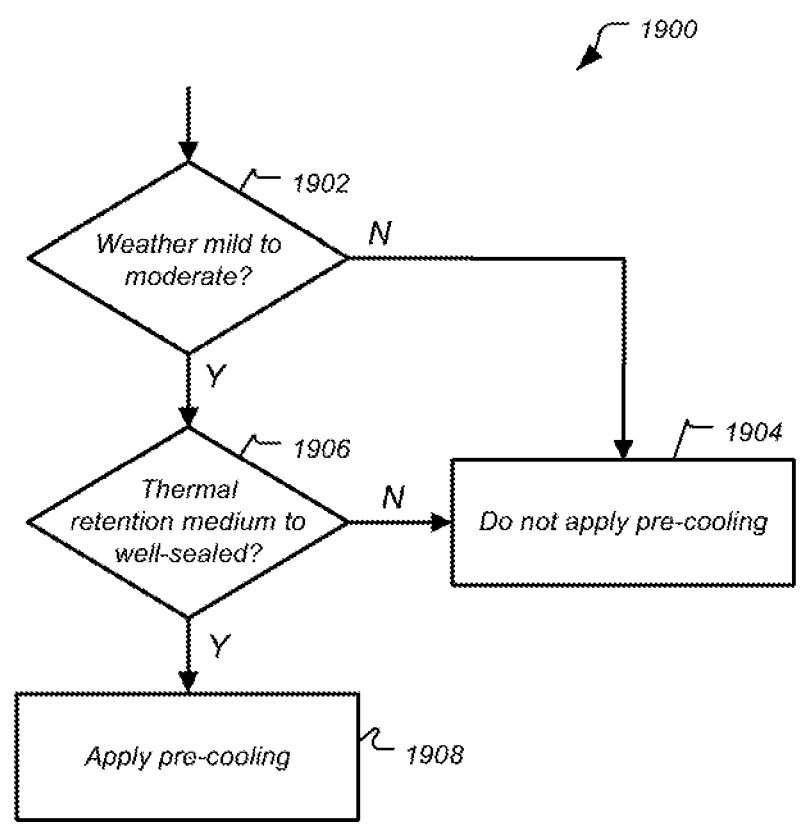
FIG. 19 illustrates a process for determining whether pre-cooling is appropriate according to an embodiment.

Turning to FIG. 19, FIG. 19 illustrates a process 1900 for determining whether pre-cooling is appropriate according to an embodiment. In operation 1902 it is determined whether the temperature outside of the structure is mild to moderate. For example, it may be determined whether the temperature is in a particular range. If the temperature is not within this particular range, then processing may continue to operation 1904 where it is determined not to apply pre-cooling. If the temperature is within this range, however, then processing may continue to operation 1906.

In operation 1906 it is determined whether the structure has a thermal retention characteristic indicating that the structure is moderately sealed to well-sealed. For example, it may be determined whether the retention characteristic of the structure is in a particular range. If the thermal retention characteristic is not within this particular range, then processing may continue to operation 1904 where it is determined not to apply pre-cooling. If the thermal retention characteristic is within this range, however, then processing may continue to operation 1908 where it is determined to apply pre-cooling.

It should be recognized that the process 1900 is a simplified process for determining whether to apply pre-cooling. In many embodiments not one factor is determinative as to whether pre-cooling should be applied or not, but rather a number of factors (such as those discussed with respect to the basis used for the DR event implementation profile) are combined to determine whether pre-cooling (or more generally, pre-event energy management) results in energy shifting. In this particular example it is being illustrated that, in a pre-cooling environment, extremely hot weather or very poor thermal retention characteristics may be strong (in some cases, determinative) indicators that pre-cooling will not be effective at shifting energy from the DR event period to periods outside of the DR event period.

Figure 20:
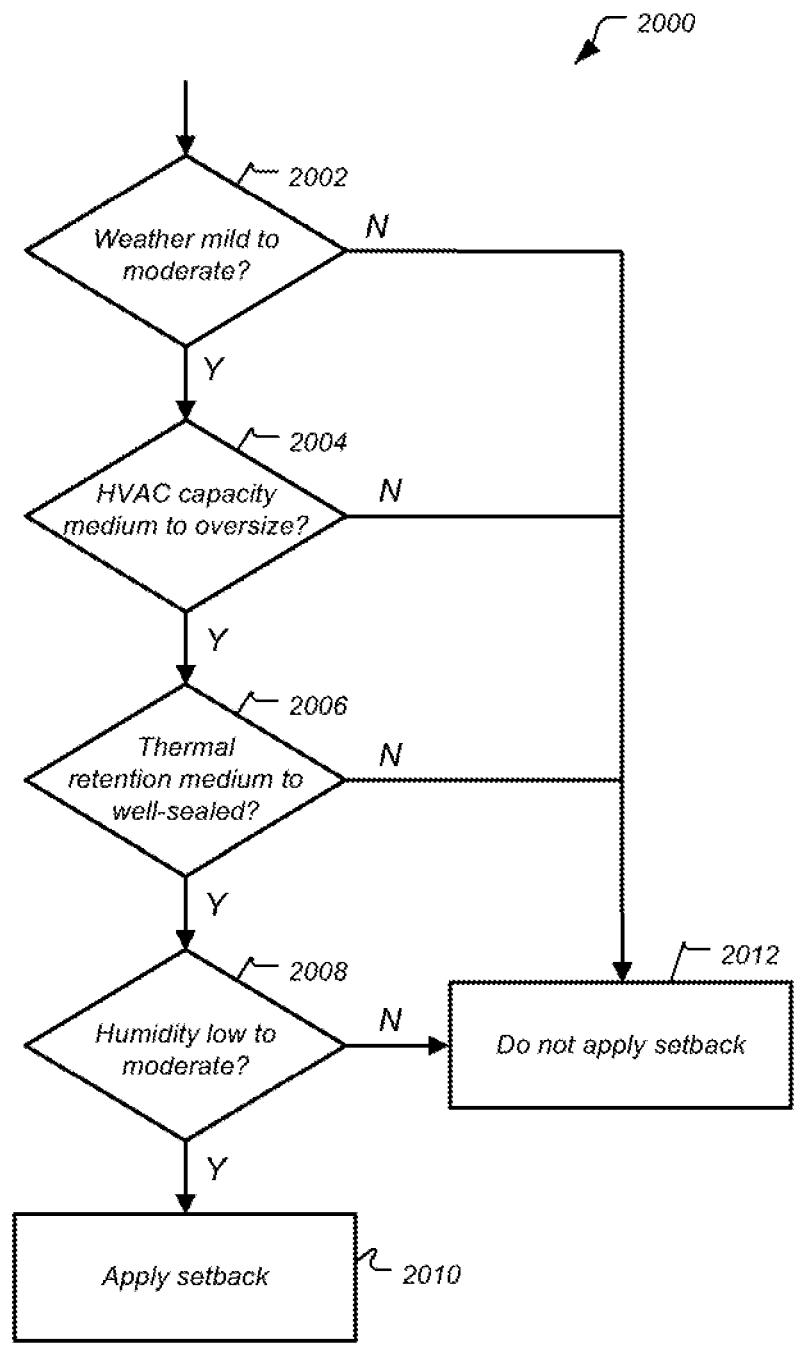
FIG. 20 illustrates a process for determining whether a setback-type DR event interval energy management mechanism is appropriate according to an embodiment.

Turning to FIG. 20, FIG. 20 illustrates a process 2000 for determining whether a setback-type DR event interval energy management mechanism is appropriate according to an embodiment. In operation 2002 it is determined whether the temperature outside of the structure is mild to moderate. For example, it may be determined whether the temperature is in a particular range. If the temperature is not within this particular range, then processing may continue to operation 2012 where it is determined not to use setback-type energy management during the DR event interval. If the temperature is within this range, however, then processing may continue to operation 2004.

In operation 2004 it is determined whether the capacity of the cooling system (e.g., HVAC) relative to the volume to be cooled is medium to oversized. For example, it may be determined whether the capacity of the cooling system is in a particular range. If the capacity of the cooling system is not within this particular range, then processing may continue to operation 2012 where it is determined not to use setback-type energy management during the DR event interval. If the capacity of the cooling system is within this range, however, then processing may continue to operation 2006.

In operation 2006 it is determined whether the structure has a thermal retention characteristic indicating that the structure is moderately sealed to well-sealed. For example, it may be determined whether the structure has a thermal retention characteristic in a particular range. If the thermal retention characteristic is not within this range, then processing may continue to operation 2012 where it is determined not to use setback-type energy management during the DR event interval. If the thermal retention characteristic is within this range, however, then processing may continue to operation 2008.

In operation 2008 it is determined whether the humidity outside of the structure is low to moderate. For example, it may be determined whether the humidity is in a particular range. If the humidity is not within this range, then processing may continue to operation 2012 where it is determined not to use setback-type energy management during the DR event interval. If the humidity is within this range, however, then processing may continue to operation 2010 where it is determined to use setback-type energy management during the DR event interval.

It should be recognized that the process 2000 is a simplified process for determining whether to use setback-type energy management during the DR event interval. In many embodiments not one factor is determinative as to whether setback-type energy management should be applied or not, but rather a number of factors (such as those discussed with respect to the basis used for the DR event implementation profile) are combined to determine whether using setback-type energy management would result in energy shifting. In this particular example it is being illustrated that, during a DR event period, extremely hot weather or humid weather, very low HVAC capacity, or very poor thermal retention characteristics may be strong (in some cases, determinative) indicators that a setback-type energy management mechanism will not be effective at shifting energy from the DR event period to periods outside of the DR event period.

Figure 21:
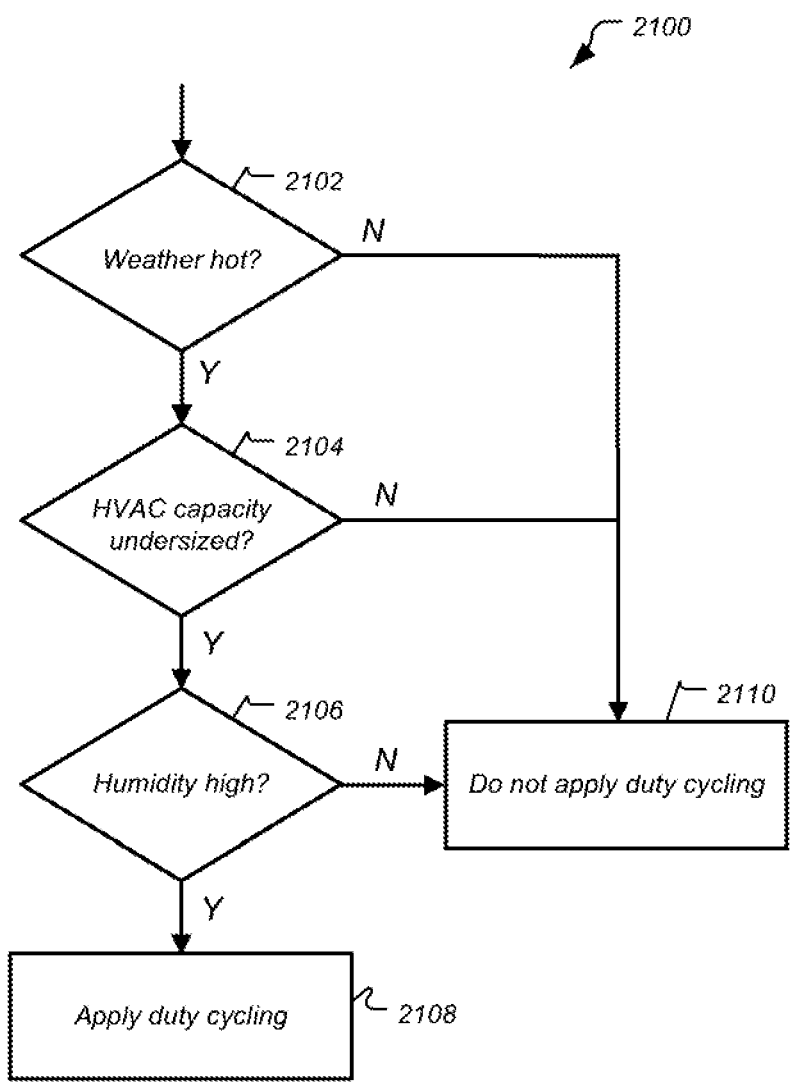
FIG. 21 illustrates a process for determining whether a duty cycling DR event interval energy management mechanism is appropriate according to an embodiment.

Turning to FIG. 21, FIG. 21 illustrates a process 2100 for determining whether a duty cycling DR event interval energy management mechanism is appropriate according to an embodiment. In operation 2102 it is determined whether the temperature outside of the structure is hot. For example, it may be determined whether the temperature exceeds a particular temperature. If it is determined that the temperature is not hot, i.e., does not exceed a particular temperature, then processing may continue to operation 2110 where it is determined not to use a duty cycling energy management mechanism during the DR event interval. If the temperature does exceed the particular temperature, however, then processing may continue to operation 2104.

In operation 2104 it is determined whether the capacity of the cooling system (e.g., HVAC) relative to the volume to be cooled is undersized. For example, it may be determined whether the capacity of the cooling system is less than a particular amount. If the capacity of the cooling system is not less than the particular amount, then processing may continue to operation 2110 where it is determined not to use a duty cycling energy management mechanism during the DR event interval. If the capacity of the cooling system is less than the particular amount, however, then processing may continue to operation 2106.

In operation 2106 it is determined whether the humidity outside of the structure is high. For example, it may be determined whether the humidity exceeds a particular amount. If the humidity does not exceed the particular amount, then processing may continue to operation 2110 where it is determined not to use a duty cycling energy management mechanism during the DR event interval. If the humidity does exceed the particular amount, however, then processing may continue to operation 2108 where it is determined to use a duty cycling energy management mechanism during the DR event interval.

It should be recognized that the process 2100 is a simplified process for determining whether to use a duty cycling energy management mechanism during the DR event interval. In many embodiments not one factor is determinative as to whether a duty cycling energy management mechanism should be applied or not, but rather a number of factors (such as those discussed with respect to the basis used for the DR event implementation profile) are combined to determine whether a duty cycling energy management mechanism would result in energy shifting. In this particular example it is being illustrated that, during a DR event period, extremely hot weather, extremely high humidity, or a very low HVAC capacity may be strong (in some cases, determinative) indicators that a duty cycling energy management mechanism will be effective at shifting energy from the DR event period to periods outside of the DR event period.

Figure 22:
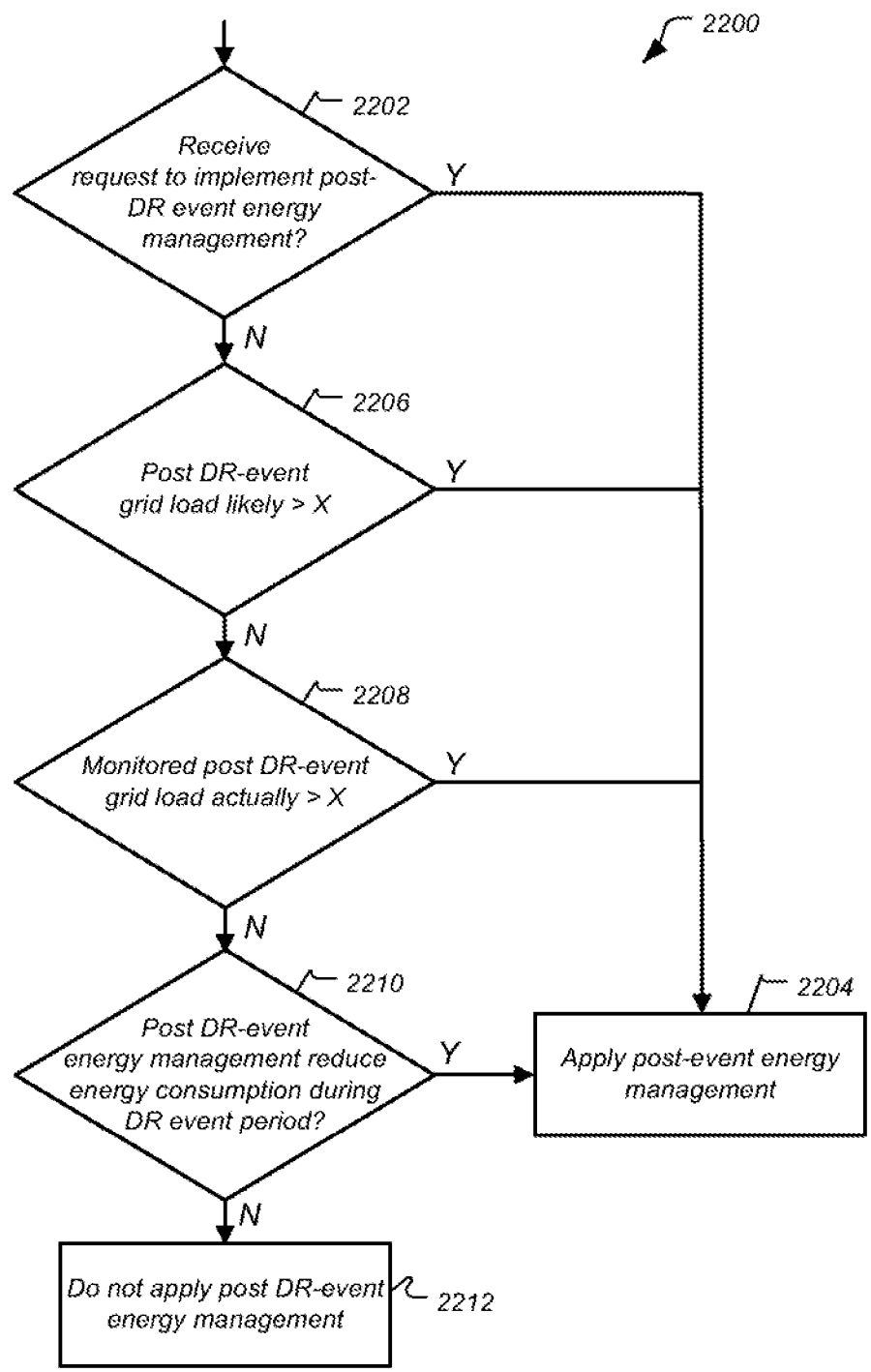
FIG. 22 illustrates a process for determining whether post-event energy management is appropriate according to an embodiment.

Turning to FIG. 22, FIG. 22 illustrates a process 2200 for determining whether post-event (i.e., snapback) energy management is appropriate according to an embodiment. In operation 2202 it is determined a request to implement post-DR event energy management is received. For example, in some cases an entity (such as utility provider computing system 120) may communicate a request to the energy management 130 to perform post-DR event energy management. If such a request is received, then processing may continue to operation 2204 where post-event energy management is applied. Otherwise, processing may continue to operation 2206.

In operation 2206 it is determined whether a post DR-event grid load is likely to exceed a particular threshold. For example, it may be determined whether the aggregate energy consumption of residences 150A-150N may exceed a particular threshold, and/or it may be determined whether an aggregate load on power distribution network 160 exceeds a threshold. The expected load may be calculated prior to the end of the DR event period, and may be calculated using one or more of a variety of information that energy management system 130 has at its disposal, such as the scheduled setpoints for residences 150A-150N, the thermal retention characteristics for those residences, the HVAC capacities of those residences, the occupancy probability profiles for those residences, expected weather forecast, etc. The threshold may be set by utility provider computing system 120 or some other suitable entity. If it is determined that the aggregate post-DR event grid load is likely to exceed the threshold, then processing may continue to operation 2204 where post-event energy management is applied. Otherwise, processing may continue to operation 2208.

In operation 2208 it is determined whether the monitored (i.e., actual) post DR-event grid load actually exceeds the threshold. For example, after the DR event is complete, the load on the power distribution network 160 and/or the actual real-time energy consumption of residences 150A-150N may be monitored. If it is determined that the monitored energy consumption exceeds the threshold, then processing may continue to operation 2204 where post-event energy management is applied. Otherwise, processing may continue to operation 2210.

In operation 2210 it is determined whether post DR-event energy management is likely to reduce energy consumption during the DR event period. For example, the estimated post-DR event energy consumption may be compared to a baseline post-DR event energy consumption. If the estimated energy consumption is likely to be greater than the baseline post-DR event energy consumption, then processing may continue to operation 2204 where post-event energy management is applied. Otherwise, processing may continue to operation 2212 where post DR-event energy management is not applied.

It should be recognized that the process 2200 is a simplified process for determining whether to perform post DR-event energy management. In many embodiments not one factor is determinative as to whether post DR-event energy management should be applied or not, but rather a number of factors are combined to determine whether post DR-event energy management would assist in energy shifting. It should further be recognized that a process similar that described with reference to FIG. 22 may alternatively or additionally be applied to determining whether to apply pre DR-event energy management (e.g., pre-cooling). In such a case, the operations may be modified to refer to a "pre DR-event" rather than a "post DR-event". For example, operation 2202 may be modified to receiving a request to implement pre-DR event energy management. Operation 2206 may be modified to determine whether a pre DR-event grid load is likely greater than a predetermined amount. One skilled in the art would recognize how to similarly apply such changes to the remainder of the operations described with reference to FIG. 22.

As described in various places, e.g., with respect to operation 1408 of FIG. 14, one or more metrics indicative of an amount of energy likely to be shifted as a result of an enrolled energy consumer participating in a DR event may be calculated. At the time of performing such a calculation, in many embodiments a DR event has already been defined, as has a DR event implementation profile for the energy consumer. Further, as the DR event is likely to occur soon (e.g., within a matter of days) after calculating the one or more metrics indicative of an amount of energy likely to be shifted, the originally scheduled setpoints for the DR event (or very accurate estimates thereof) may also be acquired. These, in combination with the ability of the structure associated with the energy consumer and, in some cases, the likely cost of energy over the DR event, can be used to determine the one or more metrics indicative of the amount of energy likely to be shifted. One particular process for calculating such metrics is described with reference to FIG. 23.

Figure 23:
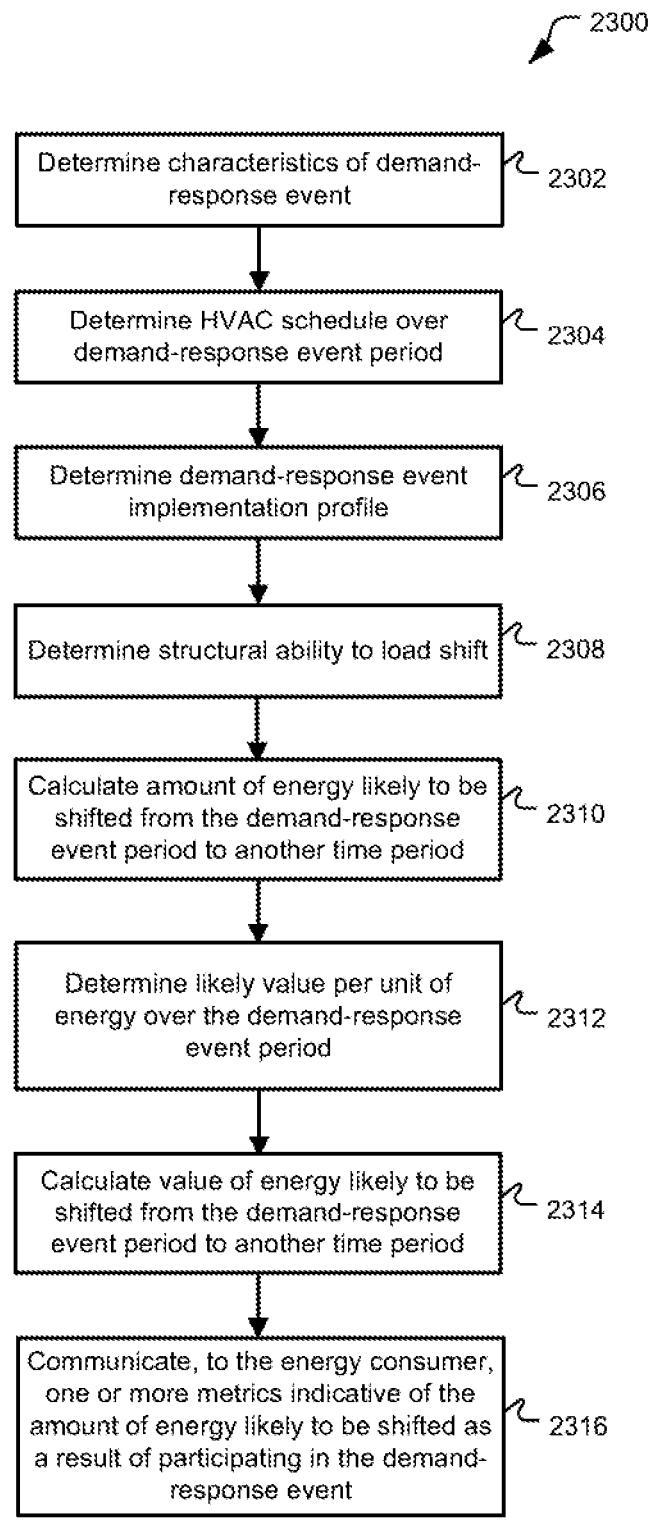
FIG. 23 illustrates a process for generating one or more metrics indicative of an amount of energy likely be shifted by an enrolled energy consumer if the energy consumer participates in a demand-response event according to an embodiment.

Specifically, FIG. 23 illustrates a process 2300 for generating one or more metrics indicative of an amount of energy likely be shifted by an enrolled energy consumer if the energy consumer participates in a demand-response event according to an embodiment. To facilitate understanding, the process 1000 is described with reference to FIG. 1 and FIG. 2, although it should be understood that embodiments of the process 1000 are not limited to the exemplary systems and apparatus described with reference to FIG. 1 and FIG. 2.

In operation 2302 the characteristics of the DR event are determined. As previously described, a DR event is defined by a DR event profile that includes information such as the DR event period, DR event magnitude, geographical scope of the DR event, etc. Accordingly, such characteristic information may be received by the utility provider computing system 120, generated by the energy management system 130, or received or generated in part or in whole by another suitable entity.

In operation 2304, the HVAC schedule of the energy consumer over the DR event period is determined. In determining the HVAC schedule of the energy consumer, the HVAC schedule set by the energy consumer may be acquired. For example, energy management system 130 may receive the HVAC schedule from one or more of the thermostat 202 and access device 266. In some cases, the HVAC schedule may not be explicitly set by the energy consumer, but rather may be learned by the thermostat 202 and/or other electronic devices associated with the energy consumer. In such a case, the learned and/or manually set setpoints may be acquired.

Once the HVAC schedule is determined, processing may continue to operation 2306 where the DR implementation profile for the DR event is determined. The DR implementation profile indicates the setpoints to be implemented for the energy consumer during a DR event instead of their scheduled setpoints. In determining the DR implementation profile, a number of factors may be taken into consideration. These factors may include, for example, the HVAC schedule determined in operation 2302, the occupancy probability profile, the thermal retention characteristic of the structure associated with the energy consumer, the HVAC capacity of the structure associated with the energy consumer, the DR event profile, any indication as to the energy consumer's amenability to load shifting, past DR event behavior, weather forecast, etc. Some particular methods for generating a DR implementation profile are described with reference to FIG. 16 through FIG. 22.

In operation 2308 the ability of the structure associated with the energy consumer to load shift, for example one of residences 150A-150N, is determined. The ability of a structure to load shift may be calculated based on a number of factors, such as the capacity of an environmental management system of the structure relative to a volume of the structure to be environmentally managed. The environmental management system may be, e.g., an HVAC, a cooling system, a heating system, a humidifier, etc. The ability to load shift may also or alternatively be based on the environmental retention characteristics of the structure. Environmental retention characteristics refer to a structures ability to retain heat, retain cold, retain humidity, retain dryness, etc. Various techniques for determining the environmental retention characteristics of a structure may be used. Some particular techniques are described in U.S. patent application Ser. Nos. 12/881,463 and 13/632,152, supra. Further, it should be recognized that while thermal retention is described in numerous places herein, embodiments are not so limited. Rather, other types of environmental retention may be considered and/or used depending on the particular environmental conditions at the structure and type of energy management being performed during a DR event.

In operation 2310, the amount of energy likely to be shifted from the DR event period to another time period is calculated. Such a calculation may use some or all of the aforementioned factors, such as the HVAC schedule, the DR implementation profile, and the ability of the structure to load shift. In one particular embodiment, a 'baseline' energy consumption for the DR event may first be determined using the HVAC schedule for the DR event and the structures ability to load shift. The likely energy consumption as a result of participating in the DR event may then be determined using the DR implementation profile and the structures ability to load shift. The difference of these values may then be taken as the amount of energy likely to be shifted from the DR event period to another time period.

In operation 2312, the likely value per unit of energy over the DR event period may be determined. The likely value per unit may be, for example, an expected cost per unit of energy. In the context of electrical energy, this may be a cost per kWh or other suitable unit. The expected cost per unit of energy may be determined using one or more of a variety of sources, such as contracted energy costs (i.e., a cost of energy as defined by the DR program), historical energy costs (i.e., energy costs from prior similar DR events, energy costs during prior similar weather patterns as expected for the DR event, etc.

In operation 2314 the value of energy likely to be shifted from the DR event period to another time period is determined. This value of energy may be determined by multiplying the likely value per unit of energy determined in operation 2312 with the amount of energy likely to be shifted calculated in operation 2310. In one particular embodiment, the value of energy likely be shifted represents only the energy reduction that is likely to occur during the DR event period. In other embodiments, however, the value of energy likely be shifted may also incorporate increased energy consumption outside of the DR event period.

In operation 2316, one or more metrics indicative of the amount of energy likely to be shifted as a result of participating in the DR event are communicated to the energy consumer. The metrics may include the amount of energy likely to be shifted as described with reference to operation 2310. The metrics may also or alternatively include the value of energy likely to be shifted (e.g., as described with respect to operation 2314). In one particular embodiment, energy management system 130 may communicate the one or more metrics to one or more electronic devices of residences 150A-150N associated with the identified energy consumer, including one or more of an intelligent, multi-sensing, network-connected thermostat 202 and an access device 266 associated with the identified energy consumer.

It should be appreciated that the specific operations illustrated in FIG. 23 provide a particular process for generating one or more metrics indicative of an amount of energy likely be shifted by an enrolled energy consumer if the energy consumer participates in a demand-response event according to an embodiment. The various operations described with reference to FIG. 23 may be implemented at and performed by one or more of a variety of electronic devices or components described herein. For example, they may be implemented at and performed by the energy management system 130, one or more residences 150A-150N, the utility provider computing system 120, etc. Other sequences of operations may also be performed according to alternative embodiments. For example, alternative embodiments of the present invention may perform the operations outlined above in a different order. Moreover, the individual operations illustrated in FIG. 23 may include multiple sub-operations that may be performed in various sequences as appropriate to the individual operations. Furthermore, additional operations may be added or existing operations removed depending on the particular applications. For example, where only energy estimates (i.e., no value estimates) are needed, operations 2312 and 2314 may be omitted. One of ordinary skill in the art would recognize and appreciate many variations, modifications, and alternatives.

As described with reference to operation 1402, each identified energy consumer that is enrolled in a DR program may be notified of an upcoming DR event. The notification generally includes information regarding the DR event profile, such as when the DR event is to occur, how long the DR event will last, etc. Further, as described with reference to operation 1410, one or more metrics indicative of the amount of energy likely be shifted as a result of that particular energy consumer participating in the upcoming DR event may also be communicated to the energy consumer. While such information may be communicated to the energy consumer in a variety of ways, one particular technique for doing so is described with reference to FIGS. 24A through 24C.

Figure 24A:
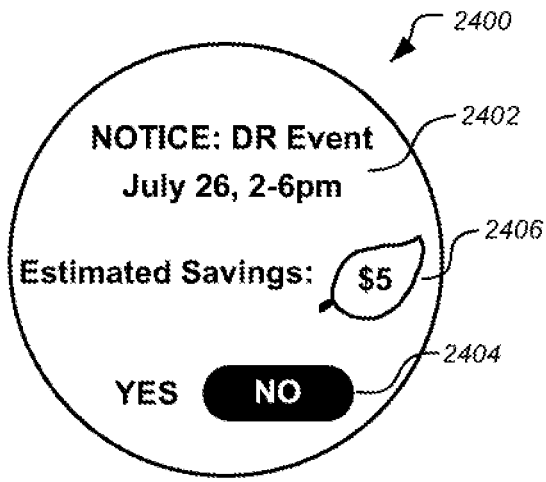
FIGS. 24A through 24C illustrate a simplified graphical user interface for presenting a DR event notification to an energy consumer according to an embodiment.
Figure 24B:
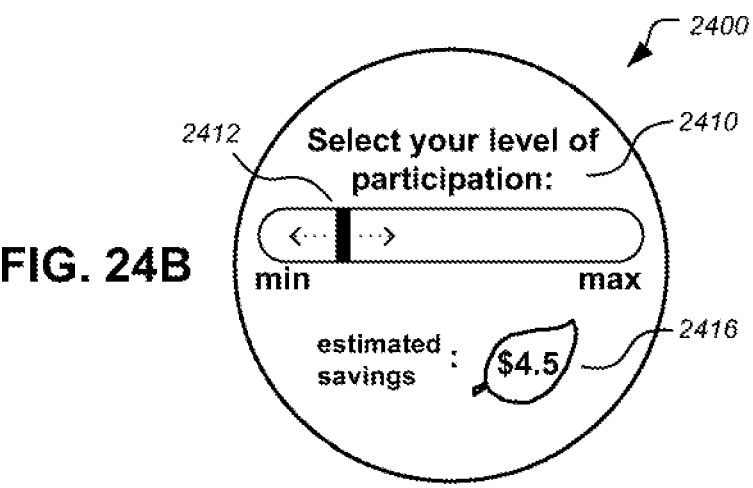
Figure 24C:
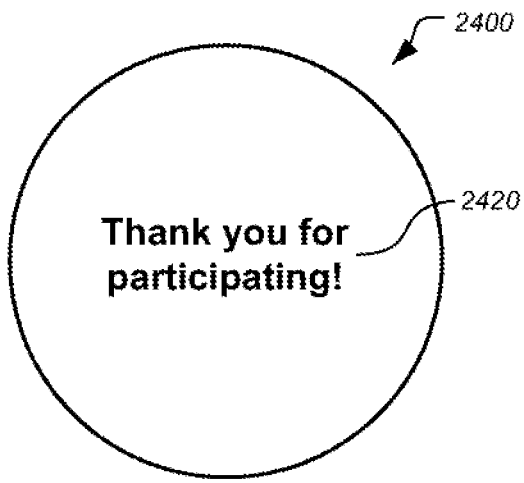

FIGS. 24A through 24C illustrate a simplified graphical user interface for presenting a DR event notification to an energy consumer according to an embodiment. While the graphical user interface (GUI) is presented in the form of an interface that may be displayed on a circular-shaped device such as the device 300 discussed with reference to FIGS. 3A through 3C, embodiments are not so limited as similar GUI's could be presented on other devices of other shapes.

Turning to the figures, FIG. 24A illustrates an input/output (I/O) element 2400 which may be, e.g., user interface 304 (FIG. 3A), output device 606 and/or input device 608 (FIG. 6), or other suitable I/O element 2400 of an electronic device associated with an identified energy consumer which is participating in the DR program. The I/O element 2400 includes a notification message 2402 displaying information regarding the upcoming DR event, such as the date and time of the event. The I/O element 2400 also includes a selectable input mechanism 2404 whereby the user can either accept or reject the offer. In one specific example, ring 320 could be rotated and/or depressed to either accept or reject the offer. In this particular example, the I/O element 2400 simultaneously displays an energy savings estimate 2406 which is one or more metrics indicative of the amount of energy likely to be shifted as a result of that particular energy consumer participating the DR event. The estimated savings in this particular example is illustrated as a dollar savings, but in other examples may also or alternatively be illustrated as a magnitude of energy savings (e.g., kWh), AC run time, percentages, etc. AC run time, in some embodiments, may be a good metric where information regarding pricing or HVAC capacity is unknown. The estimated savings may be calculated based on a default or expected level of participation, such as a level of participation input by the energy consumer at the time of enrolling.

FIG. 24B illustrates the I/O element 2400 in the event the user accepts the offer to participate in the DR event. The I/O element 2400 includes a participation level request message 2410 displaying a request for the identified energy consumer to select their desired level of participation in the DR event. This may range from a minimum level of participation to a maximum level of participation in the event. The I/O element 2400 may include a controllable slider 2412 that enables the identified energy consumer to select any level of participation on a gradient ranging from minimum to maximum participation. In one specific example, ring 320 could be rotated and/or depressed to select the level of participation. The I/O element 2400 may also include an estimated savings 2416 the identified energy consumer may realize if they participate at the level of participation indicated by the slider 2416. The estimated savings in this particular example is illustrated as a dollar savings, but in other examples may also or alternatively be illustrated as a magnitude of energy savings (e.g., kWh). The estimated savings may also be recalculated and re-displayed in real-time in response to the energy consumer changing their level of participation.

FIG. 24C illustrates the I/O element 2400 in the event the identified energy consumer accepts the offer to participate in the DR event and, in some embodiments, in the event the identified energy consumer selects their desired level of participation. The I/O element 2400 includes a thank you message 2420 thanking the identified energy consumer for participating the DR event.

It should be appreciated that the specific I/O elements illustrated in FIGS. 24A through 24C describe particular I/O elements according to certain embodiments. The I/O elements described with reference to FIGS. 24A through 24C may be implemented at and performed by one or more of a variety of electronic devices associated with the identified energy consumer. For example, they may be implemented at and performed by one or more of the a thermostat 202, hazard detection unit 204, entryway interface device 206, wall light switch 208, wall plug interface 210, appliance 212, access device 266, or other electronic device associated with the identified energy consumer. The various messages and input elements may not necessarily be displayed at different times, but rather some messages could be presented simultaneously on the same display. Some messages could be communicated using other communication mechanisms, and responses could similarly be received using other communication mechanisms. For example, audible, touch, or other input/output mechanisms could be used. Further, it should be recognized that additional or alternative information could be presented to request participation in a DR event, and all of the information illustrated in FIGS. 24A through 24C need not be presented. For example, an option to participate or refuse participation in a DR event may not be presented, and/or a level of participation may not be set by the user in some embodiments. One of ordinary skill in the art would recognize and appreciate many variations, modifications, and alternatives.

As described with reference to operation 1420 of FIG. 14, an energy consumer may alter one or more basis used for creating a DR event implementation profile. For example, the energy consumer may change the setpoints defined by the DR event implementation profile to shift energy either more aggressively or less aggressively. In some embodiments, the energy consumer may make such changes to the scheduled setpoints using a scheduler provided on one or more electronic devices (e.g., access device 266) associated with the energy consumer. Such changes may be done either before or during the DR event period. One particular scheduler interface for facilitating such changes is described with reference to FIGS. 25A through 25F.

FIGS. 25A through 25F illustrate a simplified graphical user interface of a schedule of setpoints associated with an energy consumer that has agreed to participate in a DR event according to an embodiment. Various techniques for modifying scheduled setpoint temperatures for a thermostat are described in commonly assigned U.S. patent application Ser. No. 13/624,875 (client reference number NES0245), filed Sep. 21, 2012, the contents of which are incorporated herein in their entirety for all purposes. While the graphical user interface (GUI) is presented in the form of an interface that may be displayed on a rectangular-shaped device, embodiments are not so limited as similar GUI's could be presented in other forms.

Figure 25A:
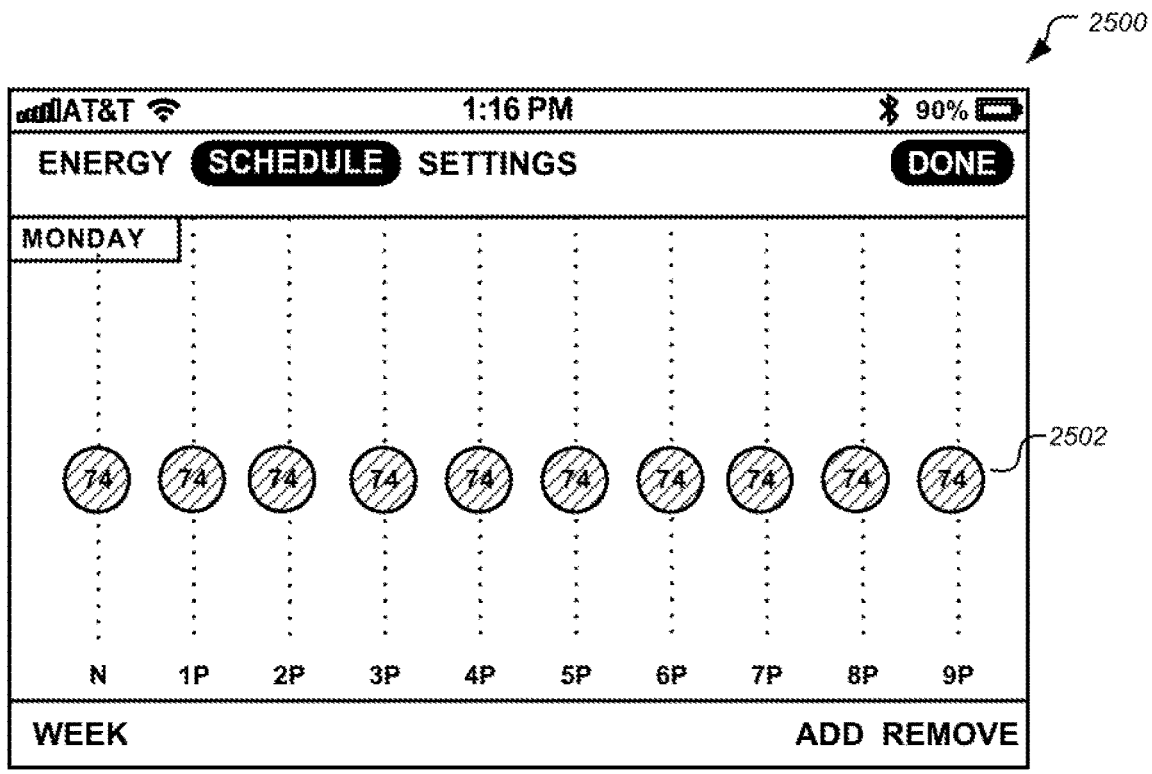
FIGS. 25A through 25F illustrate a simplified graphical user interface of a schedule of setpoints associated with an energy consumer that has agreed to participate in a DR event according to an embodiment.

Turning to the figures, FIG. 25A illustrates an input/output (I/O) element 2500 including a number of originally scheduled setpoints 2502 according to an embodiment. The originally scheduled setpoints 2502 in this example are defined at hourly intervals from noon until 9 pm and indicate a setpoint (i.e., desired) temperature of 74° F. throughout the entire time period.

Figure 25B:
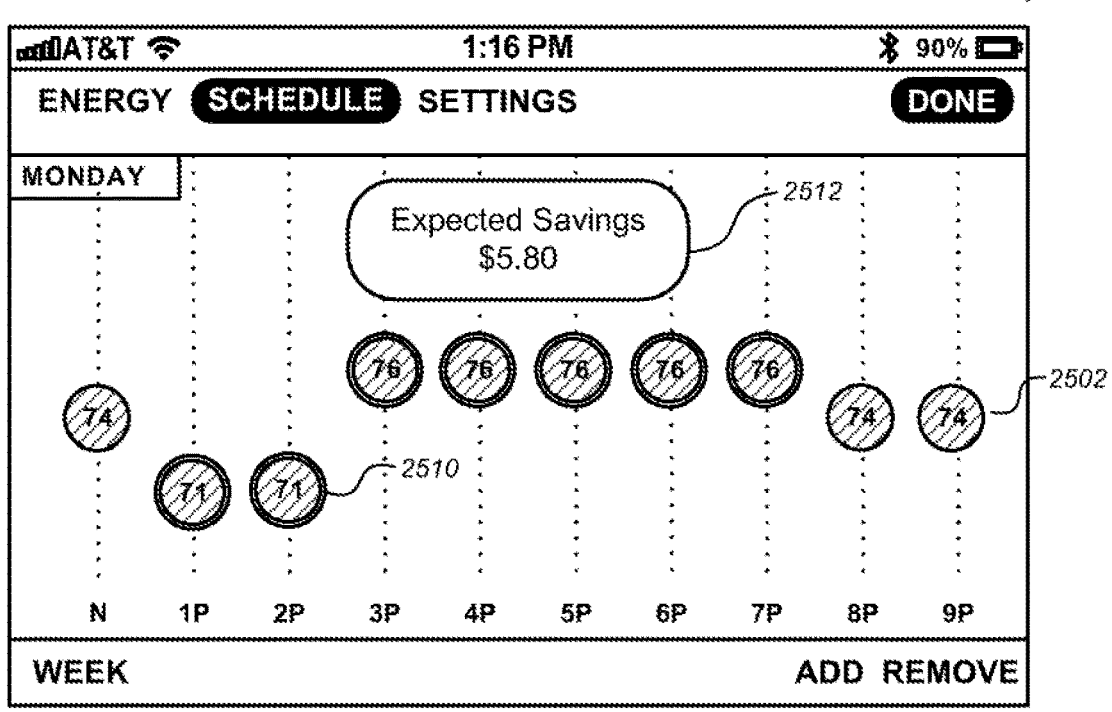

FIG. 25B illustrates the I/O element 2500 including a number of DR event-modified setpoints 2510 prior to beginning the DR event. The DR event-modified setpoints 2510 are new setpoints defined by the DR event implementation profile that replace the originally scheduled setpoints. In this particular example, the DR-event modified setpoints 2510 are identified by an additional graphical ring around each setpoint, although in other embodiments such setpoints could be identified using other techniques, such as using a color different than the originally scheduled setpoints, using a different font for the numbers or text, etc. It may be recognized that while the DR-event modified setpoints 2510 span over the DR event period (e.g., from 2 pm-7 pm), they may also span over other time periods (e.g., a pre-cooling period from 1 pm-2 pm). In cases where a DR event-modified setpoint 2510 is not defined, the originally scheduled setpoints 2502 may remain. In this particular example, a savings estimate 2512 is also displayed indicating to the energy consumer an estimate of the value of the energy shifting likely to occur if the DR event implementation profile is followed.

Figure 25C:
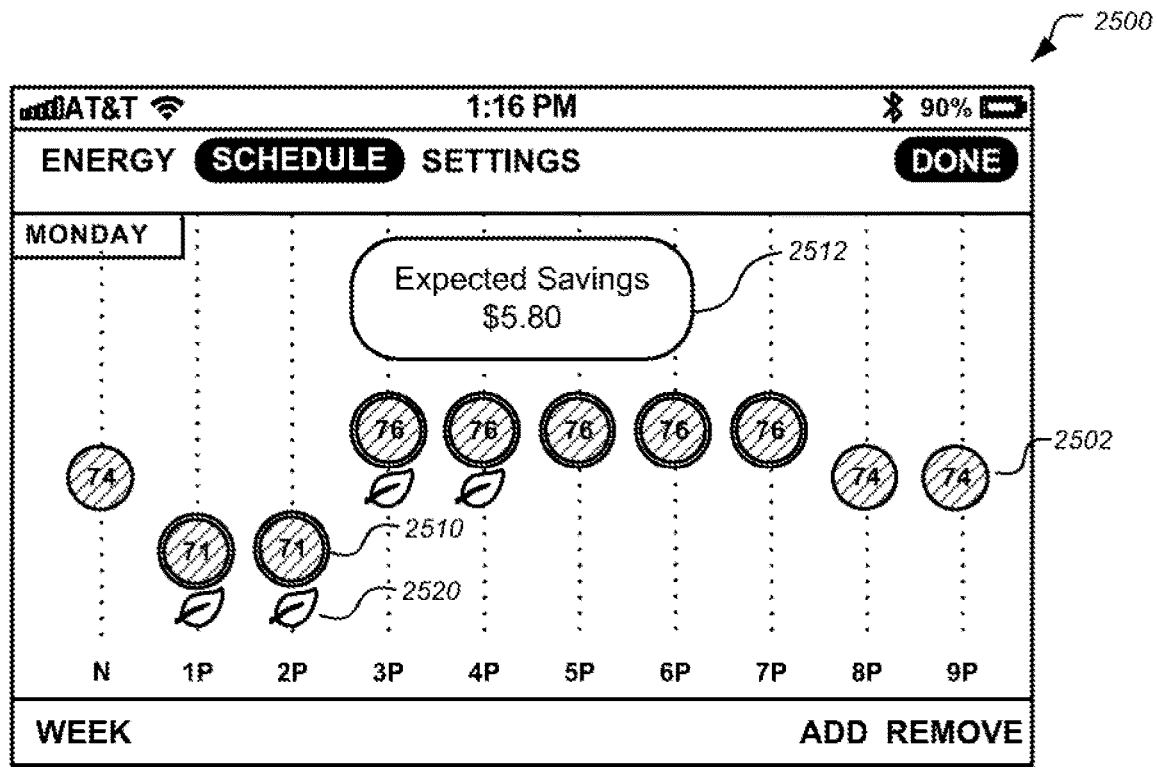

FIG. 25C illustrates the I/O element 2500 including a number of DR event-modified setpoints 2510 partway through the DR event. In this particular example, the energy consumer may be notified as to how far along the DR event they have progressed, and whether each setpoint achieved the expected energy shifting. In the case that a time period associated with a particular setpoint has passed, and the setpoint was not altered to reduce the expected energy savings, a successful implementation indicator 2520 may be displayed. In this particular example, the successful implementation indicator 2520 is graphically illustrated as a leaf, although other shapes, objects, or graphical indications may be used and may have one or more of a variety of colors, such as a gold colored gear. The successful implementation indicator 2520, in some embodiments, may indicate that the thermostat is successfully following or applying the DR implementation profile (i.e., no user setpoint changes to the DR implementation profile). As mentioned, the successful implementation indicator 2520 may be displayed if the setpoint was not altered to reduce the expected energy savings. For example, if the energy consumer did not alter the setpoint, then the indicator 2520 may be displayed. In this particular embodiment, the energy consumer has successfully progressed through four DR event-modified setpoints 2510.

Figure 25D:
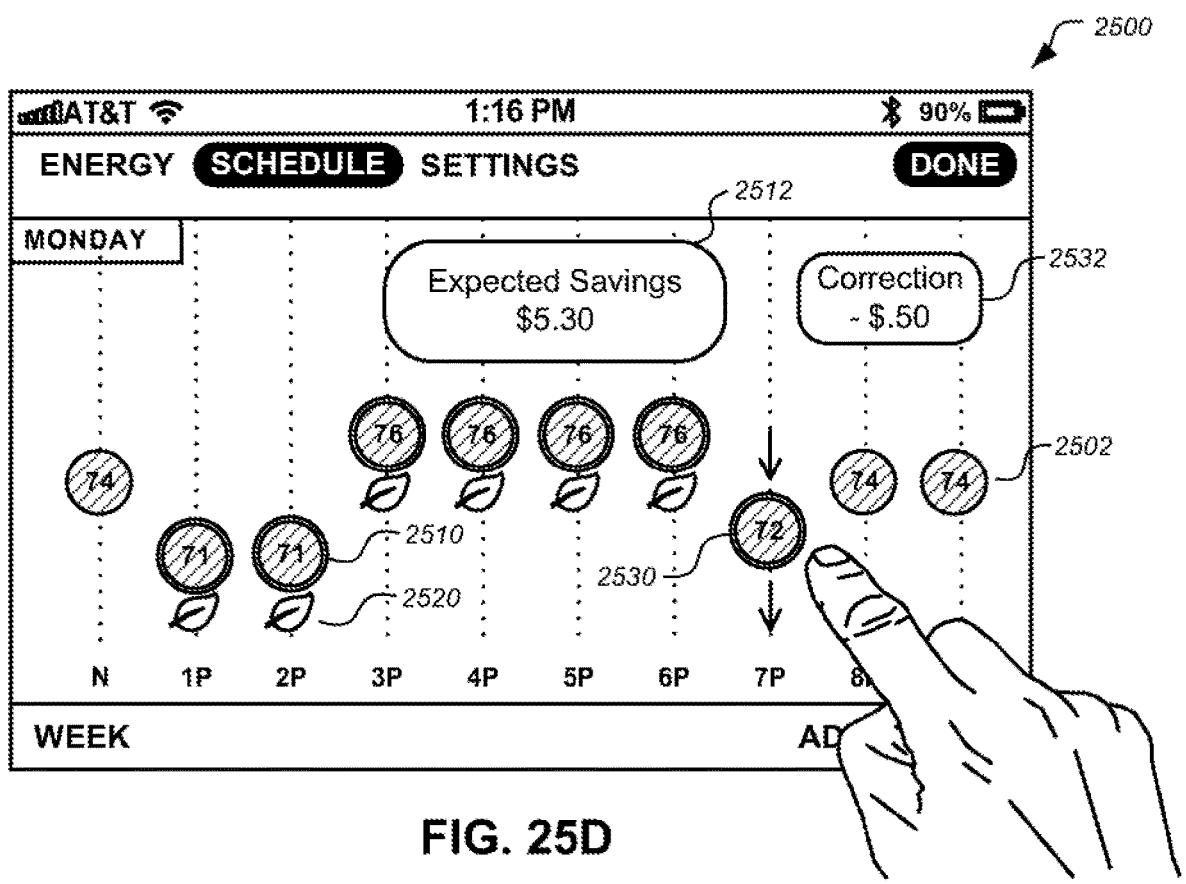

FIG. 25D illustrates the I/O element 2500 including a number of DR event-modified setpoints 2510 partway through a DR even subject to an energy consumer-instigated change to a DR event-modified setpoint resulting in a decrease of energy shifting. In this particular example, the energy consumer's cooling system is being managed to deal with hot temperatures. The energy consumer reduced the 7 pm DR event-modified setpoint 2530 by 4° F. from 76° F. to 72° F. In this situation, such a reduction will result in reduced energy shifting, and as a result a successful implementation indicator 2520 may not be displayed for the setpoint 2530. Further, in some embodiments the savings estimate 2512 may be modified to reflect an updated estimate to the value of the energy shifting likely to occur as a result of the change in setpoint 2530. A savings correction notification 2532 is also displayed indicating the change in value from the estimate prior to the change and the estimate after the change.

Figure 25E:
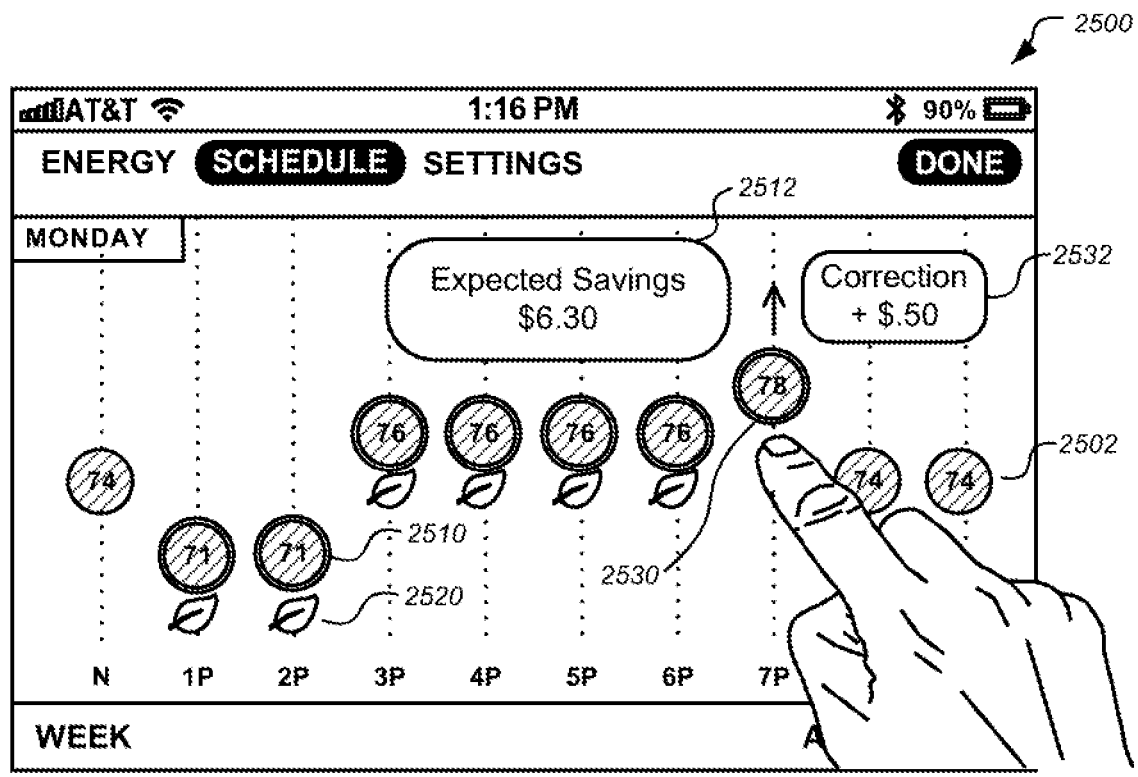

FIG. 25E illustrates the I/O element 2500 including a number of DR event-modified setpoints 2510 partway through a DR even subject to an energy consumer-instigated change to a DR event-modified setpoint resulting in an increase of energy shifting. This example is similar to that described with reference to FIG. 25D, but in this case the 7 pm DR-event modified setpoint 2530 is increased 2° F. from 76° F. to 78° F. In this situation, such an increase will result in an increased energy shifting, and as a result a successful implementation indicator 2520 may still be displayed for the setpoint 2530. Further, the savings estimate 2512 is modified to reflect an updated estimate to the value of the energy shifting likely to occur as a result of the change in setpoint 2530, and a savings correction notification 2532 is also displayed indicating the change in value from the estimate prior to the change and the estimate after the change.

Figure 25F:
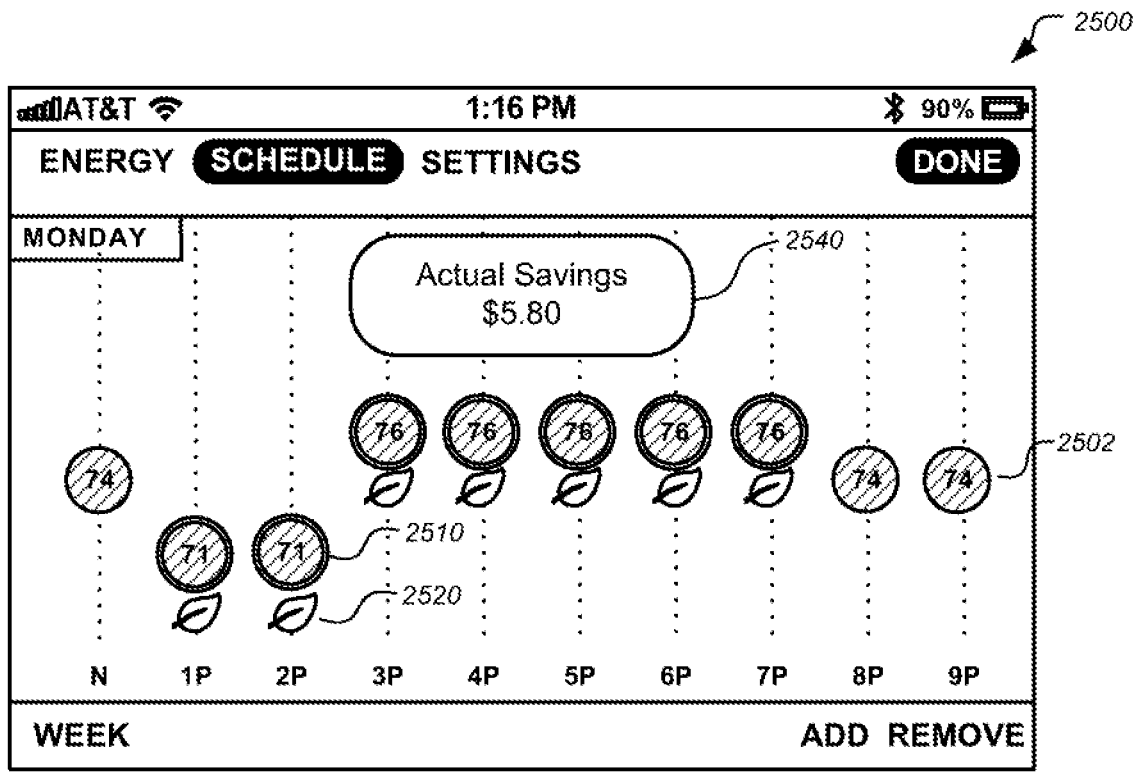

FIG. 25F illustrates the I/O element 2500 including a number of DR event-modified setpoints 2510 after completion of the DR event. In this particular example, the energy consumer completed the entire DR event in accordance with the DR event implementation profile. Accordingly, successful implementation indicators 2520 are displayed for each event-modified setpoint 2510. Further, in some embodiments the actual amount of savings 2540 resulting in energy costs resulting from participation in the DR event may be calculated and displayed.

It should be appreciated that the specific I/O elements illustrated in FIGS. 25A through 25F describe particular I/O elements according to certain embodiments. The I/O elements described with reference to FIGS. 25A through 25F may be implemented at and performed by one or more of a variety of electronic devices associated with the identified energy consumer. For example, they may be implemented at and performed by one or more of the a thermostat 202, hazard detection unit 204, entryway interface device 206, wall light switch 208, wall plug interface 210, appliance 212, access device 266, or other electronic device associated with the identified energy consumer. The various messages and input elements may not necessarily be displayed at different times, but rather some messages could be presented simultaneously on the same display. Some messages could be communicated using other communication mechanisms, and responses could similarly be received using other communication mechanisms. For example, audible, touch, or other input/output mechanisms could be used. Further, it should be recognized that additional or alternative information could be presented to request enrollment and a participation level, and all of the information illustrated in FIGS. 25A through 25F need not be presented. For example, in some embodiments, the energy consumer may not be provided with an opportunity to change the DR event-modified setpoints at all. For example, with reference to FIG. 25B, all of the DR event-modified setpoints 2510 may be blacked out or otherwise hidden from the energy consumer. Or, in some embodiments, simply not changeable by the energy consumer. For another example, in some embodiments a consumer may not be notified of a DR event at all. This may be particularly advantageous for 'instantaneous' DR events, where a DR event notification is communicated to a thermostat shortly before the DR event begins. In these or other cases there may be no notification to the consumer of the DR event (e.g., no "DR EVENT" notification as described with reference to FIG. 26A), but rather the thermostat may display temperature setpoints as defined by the DR implementation profile without displaying an explicit notification that the thermostat is actively implementing a DR implementation profile. Accordingly, in some cases the I/O element 2600 may display the originally scheduled setpoints even during implementation of a DR implementation profile, whereas in other cases the I/O element 2600 may alternatively or additionally display the DR implementation profile setpoints during implementation of the DR implementation profile. In at least one embodiment, the setpoints shown to the user may change based on whether the user attempts to view those setpoints before, during, or after the DR event. For example, before and during the DR event the user's typically scheduled setpoints may be displayed, whereas after the DR event the DR implementation profile setpoints may be displayed. One of ordinary skill in the art would recognize and appreciate many variations, modifications, and alternatives.

In addition or alternatively to changing scheduled setpoint temperatures, an energy consumer may modify their immediate setpoint temperature. Various techniques for modifying an immediate setpoint temperature of a thermostat are described in commonly assigned U.S. patent application Ser. No. 13/356,762 (client reference number NES0176), filed Jan. 24, 2012, the contents of which are incorporated herein in their entirety for all purposes. Such immediate setpoint temperatures may be changed before, during, or after a DR event. If changing such setpoint temperatures during a DR event result in a change to the estimated energy shifting, then the energy consumer may be notified and confirmation of the change required.

FIGS. 26A through 26D illustrate a simplified graphical user interface for responding to immediate setpoint changes during a DR event according to an embodiment. While the graphical user interface (GUI) is presented in the form of an interface that may be displayed on a circular-shaped device such as the device 300 discussed with reference to FIGS. 3A through 3C, embodiments are not so limited as similar GUI's could be presented on other devices of other shapes.

Figure 26A:
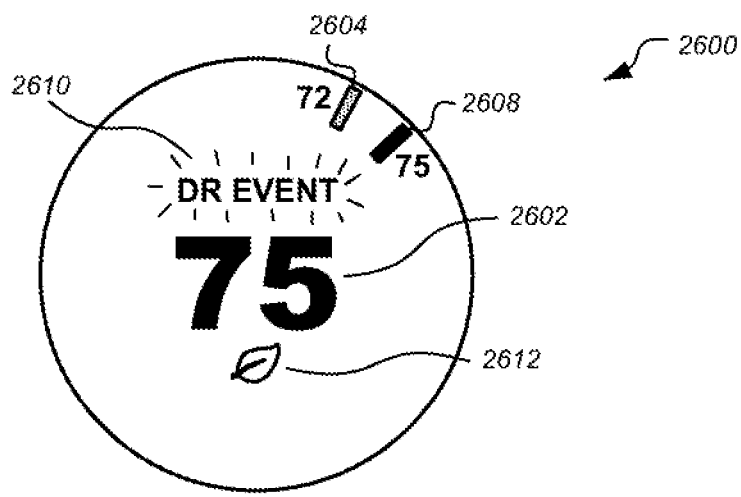
FIGS. 26A through 26D illustrate a simplified graphical user interface for responding to immediate setpoint changes during a DR event according to an embodiment.

Turning to the figures, FIG. 26A illustrates an input/output (I/O) element 2600 which may be, e.g., user interface 304 (FIG. 3A), output device 606 and/or input device 608 (FIG. 6), or other suitable I/O element 2600 of an electronic device used by an energy consumer during a DR event. The I/O element 2600 includes a current setpoint temperature 2602 displaying the immediate setpoint to the identified energy consumer. The I/O element 2600 also includes a current temperature indicator 2604 indicating the current temperature inside of the structure, and in some cases a current setpoint temperature indicator 2608 indicating the immediate setpoint and graphically displayed relative to the current temperature indicator 2604. The I/O element 2600 may also include a DR event indicator 2610 indicating that energy consumption of the energy consumer is currently being managed. In this particular example, the DR event indicator 2610 is a textual display of "DR EVENT", but in other embodiments the DR event indicator 2610 may take other forms or textual sequences, such as "RUSH HOUR". Such an indicator may be displayed during the DR event period, but may also be displayed during other time periods over which energy consumption is being managed, such as during the pre-event period and/or post-event period. The I/O element 2600 may also include a successful implementation indicator 2612 similar to indicator 2520.

Figure 26B:
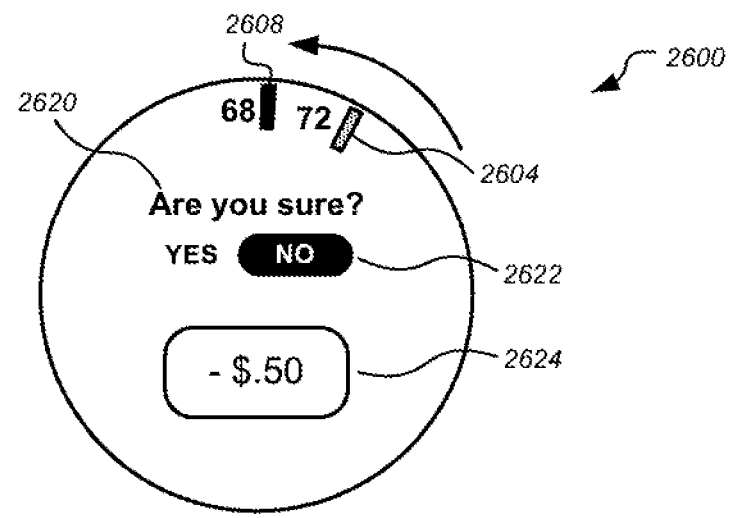

FIG. 26B illustrates an input/output (I/O) element 2600 in which the energy consumer alters the immediate setpoint to result in a decrease of energy shifting. In this particular example, the energy consumer has reduced the immediate setpoint temperature by 7° F. from 75° F. to 68° F. The energy consumer is presented with a confirmation message 2620 requesting confirmation of the change, as well as a selectable input mechanism 2622 whereby the user can either accept or reject the change. The energy consumer may also be presented with a savings correction notification 2624 indicating the change in value of energy shifting that is likely to result if the energy consumer's change to the immediate setpoint is accepted. In some embodiments, the desired change to the immediate setpoint temperature may cause the energy consumer to opt-out of the DR event (e.g., due to the change resulting in the structure not achieving any energy shifting). In such a case, the energy consumer may also be presented with a message indicating that their change will result in them opting out of the DR event, and a confirmation message requesting confirmation of their desire to opt-out.

Figure 26C:
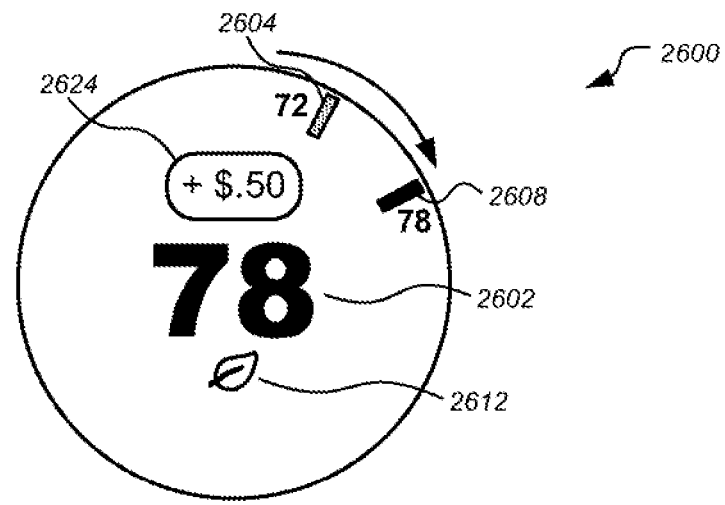

FIG. 26C illustrates an input/output (I/O) element 2600 in which the energy consumer alters the immediate setpoint to result in an increase of energy shifting. In this particular example, the energy consumer has increased the immediate setpoint temperature by 3° F. from 75° F. to 78° F. The energy consumer in this example is not presented with a confirmation message but rather the desired change is immediately accepted as it increased energy shifting. In other examples, the energy consumer may be presented with a confirmation message. The energy consumer may also be presented with a savings correction notification 2624 indicating the change in value of energy shifting that is likely to result due to the energy consumer's change to the immediate setpoint. In some cases, information, such as the implementation indicator 2612, may be removed from the display.

Figure 26D:
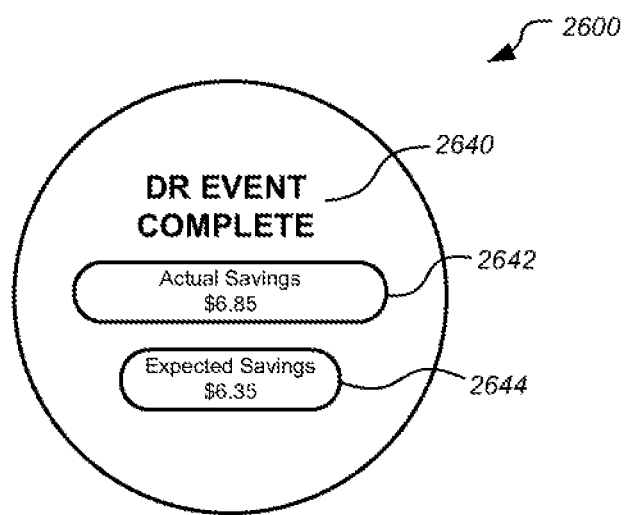

FIG. 26D illustrates the I/O element 2600 upon completion of the DR event. The I/O element 2600 includes an event completion message 2640 notifying the energy consumer that the DR event is completed. The I/O element 2600 may also include an actual savings notification 2642 indicating the value of energy savings actually achieved as a result of the energy consumer's participation in the DR event, as well as an expected savings notification 2644 indicating the value of energy savings that was expected to be achieved as a result of the energy consumer's participation in the DR event.

It should be appreciated that the specific I/O elements illustrated in FIGS. 26A through 26D describe particular I/O elements according to certain embodiments. The I/O elements described with reference to FIGS. 26A through 26D may be implemented at and performed by one or more of a variety of electronic devices associated with the identified energy consumer. For example, they may be implemented at and performed by one or more of the a thermostat 202, hazard detection unit 204, entryway interface device 206, wall light switch 208, wall plug interface 210, appliance 212, access device 266, or other electronic device associated with the identified energy consumer. The various messages and input elements may not necessarily be displayed at different times, but rather some messages could be presented simultaneously on the same display. Some messages could be communicated using other communication mechanisms, and responses could similarly be received using other communication mechanisms. For example, audible, touch, or other input/output mechanisms could be used. Further, it should be recognized that additional or alternative information could be presented to request enrollment and a participation level, and all of the information illustrated in FIGS. 26A through 26D need not be presented. For example, in some embodiments a consumer may not be notified of a DR event at all. This may be particularly advantageous for 'instantaneous' DR events, where a DR event notification is communicated to a thermostat shortly before the DR event begins. In these or other cases there may be no notification to the consumer of the DR event (e.g., no "DR EVENT" notification as described with reference to FIG. 26A), but rather the thermostat may display temperature setpoints as defined by the DR implementation profile without displaying an explicit notification that the thermostat is actively implementing a DR implementation profile. In some cases, while no explicit notification is provided, an implicit notification may be provided (e.g., by constant display of the implementation indicator 2612 during implementation of the DR implementation profile) that indicates the thermostat is actively shifting energy. One of ordinary skill in the art would recognize and appreciate many variations, modifications, and alternatives.

Figure 27:
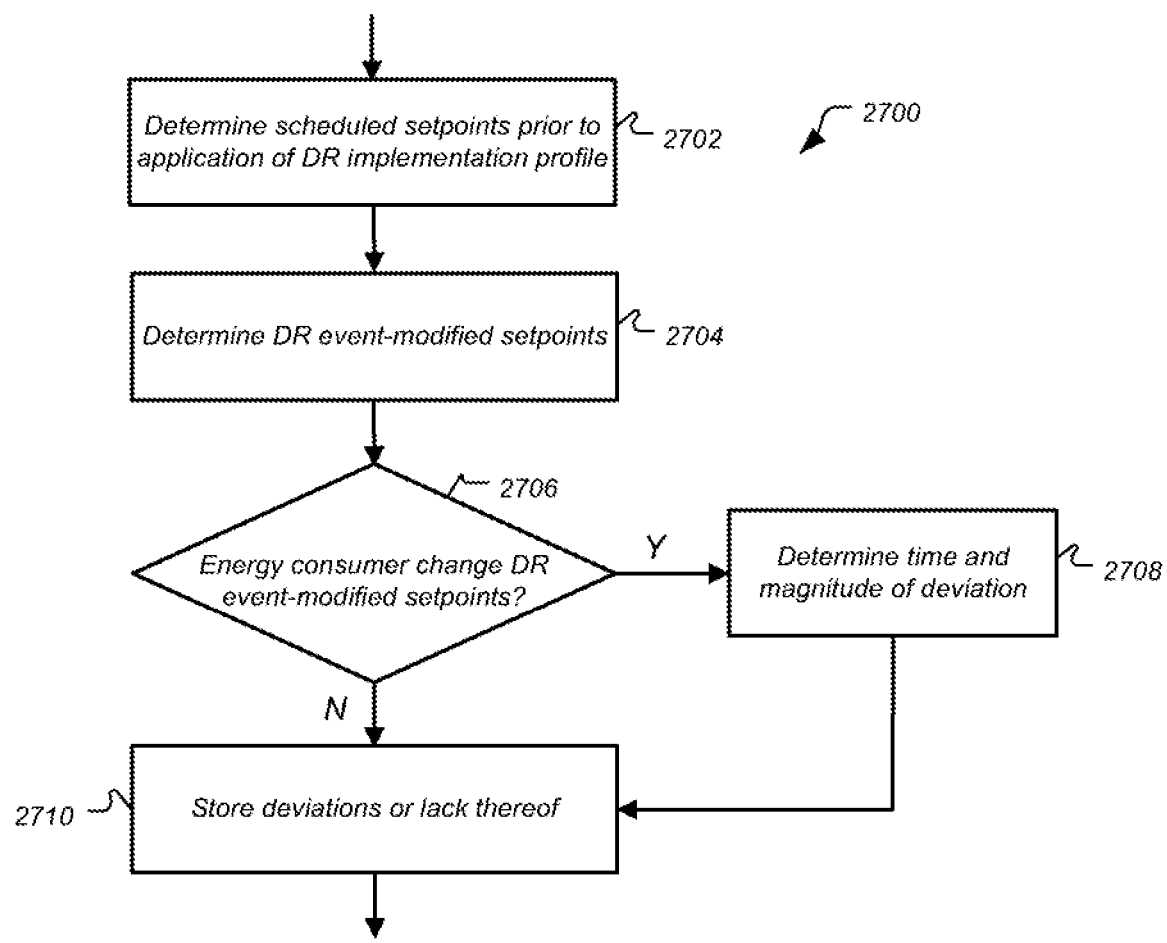
FIG. 27 illustrates a process for learning user preferences indicated during a DR event according to an embodiment.

As described with reference to operation 1218, the tendencies and preferences of the occupants of a structure (e.g., preferred temperatures, humidity's, etc. for different times of the day, for different occupants, etc.) may be learned, where specific learning algorithms are further described in U.S. Provisional Application No. 61/550,346, supra. In some embodiments, in addition to learning preferred temperatures, humidity's, etc. during regular (i.e., non-DR event) time periods, the tendencies and preferences of occupants with respect to participation in a DR event may also be learned. For example, a DR event implementation profile may be implemented for a particular energy consumer. During the DR event, the energy consumer may indicate increases or decreases the amount of energy shifting resulting from participation in the DR event (e.g., due to changing the DR event implementation setpoints). Such changes made during the DR event may be used in the generation of DR event implementation profiles for subsequent DR events. For example, where an energy consumer indicates an increase in the amount of energy shifting resulting from participation in a first DR event, the DR implementation profile for a second, subsequent event may be made to more aggressively shift energy as compared to the DR implementation profile originally generated for the first event. FIG. 27 illustrates a particular process for learning the preferences of energy consumers during DR events, although it should be recognized that some or all of the learning processes described in U.S. Provisional Application No. 61/550,346, supra, may similarly be applied herein.

Specifically, FIG. 27 illustrates a process 2700 for learning user preferences indicated during a DR event according to an embodiment. In operation 2702 the scheduled setpoints prior to application of a DR implementation profile (i.e., the originally scheduled setpoints) may be determined. For example, with reference to FIG. 25D, these may be originally scheduled setpoints 2502. In determining the originally scheduled setpoints, a schedule set by the energy consumer may be acquired. For example, energy management system 130 may receive an HVAC schedule from one or more of the thermostat 202 and access device 266. In some cases, the schedule may not be explicitly set by the energy consumer, but rather may be learned (e.g., using some or all of the learning processed described in U.S. Provisional Application No. 61/550,346, supra) by the thermostat 202 and/or other electronic devices associated with the energy consumer. In such a case, the learned and/or manually set setpoints may be acquired.

In operation 2704, the DR event-modified setpoints are determined. For example, with reference to FIG. 25D, these may be DR event-modified setpoints 2510. These may be determined from the DR implementation profile.

In operation 2706 it is determined whether the energy consumer changes any of the DR event-modified setpoints. It may be determined whether the change is an increase or a decrease in the setpoint value. For example, with reference to FIG. 25D, when an energy consumer reduces a DR event-modified setpoint from 76° F. to 72° F., it may be determined that a decrease in the DR event-modified setpoint has occurred. For another example, with reference to FIG. 26B, when an energy consumer reduces a DR event-modified setpoint (in this example, a current setpoint) from 72° F. to 68° F., it may be determined that a decrease in the DR event-modified setpoint has occurred.

If it is determined that there are no changes to the DR event-modified setpoints, then processing may continue to operation 2710 where information indicating the user's acceptance of the DR event-modified setpoints is stored. In contrast, if it is determined that there are changes to the DR event-modified setpoints, then processing may continue to operation 2708.

In operation 2708 the time and magnitude of the deviation are determined. For example, with reference to FIG. 25D, when an energy consumer reduces a DR event-modified setpoint from 76° F. to 72° F., the 7 pm time of the setpoint change as well as the 4° F. magnitude of the change may be determined. In some cases, the values of the DR event-modified setpoints prior to and after change (i.e., 76° F. and 72° F.) may also be determined, as may be the corresponding originally scheduled setpoint (i.e., 74° F.). Processing may then continue to operation 2710, where the time, magnitude, and other information may be stored.

Information identifying the aforementioned deviations may be stored in any suitable element of system 100, such as the energy management system 130, one or more residences 150A-150N, the utility provider computing system 120, etc. Such stored information may subsequently be used when determining the DR implementation profile for a subsequent DR event profile. For example, as described with reference to operation 1602, past DR event behavior may be used when identifying the basis for the DR implementation profile. One particular process for using the stored deviations is described with reference to FIG. 28.

Figure 28:
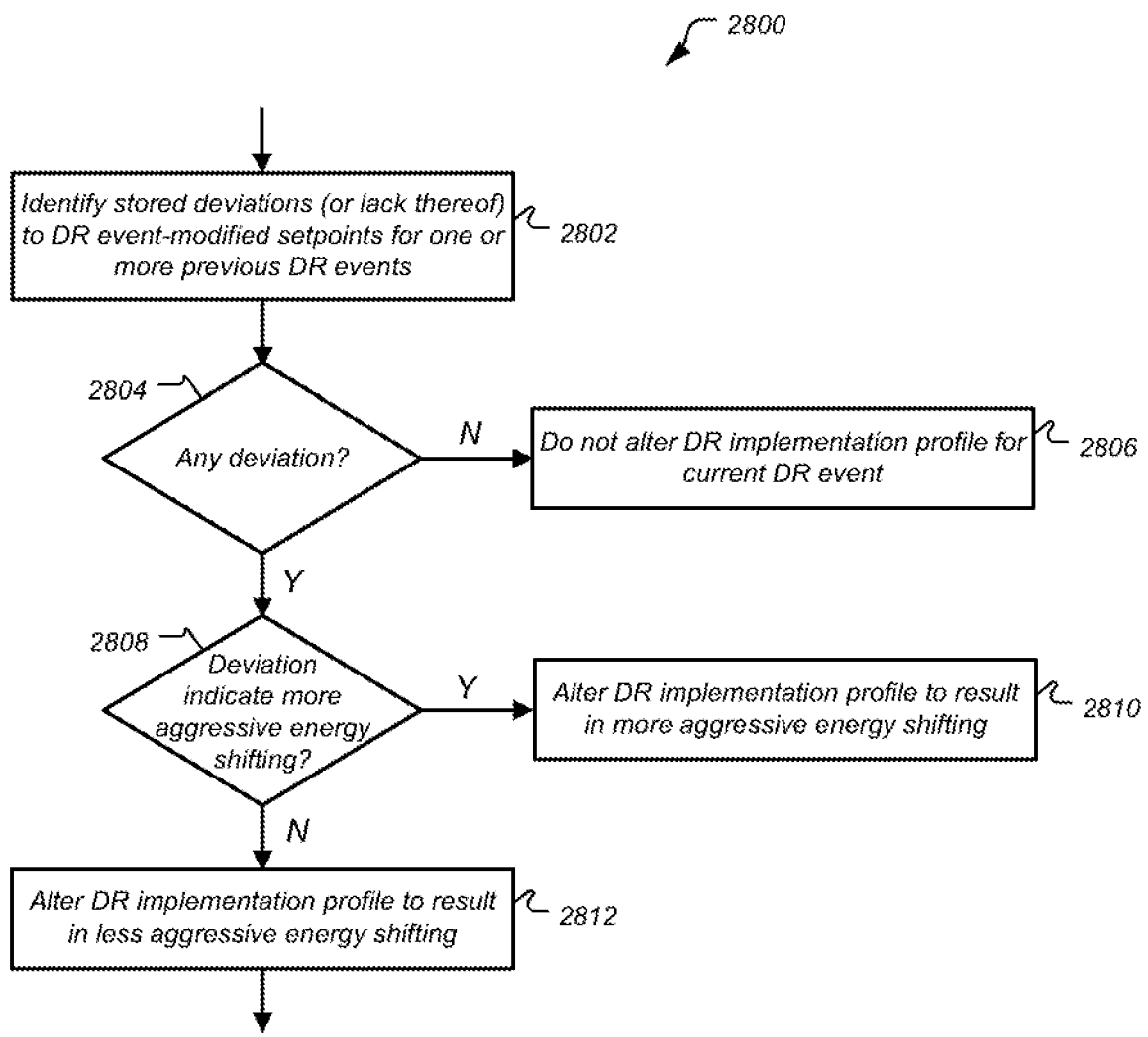
FIG. 28 illustrates a particular process for modifying a DR implementation profile based on user preferences indicated during a prior DR event according to an embodiment.

Specifically, FIG. 28 illustrates a particular process for modifying a DR implementation profile based on user preferences indicated during a prior DR event according to an embodiment. In operation 2802, information indicating deviations (or lack thereof) to DR event-modified setpoints for one or more previous DR events is identified. For example, this could be information stored in operation 2710.

In operation 2804 it is determined whether there were any deviations to the DR event-modified setpoints for the previous DR event(s). If not, then processing may continue to operation 2806, where a DR implementation for a current DR event is not altered. In some embodiments, even though there were no deviations for past DR events, the DR implementation for a current DR event may nonetheless be altered. For example, the DR implementation for the current DR event may be altered to more aggressively shift energy in an effort to slowly increase the amount of energy shifting caused a particular energy consumer.

If, on the other hand, in operation 2804 it is determined that there is a deviation, then processing may continue to operation 2808. In operation 2808 it is determined whether the deviation indicates more an increase in (e.g., more aggressive) energy shifting. For example, with reference to FIG. 25E, an increase in the temperature of the DR event-modified setpoint 2530 would result in an increased energy shift or, at the very least, an indication of a desire for more aggressive energy shifting. Accordingly, if it is determined that the deviation indicates an increase in energy shifting, processing may continue to operation 2810.

In operation 2810 the DR implementation profile for the current DR event is altered to result in more aggressive energy shifting. For example, referring to FIG. 25B, instead of setting the DR event period setpoints to 76° F., the DR implementation profile may push for more aggressive energy shifting by setting the DR event period setpoints to 77° F. In contrast, if it is determined in operation 2808 that the deviation does not indicate an increase in energy shifting, but rather indicates a decrease in (e.g., less aggressive) energy shifting, then processing may continue to operation 2812.

In operation 2812 the DR implementation profile for the current DR event is altered to result in less aggressive energy shifting. For example, referring to FIG. 25B, instead of setting the DR event period setpoints to 76° F., the DR implementation profile may allow for less aggressive energy shifting by setting the DR event period setpoints to 75° F.

It should be appreciated that the specific operations illustrated in FIGS. 27 and 28 provide particular processes for learning and applying energy consumers' DR event preferences according to embodiments. The various operations described with reference to FIGS. 27 and 28 may be implemented at and performed by one or more of a variety of electronic devices or components described herein. For example, they may be implemented at and performed by a thermostat 202, an access device 266, or other electronic device described in accordance with the smart home environment 200, the energy management system 130, the utility provider computing system 120, etc. Other sequences of operations may also be performed according to alternative embodiments. For example, alternative embodiments of the present invention may perform the operations outlined above in a different order. Moreover, the individual operations illustrated in FIGS. 27 and 28 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Turning back to FIG. 1, in many embodiments, energy management system 130 may manage the energy consumption at one or more residences 150A-150N. Such energy management may be performed for and during a DR event having characteristics (such as a desired reduction in energy consumption during the DR event on a particular electric grid) defined by the utility provider associated with utility provider computing system 120. In some embodiments, energy management system 130 may provide the utility provider, via utility provider computing system 120, various information regarding the status and progress of the energy reduction mechanisms implemented by the energy management system 130. For example, the energy management system 130 may allow the utility provider to see which particular residences 150A-150N are participating in a DR event, how much energy shifting each residence has actually performed, whether the actual aggregate energy reduction during the DR event period is close to the desired aggregate energy reduction initially instructed by the utility provider. In one particular embodiment, such information may be presented to the utility provider via a utility portal. The utility portal may a website hosted by the energy management system 130 or other third party entity, may be an application executed at the utility provider computing system 120, may be an application executable on a portable electronic device provided to one or more members of the utility provider, or other type of interface that allows the utility provider to acquire, manage, and respond to such information. In at least one embodiment, the various information provided to the utility provider may be provided in real-time so that the utility provider may monitor the characteristics and effectiveness of the energy reduction mechanisms employed by the energy management system 130.

Figure 29A:
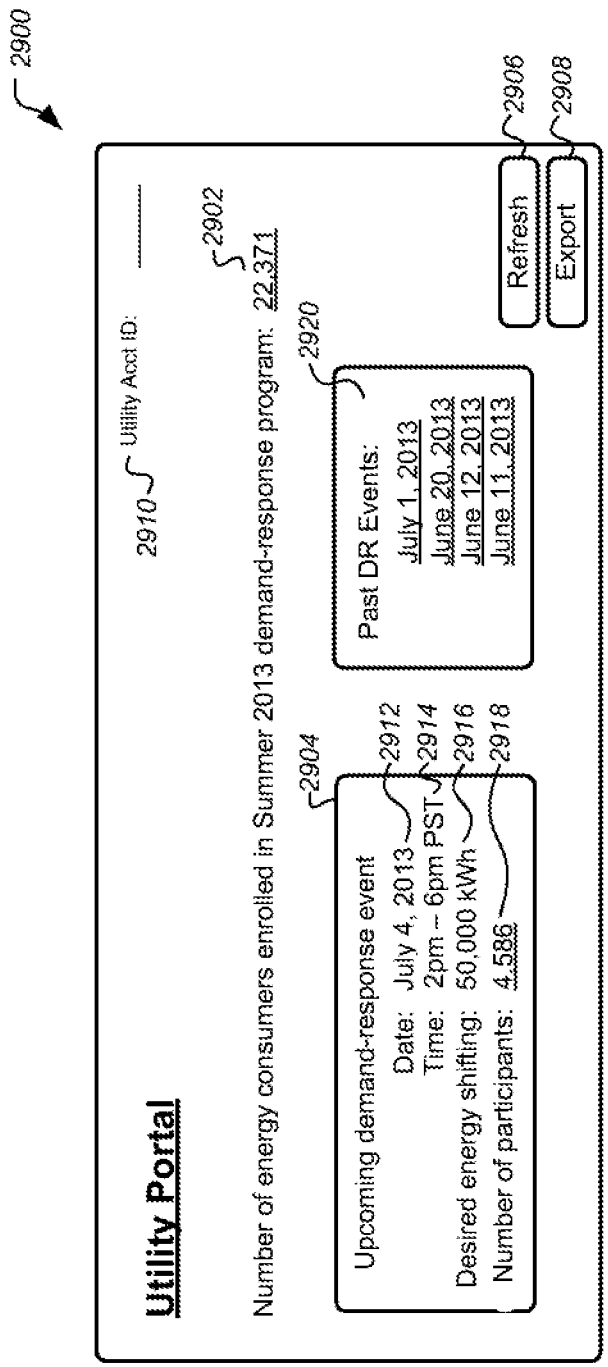
FIG. 29A illustrates an I/O element including a utility portal summary according to an embodiment.

FIG. 29A illustrates an input/output (I/O) element 2900 including a utility portal summary according to an embodiment. A variety of information regarding an energy management mechanism employed by the energy management system 130 may be presented to the utility provider via the I/O element 2900. Such information may initially be stored at energy management system 130 and/or electronic devices at residences 150A-150N. In one particular embodiment, the information may be acquired by and aggregated at a server of energy management system 130 from various electronic devices associated with each of the residences 150A-150N. The information may then be presented in real-time to the utility provider via the utility portal and, in some embodiments, the utility provider computing system 120 may be used to interact with the data.

In the particular input/output element 2900 depicted in FIG. 29A, the utility portal includes a summary of information regarding a particular DR event. The summary includes the number of energy consumers that are enrolled to participate in a particular DR program 2902, information regarding an upcoming DR event 2904, a refresh link 2906 that upon selection causes the displayed information to be refreshed (recognizing that the information can be refreshed periodically, e.g., every minute, every 30 minutes, every 60 minutes, etc. without user input), an export link 2908 that upon selection exports the displayed information in one or more of a variety of file formats, and a utility account identifier 1910 that uniquely identifies an account associated with the utility provider.

The information regarding an upcoming DR event 2904 may include a variety of information regarding an upcoming DR event. For example, such information may include the date of the DR event 2912, the time of the DR event 2914, the desired amount of energy shifting 2914, the number of participants for the DR event 2918, etc. Much of this information, such as the date, time, and desired energy shifting, may be acquired from the DR event profile by the energy management system 130. Other information, such as the number of participants, may be generated by the energy management system (e.g., as a result of the operations described with reference to FIG. 8) and communicated to the utility provider computing system 120.

The utility provider computing system 120 may be used to interact with the various data presented by the energy management system 130. For example, upon selecting the number of enrolled energy consumers 2902, the utility portal may present additional information regarding all of the enrolled consumers. Similarly, upon selecting the number of participants, the utility portal may present additional information regarding the energy consumers that have indicated they will participate (or are currently participating) in the upcoming DR event.

In some embodiments, the utility portal may include prior DR event information 2920. The prior DR event information may identify past DR events and include selectable links to those DR events. Upon receiving a selection of one of those links, the utility portal may provide various information regarding the past DR event similar to that described with reference to FIGS. 29A and 29B.

FIG. 29B illustrates an I/O element 2950 including a utility portal providing detailed energy consumer information according to an embodiment. Such detailed information may be provided in a number of fashions, for example in response to a user of the utility provider computing system 120 selecting the number of enrolled energy consumers 2902 or the number of participants 2918 described with reference to FIG. 29A. In one particular embodiment, in response to the number of enrolled energy consumers 2902 being selected, a list of all enrolled energy consumers and their devices used for managing energy consumption may be generated. Similarly, in response to the number of participants in a DR event 2918 being selected, a list of only the energy consumers participating in a particular DR event may be generated.

The I/O element 2950 in this particular example includes a user identifier 2952 that identifies an energy consumer, a device identifier 2954 that uniquely identifies an electronic device (e.g., thermostat 202) associated with the energy consumer and is used for energy management, a connection status 2956 indicating whether the electronic device is connected to the energy management system 130 (e.g., remote server 264), qualification information 2958 indicating whether the device qualifies to participate in a DR event, notification information 2960 indicating whether the device received a DR event notification, DR execution information 2962 indicating whether the device is currently performing energy management in accordance with a DR event (e.g., currently implementing a DR implementation profile), an estimate of total energy reduction 2964 indicating an estimate of the total energy reduction during the DR event period (or energy shifting from the DR event period to other time periods) attributed to the device, an estimate of the current energy reduction 2966 indicating an estimate of the amount of energy reduction the device was expected to achieve from the beginning of the DR event period up until a particular time during the DR event in accordance with its DR implementation profile, and an actual current energy reduction 2968 indicating the actual amount of energy reduction achieved by the device from the beginning of the DR event period up until the particular time during the DR event.

In addition to providing a variety of information on a per-device basis, aggregated values may also be generated and provided to the utility portal. For example, the utility portal may also include an estimate of the aggregate current energy reduction 2970 that indicates the total amount of energy reduction across all participating devices expected to be achieved from the beginning of the DR event up until a particular time during the DR event, an actual aggregate current energy reduction 2972 that indicates the total amount of energy reduction across all participating devices actually achieved from the beginning of the DR event up until the particular time during the DR event, the percentage of devices currently executing the DR event 2974, and the amount of time remaining in in the DR event 2976.

It should be recognized that much of the aforementioned information may be generated by the energy management system 130 in accordance with many of the previously described processes. For example, the estimated total energy reductions 2964 may be calculated in accordance with operation 1408, while the estimated current energy reduction 2966, estimated aggregate current energy reduction 2970, actual current energy reduction 2968, and actual aggregate current energy reduction 2972 may be calculated in accordance with operations 1504 and 1510.

Moreover, it should be appreciated that the specific I/O elements illustrated in FIGS. 29A and 29B describe particular I/O elements according to certain embodiments. The various information and selectable elements may not necessarily be displayed at different times, but rather some messages could be presented simultaneously on the same display; similarly, the information and selectable elements may not necessarily be displayed simultaneously, but could be displayed at different times. Some messages could be communicated using other communication mechanisms, and responses could similarly be received using other communication mechanisms. For example, audible, touch, or other input/output mechanisms could be used to communicate the information to the utility provider and allow the utility provider to interact with the information. Further, it should be recognized that additional or alternative information could be presented, and all of the information illustrated in FIGS. 25A through 25F need not be presented. For example, in some embodiments, the user identifier 2952 and/or device identifier 2954 can be selected to generate and display additional information regarding the energy consumer, such as their full name, address, billing information, structure information (type of structure, volume of structure, thermal retention characteristics of structure, cooling/heating capacity of structure, etc.), or other user/account/device-related information. For another example, in some embodiments, after a DR event the utility portal may generate and display information identifying which devices completed their participation in the DR event, which devices did not even start their participation in the DR event, which devices canceled or altered their participation level during the DR event, and when such changes were made and the impact of such changes (e.g., increased energy shifting, decreasing energy shifting, opt-out). One of ordinary skill in the art would recognize and appreciate many variations, modifications, and alternatives. For example, additional utility portal embodiments are discussed below in connection with FIGS. 34-38.

In some instances energy consumers may attempt to obviate the application of a DR implementation profile while still enjoying rewards associated with participation in a DR event. For example, an energy consumer may prevent their thermostat 202 from controlling their HVAC 203, but still allow the thermostat 202 to download and implement a DR implementation profile for a DR event. In some cases, the thermostat 202 may execute the DR implementation profile for the entire duration of the DR event, and the energy consumer may get rewarded for their participation in the DR event, although the user has only presented the appearance of participating in the DR event. Instead of actually shifting their energy consumption, the energy consumer may manually control their HVAC resulting in no energy shifting or less energy shifting than that reported by the thermostat. In some embodiments, techniques for determining whether an energy consumer is or has attempted to obviate DR programming (i.e., application of a DR implementation profile) are disclosed. In making such a determination, the status of an HVAC wire connection to an electronic device (e.g., thermostat 202) can be monitored to see whether the HVAC has been disconnected. If so, this may indicate tampering. In some embodiments, one or more additional factors may also be taken into consideration prior to making a definitive determination of tampering, such as whether the energy consumer is enrolled in a DR program, participating in a DR event, etc.

Figure 30A:
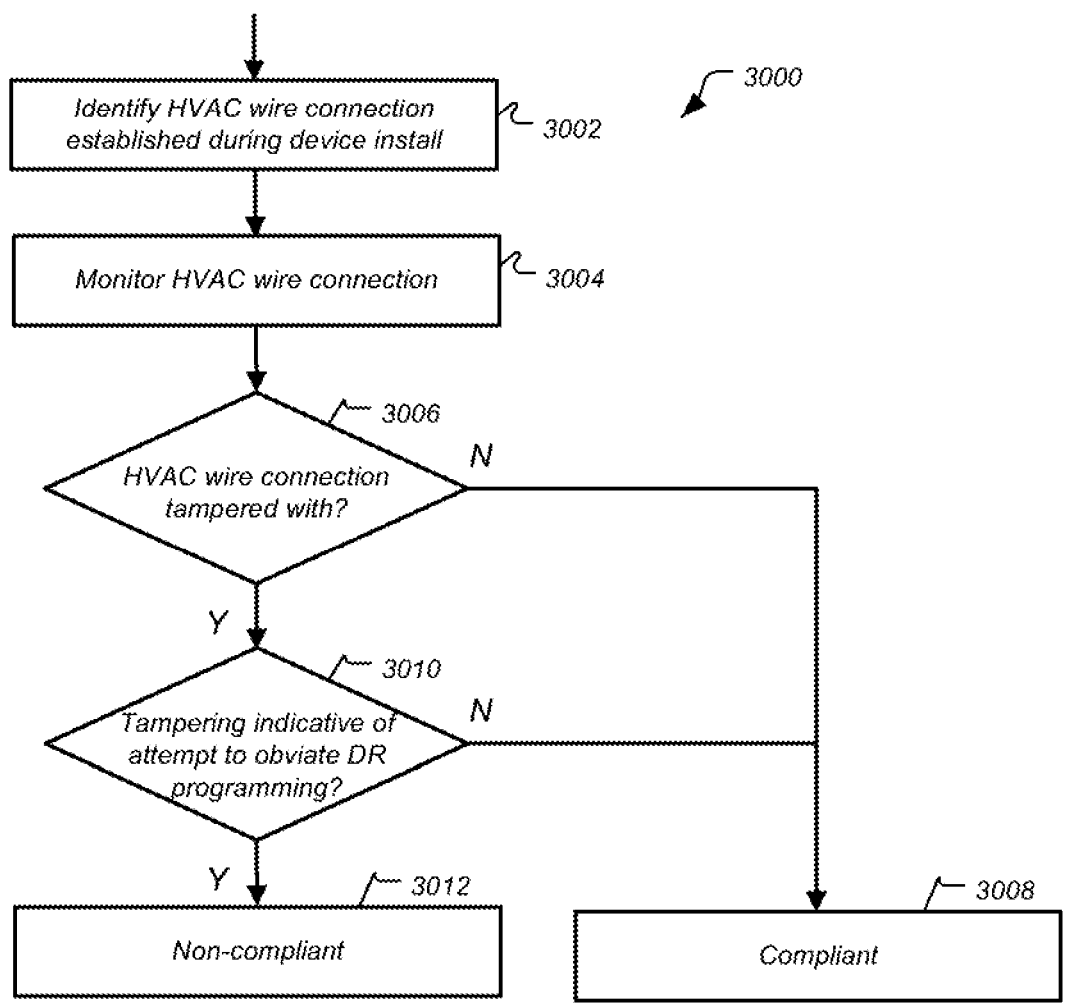
FIG. 30A illustrates a process for determining whether an energy consumer has complied with participation in a DR event according to an embodiment.

FIG. 30A illustrates a process 3000 for determining whether an energy consumer has complied with participation in a DR event according to an embodiment. To facilitate understanding, the process 3000 is described with reference to FIG. 1 and FIG. 2, although it should be understood that embodiments of the process 3000 are not limited to the exemplary systems and apparatus described with reference to FIG. 1 and FIG. 2.

In operation 3002, an HVAC wire connection established during a device install is identified. The device may be any device connected to an HVAC or other environmental management system, such as thermostat 202 being connected to HVAC 203. The thermostat 202 may generally be connected to the HVAC 203 so as to control the operation of HVAC 203. In one particular embodiment and with reference to FIG. 3C, various electric wires from the HVAC 203 for controlling the HVAC 203 may be connected to the thermostat 203, such as a heating call wire W1, a cooling call wire Y1, etc. One particular technique for connecting an HVAC to a thermostat is described in commonly assigned U.S. Ser. No. 13/034,674, supra. Accordingly, in one embodiment, processor 330 (or other processing circuitry/software associated with device 300) may identify one or more connections to an HVAC via the wire connectors 338.

In operation 3004, the HVAC wire connection is monitored. For example, the wire connectors 338 may be monitored for wire connections and disconnections. In one particular embodiment, the port sensing circuit 342 may include a two-position switch that is closed to short the electrical leads 344 together when no wire has been inserted into the associated wire connector 338, and the two-position switch may be mechanically urged into an open position to electrically segregate the electrical leads 344 when a wire is inserted into the associated wire connector 338. Accordingly, the two-position switch may be monitored to determine whether a wire has been connected or disconnected to/from a particular wire connector 338.

In operation 3006 it is determined whether an HVAC wire connection has been tampered with. In some embodiments, it may be determined whether an HVAC wire connection has been removed. For example, as a result of monitoring the two-position switch in operation 3004, it may be determined whether a wire connected to an HVAC via a wire connector 338 is removed from the wire connector 338. If it is determined that an HVAC wire connection has not been tampered with, then processing may continue to operation 3008 where it is determined that the device is compliant. Otherwise, processing may continue to operation 3010.

In operation 3010 it is determined whether the tampering is indicative of an attempt to obviate DR programming. In some embodiments it may be determined that the mere disconnect of one or more wires is indicative of tampering. In some cases, a particular wire (e.g., cooling call wire Y1) must be removed to indicate tampering. In other embodiments, one or more additional factors may be taken into consideration in determining whether the tampering is indicative of an attempt to obviate the DR programming. A number of such factors are further described with reference to FIG. 30B. If it is determined that the tampering is not indicative of an attempt to obviate DR programming, then processing may return to operation 3008 where it is determined that the device is compliant. Otherwise, processing may continue to operation 3012 where it is determined that the device is compliant.

Figure 30B:
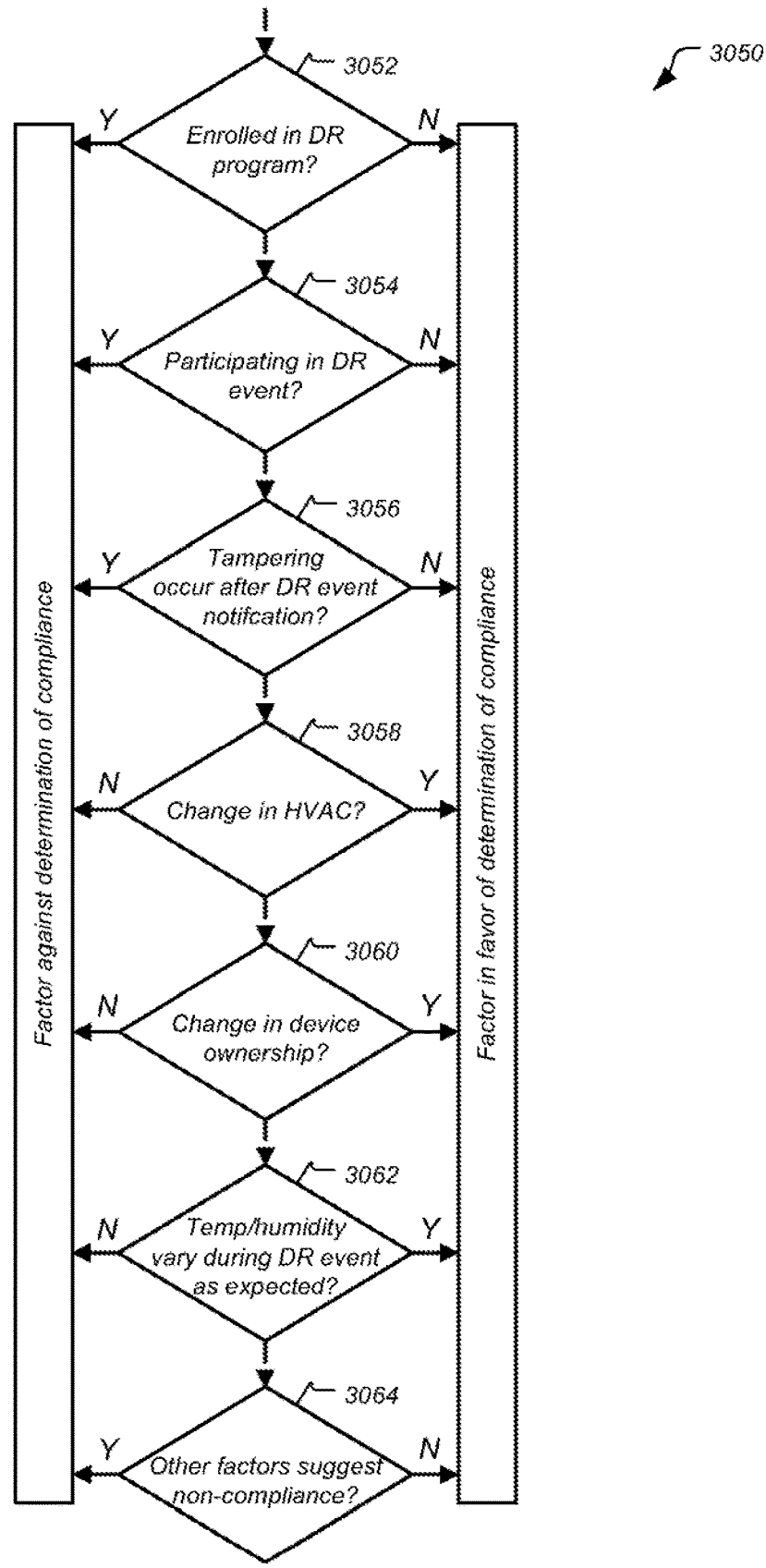
FIG. 30B illustrates a process for determining whether tampering of an HVAC wire is indicative of an attempt to obviate DR programming according to an embodiment.

As mentioned, FIG. 30B illustrates a process 3050 for determining whether tampering of an HVAC wire is indicative of an attempt to obviate DR programming according to an embodiment. In operation 3052, it is determined whether the energy consumer associated with the device (e.g., paired with the device) is enrolled in a DR program. If so, then this may weigh against a determination of compliance as the energy consumer may have a motive to obviate the DR programming. In operation 3054, it is determined whether the energy consumer associated with the device is participating in a DR event. If so, then this may weigh against a determination of compliance as the energy consumer may have a motive to obviate the DR programming. In operation 3056 it is determined whether the tampering occurred after a DR event notification. If so, then this may weigh against a determination of compliance as the energy consumer may have notice of an upcoming DR event and thus a motive to obviate the upcoming DR programming. In operation 3058 it is determined whether there has been a change in HVAC. For example, it may be determined whether a new HVAC has been installed, or the device has been installed at a different HVAC. If so, then this may weigh in favor of a determination of compliance as there may be justified reason for the appearance of tampering. In operation 3060 it is determined whether there is change in device ownership. For example, it may be determined whether a user account paired with a device becomes unpaired with device, and/or whether a new user account is paired with the device. If so, then this may weigh in favor of a determination of compliance as there may be justified reason for the appearance of tampering. In operation 3062 it is determined whether the environmental conditions in the structure (e.g., temperature, humidity, etc.) vary during a DR event as expected. For example, based on the DR implementation profile, structural characteristics (i.e., thermal retention characteristics), HVAC capacity, and outside weather, changes to the environmental conditions inside of the structure in response to programmed environmental (temperature/humidity) changes by the HVAC may be estimated. Environmental sensors in the structure may be used to determine whether the actual environmental conditions inside of the structure change as estimated. If so, then this may weigh in favor of a determination of compliance since the environmental conditions inside of the structure are changing as they should if the HVAC were being controlled as expected. In operation 3064 it is determined whether other factors suggest non-compliance. This may be any one or more of a variety of factors, such as whether a real-time occupancy sensor indicates the structure is occupied, whether the energy consumer changed the DR event-modified setpoints to perform less aggressive energy shifting immediately prior to the detected tampering, or changed the setpoints to be perform much more aggressive energy shifting immediately after detecting the tampering, etc.

It should be recognized that although the process described with reference to FIG. 30A includes making definitive determinations of compliance or non-compliance, in some embodiments a probability of compliance ranging from non-complaint (e.g., 0%) to full compliance (100%) may be determined, where each of the factors may impact either a probabilistic findings of non-compliance or compliance. The factors may be equally or non-equally weighted.

Further, it should be appreciated that the specific operations illustrated in FIGS. 30A and 30B provide a particular process for determining whether an energy consumer has complied with participation in a DR event according to an embodiment. The various operations described with reference to FIGS. 30A and 30B may be implemented at and performed by one or more of a variety of electronic devices or components described herein. For example, they may be implemented at and performed by a thermostat 202, an access device 266, or other electronic device described in accordance with the smart home environment 200, or one or more electronic components at energy management system 130, utility provider computing system 120, or other entity of system 100. Other sequences of operations may also be performed according to alternative embodiments. For example, alternative embodiments of the present invention may perform the operations outlined above in a different order. Moreover, the individual operations illustrated in FIGS. 30A and 30B may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 31A:
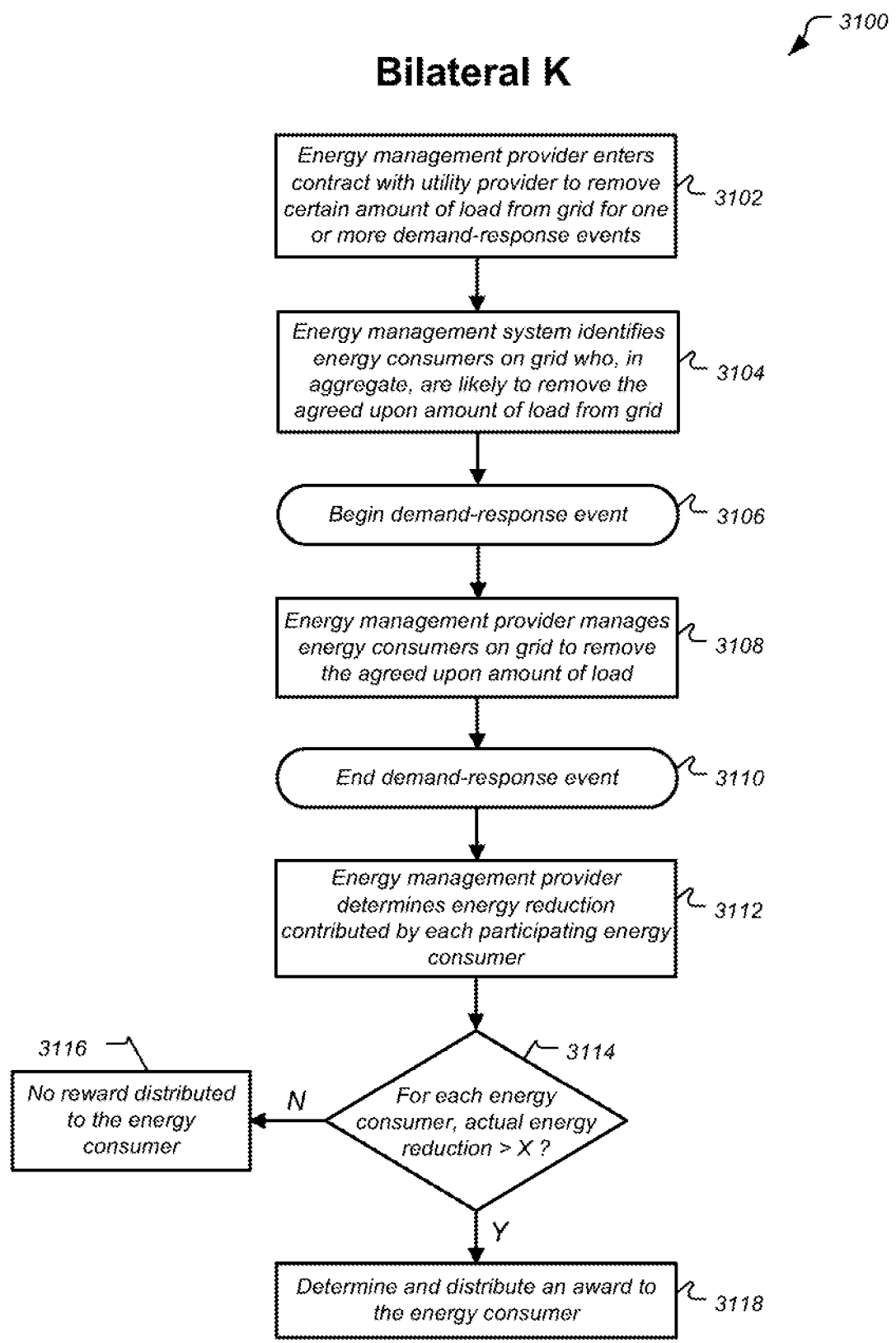
FIG. 31A illustrates a process for an energy management to manage energy in accordance with a bilateral contract between an energy manager associated with the energy management system and a utility provider associated with a utility provider computing system according to an embodiment.
Figure 31B:
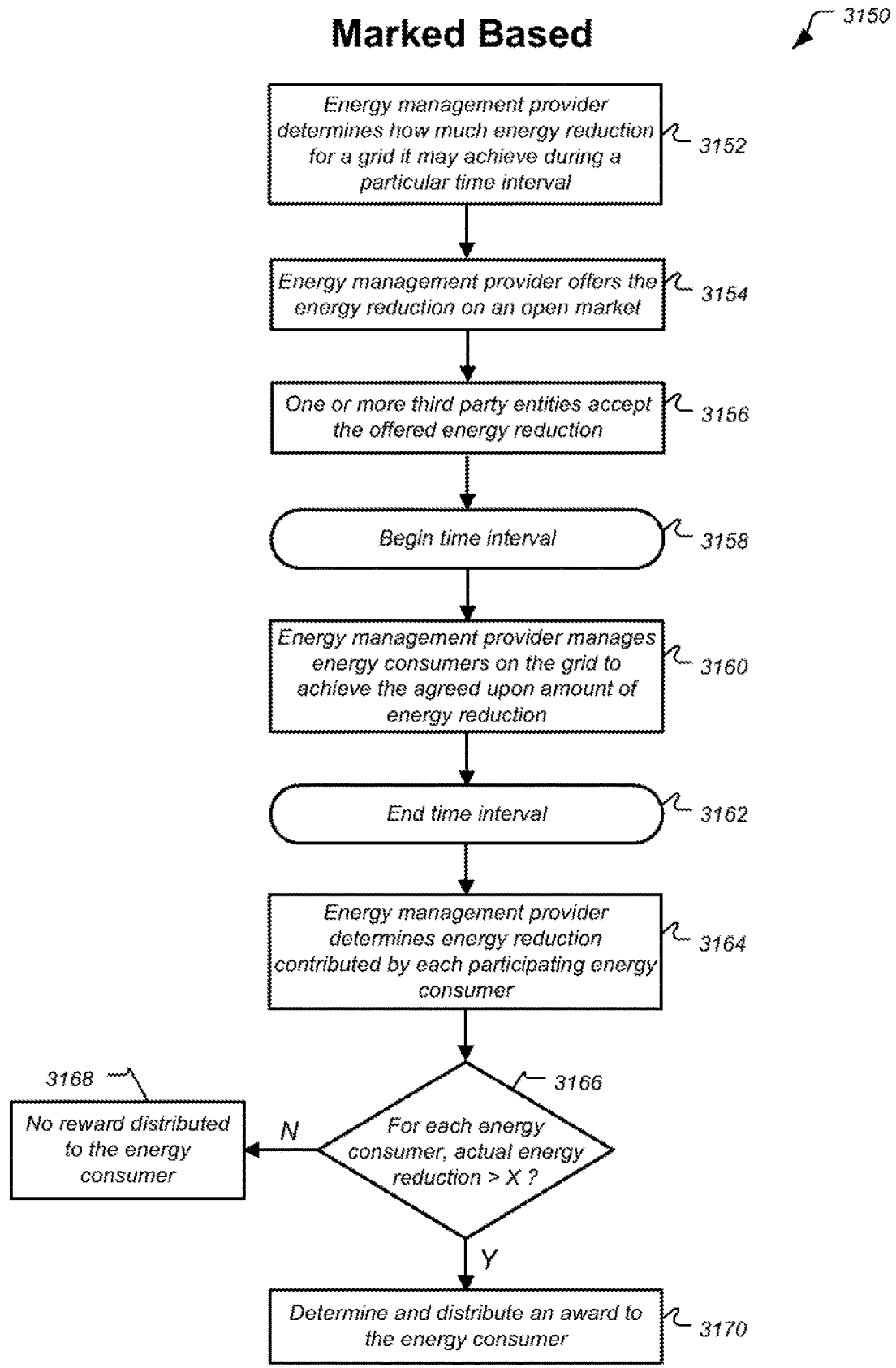
FIG. 31B illustrates a process for an energy management to manage energy in accordance with a marked-based sale of energy reduction according to an embodiment.

As described with reference to FIG. 1, the energy management system 130 may manage the energy consumption for a number of different residences 150A-150N. In managing that energy consumption, the energy management system 130 may predict the likely amount of an energy reduction over a given period of time resulting from the energy management. While the energy management system 130 itself does not necessarily generate energy, the energy manager associated with the energy management system 130 may enter into a variety of different agreements with the utility provider associated with the utility provider computing system 120 in order to sell the reductions in energy. FIGS. 31A and 31B illustrate various processes by which the energy management system 130 and utility provider computing system 120 may manage energy.

Specifically, FIG. 31A illustrates a process 3100 for an energy management system (e.g., energy management system 130) to manage energy in accordance with a bilateral contract between an energy manager associated with the energy management system and a utility provider associated with a utility provider computing system (e.g., utility provider computing system 130) according to an embodiment. To facilitate understanding, the process 3100 is described with reference to FIG. 1 and FIG. 2, although it should be understood that embodiments of the process 3100 are not limited to the exemplary systems and apparatus described with reference to FIG. 1 and FIG. 2.

In operation 3102 the energy management provider enters into a contract with the utility provider to remove a certain amount of load from a grid for one or more demand-response events. For example, the utility provider associated with utility provider computing system 120 and the energy manager associated with energy management system 130 may enter into a contract for energy management system 130 to reduce the energy consumption on power distribution network 160 by a certain number of kWh over a particular duration (i.e., DR event period).

In operation 3104, the energy management system identifies energy consumers on the grid who, in aggregate, are likely to remove the agreed upon amount of load from the grid. For example, energy management system 130 may identify some of residences 150A-150N to participate in a DR program and DR event who, in the aggregate, are likely to reduce their energy consumption on the power distribution network 160 the contracted number of kWh over the DR event period.

In operation 3106 a demand-response event begins. For example, the beginning of a DR event period defined by a DR event profile may be reached. It should be recognized that the beginning of the DR event period may include the beginning of a pre-event energy management period.

In operation 3108 the energy management provider manages the energy consumers on the grid to remove the agreed upon amount of load. For example, the energy management system 130 may apply DR implementation profiles for the residences 150A-150N associated with the participating energy consumers. The DR implementation profiles may be generated to cause the participating energy consumers to, in the aggregate, reduce their energy consumption by the amount agreed upon and defined in the contract described with reference to operation 3102.

In operation 3110 the demand-response event ends. For example, the end of a DR event period defined by a DR event profile may be reached. It should be recognized that the end of the DR event period may include the end of a post-event energy management period.

In operation 3112 the energy management provider determines the energy reduction contributed by each participating energy consumer. For example, for each residence 150A-150N associated with an energy consumer that at least partially participated in the DR event, the energy management provider may determine the amount of energy reduced at that residence during the DR event period as compared to what the energy consumer would have consumed but-for its participation in the DR event.

In operation 3114 it is determined, for each energy consumer, whether the actual energy reduction is greater than some threshold amount. The threshold amount may be zero or some energy value greater than zero. If it is determined that the actual amount of energy reduction does not exceed the threshold, then processing may continue to operation 3116 where it is determined that no reward is distributed to the energy consumer. In contrast, if it is determined that the actual amount of energy reduction exceeds the threshold, then processing may continue to operation 3118 where an award is determined and distributed to the energy consumer. The award may be relative the amount of energy reduction achieved by the energy consumer, such that if the energy consumed reduces a greater amount of energy compared to another consumer they will be awarded a greater reward computer to the other consumer. In other embodiments, all energy consumers that meet some threshold of energy reduction may receive the same reward.

FIG. 31B illustrates a process 3150 for an energy management system (e.g., energy management system 130) to manage energy in accordance with a market-based sale of energy reduction according to an embodiment. To facilitate understanding, the process 3150 is described with reference to FIG. 1 and FIG. 2, although it should be understood that embodiments of the process 3150 are not limited to the exemplary systems and apparatus described with reference to FIG. 1 and FIG. 2.

In operation 3152 the energy management system 130 determines how much energy reduction for a grid it may achieve during a particular time interval. For example, the energy management system 130 may determine how much energy consumption can be reduced by one or more energy consumers associated with structures 150A-150N.

In operation 3154 the energy management provider offers the energy reduction on an option market. The energy management provider may offer the energy reduction as an amount of energy reduction (e.g., number of kWh) that may be achieved on a particular grid (e.g., power distribution network 160) during a particular time interval (e.g., a particular date and time interval). In some cases the offered energy reduction may also be accompanied by a probability of the reduction being achieved (e.g., there is a 95% probability that 50 kWh of energy can be reduced on the grid over the period from 2 pm-6 pm on a particular day)

In operation 3156 one or more third party entities accept the offered energy reduction. The entity may be any one or more of a variety of entities, such as a utility provider associated with the utility provider computing system 120, one or more power operators associated with electrical power generators 110A-110N, etc. As a result of the third party entity accepting the offer, the third party entity and the energy management provider may enter into a contract for the energy management provider to reduce the amount of energy consumption consumed at the residences 150A-150N similar to that described in operation 3102. Further, once the contract has been entered into, a DR event may begin, the energy management system 130 may manage energy, and then rewards may be distributed, as described in operations 3158-3170, which are similar to operations 3106-3118, so further description is omitted.

It should be recognized that one or more entities may determine and provide rewards to the energy consumers. For example, the energy management system 130 may determine and provide rewards, and/or the utility provider computing system 120 may determine and provide rewards. In some cases, the rewards may be monetary. For example, the energy management system 130 may provide credits towards energy bills that are sent to the energy consumers for the energy consumption. In other cases the rewards may be points. For example, the energy management system 130 may award points which may subsequently be traded for goods or services.

In at least one embodiments, points may be used as a normalizer. For example, energy consumers may attempt to obviate DR programming by putting their scheduled setpoints at points that are less energy efficient (e.g., lower temperatures on hot days) than what the energy consumer is actually comfortable at. A resulting DR implementation profile, looking only at the energy consumer's scheduled setpoints, presumes that the setpoints are set at temperatures the energy consumer deems comfortable, and adjusts the setpoints from those temperatures. Accordingly, the energy consumer ends up being compensated for the resulting discomfort of setpoints placed at temperatures higher than may be comfortable for the DR event period. However, if the energy consumer sets their scheduled setpoints to temperatures below what they're actually comfortable at, the DR implementation profile may inadvertently set their DR event-modified setpoints to temperatures that the energy consumer is actually comfortable at.

To obviate such behavior, an 'average' setpoint temperature may be determined. This may be determined using the setpoint temperatures of similarly situated energy consumers (e.g., other energy consumers having structures with similar thermal retention characteristics, similar cooling capacities, similar outside weather patterns, similar occupancy profiles, etc.). The average setpoint temperature may be determined using a number of similarly situated energy consumers so that the setpoint temperatures that likely correspond to what most people deem 'comfortable' may be determined. In the event an energy consumer sets their scheduled setpoints to consume more energy than the average setpoints (e.g., in hot weather, they may be set lower than average), it may be deemed that the energy consumer is possibly a 'bad actor' and thus entitled to fewer points upon successful completion of a DR event than an energy consumer that sets their scheduled setpoints to consume the same energy or less energy than the average setpoints. Accordingly, points may be used as a way to normalize the behavior of energy consumers. Other techniques for obviating such behavior may also or alternatively be implemented. For example, a history of the user's scheduled setpoints may be compared to altered setpoints, and if the altered setpoints differ significantly (e.g., more than a number of degrees) it may be deemed that the energy consumer is possibly a 'bad actor'.

In at least one embodiment, points may be used as incentive to not only incentivize positive individual behavior, but also or alternatively to incentivize positive group behavior. For example, energy consumers may be associated into groups. The groups may be, e.g., friends, colleagues, geographically defined (within a same ZIP code), structurally defined (all tenants of an apartment complex), etc. Groups may be defined by the energy consumer (e.g., one energy consumer can associate themselves with another energy consumer), or may be defined by a third party (e.g., the energy management system 130 may define a group including specified energy consumers). If a group then achieves some particular goal, such as reducing their aggregate energy consumption for a particular DR event by a certain amount, they may receive an additional reward that is in addition to what they receive for their individual contributions to the energy reduction.

In some cases, points do not need to necessarily be awarded only based on an amount of energy consumption reduction. Rather, points (or other goods or services of value) may be awarded based on an energy consumer's good behavior. For example, points may be awarded if users participate in one or more DR events, if they successfully participate in at least a certain percentage of DR events in a program, if they maintain a temperature at some average temperature for a particular time period (where the average may be defined by similarly situated energy consumers), if they consume less than some threshold amount of energy over the course of a DR event (where the threshold may be set as an average amount based on similarly situated consumers, based on utility capacity, etc.), or for other positive behavior.

In some embodiments, points may be used as a currency. For example, points may be traded for goods or services. In at least one case, points may be used to enter into a sweepstakes. For example, the energy management provider may hold a sweepstakes for certain goods or services, and a certain number of points may be traded by an energy consumer to the energy management provider for one or more entries into the sweepstakes. Further, points may also be used to grant a ranking or status. For example, the a particular status or level may be associated with different aggregate numbers of points, where increased levels identify an increased status, but are only achieved after certain threshold(s) of points have been accumulated.

In at least one embodiment, various models for incentivizing participation in a DR program or DR event may be used. These may include, e.g., a punishment model, a reward model, and a subscription model. In a punishment model an energy consumer may receive a high reward for successfully completing a DR event, and being given a limited number of opt-outs. After they expend those limited opt-outs, however, they get punished (e.g., reward reductions, higher utility fees, etc.) for each additional opt-out. In a reward model, the energy consumer may receive a medium-size reward for each DR event they successfully complete. In this case, there would be no punishment for opting-out, but they would also not receive high rewards for each successful DR event. In a subscription model the customer may receive a constant, low, period reward for them to enroll in the DR program. The customers may not participate in all of the DR events, or may not participate in any DR event. However, there is no monitoring, no rewards, and no punishment.

It should be appreciated that the specific operations illustrated in FIGS. 31A and 31B provide particular processes for an energy management system to manage energy in accordance with different types of contracts. The various operations described with reference to FIGS. 31A and 31B may be implemented at and performed by one or more of a variety of electronic devices or components described herein. For example, they may be implemented at and performed by the energy management system 130, the utility provider computing system 120, one or more residences 150A-150N, etc. Other sequences of operations may also be performed according to alternative embodiments. For example, alternative embodiments of the present invention may perform the operations outlined above in a different order. Moreover, the individual operations illustrated in FIGS. 31A and 31B may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

As described with reference to FIG. 2, a number of intelligent, network-connected devices (e.g., thermostat 202) may be incorporated in a smart-home environment 200 and in communication with an energy management system 130 (e.g., remote server 264) that is disposed as an intermediary between the smart home environment 200 and a utility provider associated with utility provider computing system 120. Generally speaking, a typical smart home will usually have at least one high-speed broadband connection to the outside world, such as may be provided by an Internet Service Provider (ISP), and such as indicated by the link shown in FIG. 2, supra, between wireless router 260 and network 262 (e.g., the Internet). Generally speaking, these high-speed broadband connections to the outside world will be characterized by very high speeds, low network latencies, and generally high reliability, especially in view of growing consumer dependence on high-speed broadband for home entertainment and other data communications needs. In some embodiments the smart home environment 200 includes a smart meter 218. The smart meter 218 monitors some or all energy (electricity, gas, etc.) consumed by the devices in and around the structure 250, and may provide such raw data to the utility provider using some type of data communications link. However, likely due in significant part to the relatively uneven historical development and adoption patterns of smart meter infrastructures, the data communications link between the smart meter 218 and utility provider (which can take various forms based on telephone lines, special-purpose wireless metropolitan-area networks, powerline communications, etc.) can sometimes be characterized by slow data rates, long latencies, and uneven reliability. Thus, for example, some wireless implementations known in the art tend to be problematic in that the smart meter 218 provides updates to the utility provider only after long time intervals. Further yet, some wireless implementations known in the art also tend to be problematic in that they raise health concerns due to the strong RF fields propagated by the smart meter 218 in order to reach a receiving station. Provided according to one or more embodiments herein is a method for providing improved data communications between the smart meter 218 and the associated utility provider by forming an alternative data communication channel between the smart meter 218 and one or more of the intelligent, network-connected devices inside the smart home (e.g., thermostat 202), wherein the smart-home device then transmits the raw data to the utility provider through the smart home's high-speed broadband connection. In some embodiments, the alternative data communication channel can be provided by implementing a low-power RF connection (for example, using ZigBee, 6LowPAN, WiFi, NFC, etc.) between the smart meter 218 and one or more electronic devices of the smart home environment 200 (e.g., thermostat 202). In other embodiments, wired communications paths can be used. In such a case, real-time status updates may advantageously be communicated to the utility provider computing system 120 from the smarter meter 218 via another electronic device in the smart home environment 200 (e.g., thermostat 202), router 260, network 262, and remote server 264/energy management system 130.

Figure 32:
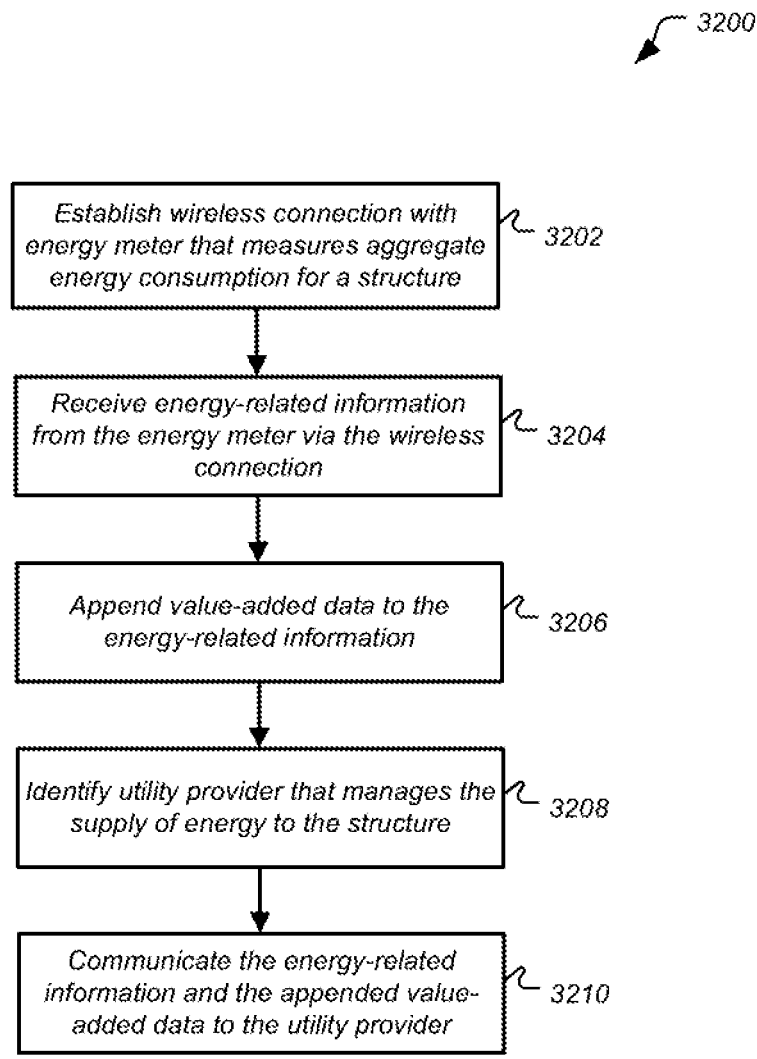
FIG. 32 illustrates a process for passing and supplementing information from an energy consumption meter to a utility provider computing system via an energy management system according to an embodiment.

FIG. 32 illustrates a process 3200 for passing and supplementing information from an energy consumption meter to a utility provider computing system via an energy management system according to an embodiment. For example, information generated by and stored at the smart meter 218 may be read by thermostat 202, communicated from thermostat 202 to energy management system 130, and communicated from energy management system 130 to utility provider computing system 120.

In operation 3202 a wireless connection is established with the energy meter that measures aggregate energy consumption for a structure. For example, a wireless connection may be established between thermostat 202 and smart meter 218.

In operation 3204 energy-related information is received from the energy meter via the wireless connection. For example, information indicating the aggregate energy consumption for any given period of time at the structure may be communicated from the smart meter 218 to the thermostat 202.

In operation 3206 value-added data is appended to the energy-related information. The energy management system monitors and generates a variety of energy-related information such as a current inside temperature or humidity of the structure, a thermal retention characteristic of the structure, an HVAC capacity of an HVAC associated with the structure, an estimated or actual energy reduction associated with the structure before, during, or after a DR event, whether a structure is enrolled in a DR program or volunteered to participate in a DR event, an amenability of the residents of the structure to load shifting, a baseline, etc. Any or all of this information may be appended to the basic information generated by the smart meter 218 (i.e., aggregate energy consumption). This additional information may be used by the utility provider computing system to perform a variety of functions, such as deciding whether to issue a DR event, the scope of DR event, the magnitude of a DR event, etc. Accordingly, in operation 3206, such information may be added (either at the structure or at the energy management system 130) to the energy-related information acquired from the smart meter 218.

In operation 3208 a utility provider that manages the supply of energy to the structure is identified. For example, the energy management system 130 may determine that the utility provider computing system 120 provides power to the smart home environment 200 (i.e., a particular residence 150A-150N over the power distribution network 160. In one embodiment, the identity of the utility provider may be included in the information communicated from the smart meter 218.

In operation 3210 the energy-related information and the appended value-added data is communicated to the utility provider. For example, the energy management system 130, after appending the value-added data to the information received from smart meter 218, may communicated both sets of information to the utility provider 120. In some embodiments, such information may be communicated in real-time, or in very short intervals (e.g., every 30 seconds), so as to provide the utility provider with a real-time perception of the energy consumption characteristics of the smart home environment 200.

It should be appreciated that the specific operations illustrated in FIG. 32 provide a particular process for passing and supplementing information from an energy consumption meter to a utility provider computing system via an energy management system according to an embodiment. The various operations described with reference to FIG. 32 may be implemented at and performed by one or more of a variety of electronic devices or components described herein. For example, they may be implemented at and performed by the energy management system 130, one or more residences 150A-150N, etc. Other sequences of operations may also be performed according to alternative embodiments. For example, alternative embodiments of the present invention may perform the operations outlined above in a different order. Moreover, the individual operations illustrated in FIG. 32 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

FIGS. 33A-33E show several screen shots that illustrate a demand response program enrollment process for an energy consumer who has a network-connected device (e.g., thermostat 202) in his or her structure (e.g., residence). These illustrative screen shots may embody enrollment step 702 of FIG. 7 and may be managed by the energy management system (e.g., system 130 of FIG. 1). Having the energy management system, as opposed to the utility company (e.g., utility provider computing system 120 of FIG. 1), manage the enrollment process reduces the management overhead for the utility company. The utility may be able to approve or disapprove potential applicants, but the energy management system can manage all other aspects of the enrollment process.

A user may be presented with screen 3310 in response to selecting a link to enroll in a demand response program. For example, the link may be provided in an email, displayed as a notification on a website, or as an option in an application. Screen 3310 can ask the user to enter his or her login credentials to begin the enrollment process. Screen 3310 can identify utility company at location 1312 that is offering the demand response program. After the user has entered the login information, the energy management system can verify that the user's networked-connected device is installed properly, is online (e.g., connected to network 140), controls an HVAC unit, and/or is running a particular version of software. Once verified, screen 1320 can be presented. Screen 3320 can include information relating to the demand response program.

Screen 3330 asks the customer to provide account information related to his or her account with the utility company. As shown, fields for name, address, city, state, zip code, and account number may be provided. In addition, the user may be required to agree to the terms of service (by selecting a box) before signing up for the program. After the user has entered his information and agreed to the terms of service, screen 3340 may be displayed. Screen 3340 can ask the user to enter information for where his or her rewards check should be mailed. The user can select the "same as account address" box or enter a new address.

Figure 33A:
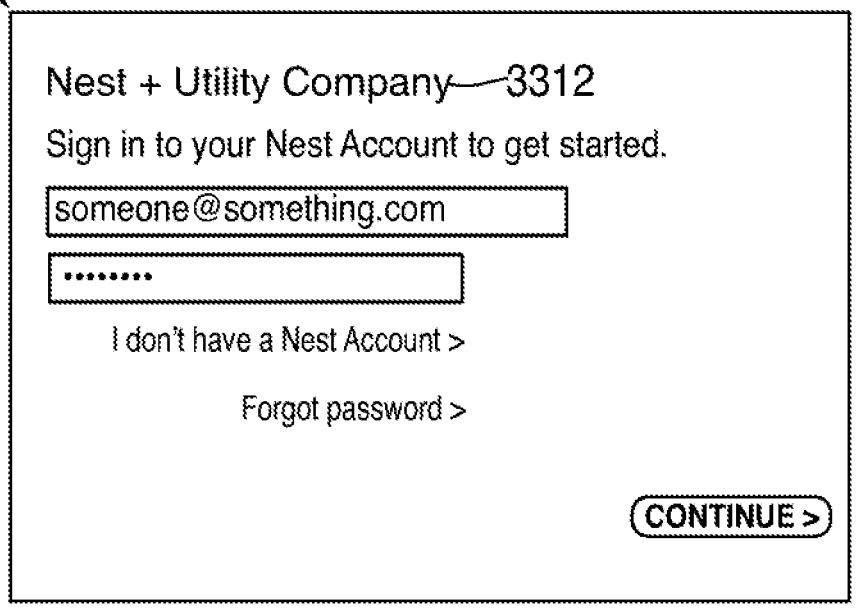
FIGS. 33A-33E show several screen shots that illustrate a demand response program enrollment process for an energy consumer who has a network-connected device according to various embodiments.
Figure 33B:
Figure 33C:
Figure 33D:
Figure 33E:
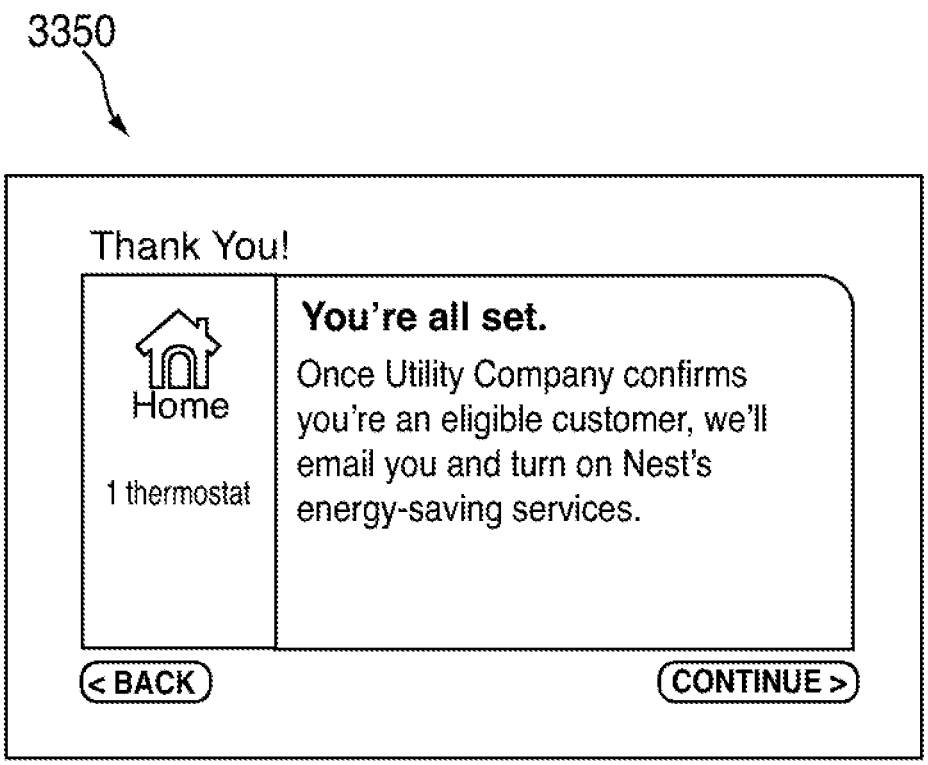

Screen 3350 of FIG. 33E may display information indicating that the user has successfully entered the account information and awaiting confirmation as an eligible customer by the utility company. After the utility company approves that the user is eligible for enrollment, the energy management system can send an email notifying the user and activating energy-saving services. In one embodiment, the approval of a customer's eligibility may be performed manually. A discussion in which the utility company manually approves a customer's eligibility is discussed below in more detail in connection with FIGS. 34A and 34B.

In another embodiment, the approval of a customer's eligibility may be performed automatically. In this embodiment, an application programming interface (API) may be integrated into an enrollment screen (e.g., a different version of screen 3330) that enables the customer to include login and password information for his or her utility company. The API can use the login and password information to confirm in real-time whether the customer is eligible. Real-time confirmation of eligibility can enable the energy management system to display a confirmation screen (e.g., as an alternative to screen 3340) that actually confirms eligibility of the customer as part of the initial enrollment process. In this embodiment, no confirmation email is required, but it could be provided as a courtesy.

Figure 33F:
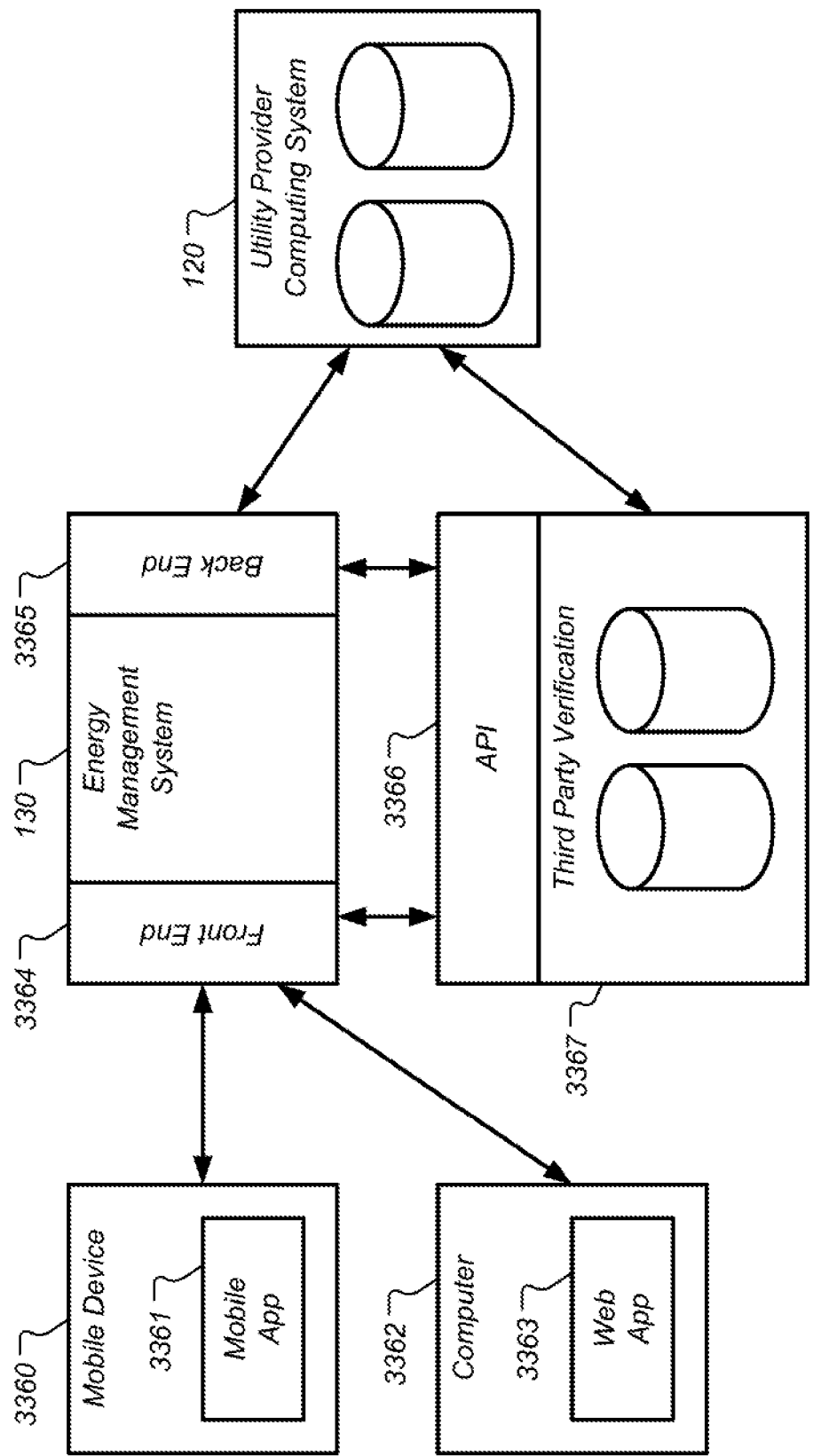
FIG. 33F illustrates a simplified block diagram for a streamlined method of enrolling customers and devices in a DR program, according to some embodiments.

FIG. 33F illustrates a simplified block diagram for a streamlined method of enrolling customers and devices in a DR program, according to some embodiments. In the embodiments described above, in order to enroll users or devices into a DR program, the user had to provide information at the time of enrollment that would identify a user account with the utility provider. For example, a user would need to supply an account number for the utility provider to the energy management system 130 so that the utility provider computing system 120 could match the request to an existing customer account. While embodiments requiring information such as a customer account number may work for the vast majority of enrollment scenarios, a small number of enrollment attempts could be unsuccessful. First, providing an account number may lead to what is referred to as a "leaky funnel problem." A user may begin enrolling in the DR program with the intent to participate. However, during the enrollment process, the user could be asked for information that is not readily available. An account number for the utility provider is not typically something that users will have memorized or readily on hand. In order to enter the account number, users would have to find a statement from the utility provider and/or look up their account number online. This may interrupt the enrollment process while users attempt to find their account numbers. The problem lies in the fact that many users will begin the DR enrollment process, interrupt the process in order to find an account number, and never subsequently resume the process.

Another difficulty with some existing enrollment processes can be characterized by a lack of immediacy. Because enrollment is facilitated through the energy management system 130, information needs to be verified by the utility provider computing system 120 before the energy management system 130 can approve the user/device for participation in the DR program. Users may have all the needed information on hand for the enrollment process and may only take a few moments to fill out the enrollment information. However, this enrollment information then has to pass through energy management system 130 for approval at the utility provider computing system 120. Because these approvals could happen off-line, the approval process could take from one to two days to as long as a week. If the user entered incorrect information, or if the utility provider computing system 120 was unable to find a matching account, the user enrollment could be rejected long after the enrollment process began. Not only would such a rejection be confusing for potential enrollees, but it could also result in a level of user frustration that would prevent users from correcting mistakes, finding missing information, or finishing the enrollment process.

The embodiment of FIG. 33F can eliminate these and other problems that may be faced by customers during enrollment process. While in some embodiments enrollment may take place using a web form or webpage interface, the embodiment of FIG. 33F uses an application ("app") interface. The app interface can be hosted on a number of different devices, which brings a common "look and feel" and user interface experience to users across different devices. For example, when using a mobile device 3360, such as a smart phone, tablet computer, PDA, laptop computer, and so forth, the mobile device 3360 can host a mobile app 3361 that can be downloaded readily from one of the many existing app stores. When using a traditional computer 3362 with a web browser, the same app interface can be hosted by a web browser as a web app 3363. Thus, the mobile app 3361 and the web app 3363 will look and operate substantially the same to user.

As described above, some enrollment processes require users to provide identifying information to the mobile/web app 3361, 3363 during the initial stages of the enrollment process. This information is then sent to the utility, where it is validated off-line to ensure that all the information matches an existing user account. This process did not happen in real time. In the embodiment of FIG. 33F, information from the mobile/web app 3361, 3363 can be sent to a front end 3364 of the energy management system 130. The energy management system can then immediately access a third-party verification service 3367 that can provide real-time verification of user data in order to approve the DR enrollment process. In some embodiments, the third-party verification service 3367 can provide an API 3366 or other web interface configured to accept user information. The third-party verification service 3367 can maintain one or more databases that store account information for one or more utility providers. Upon receiving user information, the third-party verification service 3367 can search its databases for existing utility provider customer information that matches the information received from the user. If a matching account is found with an existing utility provider, the third-party verification service 3367 can immediately return an indication that enrollment in the DR process is approved. Similarly, if no matching account is found with an existing utility provider, the third-party verification service 3367 can immediately return an indication that enrollment in the DR process cannot be approved at this time. In this case, the energy management system 130 can either require more information from the user, or can send a request directly to the utility provider computer system 120 to determine whether an existing account can be located.

The third-party verification service 3367 can sync information stored in its databases with information from the utility provider computer system 120. Typically, users will sign up for an account with the utility provider computer system 120. The utility provider computer system 120 will then transmit the new enrollee information to the third-party verification service 3367. In some cases, there may be a lag between when information for a new enrollee is entered into the utility provider computer system 120 and when it is synced with the third-party verification service 3367. In some embodiments, enrolling a new user with utility provider computer system 120 may send an immediate message to the third-party verification service 3367 containing a data structure that includes the new user information such that there is no appreciable difference between the information stored at the utility provider computer system 120 and the third-party verification service 3367.

In some embodiments, JSON objects can be passed back and forth between the energy management system 130 and the third-party verification system 3367. For example, a POST operation to the API 3366 can include an object formatted as:

```
{"customers":
    [{
        "full_name": "Jane Doe", // user's full name as it appears on
        the utility bill
        "address": "345 4th Ave, San Francisco, CA 94102"
        // utility address
        "utility_account": "12345" // [optional] if not specified,
        use only name/address
    }]
}
```

Note that this JSON object only requires a bare minimum amount of information from a user, such as a name and an address. While this JSON object can include an account number, it is not mandatory. If the JSON object does not include an account number, the third-party verification service 3367 will attempt to locate the user account using only the name and address. In response to receiving the POST command above, the API 3366 can return a JSON object, such as the following:

```
{"customers":
    [{
        "full_name": "Jane Doe",
        "address": "345 4th Ave, San Francisco, CA 94102"
        "utility_account": "12345"
        "customer_id": "opaque-identifier",
        "eligible": true
    }]
}
```

The customer array can be returned in the same order as in the original POST request. This allows each field in the JSON customers object to be mutable. Note that the JSON object returned may include two additional fields. In addition to adding the utility account number if it was not present in the original POST request, the API 3366 can return a customer ID with an opaque identifier for this particular user and an eligibility field having a value of "true" if the customer is eligible for DR, and "false" otherwise. Additionally, any other field in the customer object may be changed. This may indicate that the field's value has been changed at the third-party verification service 3367 and that it should be updated locally at the energy management system 130 to match. This can be used, for example, when a user's address changes.

In some embodiments, additional fields may be added, such as an error field with an error code when the request is invalid. In some embodiments, these error codes can better inform a customer as to why he/she is ineligible for enrollment. For example, an error code could include a text indication such as "We could not confirm your account number—please contact your energy provider." Once the energy management system 130 has linked the customer ID provided by the API 3366 with a user account at the energy management system 130, the energy management system 130 can then make requests to the API using the customer ID. This can speed up retrieval of user account information because the third-party verification service 3367 will be able to index user account information using the customer ID without needing to search through account numbers, addresses, and/or names. This can also enable single sign-on (SSO) within the domain of the energy management system 130.

If the verification through the third-party verification service 3367 is successful, the user can be fast tracked to the end of the enrollment procedure and presented with a set of terms and conditions to accept. If the third-party verification system 3367 is unable to locate a matching account for the user, the energy management system 130 can forward the information provided from the mobile/web app 3361, 3363 to the utility provider computing system 120 for off-line approval according to the process described above.

Figure 33G:
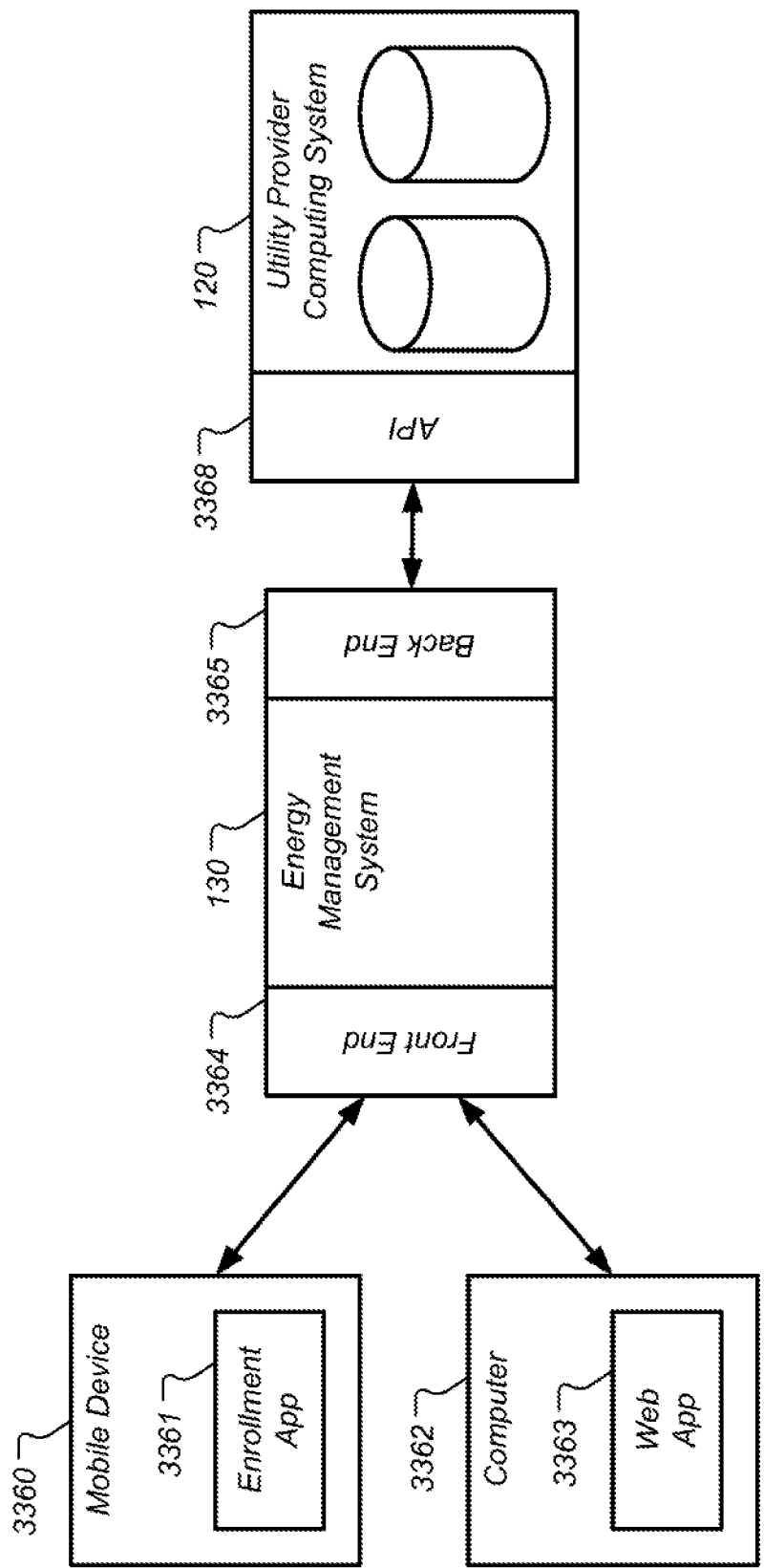
FIG. 33G illustrates a simplified block diagram of a streamlined system for performing DR enrollment, according to some embodiments.

FIG. 33G illustrates a simplified block diagram of a streamlined system for performing DR enrollment, according to some embodiments. In this embodiment, the third-party verification service 3367 of FIG. 33F has been replaced by an API 3368 provided by the utility provider computing system 120. This embodiment operates in the same manner as the embodiment of FIG. 33F, but instead of sending the user information to the third-party verification service 3367, the user information can be sent directly to an API provided by the utility provider computing system 120. This API 3368 can match a user's name and utility address with any existing user account at the utility provider. If the account cannot be located, the utility provider computing system 120 can return a JSON object with an error code that causes the energy management system 130 to notify the user that the enrollment was unsuccessful, or to request an account number from the user.

Figure 33H:
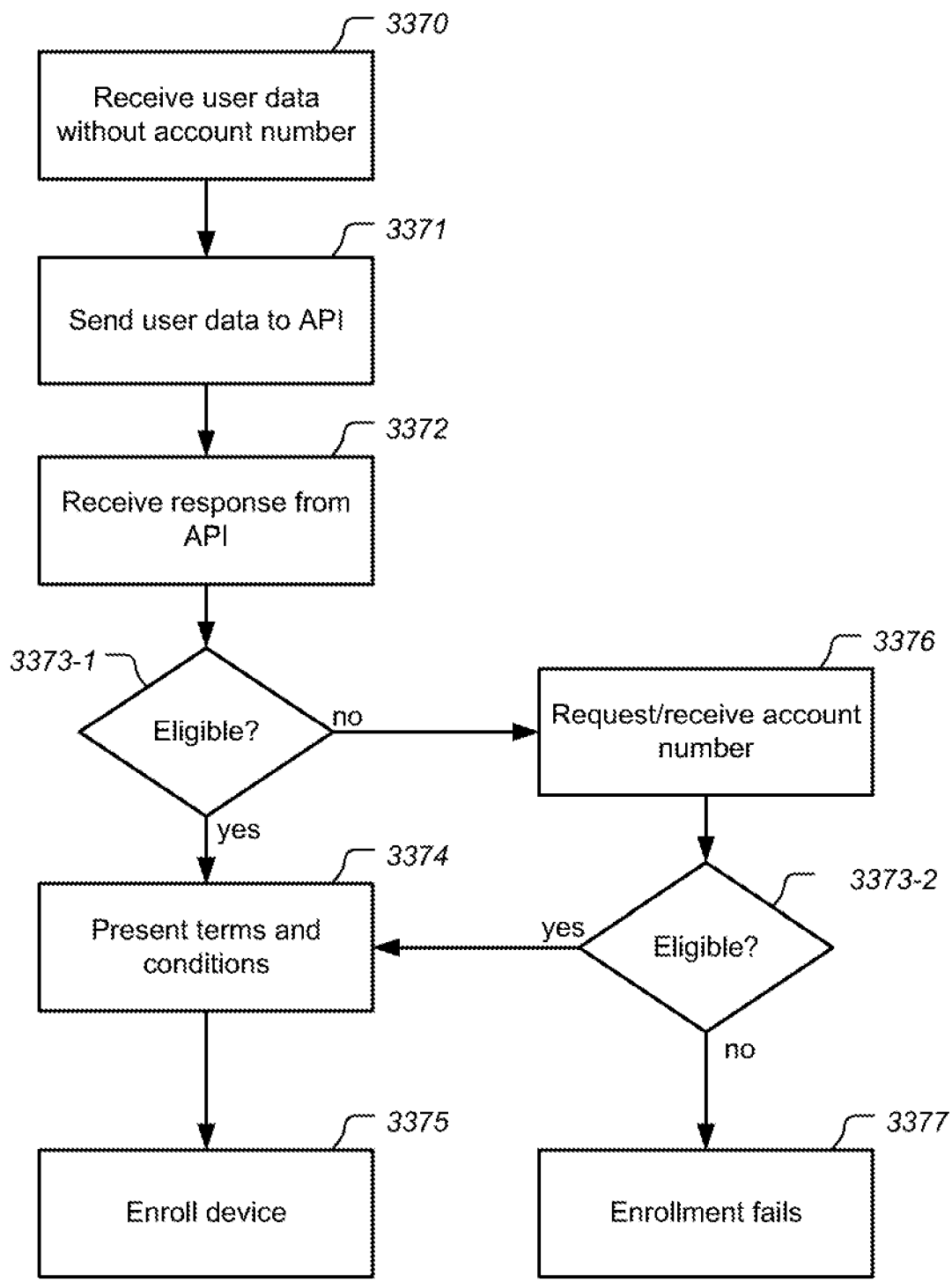
FIG. 33H illustrates a flowchart of a method for streamlined DR enrollment, according to some embodiments.

FIG. 33H illustrates a flowchart of a method for streamlined DR enrollment, according to some embodiments. The method may include receiving user data without an account number (3370). Note that in some embodiments, an account number may also be included, but it is not mandatory at this stage of the enrollment process. The method may also include sending user data to an API (3371). The API may be provided by a third-party verification service that aggregates account information for one or more utility providers. The API may also be provided by a particular utility provider. The method may additionally include receiving a response from the API (3372). The response may include additional information retrieved from a matched user account, such as an account number. The response may also include a customer ID that can be used to uniquely identify the customer at the energy management system and at the API. The response may include an indication of whether the user data can be matched to an existing user account, and whether the existing user account is eligible for DR enrollment. In some embodiments, the response received from the API may be in real time, requiring a delay of less than 10 seconds, less than 20 seconds, less than 30 seconds, and/or the like.

If the API indicates that the user data is eligible for DR enrollment (3373-1), the energy management system can streamline the registration process and present the user with terms and conditions that may be accepted at the user's device (3374). If the terms and conditions are accepted, the device can be enrolled in the DR program of the utility provider (3375). In some embodiments, instead of enrolling individual devices, the entire enclosure (e.g., the customer's home) would be enrolled. In these embodiments, all qualifying thermostats within the enclosure would be enrolled. If the API indicates that the user data is not eligible for DR enrollment (3373-1), it likely means that an existing account could not be matched to the limited user data (e.g., name and/or utility address) sent to the API. At this point, a utility account number can be requested from the user and received at the energy management system (3376). Using the account number, the energy management system can send a second request to the API to determine in real time if the user is eligible for DR enrollment. Alternatively or additionally, the energy management system can send the account number to the utility provider directly for off-line verification and return a response indicating that the energy management system is waiting for verification by the utility provider. If enrollment fails (3377), then the user can be provided with an indication that they are not eligible for DR enrollment. If enrollment using the account number is successful (3373-2), then the user can be presented with the terms and conditions (3374) and the device and/or the enclosure (including all devices) can be enrolled (3375).

Figure 33I:
FIG. 33I illustrates a user interface 3378 for a web/mobile app for streamlined DR enrollment, according to some embodiments.

FIG. 33I illustrates a user interface 3378 for a web/mobile app for streamlined DR enrollment, according to some embodiments. Interface 3378 is similar to a previously presented user interface, the difference being that an account number is not required from a user. In some embodiments (not shown), and account number field may be presented to a user with an indication that it is optional. Additionally, interface 3378 may be provided as an app on either a mobile device or hosted on a web browser. Interface 3378 only requires a minimal amount of information from a user, and that information should be readily available to the user without requiring the user to look up any information online or on a utility account statement.

Figure 33J:
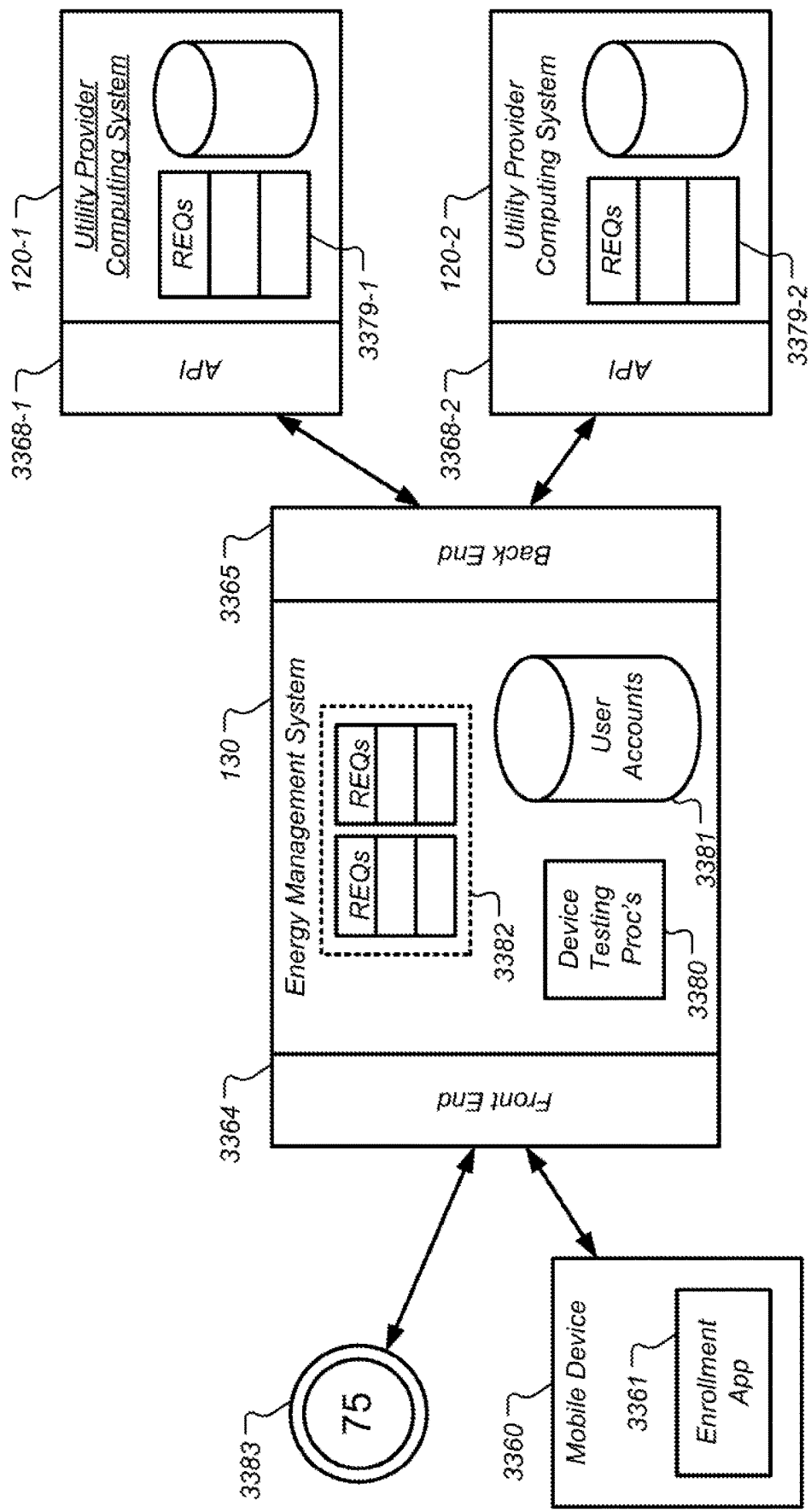
FIG. 33J illustrates a block diagram of a system for enforcing system requirements for DR enrollment, according to some embodiments.

FIG. 33J illustrates a block diagram of a system for enforcing system requirements for DR enrollment, according to some embodiments. Thus far, the streamlined enrollment process has focused on verifying user data and matching user data to an existing user account at a utility provider. However, some utility providers may impose hardware requirements in addition to matching an existing user account. For example, a utility provider could require a user to have a thermostat connected to Wi-Fi. A utility provider could require a thermostat connected to an air conditioner. A utility provider could require a thermostat connected to a gas heater or an auxiliary/secondary heating system. In some cases, the energy management system may also impose hardware requirements on a device for DR enrollment. For example, an energy management system may require a certain hardware version of the thermostat, or a recent software version operating on the thermostat. The energy management system may require the thermostat to be registered through a warranty system. The energy management system may require multiple thermostats, or a combination of a thermostat, hazard detector, and/or security system device. In short, the energy management system and/or the utility provider may each have their own requirements for a device and/or enclosure (including all eligible devices) to be enrolled in a DR program.

In FIG. 33J, each utility provider computing system 120 can send a set of requirements 3379 to the energy management system 130. During a DR enrollment process, the energy management system 130 can check a set of locally stored requirements 3382 and verify that a user device 3383 complies with the requirements 3382 corresponding to a particular utility provider 120 with which the user is registered. In some embodiments, a set of device testing procedures 3380 can be carried out remotely on the user device 3383 and/or other user devices registered to the user. For example, the device testing procedures 3380 can query the user device 3383 to determine a software version number or to retrieve a hardware version number. Alternatively or additionally, the energy management system 130 can store information in a plurality of user accounts 3381 regarding the user device 3383. For example, the user accounts 3381 can store a hardware version and/or software version associated with the user device 3383. In this case, the energy management system 130 can simply check information stored in the user accounts 3381 to verify that any hardware requirements of the user device 3383 are met.

In some embodiments, the utility provider can provide the energy management system 130 with a set of criteria for enforcement that does not require an electronic connection with the energy management system 130. Instead, the utility provider can provide requirements to the energy management system 130 in written or electronic format, and the information can be manually and/or automatically imported into the energy management system 130. The energy management system 130 can then filter out any homes that do not meet a minimum set of eligibility criteria. As with the enrollment scenarios described above, these embodiments can enroll an entire enclosure with all eligible devices installed therein. For example, the energy management system 130 can enroll any homes that include at least one device that controls an air-conditioning unit and at least one device that is connected to the Internet and which has a minimum software version installed. Enforcement of the eligibility criteria is done by the energy management system 130 without requiring further involvement from the utility provider or the utility provider computer system 120.

In another embodiment (not shown), the requirements 3382 can be stored at the third-party verification service 3367 described earlier. When user data is sent to the third-party verification service 3367, it can also verify that the user device 3383 meets the requirements 3379 of the particular utility provider 120. In contrast to the embodiment described above, this embodiment can enforce the eligibility criteria without using the energy management system 130. In another embodiment (not shown) the utility providers 120 can verify that their requirements 3379 are met without requiring the energy management system 130 to store and/or verify such information. In some embodiments, the third-party verification service 3367 counsel provide its own set of eligibility criteria, which can be validated by the energy management system 130 or the third-party verification service 3367. Overall, the embodiment of FIG. 33J provides flexibility such that each utility provider can specify its own set of hardware requirements that would need to be met in order to be eligible for DR registration. For example, some utility providers may require both Wi-Fi and a connection to an air conditioner, while other utility providers may only require a connection to an air conditioner. One benefit is that the energy management system 130 can enforce and provide to the utility provider and validated list of enclosures that are eligible for a given program—programs that might depend on seasonality (e.g., requiring cooling the summer or heating in the winter). In some embodiments, the system allows the energy management system 130 to use an external ID of the particular utility provider to retrieve a list of tuples that identifies requirements particular to that utility provider.

FIG. 33K illustrates a transaction diagram for updating device registrations between the energy management system 130 and utility provider computer system 120. A single user account at the energy management system 130 may have multiple devices paired with the account. For example, a home may have three thermostats, three hazard detectors (e.g., smoke detectors, CO detectors), a security system, and/or a security system. Each of these devices will have a permanent serial number that uniquely identifies the device with the energy management system 130. Some utility providers may provide additional DR benefits to utility accounts that have multiple devices. To the utility provider, multiple devices may indicate that a home uses multiple detection devices (e.g. thermostats, hazard detectors, etc.) and is thus more efficient with its energy usage. Alternatively or additionally, multiple devices may indicate a user with multiple residences managed under the same utility account. For example, a user may have a number of rental properties under the same account, with each rental property having its own unique thermostat. In situations where a single account is associated with numerous devices, the utility provider needs to know how many devices qualify for DR benefits. In some embodiments, the utility provider computer system 120 may automatically generate payments for users based on the number of eligible devices registered to their account.

FIG. 33K illustrates one embodiment for transmitting device information from the energy management system 130 to the utility provider computer system 120. Typically, users will register their devices with the energy management system 130. The energy management system 130 will store account information specific to the devices, such as sensor histories, usage information, Wi-Fi communication protocols, and so forth. Therefore, when a user adds a new device to their home, they will register the device with the energy management system 130, typically during the process of setting up the device on their home network. Some embodiments will utilize the registration with the energy management system to automatically generate information that can be provided to the utility provider computer system 120. For example, the energy management system 130 can provide an event stream to utility providers. An event is generated and transmitted each time a user changes their configuration. For example, when a user adds or removes a device from their residence, a new event will be generated. In the example of FIG. 33K, a first event is generated when device #2466334 is added to account #4432-5565, and a second event is generated when device #3345674 is added to the same account. Another event is generated when device #3345674 is later removed from account #4432-5565. Finally, an event is generated when device #334-3567 is added to a separate account (#1112-2323). The utility provider computer system 120 receives each of the generated events in their event stream and can update a list of eligible devices.

FIG. 33L illustrates a transaction diagram for updating a number of eligible devices, according to some embodiments. This embodiment is similar to that shown in FIG. 33K, the difference being that instead of generating events that add/remove devices, events are generated that simply indicate the number of eligible devices for a particular account. This embodiment alleviates the need for the utility provider computer system 120 to constantly update and track the number of devices as they are dynamically added and removed by users. Instead, the energy management system 130 can simply transmit an indication to the utility provider computer system 120 that indicates the total number of eligible devices enrolled in the DR program. For example, when two eligible devices are registered for account #4432-5565, the utility provider computer system 120 can generate two payments corresponding to the two eligible devices. When a user removes a device from their residence, the number of eligible devices for that user's account will decrease. Thus, when only one eligible device remains for account #4432-5565, the utility provider computer system 120 can use this information to generate a single payment to that user. In addition to adding and removing devices, the number of eligible devices can change when the utility provider computer system 120 changes its configuration requirements. For example, if the utility provider computer system 120 requires eligible devices to be connected to a Wi-Fi network, a thermostat that is removed from a home Wi-Fi network may no longer be eligible. The energy management system 130 can detect changes in configuration such as this as described above, and update the number of eligible enrolled devices for the utility provider computer system 120.

Although FIG. 33L illustrates events being transmitted through an event stream, other embodiments may use different methods of transmitting an eligible number of devices to the utility provider computer system 120. For example, in one embodiment events generated by the energy management system can write results to a database that can consume information the form of a data file (e.g. CSV format) that is specific to each utility provider. The utility provider can then log into the utility portal described below and access their data file. The utility provider computer system 120 can then download the data file to their system for generating payments.

Figure 33M:
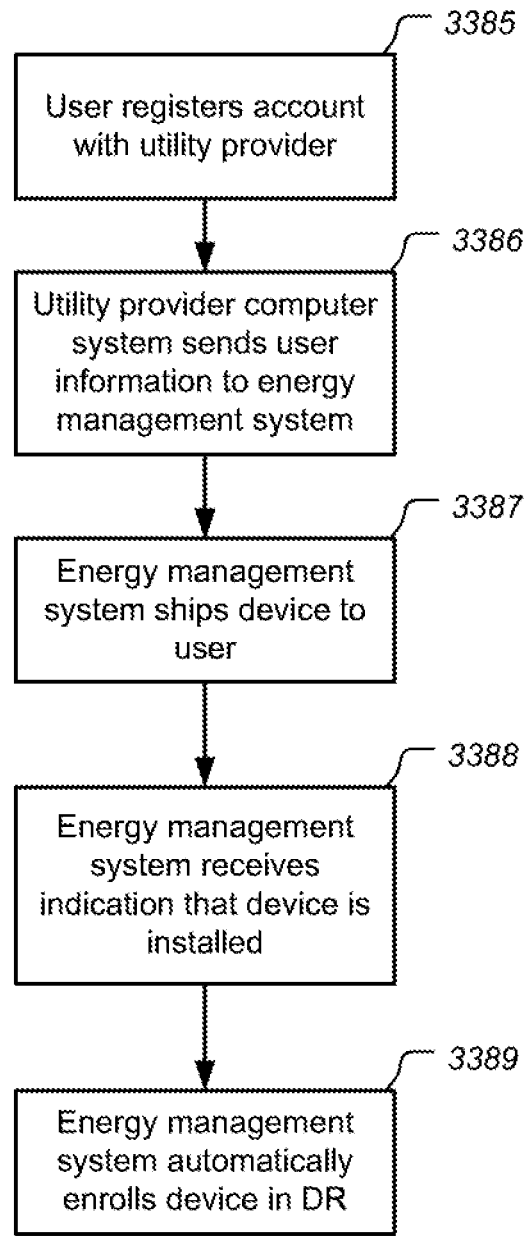
FIG. 33M illustrates a flowchart of a method for automatically enrolling devices in a DR program after origination with the utility provider computer system, according to some embodiments.

FIG. 33M illustrates a flowchart of a method for automatically enrolling devices in a DR program after origination with the utility provider computer system 120. In some cases, the utility provider will offer free devices to users signing up for their utility services. For example, a utility provider may offer a free thermostat to anyone signing up for the utility and enrolling in the DR program. When user signs up for the utility through an online web form presented by the utility provider computer system 120, the user will provide a name, an address, a payment method, and/or any other information required to complete the transaction. When the user registers an account with utility provider (3385), the utility provider computer system 120 can generate a data packet to be transmitted to the energy management system 130 in order to fulfill the device order. When the user signs up at the utility, they can choose to receive a free device and to participate in the DR program.

The method may include receiving user information from the utility provider computer system 120. For example, the utility provider computer system 120 can secure FTP a file that includes customer information for fulfilling the device order and information for enrolling the device in the DR program. The method may also include causing the device to be shipped to the customer (3387). In some embodiments, the energy management system 130 can send a request to a fulfillment service to ship the device to the user. The fulfillment service can then provide a list of device serial numbers to the energy management system 130 such that the energy management system 130 can pair a device serial number with a user account before the device is activated and registered with the energy management system 130. In some embodiments, the energy management system 130 can generate a shipping order and invoice such that the energy management system can handle fulfilling the order directly without the fulfillment service.

After receiving the device, the user may install, provision, and register the device according to methods discussed elsewhere in this disclosure. As part of the registration process, the device will send a transmission to the energy management system 130 indicating a user account and a device serial number that should be paired with that account. Thus, the method may also include receiving an indication that the device is installed and activated in the user's residence (3388). In response, the energy management system 130 can automatically enroll the device in the DR program based on a previous agreement made between the utility provider computer system 120 and the user at the time device was ordered (3389). This streamlined procedure eliminates the need for a user to specifically request enrollment in the DR program after the device is installed.

Occasionally, problems may arise during the process of automatically registering a device for the DR program. For example, a user may refuse shipment of the device when it arrives. A user may receive a device and never install/register the device with the energy management system. Users may receive a device and sell the device to another user. If the device is shipped by the fulfillment service (or the energy management system 130 itself) but never registered, the energy management system 130 will have record of a serial number for that device. In response, the energy management system can determine—after a predetermined time interval—that the user may not have properly installed their device. The energy management system 130 can then send an email or other form of communication to the user inquiring as to the status of the device and offering additional setup instructions. In cases where the device serial number is registered to an account that does not belong to the original user (e.g., the user sells the device or it is stolen before registration) then the energy management system 130 can send an indication to the utility provider computer system 120 indicating that the enrollment in the DR program and association with the original user account should be canceled. In one embodiment, the energy management system 130 can allow the utility provider and/or any other third party access via an API to query information that will indicate whether a qualifying device has been paired to a given user's account.

Figure 34A:
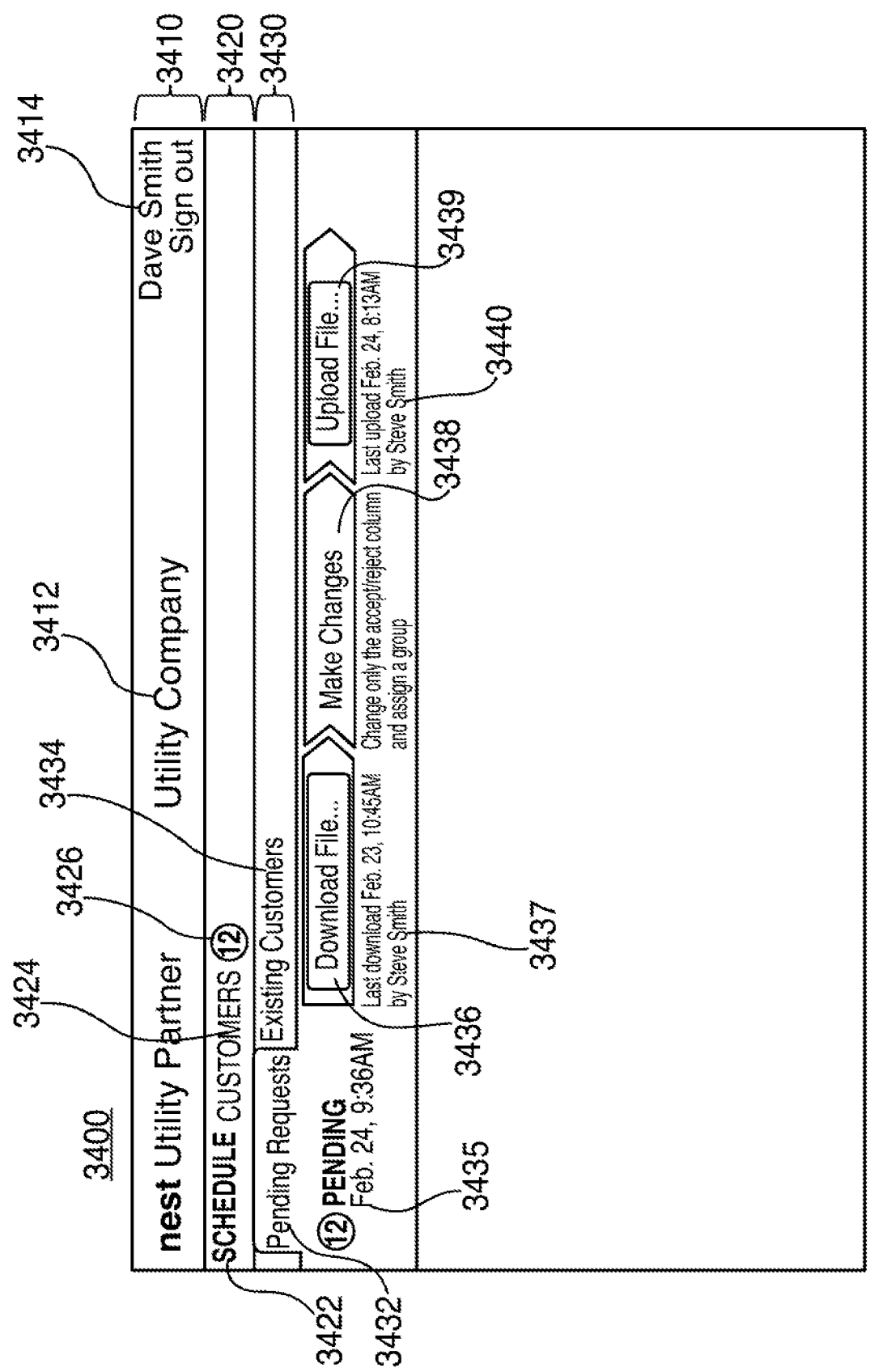

FIG. 34A illustrates an input/output (I/O) element 3400 including a utility portal according to an embodiment. As referenced above in connection with FIGS. 29A and 29B, the utility portal can be managed by energy management system 130 and all information associated with the portal can be contained on one or more servers associated with energy management system 130. I/O element 3400 may be presented to a utility operator after he logs into an interface managed by energy management system 130. For example, the utility operator can log into the interface by entering his login name and password via a website. The utility operator can navigate to different pages or modules and interact with various sub-elements within I/O element 3400 by manipulating an input device (e.g., a mouse).

In the particular I/O element shown in FIG. 34A, the utility portal can include information bar 3410, which can include utility company name 3412 and utility operator name 3414, and module selection bar 3420, which can include schedule module 3422, customer management module 3424, and pending customers number 3426. Information bar 3410 can include various information that remains persistently displayed throughout the duration of the utility operator's session with I/O element 3400. Utility company name 3412 can identify the name of the utility company who is associated with I/O element 3400. Utility operator name 3414 can identify the name of the person logged in to access I/O element 3400. Module selection bar 3420 can serve as a navigation tool to different modules in I/O element 3400. For example, the information shown below selection bar 3420 depends on which module is selected. As shown, customer module 3424 is selected and thus information pertaining to module 3424 is provided below selection bar 3420. Various aspects relating to customer module 3424 is now discussed, and aspects relating to schedule module 3422 is discussed in more detail below.

When customer management module 3424 is selected, tab bar 3430 can be displayed. Tab bar 3430 can include any suitable number of user selectable tabs, and when a tab is selected, information pertaining to that tab is displayed. As shown, pending requests tab 3432 and existing customers tab 3434 are included in tab bar 3430, and pending requests tab 3432 is currently selected. With tab 3432 selected, information related to new enrollees awaiting confirmation for entry into a demand response program is displayed. In particular, pending customer number 3435, download file option 3436, last download notification 3437, instructions 3438, upload file option 3439, and last upload notification 3440 can be displayed. When the utility operator is viewing I/O element 3400, he can see that twelve (12) customers (shown at pending customer number 3435) are awaiting approval by the utility company to participate in a demand response program. In addition, the utility operator is informed of the last time a file was downloaded at notification 3437 and the last time a file was uploaded at notification 3440. Upon seeing this information, the utility operator can select download file option 3436.

When download file option 3436 is selected, the utility operator can be provided with a file that is supplied by energy management system 130. The file can include any suitable information that enables the utility operator to decide whether to approve or disapprove each pending customer for inclusion in a demand response program. For example, the file can be a common separated value (CSV) file or any other file type suitable for electronically passing information securely from one place to another. After the file is downloaded, the utility operator can make changes (pursuant to instructions 3438) to the file and then upload it to energy management system 130 by selecting upload file option 3439.

Referring now to FIG. 35, illustrative contents of file 3500 downloaded from energy management system 130 are shown. File 3500 can include information for two pending customers, as shown in columns 3502 and 3503, respectively. File 3500 can include several fields of information arranged in column 3501. The customer information for the various fields can be populated by different sources. These sources can include energy management system 130, the customer, and the utility company. Fields populated by energy management system 130 can include month field 3510, day field 3511, event_type field 3512, email field 3513, rate_plan field 3514, serial number field 3515. Event_type field 3512 may be used to populate pending customer number 3435 (of FIG. 34A). For example, if there are twelve customers having NEW_USER in field 3512, then number 3435 can show that there are twelve pending customers. Rate_plan field 3512 can specify what type of demand response program the customer has enrolled into. Serial number field 3515 can specify the serial number of the network-connected thermostat associated with the customer. The information in these fields may have already been acquired from the customer prior to his attempt to enroll in a demand response program. For example, this information may have been collected during the initial installation of the network-connected thermostat.

Other fields that can be populated by energy management system 130 include DEVICE_ADDED, DEVICE_REMOVED, AND STRUCTURE_REMOVED. These additional fields can enable energy management system 130 to inform the utility company when users are adding or removing devices. If users add or remove one or more devices, this can affect their rebates. Moreover, energy management system 130 can inform the utility company if a particular user's device has been offline for a predetermined period of time. The utility company may use this information in deciding how to provide a rebate to that customer.

Fields populated by the customer can include name field 3520, service address field 3521, service_city field 3522, service_state field 3523, service_postal_code field 3524, mailing_address field 3525, mailing_city field 3526, mailing_state field 3527, mailing_postal_code field 3528, account_number field 3529, and contract_approved field 3530 (which can indicate the date the customer agreed to the terms of service). The invention in these fields may be acquired from the customer when he enrolls himself into a demand response program. For example, the information collected during the enrollment process of FIGS. 33A-33E may be used to populate these fields. This information may be included in the file by energy management system 130, and is ultimately stored and maintained there, but is initially collected during the enrollment process.

Fields populated by the utility operator can include approved field 3531, assign_group field 3532, group field, 3533, rejection_reason field 3534, and rejection_notes field 3535. One or more of these fields can be populated by the utility operator. The utility operator may be able to choose an entry for each field from a pre-defined list of entries, or insert entries manually by typing it in. For example, the utility operator can choose from a list including "yes," "no," and "undecided" when selecting an entry for approved field 3531. Entries for assign_group field 3532 can be yes or no. If the utility operator does not approve a customer, he can optionally insert an entry into rejection_reason field 3534 and rejection_notes field 3535. The entry in rejection_reason field 3534 may be used in an email to the customer explaining why he is not eligible for the demand response program.

Group field 3533 can be populated with a particular group. For example, the utility operator can select group number one (1) for the customer in column 3502 and select group number two (2) for the customer in column 3503. The utility operator can select a group from a pre-defined list of groups or create a new group, which would then be included in the pre-defined list of groups. The utility company may create as many groups as it would like and assign customer to any one of those groups. The motivation or reasoning for each group can be entirely defined by the utility company. In one approach, the utility company may associate each group to a particular geographic location (e.g., a city or neighborhood). In another approach, the utility may associate each group with a particular power sub-station or a distribution network region. In yet another approach, the utility may associate each group with a load profile (e.g., customers can be assigned to a group based on average power consumption, power consumption characteristics, and other suitable power usage criteria). It should be understood that the criteria the utility company can use for associating a customer to a group can be virtually limitless, but the only information it needs to insert in the file is the name of group it wants associated with a particular customer.

After the utility operator has finished making changes to and uploads the file, energy management system 130 can analyze the changes made to the file and provide summary information 3450, as shown in I/O element 3401 of FIG. 34B. Energy management system 130 can check see whether the utility operator made any errors in entering information into the file, tabulate the number of customers accepted, and tabulate the number of customers rejected. Summary information 3450 illustrates that nine (9) customers were accepted, one (1) was rejected, and that there were two errors. Each error can provide a reason, in addition to other information that identifies the customer. If desired, the utility operator can download the file again, and attempt to resolve the errors, and then re-upload the file.

When the utility operator selects schedule module 3422, the user can be presented with I/O element 3403, as illustrated in FIG. 34C. I/O element 3403 shows an interface for enabling the utility operator to schedule or cancel demand response events and view information on active and previous demand response events. In particular, I/O element 3403 includes scheduler region 3450, active demand response region 3470, and previous demand response region 3480. Scheduling region 3450 can include date selection 3451 for defining the date of a future demand event. The operator can select the current date or a future date for scheduling the future demand event. Region can include demand event time period selection 3452 for defining the time duration of the future demand event. The operator can define the time duration by manually inputting start and end times, or selecting from a dropdown menu. In some embodiments, the time duration may be fixed for a particular utility company. That is, regardless of the day the demand response event is scheduled to run, its time duration is the same.

Scheduling region 3450 can include demand response scheduling deadline 3453 that informs the operator of deadline by which a demand response event should be requested. In some embodiments, the deadline for a next day demand response event can be at predetermined time (e.g., 11:59 pm) the night before. In other embodiments, the deadline can be a fixed period of time (e.g., two hours) before the start time of the demand response event. In yet another embodiment, there may be no deadline and demand response events can be scheduled on demand.

Scheduling region 3450 can also include columns of categories populated by one or more rows of information. As shown, the categories can include groups 3454, total units 3455, ready status 3456, percentage (%) of ready units 3457, availability 3458, last demand event 3459, and remaining event requests 3460. The units can be customer premises control units or networked controlled thermostats. Rows 3461, 3462, and 3463 show information associated with a particular utility defined group. For example, the groups can be those used in the file of FIG. 35. It is understood that any suitable number of rows may be shown to correspond to however many groups are defined by the utility company and that the operator can scroll up and down or page up and down to see more rows. Groups 3454 refer to the names of the groups defined by the utility operator (e.g., in the file downloaded from energy management system 130). These are groups that the utility customers are assigned to by the utility operator (as previously discussed above).

Total units 3455 refer to the total number of network-controlled thermostats associated with a particular group. For example, in row 3461, 438 units are associated with group A. Each one of these units can belong to a customer who agreed to participate in a demand response program and has been approved by the utility company. Ready status 3456 indicates the number of units that are currently available to receive demand response instructions (from energy management system 130) to execute a demand response program. Percentage of ready units 3457 is self-explanatory. Whether a unit qualifies as a ready status unit can depend on any number of suitable factors. These factors can include, for example, customer preference settings, whether the customer has agreed to participate in the future demand response, and whether the unit is online or scheduled to be online before the start of the demand response. Since several factors can be involved and people's preference can change, the number of ready status units can change from one moment to the next, and are not necessarily dispositive of the actual number of units that will implement received demand response instructions. In some embodiments, it may be found that the number of ready units increases as time encroaches on the start time of the future demand response.

Availability 3458 can specify whether a group is available for inclusion into a future demand response event, already scheduled in a future demand response event, or currently running in a future demand response event. As shown in I/O element 3403, all groups are designated as available. Last demand event 3459 can indicate the last time a group was utilized for a demand response event. For example, group B last ran on Saturday, February 22, from 2:00 PM-4:00 PM. Remaining event requests 3460 can specify the number of times a group can be utilized for demand response events within a given time frame (e.g., a month or a season).

Scheduling region 3450 can include aggregation region 3465, which aggregates the groups, total units, and ready units, and calculates a percentage of aggregated ready units for the one or more groups selected for inclusion in a future demand response event. The groups can be selected, for example, by checking a box adjacent to each group. In addition, a submit request element 3466 can be included to enable the utility operator to request a demand response event to commence on the defined date and event period for the selected groups.

Referring now to FIG. 34D, illustrative I/O element 3404 is shown. I/O element 3404 shows that the utility operator has selected group A and group B for potential inclusion in a future demand response event. When one or more groups are selected, aggregation region 3465 is populated with the appropriate information. In I/O element 3404, aggregation region 3465 shows Group A and Group B have been selected, and that the total units are 1005, the ready units are 791, and the percentage is 79%. After one or more groups have been selected, submit request element 3466 can change in any suitable fashion (e.g., change colors) to inform the utility operator that he can select element 3466 to request a demand response event. When the operator selects submit request element 3466, the utility portal may display I/O element 3405 of FIG. 34E.

I/O element 3405 shows that groups A and B have been moved down to active demand response region 3470 and that the availability status 3458 of groups A and B have changed from available to scheduled. In addition, groups A and B may no longer be selectable for inclusion into another demand response event for the same date and event period. Their non-selectability can be indicated in any number of ways, including, for example, being partially faded out. Active demand response region 3470 can include statistical information 3471 (e.g., total units, confirmed units, and percentage), date and event period information 3472, and status 3473 for each active or schedule demand response event. Statistical information 3471 shows that the total number of units is the same at 1005 and that the number of confirmed units is 856. Note that the number of confirmed units is higher than the number of ready units (as shown in aggregation region 3465 of I/O element 3404). This may be because additional units have confirmed their ability to participate in the demand response event since submit request element 3466 was selected. Status 3473 can indicate the demand response is "scheduled" until the current time equals the date and time, at which point the status changes to "running". This change is shown in I/O element 3406 of FIG. 34F.

Referring now to I/O element 3406, the information shown in availability field 3458 changes from "scheduled" to "running" when the demand response event is actually running. The statistical information 3471 shown in active demand response region 3470 may remain static once the demand response commences. In other embodiments, real-time information associated with the number of units participating in the demand response event may be provided in region 3470.

Previous demand response region 3480 can include data regarding one or more previously implemented demand response events. Region 3480 can include statistical unit information 3481, date and event period 3482, and statistical runtime information 3483 for each previously executed demand response event. Two previously implemented demand response events 3485 and 3486 are shown. Since the demand response events have already been implemented, the statistical information shown in region 3480 can be dispositive. For example, statistical unit information 3481 can specify the total number of units associated with the group(s) selected for the demand event, the number units of that participated in the demand event, and the percentage of participation. In some embodiments, in order for a unit to count as a participant, the unit must have run throughout the entire event period. If, for example, a unit starts participating, but then drops out (e.g., due to customer usage), that unit would not be included in the participation statistics. In other embodiments, a unit can count as a participant after the unit confirms receipt of demand response event, and even if it does not remain online during the duration of the demand response. It is understood that any suitable rule may be applied to determine whether a unit qualifies as a participation unit.

Statistical runtime information 3483 can provide an indication of actual or relative energy savings achieved through implementation of the demand response. I/O element 3406 shows relative energy savings in the form of hours shifted or saved as a result of the demand response. In particular, for demand response 3485, the cumulative run-time for groups A and B was 1429 hours when operating with the demand response. If the demand response was not to be implemented, then 2210 cumulative hours would have been needed for groups A and B. Thus, as a result of implementing demand response 3485, a 35% reduction was realized. The reduction refers to energy shifted during the demand response period. If desired, the operator can expand one or more demand events to see group specific statistical information, as shown, for example, in I/O element 3407 of FIG. 34G. In other embodiments, the statistical information can include cumulative statistics can show power shift savings in kWh or MWh.

In some embodiments, the utility portal can indicate how much energy can be saved if a demand response event is called. It is understood that the energy savings refers to how much energy is shifted during the demand response period, and is not necessarily a net savings in energy. The energy savings can be presented to the user as estimated total energy reduction, estimated current energy reduction, actual current energy reduction, estimated aggregate current energy reduction, actual aggregate current energy reduction. Various aspects of these embodiments have been discussed above in connection with the description accompanying FIGS. 29A and 29B. Turning now to I/O element 3600 of FIG. 36A, an illustrative example of a utility portal providing estimated energy savings based selected groups is provided.

I/O element 3600 is in many respects similar to the I/O elements of FIGS. 34A-G, except now there is an addition of utility operating parameters region 3630 for schedule module 3622. I/O element 3600 can retain scheduling region 3650, which can embody the same or similar aspects of scheduling region 3450 (of FIG. 34C). Other regions such as an active demand response region and past demand response region may be included in I/O element 3600, but have been omitted to avoid overcrowding the FIG. Utility operating parameters region 3630 can include energy production capacity field 3632, enter energy demand profile element 3634, and graph 3640. The utility operator can enter the energy production capacity of the utility into field 3632. The value entered here can then be displayed as the dashed line labeled max energy production 3642. In another embodiment, the value entered into field 3632 can be a subset of the energy production capacity. This value can be selected based on the number of network-controlled thermostats participating in a demand response program or the how much power the utility wishes to allocate to a subset of customers.

The operator can select enter energy demand profile 3634 to upload or define an energy demand profile. In one embodiment, which is discussed in more detail in conjunction with FIGS. 36B-D, the energy demand profile can be the utility company's projected energy consumption for a given day, or for a particular time period of a given day. In another embodiment, which is discussed in more detail in connection with FIGS. 36E-36G, the energy demand profile can include a mixture of real-time energy consumption and projected energy consumption. The energy demand profile can be provided in any number of suitable ways. In one approach, the user can upload a file that contains energy consumption data. When this file is uploaded, energy management system 130 can extract the data to produce a graphical representation of the energy demand profile, shown as profile 3644 in graph 3640. In another approach, an API may exist that automatically extracts the necessary data to produce profile 3644.

Graph 3640 can provide the utility operator with a relatively accurate assessment of the utility company's energy position for the given day or period of time within the given day. As shown in graph 3640, the operator can see that energy demand profile 3644 is projected to exceed max energy production between time period, $t_1$ and $t_2$. In order to reduce energy demand during that time period, the operator can request a demand response. The utility operator can select one or more of the groups shown in schedule region 3650 to construct a potential demand response event, and for each selected group, graph 3640 can display a demand response energy consumption profile (not shown in FIG. 36A). No demand response energy consumption profile is shown in I/O element 3640 because no groups have been selected for potential inclusion in a demand event. Examples showing different demand response energy consumption profiles depending on which group or groups have been selected are shown and described in FIGS. 36B-36D.

Figure 36B:
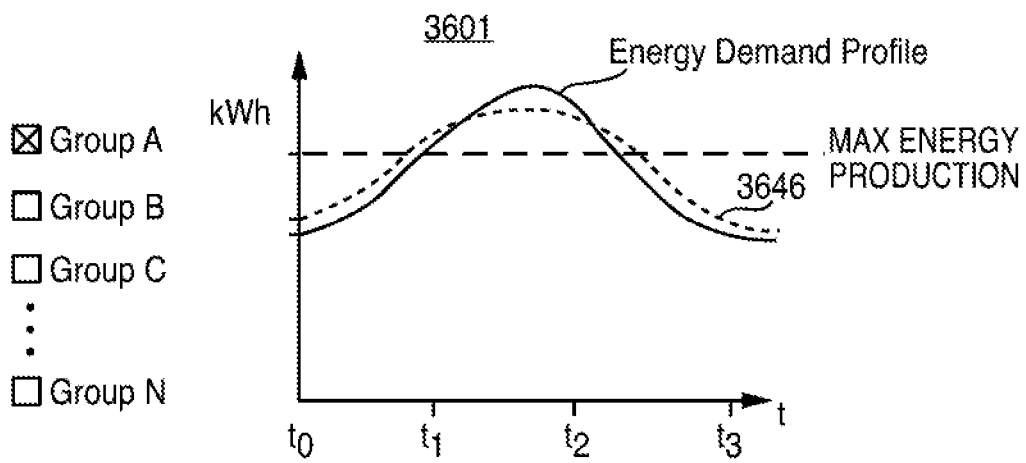
FIGS. 36B-36D each show greatly simplified I/O elements of a utility portal that show different graphs based on which group or groups are selected according to various embodiments.
Figure 36C:
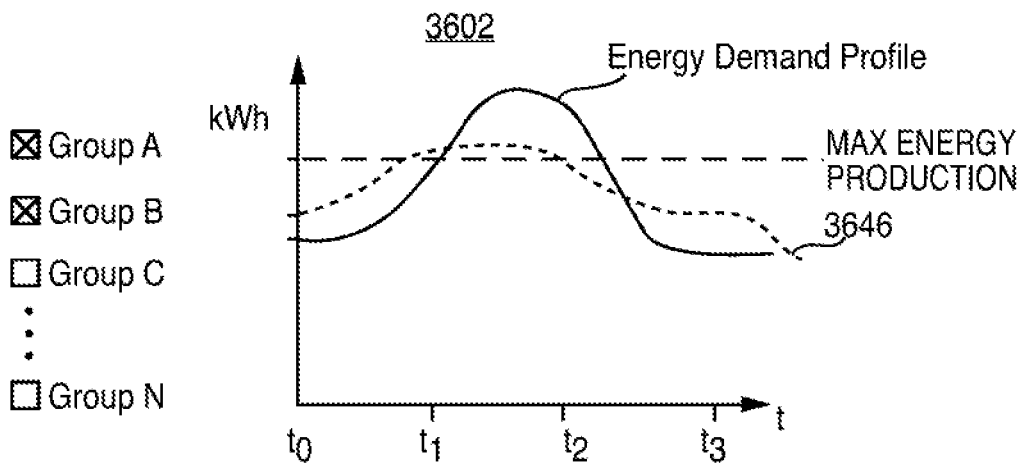
Figure 36D:
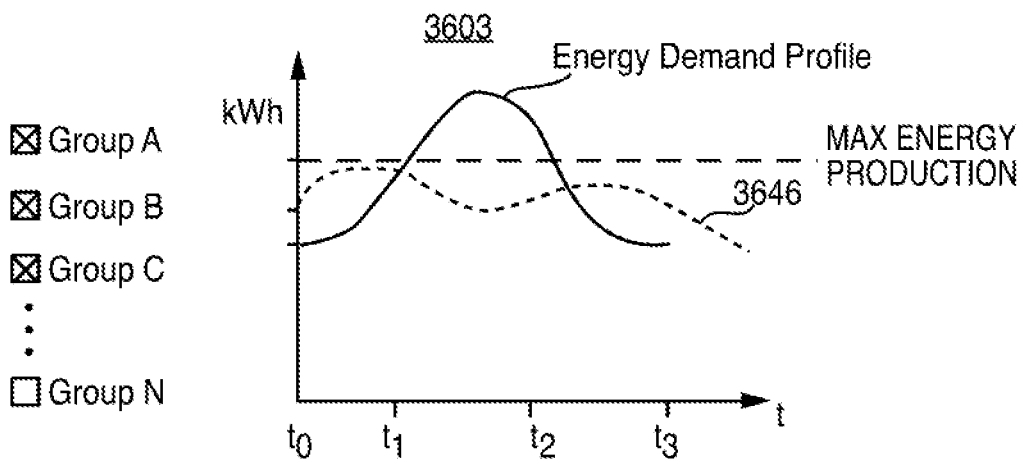

FIGS. 36B-36D each show greatly simplified I/O elements 3601-3603, respectively, that show which group or groups are selected and a corresponding graph. Although not shown in FIGS. 36B-36D, the graphs can be included as part of a utility portal and can, for example, embody graph 3640 of I/O element 3600. These FIGS. are depicted based on assumptions that the energy demand profile and max energy production are fixed. I/O element 3601 shows that group A is selected, but that demand response profile 3646 has not shifted enough energy (to avoid exceeding the max energy production). I/O element 3602 shows that groups A and B are selected, but demand response profile 3646 is not quite sufficient in shifting enough energy. I/O element 3603 shows that groups A, B, and C are selected and that demand response energy profile 3646 shifts enough energy to the satisfaction of the utility operator. Upon seeing that the selected combination of groups A, B, and C are sufficient, the operator can request a demand response using those groups.

Figure 36E:
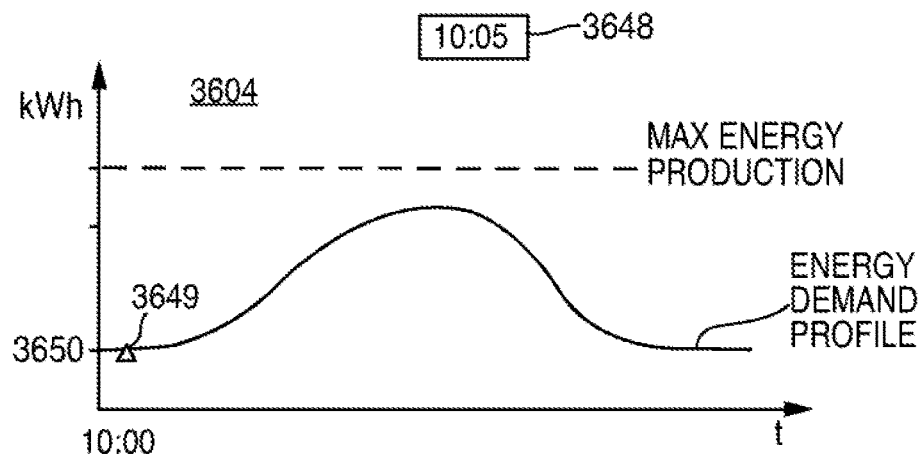
FIGS. 36E-36G each show greatly simplified I/O elements of a utility portal show energy demand profiles representing a combination of real-time energy consumption and predicted energy consumption according to various embodiments.
Figure 36F:
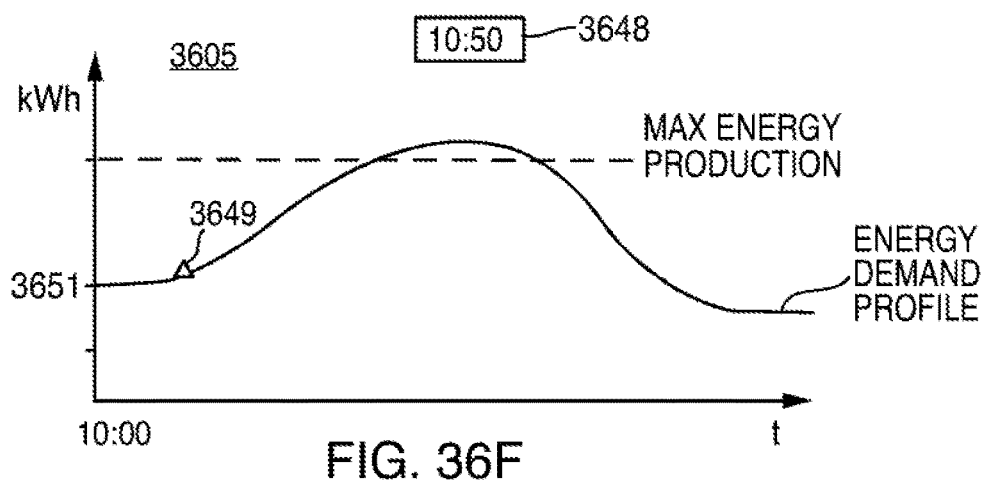
Figure 36G:
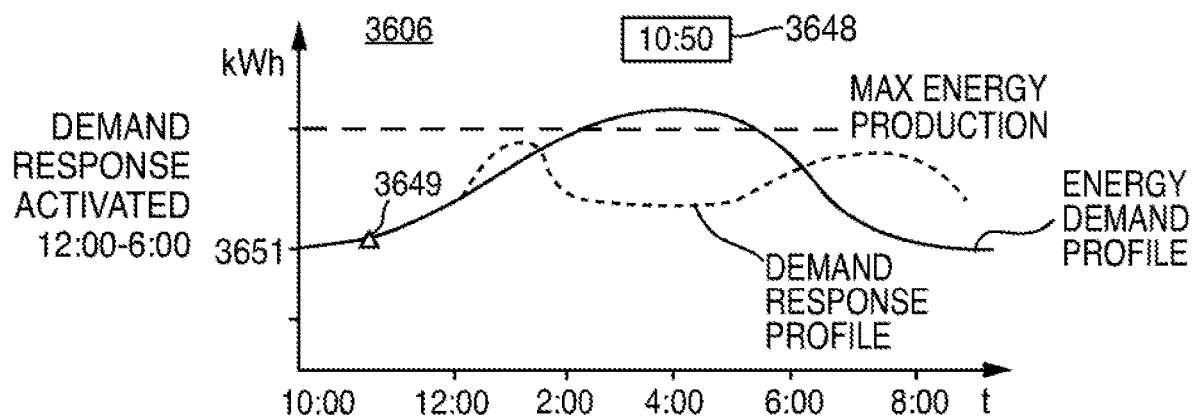

FIGS. 36E-36G each show greatly simplified I/O elements 3604-3606, respectively that show energy demand profiles representing a combination of real-time energy consumption and predicted energy consumption. The energy demand profiles shown in elements 3604-3606 are different than those shown in elements 3401-3403 because these energy demand profiles incorporate real-time energy consumption data, thereby providing the utility operator with a relatively more accurate picture of the load being serviced by the utility company. Although not shown in FIGS. 36E-36G, the graphs can be included as part of a utility portal and can, for example, embody graph 3640 of I/O element 3600. Each of I/O elements 3604-3606 shows the energy demand profile, max energy production, current time in box 3648 and time element 3649, which shows the current time location on the energy demand profile.

In I/O element 3604, the energy demand profile is shown be well below the max energy production at the time indicated in box 3648 (e.g., 10:05). Time element 3649 shows that the current energy consumption is at location 3650. However, as shown in I/O element 3604, the energy demand profile experiences a step change increase in demand. At the time indicated in box 3648 (e.g., 10:50), time element 3649 is at location 3651 and the profile indicates that the energy demand may exceed the max energy production. In seeing this graph or receiving an email or push notification from energy management system 130, the utility operator may decide to initiate a demand response. The operator can select one or more groups as discussed above, and request the demand response. In other another approach, the operator can request that its utility partner execute a demand response on its behalf (as discussed in more detail below in connection with FIG. 37). For illustrative purposes, assume that the operator schedules a demand response from 12:00-6:00. I/O element 3606 shows a demand response profile of the energy consumption based on that scheduled demand response, thereby showing the utility operator that a potential over consumption event has been averted.

FIG. 37 shows illustrative I/O element 3700 of a utility portal that has request module 3726 according to an embodiment. Request module 3726 provides the utility operator with the option of requesting an energy reduction from the utility company's utility partner. The utility partner can be the organization operating energy management system 130, for example. In this embodiment, energy management system 130 determines which demand response program participants are selected for a demand response event. The utility company can provide any suitable number of parameters pertaining to a requested demand response, but system 130 is ultimately in charge of which network-controlled thermostats are instructed to implement the demand response based on those parameters. The parameters can include, for example, desired energy reduction amount 3730, date 3732, and time period 3734. Other parameters can be defined in parameter region 3729, but are not shown to avoid overcrowding the FIG. The energy reduction amount is equivalent to the energy amount to be time shifted and is not necessarily an overall net reduction. It is energy reduced as applied to time period 3734.

An example of another parameter can include priority preferences among demand response participants. In some demand response programs, customers may opt to be involved in one of multiple tiers of a program. For example, one tier may have greater financial incentives than another tier. As another example, one tier may allow for greater participation in demand response events than another tier. The utility company may consider one tier to be a first priority, and another tier to be a second priority, and so on. In some embodiments, energy management system 130 can define the tiers based any suitable criteria, such as, for example, customer occupancy, participation in demand response events, etc.

Request summary region 3735 can show the parameters selected or entered by the user in parameter region 3729. As shown, the parameters include a 2 MWh energy reduction on March 25, from 12 pm to 6 pm. The operator can request a demand response with these parameters by selecting element 3736. After element 3736 is selected, the parameters can be transmitted to energy management system 130, which determines how it can satisfy the request. After making the determination, I/O element 3700 can present a solution in solution region 3760. Any suitable information can be displayed in solution region 3760. For example, region 3760 can specify how much energy can be reduced in box 3762 on the date specified in box 3764 during the time period specified in box 3766.

Solution region 3760 can indicate which group or groups would be participating in the requested demand response event if the operator confirms the demand request by selecting element 3768. Groups A, B, and C are shown, along with how much energy would be saved, total unit, ready units, and percentage for each. The operator can have the option to deselect or select any of the groups prior to selecting element 3768. If a group is deselected, the information populating box 3762 can be updated to reflect the change.

FIG. 38 shows illustrative I/O element 3800 of a utility portal that has suggestion module 3822 according to an embodiment. Suggestion module 3828 provides the utility operator with an indication of how many demand response events are currently being suggested by energy management system 130. Suggested demand response events can be presented in the utility portal as a way of suggesting to the utility company that it has the option to run one or more demand events. Examples of three suggested demand events are shown in suggestion region 3830. The operator can select one or more of the suggested demand events and then select element 3840 to commence demand response event for selected suggestions. In another embodiment, the suggested demand events can be run automatically unless specifically cancelled by the utility operator.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Further, embodiments may include some or all of the systems, methods, apparatus, etc. described in U.S. application Ser. No. 13/632,118, filed Sep. 30, 2012, U.S. application Ser. No. 13/632,093, filed Sep. 30, 2012, U.S. application Ser. No. 13/632,028, filed Sep. 30, 2012, U.S. application Ser. No. 13/632,041, filed Sep. 30, 2012, U.S. application Ser. No. 13/632,070, filed Sep. 30, 2012, U.S. Provisional Application No. 61/704,437, filed Sep. 21, 2012, PCT Application No. PCT/US12/20026, filed Jan. 3, 2012, and PCT Application No. PCT/US12/00007, filed Jan. 3, 2012, all of which are incorporated by reference herein in their entirety for all purposes.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A method for authorizing multiple smart-home devices for demand-response (DR) programs, the method comprising:
   receiving, at a device management server that manages a plurality of smart-home devices, a request to pair a new smart-home device with an existing user account, wherein the existing user account is enrolled in a DR program with at least one utility provider computer system;
   pairing, at the device management server, the new smart-home device with the existing user account;
   determining, at the device management server, whether the new smart-home device satisfies predefined criteria for enrollment in the DR program; and
   sending, from the device management server to the at least one utility provider computer system, a transmission that indicates a total number of smart-home devices paired with the existing user account.

2. The method of claim 1, wherein the transmission that indicates the total number of smart-home devices paired with the existing user account is one of a plurality of transmissions that form an event stream generated by the device management server that is monitored by the at least one utility provider computer system.

3. The method of claim 2, wherein the plurality of transmissions comprise a first transmission ind right here we are allowable subject matter icating that a smart-home device has been removed from the existing user account at the device management server.

4. The method of claim 1, wherein the transmission that indicates the total number of smart-home devices paired with the existing user account comprises an indication that the new smart-home device has been added to the existing user account.

5. The method of claim 1, wherein the transmission that indicates the total number of smart-home devices paired with the existing user account comprises an identifier for the existing user account and an identifier for the new smart-home device.

6. The method of claim 1, wherein the transmission in that indicates the total number of smart-home devices paired with the existing user account comprises a number of eligible devices to participate in the DR program.

7. The method of claim 1, further comprising:
   determining that the new smart-home device no longer satisfies the predefined criteria for enrollment in the DR program; and
   sending, from the device management server to the at least one utility provider computer system, a second transmission indicating that the new smart-home device is no longer eligible.

8. The method of claim 7, wherein the new smart-home device no longer satisfies the predefined criteria because the new smart-home device is no longer connected to a Wi-Fi network.

9. The method of claim 1, wherein the transmission that indicates the total number of smart-home devices paired with the existing user account comprises an entry in a data file that is downloaded by the at least one utility provider computer system.

10. The method of claim 9, wherein the at least one utility provider computer system logs in through a utility portal to download the data file.

11. A device management server of an energy management system, the device management server comprising:
   one or more processors;
   one or more memory devices comprising instructions that, when executed by the one or more processors, cause the one or more processors to perform operations comprising:
      receiving, at a device management server that manages a plurality of smart-home devices, a request to pair a new smart-home device with an existing user account, wherein the existing user account is enrolled in a DR program with at least one utility provider computer system;
      pairing, at the device management server, the new smart-home device with the existing user account;
      determining, at the device management server, whether the new smart-home device satisfies predefined criteria for enrollment in the DR program; and
      sending, from the device management server to the at least one utility provider computer system, a transmission that indicates a total number of smart-home devices paired with the existing user account.

12. The device management server of claim 11, sending the transmission that indicates the total number of smart-home devices paired with the existing user account comprises sending the transmission from the device management server to an Application Program Interface (API) of a utility provider computing system.

13. The device management server of claim 12, wherein the API is provided by the utility provider computing system.

14. The device management server of claim 12, wherein the API is provided by a third party that is distinct from the energy management system and distinct from the utility provider computing system.

15. The device management server of claim 11, wherein the new smart-home device comprises a thermostat.

16. The device management server of claim 11, wherein the request to pair the new smart-home device with the existing user account is received from an app operating on a mobile device, wherein the mobile device is in communication with the new smart-home device during a registration process.

17. A non-transitory, computer-readable medium comprising instructions that, when executed by one or more processors, cause the one or more processors to perform operations comprising:
   receiving, at a device management server that manages a plurality of smart-home devices, a request to pair a new smart-home device with an existing user account, wherein the existing user account is enrolled in a DR program with at least one utility provider computer system;
   pairing, at the device management server, the new smart-home device with the existing user account;
   determining, at the device management server, whether the new smart-home device satisfies predefined criteria for enrollment in the DR program; and
   sending, from the device management server to the at least one utility provider computer system, a transmission that indicates a total number of smart-home devices paired with the existing user account.

18. The non-transitory, computer-readable medium of claim 17, wherein the operations further comprise:
receiving the predefined criteria for enrollment in the DR program from the at least one utility provider computing system.

19. The non-transitory, computer-readable medium of claim 17, wherein the transmission that indicates the total number of smart-home devices paired with the existing user account is one of a plurality of transmissions that form an event stream generated by the device management server that is monitored by the at least one utility provider computer system.

20. The non-transitory, computer-readable medium of claim 19, wherein the plurality of transmissions comprise a first transmission indicating that a smart-home device has been removed from the existing user account at the device management server.

* * * * *